United States Patent [15] 3,652,836
Richardson et al. [45] Mar. 28, 1972

[54] NAVIGATION DIRECTOR SYSTEM

[72] Inventors: Donald W. Richardson, Woodland Hills; Stanley N. Roscoe, Los Angeles; Edward Streeter, Woodland Hills, all of Calif.

[73] Assignee: Hughes Aircraft Company, Culver City, Calif.

[22] Filed: Mar. 22, 1968

[21] Appl. No.: 715,205

[52] U.S. Cl. ................ 235/150.26, 235/150.27, 73/178 R, 116/129 R, 343/107, 343/112 C, 353/13
[51] Int. Cl. .................................. G06f 15/50, G01s 7/46
[58] Field of Search .............. 235/150.26, 150.27; 35/10.2, 35/104, 12; 340/172.5; 343/9, 10, 12, 16, 107, 112, 112 PT; 353/11

[56] References Cited

UNITED STATES PATENTS

| | | | |
|---|---|---|---|
| 2,307,029 | 1/1943 | Elm | 343/112 |
| 2,541,277 | 2/1951 | Omberg et al. | 235/150.27 |
| 2,554,394 | 5/1951 | Wood | 35/10.2 |
| 2,943,321 | 6/1960 | Karpeles | 343/112 |
| 3,028,078 | 4/1962 | George et al. | 235/150.27 X |
| 3,114,912 | 12/1963 | Tooley | 235/150.27 X |
| 3,118,059 | 1/1964 | Vago | 235/150.26 |
| 3,151,310 | 9/1964 | Shepherd et al. | 343/112 |
| 3,215,823 | 11/1965 | Ariessohn et al. | 235/150.27 |
| 3,364,343 | 1/1968 | Hunt | 235/150.271 |
| 3,422,434 | 1/1969 | Pearson | 343/112 |
| 3,475,754 | 10/1969 | Scovill | 235/150.27 |
| 3,486,815 | 12/1969 | Roscoe | 343/107 X |

Primary Examiner—Malcolm A. Morrison
Assistant Examiner—Felix D. Gruber
Attorney—James K. Haskell and Walter J. Adam

[57] ABSTRACT

A navigation system is disclosed in which a displayed map is continuously and accurately controlled during flight of an aircraft to display the true relation between the aircraft and the terrain over which it passes. The displayed map is automatically selected from a plurality of stored maps for display, in response to pilot-initiated signals. A cockpit control panel is provided with manually actuable controls for the selection of a start point and a destination which define a direct great circle route therebetween. A route segment indication is displayed of the selected direct route or at a manually-selected offset course. The indication is displayed at a distance from an aircraft symbol which corresponds to the flight path error. A vernier deviation indication is displayed to provide a magnified presentation of the flight error. A series of indicators provides supplementary operating and status data to the pilot. The indicators include a Dead Reckoning indicator which indicates that the system is navigating in a dead reckoning mode, and an Off Chart indicator to indicate that the aircraft position is not on the selected navigation map.

55 Claims, 60 Drawing Figures

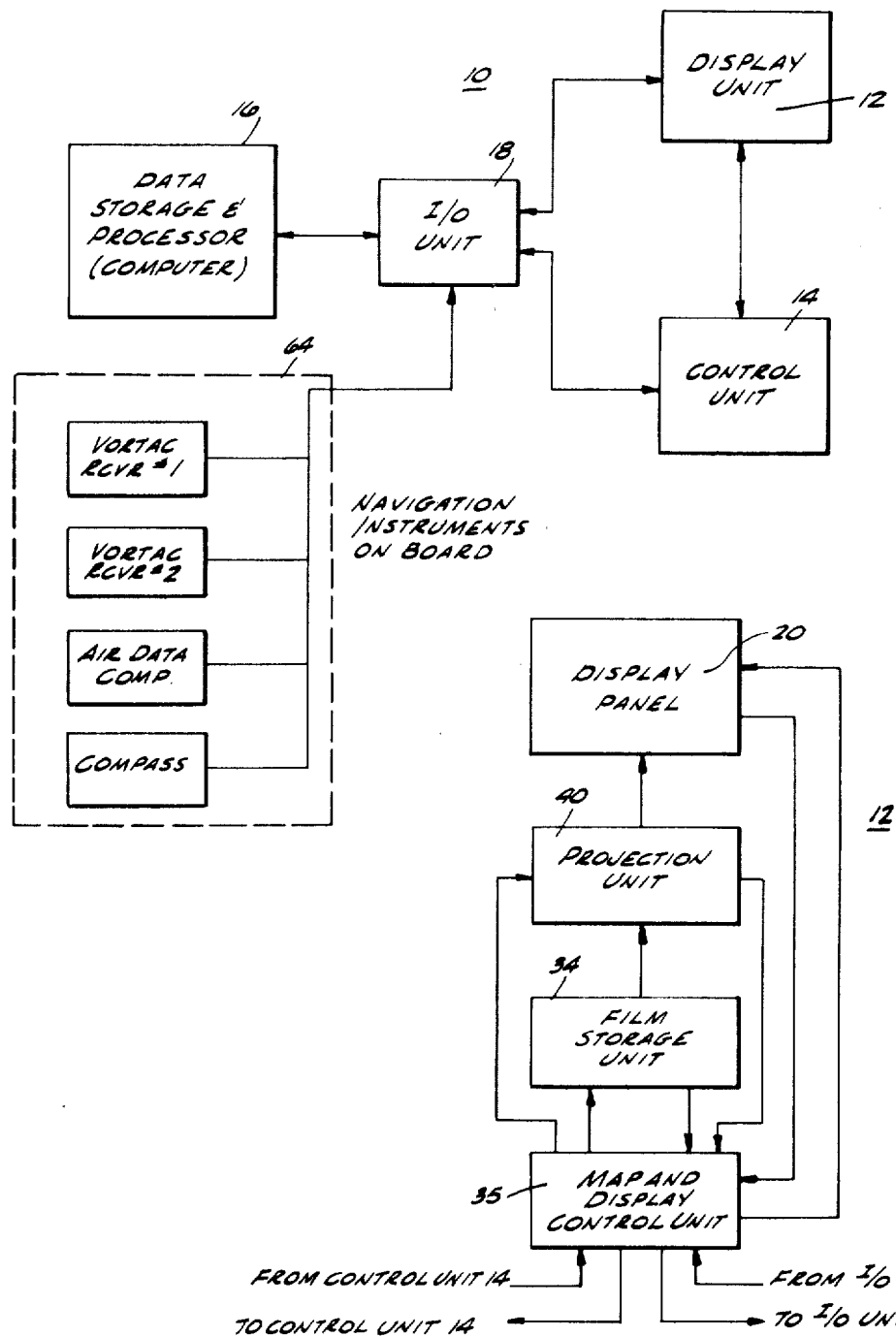

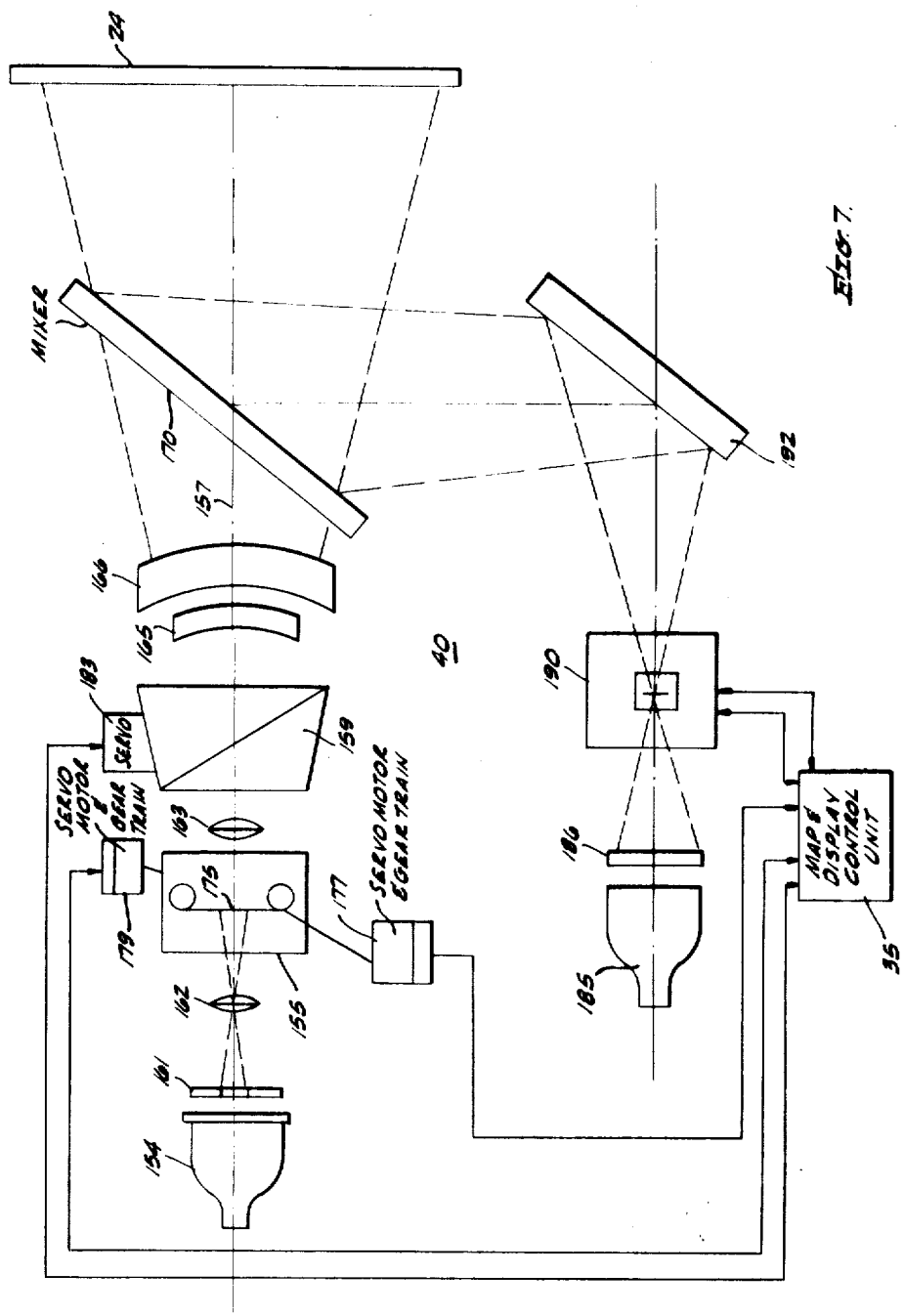

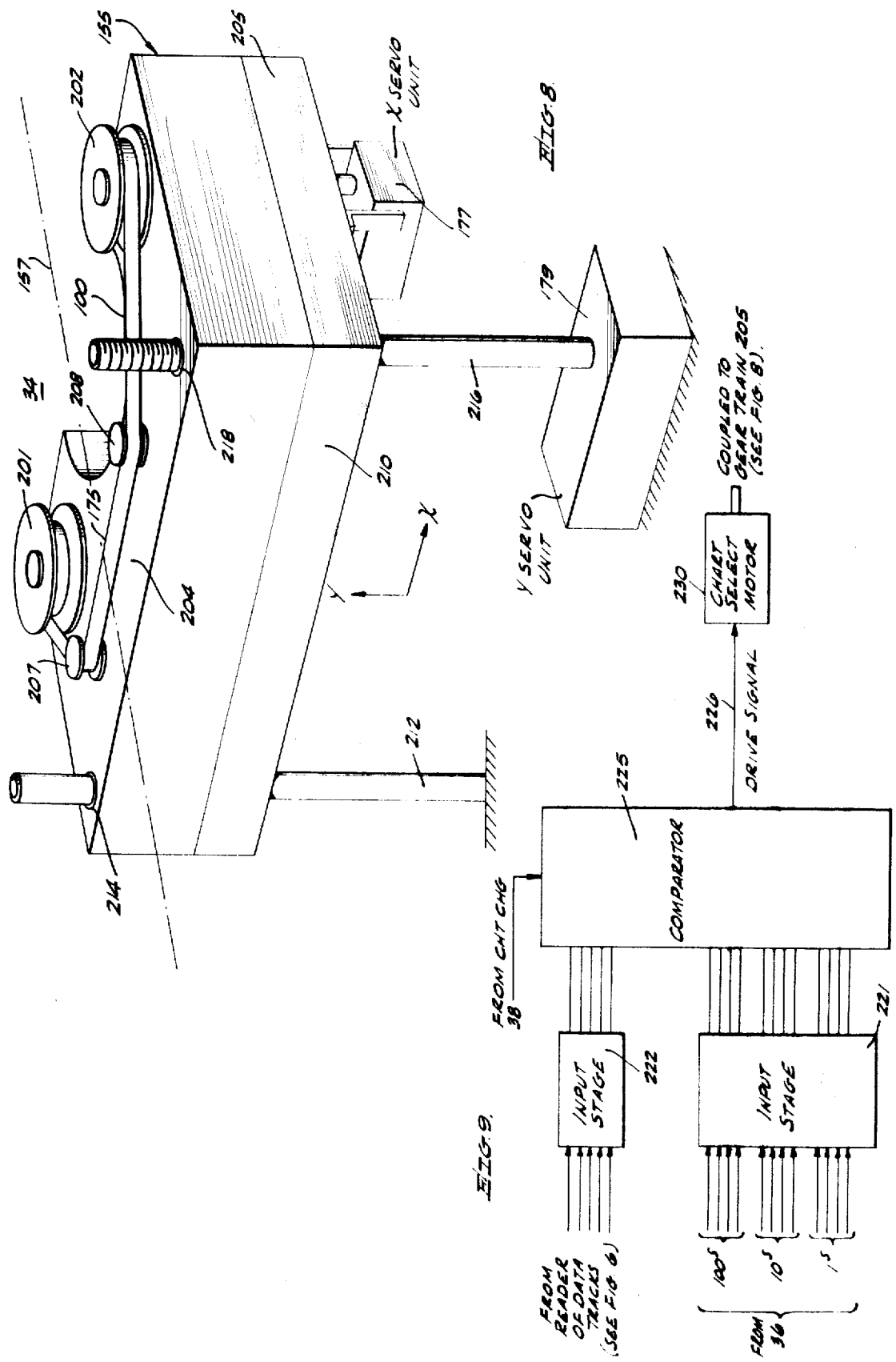

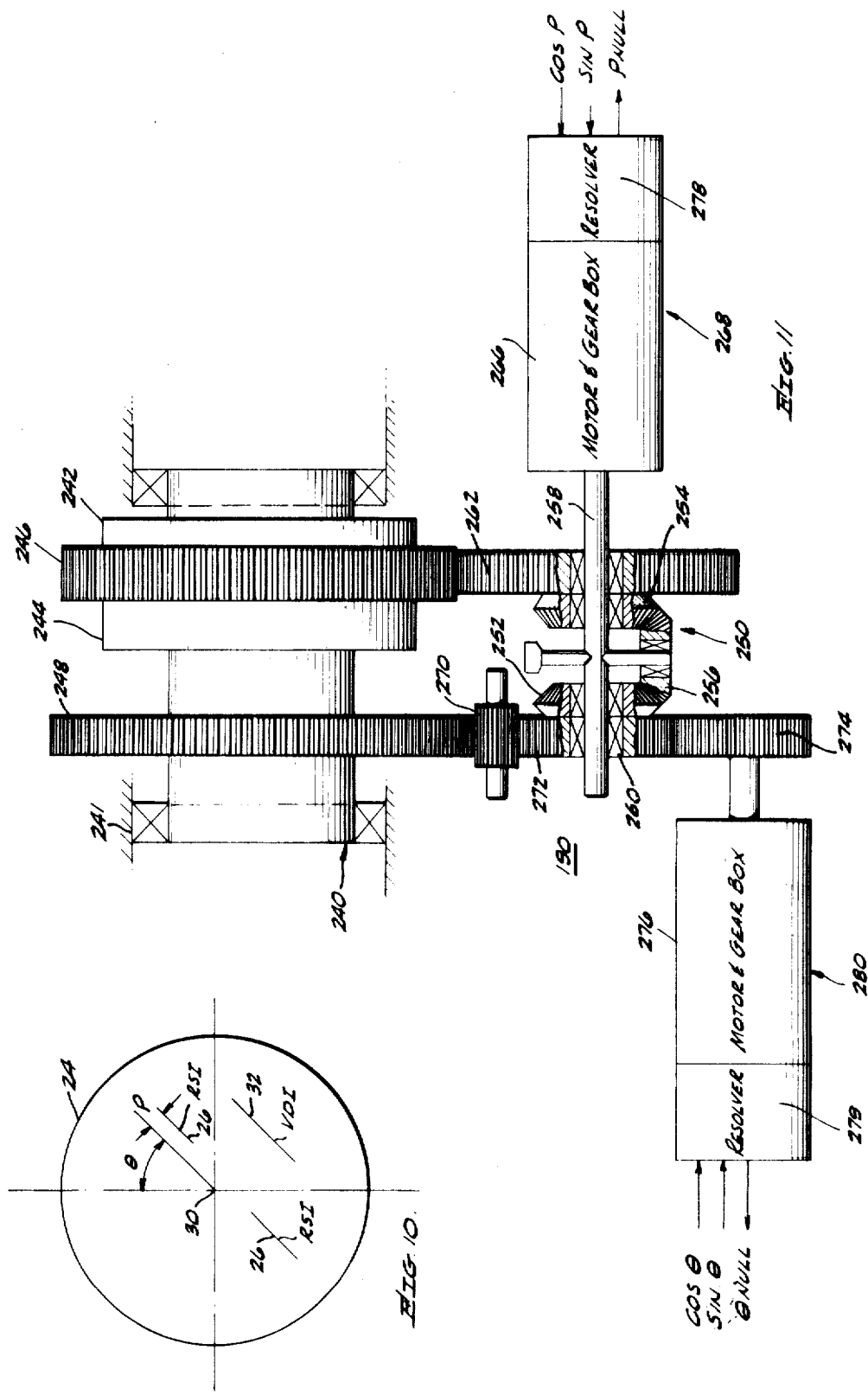

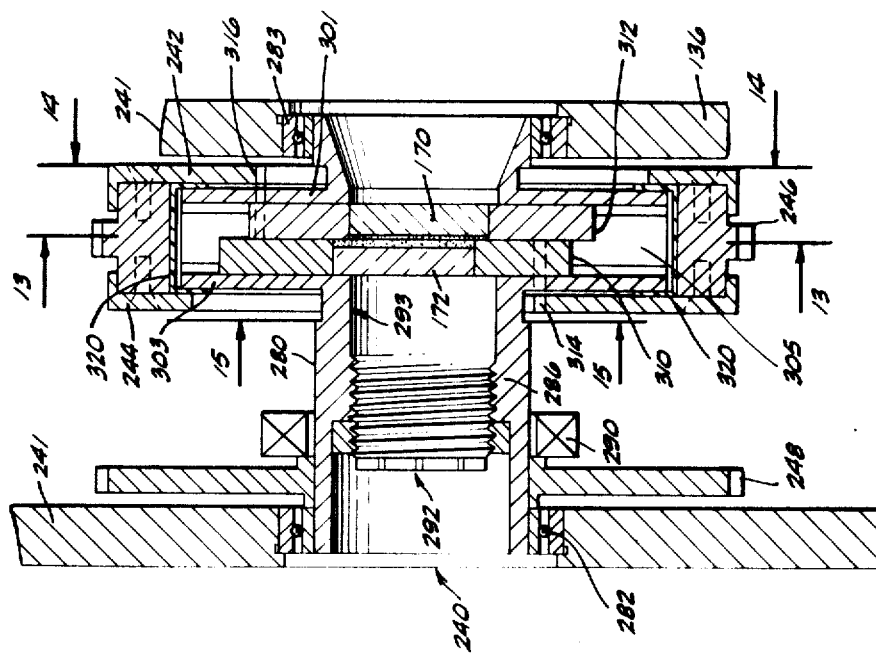
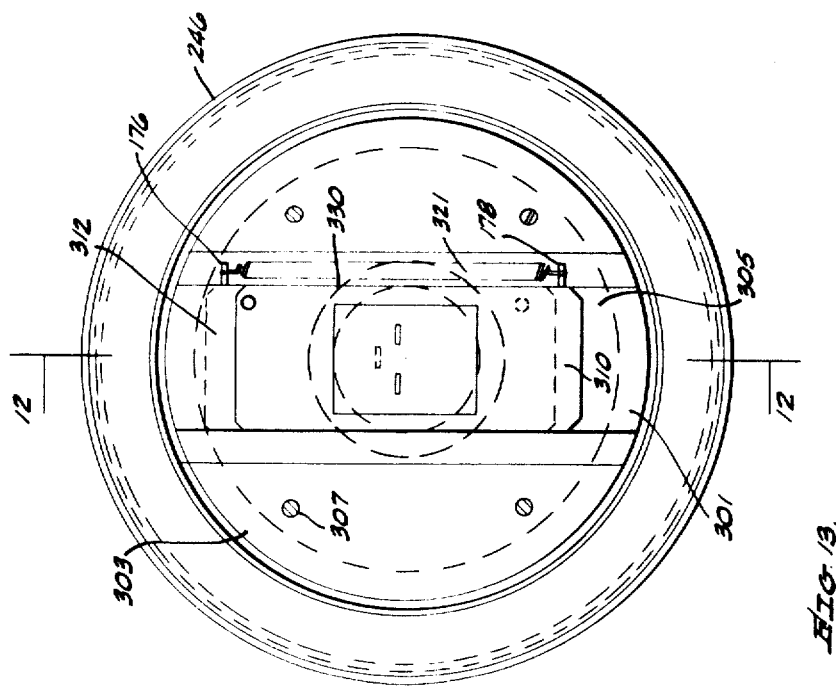

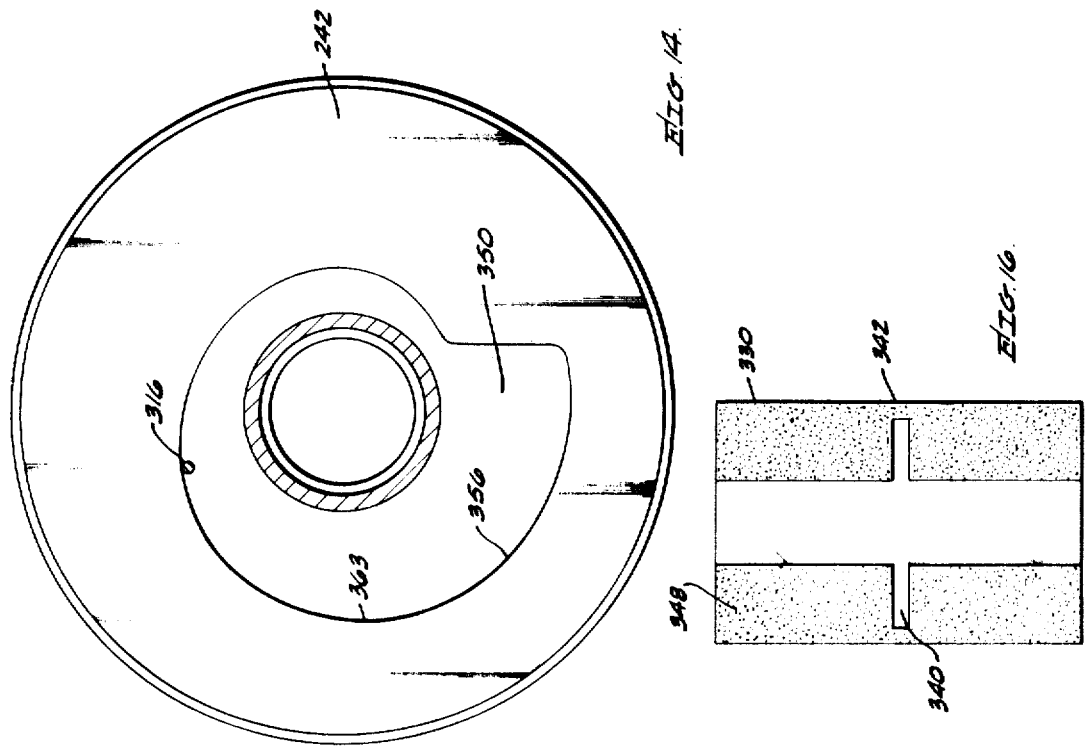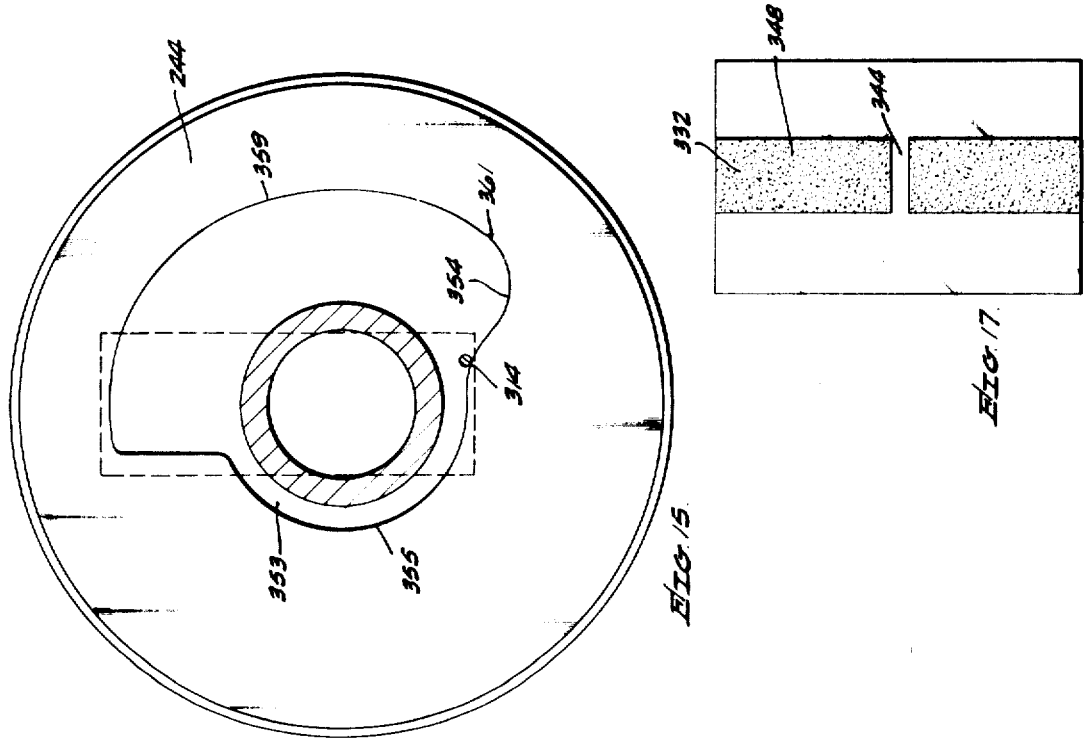

ANALOG INPUTS (AI)

| ADDRESS | SYMBOL | SIGNAL DESCRIPTION | SOURCE |
|---|---|---|---|
| 0400 | $\sin \Gamma_1$ | (VOR 1 mag Brg) | VORTAC RCVR #1 |
| 1 | $\cos \Gamma_1$ | | |
| 2 | $\sin R_{U1}$ | (DME1 UNITS) | |
| 3 | $\sin(R_{U1} + 120)$ | | |
| 4 | $\sin R_{T1}$ | (DME1 TENS) | |
| 5 | $\sin(R_{T1} + 120)$ | | |
| 6 | $\sin R_{H1}$ | (DME1 HUNDS) | |
| 7 | $\sin(R_{H1} + 120)$ | | |
| 410 | $\sin \Gamma_2$ | (VOR 2 Mag Brg) | VORTAC RCVR #2 |
| 1 | $\cos \Gamma_2$ | | |
| 2 | $\sin R_{U2}$ | (DME 2 UNITS) | |
| 3 | $\sin R_{U2}$ | | |
| 4 | $\sin R_{T2}$ | (DME2 TENS) | |
| 5 | $\sin(R_{T2} + 120)$ | | |
| 6 | $\sin R_{H2}$ | (DME2 HUNDS) | |
| 7 | $\sin(R_{H2} + 120)$ | | |
| 420 | $\sin \psi_m$ | (A/c Mag Hdg.) | A/C COMPASS |
| 1 | $\sin(\psi_m + 120)$ | | |
| 2 | $\sin h_{HI}$ | (ALTITUDE - HI SPEED) | |
| 3 | $\sin(h_{HI} + 120)$ | | A/C |
| 4 | $\sin h_{LO}$ | (ALTITUDE - LO SPEED) | AIRDATA COMPUTER |
| 5 | $\sin(h_{LO} + 120)$ | | |
| 6 | $\sin V_A$ | (TRUE AIRSPEED) | |
| 7 | $\sin(V_A + 120)$ | | |
| 430 | $\sin X_{FB}$ | (MAP X POSITION) | RESOLVER IN 177 (FIG.8) |
| 1 | $\cos X_{FB}$ | | |
| 2 | $\sin Y_{FB}$ | (MAP Y POSITION) | RESOLVER IN 179 (FIG.8) |
| 3 | $\cos Y_{FB}$ | | |
| 4 | $\psi_{NULL}$ | (HEADING SERVO NULL) | RESOLVER 377 (FIG.18) |
| 5 | $\psi_{CNULL}$ | (COMMAND HEADING SERVO NULL) | RESOLVER 389 (FIG.19) |
| 6 | $\delta_{NULL}$ | (COMPASS ROSE SERVO NULL) | RESOLVER 398 (FIG.20) |
| 7 | $L\Delta M_{NULL}$ | (CHART HDG. SERVO NULL) | RESOLVER IN 183 (FIG.7) |
| 440 | $\theta_{NULL}$ | (RSI Brg. SERVO NULL) | RESOLVER 279 (FIG.11) |
| 1 | $P_{NULL}$ | (RSI DIST. SERVO NULL) | RESOLVER 268 (FIG.11) |

FIG. 22a.

ANALOG OUTPUTS (AO)

| ADDRESS | SYMBOL | SIGNAL DESCRIPTION | TO |
|---|---|---|---|
| 0450 | $\sin \psi_0$ | (A/C HEADING) | RESOLVER 377 (FIG.18) |
| 1 | $\cos \psi_0$ | | |
| 2 | $\sin \psi_{cmd_0}$ | (cmd HEADING) | RESOLVER 389 (FIG.19) |
| 3 | $\cos \psi_{cmd_0}$ | | |
| 4 | $\sin \delta_0$ | (COMPASS ROSE) | RESOLVER 398 (FIG.20) |
| 5 | $\cos \delta_0$ | | |
| 6 | $\sin (L\Delta M)_0$ | (CHART HEADING) | RESOLVER IN 183 (FIG.7) |
| 7 | $\cos (L\Delta M)_0$ | | |
| 460 | $\sin \theta_0$ | (RSI Brg) | RESOLVER 279 (FIG.11) |
| 1 | $\cos \theta_0$ | | |
| 2 | $\sin P_0$ | (RSI DIST.) | RESOLVER 268 (FIG.11) |
| 3 | $\cos P_0$ | | |
| 4 | $\sin X_{CO}$ | (MAP X cmd) | RESOLVER IN 177 (FIG.8) |
| 5 | $\cos X_{CO}$ | | |
| 6 | $\sin Y_{CO}$ | (MAP Y cmd) | RESOLVER IN 179 (FIG.8) |
| 7 | $\cos Y_{CO}$ | | |

FIG. 22b.

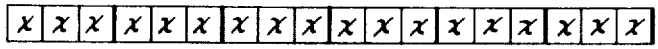
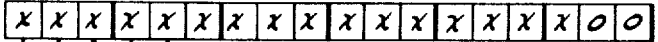
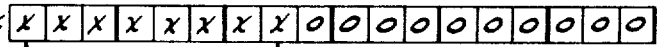
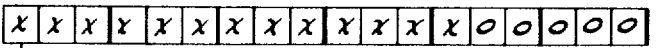
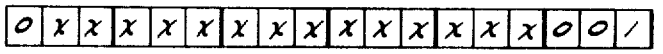
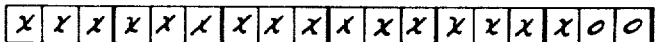
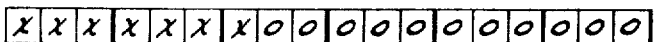
FIG. 23.

TO FIG. 31.

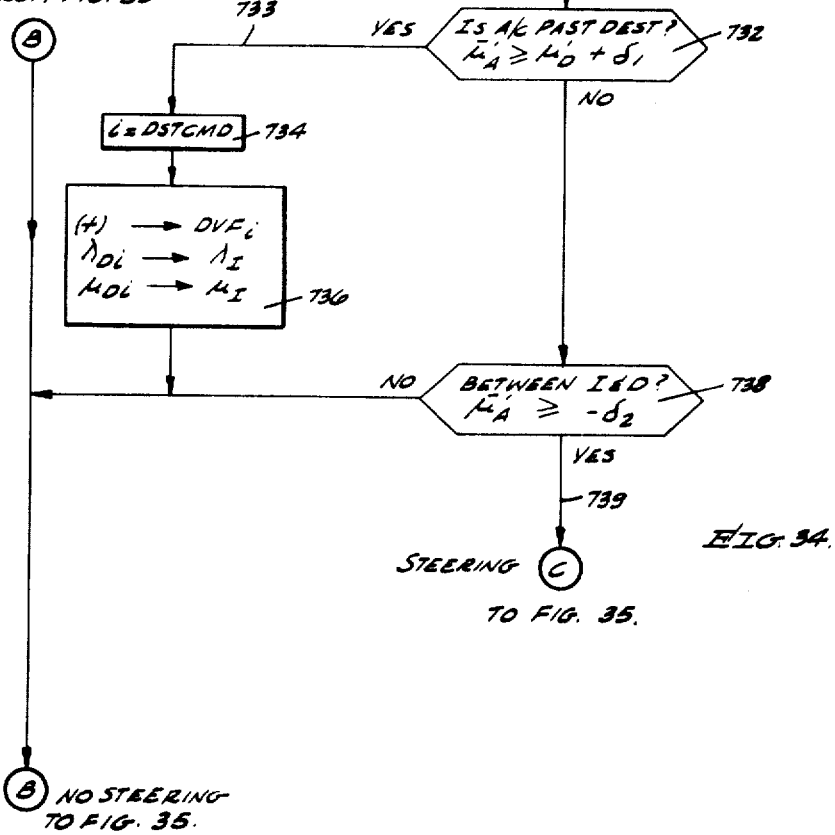
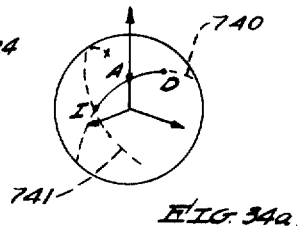
FIG. 34a.
FIG. 34.

NAVIGATION DIRECTOR SYSTEM

BACKGROUND OF THE INVENTION

1. Field of the Invention

This invention generally relates to a navigation system and, more particularly, to a course-oriented navigation system with a moving-map display.

2. Description of the Prior Art

The constant increase in air traffic and the speed of aircrafts necessitate the continuous development of new and improved navigation aids and techniques. Since the late forties, several optical moving-map displays have been developed. Their purpose is to display aircraft position information, made available by the detection of various ranging signals, such as those provided by VORTAC stations. Such an information display technique has been found to be most useful in the navigation of commercial, as well as military aircrafts. However, the overall navigation problems, created by modern flight conditions, have not been solved by such displays. Furthermore, the basic navigation technique, presently followed in the Continental United States and other countries, presents severe problems as air traffic increases.

Briefly, the basic flight navigation technique, currently employed, is essentially that of airway navigation, that is, flying an airway network along selected radials from one navigation facility to the next. The advent of air traffic control (ATC) radar capabilities has greatly enhanced airway navigation, by permitting aircraft deviation from the basic network routes, under the direction and control of ATC centers and approach control personnel. However, as air traffic increases the airways become ever more crowded, thereby greatly increasing the already heavy work load of the control personnel.

Such problems may be eliminated by adding new airways. However, this requires large expenditures for additional VORTAC stations and/or the addition of a large force of control personnel and the required computerized support equipment. A more logical solution would be to change the basic flight navigation technique from that of airway navigation to a technique which permits improved aircraft and aircrew capabilities to take full advantage of available airspace for navigational purposes. It is towards such a new flight navigation technique that the navigation system of the present invention is directed.

OBJECTS AND SUMMARY OF THE INVENTION

It is therefore a primary object of the present invention to provide a novel navigation system, based on a new flight navigation technique.

Another object of this invention is to provide a new navigation system which increases the capabilities of an aircraft crew to select available airspace for flight navigation.

Still another object of this invention is the provision of a new course-oriented flight navigation system.

A further object of the invention is to provide a flight navigation system wherein displayed information may be manually controlled to select a flight course which is not constrained by fixed airways.

Still a further object of this invention is to provide a highly advanced flight navigation system utilizing a display on which, in addition to displaying actual aircraft position and a selected course, various other data is displayed to minimize pilot tasks.

Yet a further object of this invention is to provide a course-oriented flight navigation system which is capable of complete flexibility of flight route selection while on the ground or when airborne, and one which utilizes the area navigation capabilities provided by the existing VOR/DME/TACAN system.

Still a further object of this invention is the provision of a course-oriented flight navigation system with which a pilot can select and follow a flight course with assistance from a ground controller whose task is reduced to that of monitoring rather than directing.

These and other objects of the invention are achieved by providing a flight navigation system which in the simplest embodiment enables a pilot to select start and destination points of a desired flight course or route. The selected points are communicated to the system's computer which computes a great circle route. The computer causes the route to be displayed as a route segment indicator on a display surface, under certain conditions. Prior to flight time, ground navigation information is stored in the system's computer. A plurality of navigation charts or maps are appropriately stored in a chart or map container.

During the flight, the prestored ground navigation information, together with navigation signals which are received during the flight are utilized to determine the aircraft's actual position. This determination is used to automatically position a displayed chart, so that the point on the chart which represents the aircraft's position is displayed at the center of the display. Any deviation of the aircraft from the desired course is indicated by the distance of the displayed course line from the display center.

The system incorporates means for selecting any one of a plurality of courses parallel with the selected course. Means are also included to alter the course during flight or select a succeeding flight course, after arrival at the first destination point. In addition, the system includes means which display the desired aircraft heading in order to fly along the selected course or be maintained thereon. Various other flight data, such as estimated time enroute (ETE), ground speed (GDSP), and distance to go (DIST) are available for display. In addition, the periphery of the display and various control elements on a control panel are utilized to display system conditions which are of vital importance to the pilot, thereby simplifying and/or reducing the tasks demanded of him.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 1 is a simplified block diagram of the navigation system of the present invention;

FIG. 2 is a simplified block diagram of the display unit 12, shown in FIG. 1;

FIG. 7 is a side view of the projection unit 40, shown in FIG. 2;

FIG. 8 is an isometric view of the film storage unit 34, shown in FIG. 2;

FIG. 9 is a block diagram of a map selection arrangement;

FIG. 10 is a front view of the display surface 24, which is useful in explaining the operation of symbol generator 190, shown in FIG. 7;

FIG. 11 is a side view of one embodiment of the symbol generator 190;

FIG. 12 is a broken way side view of a portion of the symbol generator, shown in FIG. 11;

FIGS. 13, 14 and 15 are sectional views of the symbol generator, taken along lines 13—13, 14—14 and 15—15 of FIG. 12, respectively;

FIGS. 16 and 17 are front views of reticle plates, described in conjunction with FIG. 13;

FIGS. 22a and 22b are tables listing the analog inputs (AI) and outputs (AO), which are supplied to, and by, the Input/Output unit 18;

FIGS. 23 and 24 list the discrete digital inputs (DI) and digital outputs (DO), associated with the Input/Output unit 18;

FIGS. 33 through 37 are flow charts of the RSI Logic routine;

DESCRIPTION OF THE PREFERRED EMBODIMENTS

Figure 3:
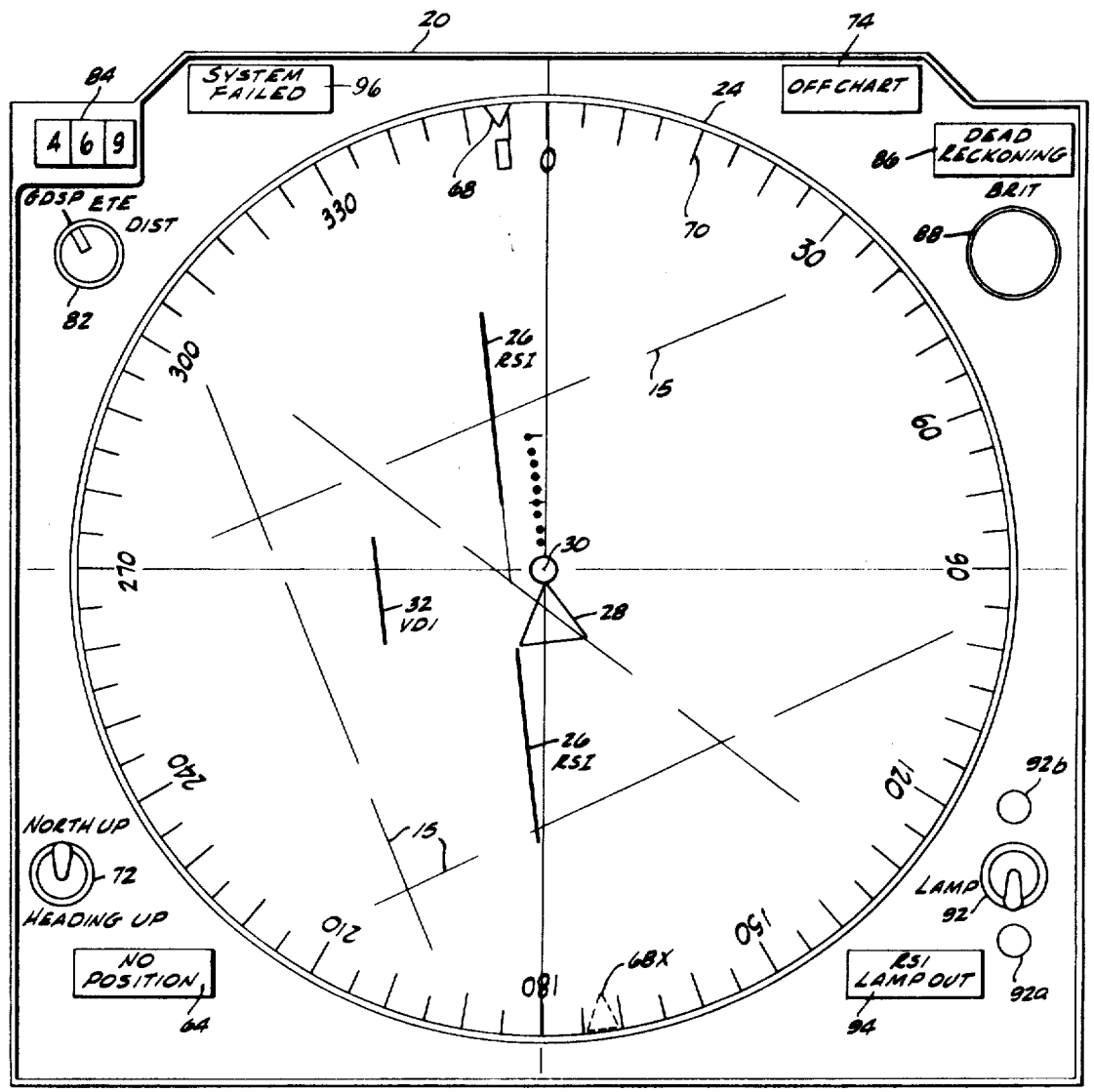
FIG. 3 is a front view of a display panel 20 of unit 12.
Figure 4:
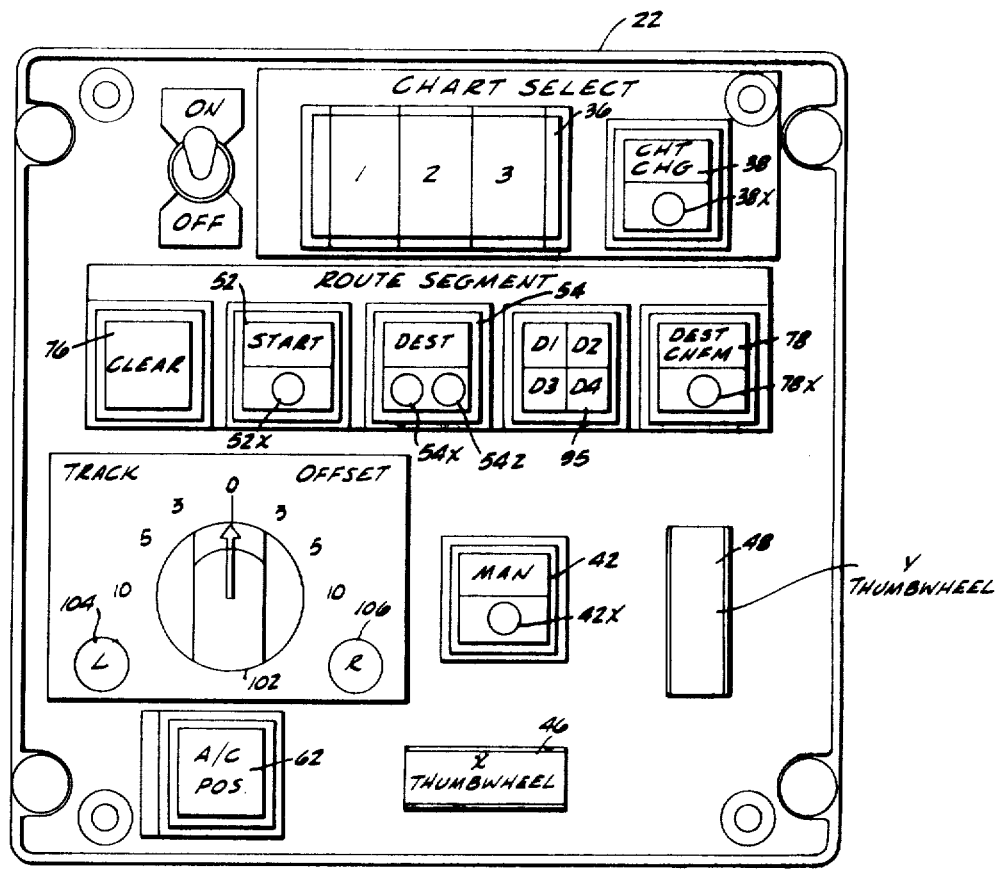
FIG. 4 is a front view of a control panel 22 of a control unit 14, shown in FIG. 1.

Reference is first made to FIG. 1 which is a simplified block diagram of the navigation system of the present invention. Basically, the system 10, which is course-oriented, consists of a display unit 12 and a control unit 14, which are interconnected. Also, the units are separately connected to a data storage and processor, or computer 16 through an input/output (I/O) unit 18. FIG. 2 is a simplified block diagram of the display unit 12, while FIG. 3 is a front view of a display panel 20 of the unit. Likewise, FIG. 4 is a front view of a control panel 22 of the control unit 14.

The display panel 20 (FIG. 3), though primarily used to display course-oriented navigation information, includes means, such as switches, which are used to control the manner in which the information is to be displayed, or to display auxiliary data. On the other hand, the primary object of the control panel 22 is to provide manually operable controls, by means of which the pilot selects a course to be flown, as well as controls the information which is to be displayed. In addition, the control panel 22 is used to display signals which indicate the proper communication of desired signals in the system. Thus, each of units 12 and 14 performs a dual role: it displays information, and it includes means to control the type of information to be displayed and the manner in which it is displayed.

The basic underlying concept of operation of the navigation system of this invention is the selection of a course or route to be navigated, by means of the display and control units. The course selection is accomplished by first selecting a course start point, on a displayed navigation map or chart, and communicating the selection of the point to the computer 16. Thereafter, the pilot selects a course destination point, whose selection is also communicated to the computer. After both points have been selected, the computer is capable of computing a great circle route between the two points. The computer route or course is displayed as a broken line on a display surface 24 of the display panel 20 (FIG. 3). The display of the line occurs only under certain conditions which will be described in detail. The displayed route will hereafter be referred to as the route segment indicator or RSI. An aircraft symbol 28 is also displayed at the center 30 of the display surface. A navigation map, which is manually selectable by means of a Chart Select unit on panel 22, is also displayed. In FIG. 3, the map is represented by lines, designated by numerals 15.

Each map, which is manually selected by the pilot, but whose position is either manually or automatically controlled, as well as all other maps which may be selected, consists of a separate frame on a film strip containing a plurality of such frames. The film is contained in a film storage unit 34 (FIG. 2). Each map is identifiable by a unique number. Any map may be displayed on the surface 24 by manually selecting the desired map number with Chart Select switch 36 on panel 22 (FIG. 4), and thereafter actuating the Chart Change (CHT CHG) control, such as a push button 38. When the latter-mentioned push button is activated, signals from switch 36 are supplied to film storage unit 34. These are used to position the selected map for display on surface 24, through a projection unit 40 (FIG. 2). When the selected map is displayed, a signal is supplied to the control panel to illuminate an indicator 38x (FIG. 4), associated with the Chart Change push button 38, thereby acknowledging that the proper chart is displayed.

The system includes manually-operated controls which enable the pilot to move the displayed map so that any selected point thereon is displayed at center 30, of the display surface. The system provides map-position signals which represent the distance between the point on the map at center 30 and the map's center point, along two orthogonal axes X and Y. Prior to flight time, the computer is supplied with the coordinates of the center point of each map and its scale. These coordinates together with the map-position signals are used by the computer to compute the coordinates of any point on a map selected by the pilot to be at center 30.

In the automatic mode, the computer, based on navigation information, computes the coordinates of the aircraft's actual position. Then, based on the map's center coordinates and the map scale, the computer computes and supplies appropriate signals to automatically move or slew the displayed map, so that the point on the map, representing the aircraft's actual position, is at center 30.

Any deviation of the aircraft's actual position from the desired course is displayed as the distance between the center 30 and the RSI (FIG. 3). To magnify the deviation from the desired course, in accordance with the teachings of this invention, a line 32, which complements the RSI and which will be referred to as the Vernier Deviation indicator, or simply the VDI, is displayed. The distance between the center 30 and the VDI is generally an integer multiple of the distance between center 30 and the RSI.

The computer is programmed to perform the various computations in a selected sequence or flight program, one example of which will be described hereafter in detail. However, in the initial system description, the various computations are mentioned, irrespective of their order in the program.

Before proceeding to describe the novel navigation system of the present invention in sufficient detail, to enable those familiar with the art to practice the invention, a typical example of how the system may be used and the operational steps associated with such an example will first be described. For the example, it is assumed that the film storage unit 34 (FIG. 2) contains all the maps necessary for a contemplated flight. As previously indicated, the maps or charts consist of separate frames along a continuous film strip, such as frames on a 35 mm. film. At any given time only a portion of a chart is displayed. In one embodiment it is contemplated that the projection unit 40 would project an area of 0.28 inches diameter of the film on a 7 inch display surface 24 (FIG. 3). Assuming that each displayed inch represents 30 nautical miles (n.m.), approximately 105 miles of the area about the center 30 are displayed.

It is further assumed that all the necessary navigation data is stored in the computer. Briefly, the data which has to be stored in the computer includes the coordinates of all the maps and their scales, and a list of instructions which defines the sequence of steps which the computer has to perform in order to calculate various equations and provide display control signals. This list is actually the computer program. The computer, in the embodiment to be described hereafter in detail, is also supplied with the coordinates, altitudes, magnetic variations and frequencies of navigation stations, hereafter referred to as VORTAC stations. The data related to the VORTAC stations is used during the flight, together with bearing and range signals supplied from properly tuned VORTAC receivers, to update and determine the aircraft's actual position. Preferably, all the data which has to be stored in the computer may be coded on the same film strip containing the maps, to simplify storage problems.

For explanatory purposes, let it be assumed that upon turning a switch 42 (FIG. 4) to the ON position, the film strip in unit 34 is read out and that all the data, which the computer requires, is stored therein. After the data is stored and the computer executes certain self-test routines which for the present explanation can be disregarded, the computer enters a routine during which it checks to determine if the aircraft's present position has been entered by the pilot. If it was not, the computer through I/O unit 18 causes the illumination of a NO POSITION plaque 64 on display surface 20.

To enter this position, the pilot may actuate a manual (MAN) p.b. 42 (FIG. 4), thereby placing the system in a manual mode or simply in manual, which is indicated by the illumination of a light 42X. When the MAN push button 42 is pressed a second time, the light 42X is darkened, thereby indicating that the system is in the automatic mode. Either before or after the system is in manual, the pilot selects a map containing the aircraft's present position. This is accomplished by selecting the number of the map, containing the aircraft position, on the multidial switch 36. Thereafter the pilot actuates the Chart Change (CHT CHG) push button 38. Signals from these switches are communicated through the control panel 22 and map and display control unit 44 (FIG. 2) to film storage unit 34, causing it to display the map of the selected number. The center displayed the display map is automatically positioned at center 30.

Once the map is displayed, the pilot, by means of X Thumbwheel 46 (FIG. 4) and Y Thumbwheel 48, slews the map until a point thereon which represents the aircraft's present position is at center 30. He then depresses an Aircraft Position (A/C POS) push button 62. As a result, the computer is supplied with signals from resolvers associated with the map slewing circuit to indicate the magnitude of map slewing. These signals will hereafter be referred to as map X position and map Y position signals. Having already the coordinates of the map center point, and the map scale, and receiving the map number, the computer computes the coordinates of the aircraft's present position and stores them in memory, for use during the flight. After the aircraft present position is entered the NO POSITION plaque 64 (FIG. 3) goes dark.

The start and destination points of the selected course are selected in a similar manner. The map containing the start point is selected by the pilot by means of switches 36 and 38 which form a CHART SELECT unit on control panel 22 (FIG. 4). Then, wheels 46 and 48 are operated to slew the displayed map until the start point is at center 30 of the display surface 24 (FIG. 3). Thereafter, a Start (START) push button 54 is activated. When the computer senses that push button 54 has been activated, it uses the map X position and map Y position signals to compute the coordinates of the start point. The completion of the computation is acknowledged by illuminating light 52X, associated with the START push button 52.

The selection of the destination point is accomplished by first selecting the map containing this point, positioning the destination point on the map at center 30, and thereafter activating Destination (DEST) push button 54. When the coordinates of this point are computed and stored in the computer, light 54X is illuminated. After all the required points have been properly positioned, the system is switched to the automatic mode by manually depressing the MAN button 42 a second time.

The aircraft is assumed to carry various known navigation instruments which are used during the flight to update the aircraft's position. These instruments, shown in FIG. 1 in block 64 include a VORTAC receiver 1, a VORTAC receiver 2, an air data computer which computes aircraft altitude and air speed and a magnetic compass which provides a magnetic heading indication. The signals from the various navigation instruments are supplied to the computer through the I/O unit 18.

During the flight, these signals are used by the computer during substantially each minor cycle of the flight program, to update the aircraft's position. The updated position is used to control the display of the map so that the point thereon, corresponding to the aircraft's position, is displayed at center 30. The updated aircraft position is also used to determine the aircraft off-course distance, used to control the display of the RSI and VDI with respect to center 30. The actual aircraft heading is determined and is used to control the display of the aircraft symbol 28.

In addition, based on the computed course, aircraft's off-course distance, its heading and other factors, the computer computes the desired heading of the aircraft to either maintain it on course or return it to the desired course. The desired heading is displayed by a command heading symbol 68. A compass rose is provided around the periphery of surface 24.

The display presentation may be oriented in either a NORTH UP or a HEADING UP mode by the control of a two-position switch 72, on the display panel 20 (FIG. 3). As shown, the display is in the NORTH UP mode. As is appreciated, in the NORTH UP the map is positioned so that NORTH thereon points upward, while in the HEADING UP, aircraft symbol 28 points upward and all other displayed data are controlled with respect thereto.

As the flight progresses, the actual aircraft position is updated repeatedly, and the displayed map is automatically slewn, so that the actual aircraft position on the map is at the display center 30. When the map is slewn so that a peripheral portion thereof is displayed, that portion may contain a number which represents the number of an adjacent partially overlapping map or chart to be selected. The selection of the adjacent map is accomplished by the pilot in a manner, as herebefore described.

If at any time during the flight the displayed map does not contain the aircraft actual position, an OFF CHART indicator or plaque 74 on the display panel 20 is illuminated. In such a case, the aircraft symbol 28, the RSI and VDI are extinguished.

At any time during the flight the pilot may clear the selected course from the system. This is accomplished by depressing a CLEAR push button 76, on the control panel 22. Also, the pilot may confirm the destination point which is in the computer by first displaying the map which contains the destination point, if a different map is displayed at the time, and then depressing a Destination Confirm (DEST CNFM) push button 78. When this is done, the computer searches the memory to locate the coordinates of the destination point stored in its memory and uses them to slew the map until the selected destination point is under the center 30. During this time a light 78X associated with 78 is illuminated. It should again be pointed out that map selection is performed manually by the pilot.

In addition to the aforementioned features, the system includes means for displaying auxiliary navigation data of interest to a pilot. These means include a three-position switch 82 (FIG. 3) and a three digit readout panel 84. Switch 82 may be positioned to digitally display on panel 84 estimated time enroute (ETE), ground speed (GDSP) or distance-to-go (DIST). ETE is displayed in minutes, GDSP in knots and DIST in nautical miles.

If during the flight valid VORTAC data is not received, the aircraft position is computed only on the basis of true air speed, magnetic heading and estimated wind values. The absence of valid VORTAC data for use in aircraft position computations is indicated to the pilot by the illumination of a DEAD RECKONING indicator or plaque 86 (FIG. 3).

The brightness of the display is controlled by a Brightness (BRIT) knob 88. The projection unit 40 (FIG. 2) is assumed to include two main lamps for map display. A LAMP switch 92 on the display panel 20 (FIG. 3) is used to switch from one lamp to the other in case of lamp failure. If a particular lamp in unit 40, used to project the RSI and VDI, fails an RSI LAMP OUT indicator 94 is illuminated. Also, if as a result of self test which are automatically performed, system failure is indicated, a SYSTEM FAILED indicator 96 is illuminated. The latter indicator is also illuminated under certain conditions which are determined during the computer program.

In addition, the present invention includes a novel display technique to warn the pilot of an approach to the selected destination point. At 5 minutes prior to the arrival at the destination, light 54z, associated with the DEST button 54 is illuminated. At 1 minute to destination, the RSI and VDI begin flashing to further alert the pilot.

At any time during the flight a subsequent destination point may be entered. If the entry is prior to a point 5 minutes out, the coordinates of the new destination point replace the coordinates of the old point and a new course is computed between the original start point and the new destination point. If, however, entry of the subsequent destination point is performed when the flight time to the original destination is less than 5 minutes, the system continues to compute a course to the initial destination point. Then, as the aircraft approaches the first destination, the computer computes a new course between the first destination as a start point and the subsequently entered destination point as the new course destination.

In a different embodiment of the present invention, the control panel 22 includes a multidestination push button 95 (FIG. 4), by means of which several destination points may be initially entered into the computer. With the arrangement of FIG. 4 up to four (D1–D4) destination points may be successively entered, by controlling push button 95 in a manner which will be described hereafter in detail. The first course to be flown may be selected from the start point to any one of the four destinations. Once the first selected destination is reached, a new course to any of the other three may be computed and displayed. Thus, the pilot may choose any flight pattern between the start point and the several destination points.

The pilot, in addition to being provided with controls to define and display a selected course, is further provided with controls to define a course parallel to the selected course, at a selected distance on either the left or right side of the defined course. Such a system capability is particularly significant in light of the ever increasing air traffic. These controls consist of a multiposition TRACK OFFSET switch 102 (FIG. 4), by means of which course offset of 3, 5 or 10 miles to the left or right of the desired course may be defined. By the proper positioning of switch 102, signals representing the desired course offset are communicated to the computer. Acknowledgement of signal reception is indicated by an illuminated left (L) or right (R) light, designated 104 and 106, respectively. Termination of the parallel tracking is accomplished by setting switch 102 to the "0" position.

The following exemplary description may be summarized in terms of a series of steps which are typically performed by the pilot and the system's response to each step.

| Step | System Response |
|---|---|
| Prior to Being Airborne | |
| 1. Turns ON-OFF switch to ON. | All data on film in 34 is read into the computer. Film returns to start point. Computer performs initial routines including self test and starts performing a flight program. Computer senses absence of aircraft present position coordinates, and causes the illumination of NO POSITION plaque 64. |
| 2. Selects number of map containing aircraft's present position by means of switch 36. | |
| 3. Pushes CHT CHG button 38 | Selected map is displayed on surface 24 with map center at 30. Map number is supplied as output to computer. |
| 4. Depresses MAN button 42 | Light 42x illuminated. |
| 5. Controls Thumbwheels 46 & 48 to display aircraft's present position at center 30. | System outputs map X position and map Y position signals. |
| 6. Depresses button 62 (FIG. 4). | Coordinates of aircraft's present position are computed. No position plaque is extinguished. |
| 7. Selects number of chart containing start point. | |
| 8. Pushes CHT CHG button 38. | Selected chart is displayed on surface 24 with map center at 30. |
| 9. Controls Thumbwheels 46 & 48 to slew map so that start point is at center 30. | System outputs map X position and map Y position signals. |
| 10. Depresses START button 52. | Coordinates of START point are computed and light 52x is illuminated. |
| 11. Selects number of chart containing destination point. | |
| 12. Pushes CHT CHG button 38. | Selected chart displayed on surface 24 with map center at 30. |
| 13. Controls Thumbwheels 46 & 48 to slew map so that destination point is at center 30. | system outputs map X position and map Y position signals. |
| 14. Depresses DEST button 54. | Coordinates of destination point are computed and light 54x is illuminated. |
| 15. Depresses MAN push button 42. System returns to automatic operation. Light 42x extinguished. | |
| 16. Selects map with aircraft's present position. | Displays aircraft's present position at center 30. |

During the actual flight the system automatically performs the following operations:
a. System receives signals from VORTAC stations for use in computing coordinates of the aircraft's actual position, if such signals are being received from the VORTAC receivers on the aircraft.
b. Utilizes the coordinates of the aircraft's actual position information to perform the following:
  i. Compute map X command and map Y command signals necessary to slew the displayed map so that actual position of aircraft on displayed map is at center 30.
  ii. Determines off-course distance $\rho$.
  iii. Uses off-course distance $\rho$ to control display of RSI & VDI, by generating $\sin \rho_o$ and $\cos \rho_o$ signals, used to control the distance between RSI and center 30.

The map X command signal is in the form of sin $X_c$ and cos $X_c$ signals, while the map Y command signal is in the form of sin $Y_c$ and cos $Y_c$ signals. Similarly all the signals supplied to control the various displayed elements are in the form of sine and cosine signals.

c. Determines aircraft's heading and supplies signals sin $\psi_o$ and cos $\psi_o$ to control the pointing of symbol 28.
d. Computes bearing of desired course and supplies signals sin $\theta_o$ and cos $\theta_o$ to control the bearing of displayed RSI and VDI.
e. Controls display of command heading symbol 68 to indicate desired aircraft direction to get aircraft on course. This is done by supplying signals sin $\psi_c$ and cos $\psi_c$.
f. Control bearing of compass rose 70 in HEADING UP mode by supplying signals sin $\delta_o$ and cos $\delta_o$.
g. In the absence of VORTAC data computes heading by dead reckoning and lights up indicator 86.
h. Illuminates OFF CHART indicator 74 when displayed map does not contain the aircraft's actual position.

During the flight, the pilot may perform any one of the following steps:

a. Press the CLEAR button 76 to clear the start and destination points from the computer. As a result the RSI and VDI are no longer displayed. Also, lights 52× and 54× are extinguished.
b. Confirm point by first selecting the map containing the destination point and then pressing the DEST CNFM button 78.
c. Select an offset course to the selected course by rotating switch 102 (FIG. 4) to the desired offset distance (in miles) and direction (right or left).
d. Control the position of switch 82 (FIG. 3) to display GDSP, ETE or DIST on plaque 84.
e. Control switch 72 (FIG. 3) to control all the displayed data on or about surface 24 to be in a NORTH UP or HEADING UP orientation.

From the foregoing it should thus be appreciated that the novel navigation system of the present invention provides a pilot with the ability to select a course to be flown and the necessary displayed information to enable him to either stay on course, or at least determine off-course position. The added ability to select and fly along a parallel course is most significant, especially in light of the ever increasing air traffic. The display unit 12 and control unit 14 which display all the required information and contain all the necessary controls are mountable within two physical assemblies, which are placed in the cockpit at a convenient location, for observation and use by the pilot. Since all the required information to fly along the selected course are in the aircraft, the role of ground personnel in any air traffic control center is reduced to that of monitoring, rather than directing the flight.

From the foregoing description, and in particular from FIGS. 3 and 4, it should be appreciated that the novel navigation system of the present invention provides a pilot with optimum displayed information by means of which a navigable craft, such as an airplane, can be navigated along a selected route. Assuming a NORTH UP display mode, such as that shown in FIG. 3, the orientation or direction of the aircraft symbol 28 indicates to the pilot the craft's actual direction, while the distance between the RSI (lines 26) and center 30, indicates the course or route offset error of the aircraft. The VDI (line 32) further provides a magnified display of such off-course deviation. The necessary correction to guide the aircraft to fly along the desired route is displayed by the command heading 68.

In addition, by displaying the map, represented in FIG. 3 by lines 15, so that the actual aircraft position on the map is displayed at center 30, under symbol 28, the pilot is provided with a visual presentation of the craft's actual position above the terrain over which it passes. Ground speed (GDSP), estimated time en route (ETE) and distance (DIST) to the destination point are selectively displayable by means of switch 82 and display panel 84. Control panel 22 (FIG. 4) further provides the pilot with manually actuable means, such as switches or push buttons, by means of which the destination point may be confirmed. Also, actuable means, such as CLEAR push button 76, are provided for clearing the presently displayed route, while the manually operable switch 102 enables the selection of a route, parallel to a desired route, a feature which is particularly desirable under heavy air traffic.

It should be appreciated to those familiar with the art of displaying data or information, that various display techniques may be employed to display the navigation map (line 15), the aircraft symbol 28, the RSI and VDI lines, the command heading 68 and the compass rose 70, all of which provide a composite display on display surface 24. However, in order to completely describe the invention, embodiments of various arrangements, necessary to control the display of the various elements, will be described in conjunction with the following figures. The specifically described embodiments are intended to be exemplary, rather than limiting the teachings disclosed herein.

Figure 5:
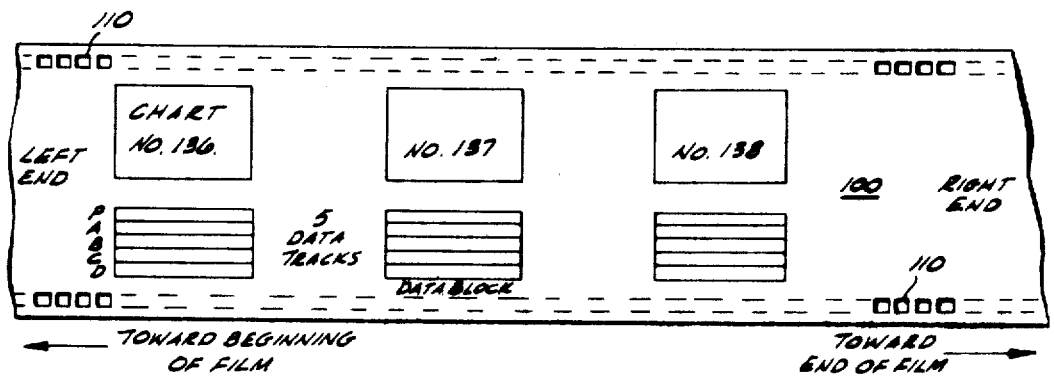
FIG. 5 is a front view of a portion of a film, containing navigation maps, in accordance with the teachings of the present invention.
Figure 6:
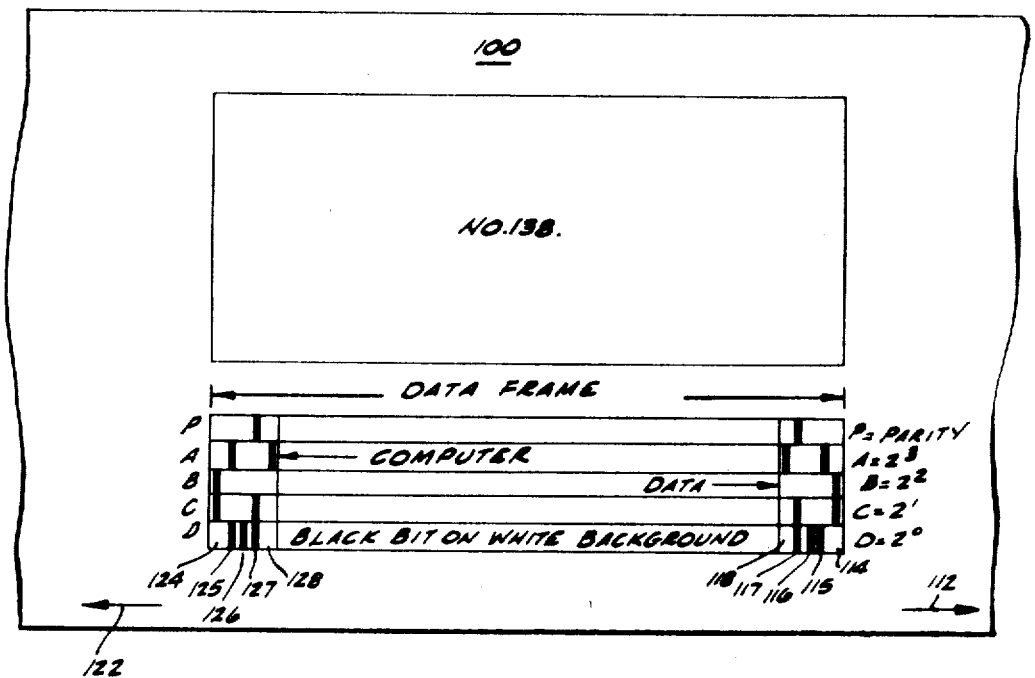
FIG. 6 is a front view of one of the maps and tracks of data adjacent thereof.

As previously indicated, all the navigation maps or charts are assumed to comprise frames on a film strip, or simply a film, contained in film storage unit 34 (FIG. 2). In one embodiment, the maps consist of frames on a sprocketed 35 mm. film 100. A portion of the film containing three charts, numbered 136, 137 and 138, is shown in FIG. 5. The film defines at least one row of perforations 110, used for film advancement in the film storage unit. Next to each map are five tracks on which data, for use by the computer, is stored. An expanded view of the tracks of data near chart 138 is shown in FIG. 6. The five tracks consist of four data tracks A, B, C, D and a parity track P.

Basically, except for the five characters at either end, hereafter also referred to as the end characters, all the data is one which need not be related to the particular map adjacent thereto. The five characters at each end are used for map number identification. The data next to each map is defined as a frame of data, while the portion between the end characters is defined as computer data. It is the data between the end characters of all of the frames that has to be stored in the computer in order for the system to operate properly. Several frames of data may define a block of data, which may include several control words. The latter may be used by the computer to determine where each block of data should be stored as the data is read in. For example, each block may include three control words, CW1, CW2 and CW3. CW1 may be used to define the address in memory in which its block of data should be stored; CW2 may be used to indicate the end of the data block, while CW3 may be used to indicate whether the next data block should be read in or whether the reading of data should be stopped.

The particular technique which is employed to store the required data in the computer is not basic to the novelty of the invention, since different arrangements and techniques may be employed. Therefore, the manner in which the computer data is coded and stored will not be described in further detail. For the purpose of explaining the present invention, it is assumed that all the computer data near all the frames is stored in the computer after the system is turned to ON, by means of the ON-OFF switch.

The first two characters at each end of a data frame are even parity control characters, which are used to indicate that the following three characters define the chart or map number. The map number is included at each end of the data frame to insure that the map number is read out, regardless of the direction in which the film is advanced in the film storage unit 34 (FIG. 2).

As seen from FIG. 6, when the film 100 is advanced in the direction indicated by arrow 112, the first two characters that are read out are the two even parity characters 114 and 115. When two consecutive even parity characters are sensed, it indicates that the following three characters 116, 117 and 118 represent the map number (138) in binary-coded-decimal (BCD). Similarly, when the film 100 is advanced in the direction indicated by arrow 122, and the two even parity characters 124 and 125 are sensed, it indicates that the next three characters 126, 127 and 128 represent the map number.

The width of each map is maximized within the limits of a perforated 35 mm. film. In one embodiment, the overall dimensions of each map are 1.417 × 0.844 inches, with a map-to-map center distance of 1.496 inches. With a 7 inch diameter display surface 24 (FIG. 3), the projection unit 40 includes a lens assembly, to be described hereafter in detail, which projects a map area of 0.276 in. diameter on the 7 inch surface. Thus, at any given time only a small portion of the selected map is displayed.

Reference is now made to FIGS. 7 through 17, in conjunction with which a specific embodiment for displaying a navigation map (lines 15) and the RSI and VDI lines will be described. Elements, like those previously described, will be designated by like numerals. FIG. 7 is essentially a schematic and block diagram of the film storage unit 34 and the projection unit 40, shown in FIG. 2 as two of the major units of the display unit 12. The film storage unit 34 is also shown in isometric view in FIG. 8. The latter figure will be used to describe the film storage unit in substantial detail.

Basically, in FIG. 7 the projection unit 40 is shown consisting of a lamp 154, which is appropriately arranged in determined physical relation with a map or film container 155. The latter forms part of film storage unit 34. The film container 155 is optically aligned on an axis 157 with a Pechan prism structure 159, focusing lenses 161, 162 and 163, diverging lenses 165, 166 and a light-passing or semireflective mirror or mixer 170. The latter is angularly arranged in relation to the axis 157 of the map projection optical system to pass, as well as to reflect light to display surface 24. For example, the mirror 170 may have a transmisivity of 50 percent and a reflectivity of 50 percent of the applied light energy.

It will be understood, that the desired map portion to be displayed on screen 24 is controlled, by controlling the film portion in container 155, which is aligned with optical axis 157. In FIG. 7 such map portion is designated by numeral 175. A servo unit 177 controls the X position of the selected film portion, while a servo unit 179 controls the Y position of such film portion. The position of Pechan prism structure 159 about axis 157 is controlled by a servo unit 183.

The projection unit 40 also includes a second lamp 185 and a focusing lens 186. Both are optically arranged with a symbol generator structure, indicated generally by block 190. The function of block 190 is to receive signals from the map and display control unit 35, as well as light from lamp 185 in order to produce the RSI and VDI, which are reflected to a reflecting mirror 192, and therefrom to the display surface 24, through mixer 170. Thus, mixer 170 reflects the RSI and VDI onto the surface 24, while transmitting thereto the navigation map portion 175 in container 155. In FIG. 3, the displayed map portion is designated by lines 15.

For a complete description of the film storage unit 34, reference is now made to FIG. 8. Therein, the film 100, which as previously described in conjunction with FIG. 5, is assumed to contain the maps and data, is shown retained on spools 201 and 202, suitably mounted on a plate structure 204 of the film container 155. The film 100 is supplied between the two spools or reels over idlers 207 and 208. When perforated film, such as that shown in FIG. 5, is used the container 155 includes sprocketed wheels which are connected to a gear train 205, which rotates the sprocketed wheels, whose teeth or sprockets engage the film's perforations to advance the film in the X direction. In such an arrangement, torque motors rotate spools 201 and 202 to supply and take up the advancing film. In order to simplify FIG. 8, the sprocketed wheels and the torque motors are deleted.

The servo unit 177 is properly coupled to the container gear train 205 in order to control the rotation of spool 202 and thereby control the position of the film 100 in the X dimension with respect to the optical axis 157. Unit 177 is connected to a structure 210, positioned below the gear train 205 which is attached to the plate structure 204.

Basically, each servo unit incorporated in the present system consists of a resolver to which controlling signals are supplied, which are then amplified in a servo amplifier, whose output is used to drive a servo motor. The motor's shaft is mechanically coupled by a gear train to control the positioning of a specific element. The resolver is also mechanically coupled to the motor or the gear train to sense the actual position of the element. The signals from the resolver approach a null, as the element reaches the desired position. When an element is to be manually positioned, manually produced signals are supplied to the servo amplifier.

Figure 8A:
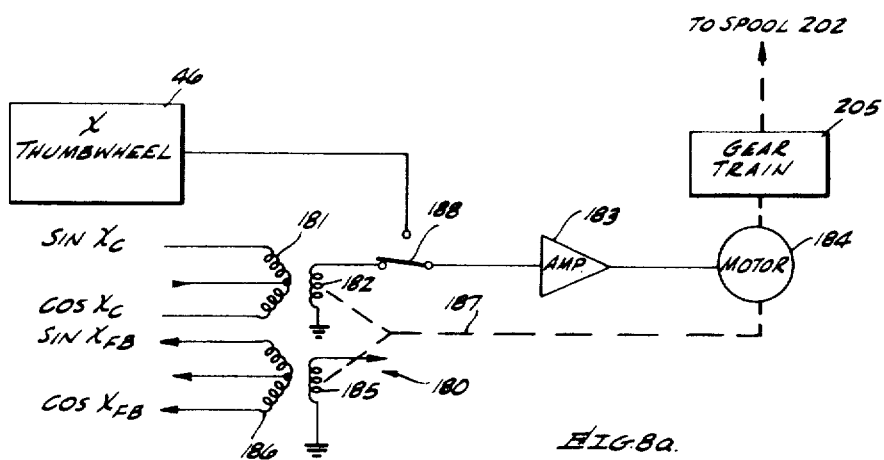
FIG. 8a is a combination schematic and block diagram of an exemplary arrangement of a servo unit, such as unit 177, shown in FIG. 8.

An exemplary arrangement of servo unit 177 is shown in FIG. 8a. Therein, numeral 180 designates a dual resolver with windings 181 and 182. Input signals are applied to winding 181. In the automatic mode, sin $X_c$ and cos $X_c$ signals are applied to winding 181 in order to automatically control the X coordinate of the point which is displayed at center 30. The winding 182 is connected to a servo amplifier 183 whose output is connected to a servo motor 184. Motor 184 is coupled to the gear train 205.

The resolver also includes windings 185 and 186. Winding 182 and winding 185 are shown mechanically coupled or linked to the motor 184 (or gear train 205). The linking is represented by dashed line 187. The outputs from winding 186 represent the actual position of the controlled element, such as spool 202 in terms of sine and cosine functions. In the present system these signals will be represented by sin $X_{FB}$ and cos $X_{FB}$ which are supplied to the computer. The winding 182 and amplifier 183 are connected through a switch 188 so that in the manual mode, the amplifier 183 is supplied with signals from a circuit (not shown) controlled by thumbwheel 46 (FIG. 4).

The resolver 180 is of the dual type since it has to receive signals from the computer to control the X position of the displayed map, as well as supply corresponding signals to the computer. Therefore, the resolver 180 includes two sets of windings (181-182 and 185-186). A similar resolver is included in the Y servo unit 179. However, in all other servo units to be referred to hereafter a single resolver is incorporated since such units need only respond to input signals. If desired, a null signal may be supplied from each resolver. The null signal may be obtained as a voltage between the input to amplifier 183 and a reference level, such as system ground.

Referring once more to FIG. 8, a fixed post 212 is provided with a ball bearing case 214, that is, freely movable therealong and mounted to the structure 204. A lead screw 216 is coupled to the servo motor 179 which is in turn fixidly mounted to the display housing. A ball nut 218 is threaded on the lead screw 216 and mounted on structure 204. An arrangement, identical with that shown in FIG. 8a is included in unit 179, except that the servo motor is coupled by an appropriate gear train to screw 216, and the switch 186 is coupled to Y thumbwheel 48. The rotation of the screw 216 provides movement of the film container 155 in the Y direction and thereby controls the position of film 100 in this direction.

As previously explained in conjunction with the control panel 22, shown in FIG. 4, the selection of a map in film 100 for display is achieved by controlling the chart select switch 36 and the chart change push button 38. When the proper chart is selected by the pilot and chart change push button 38 is actuated, the map number of any presently displayed map is read out and signals are supplied from the chart select switch 36. These signals are used to actuate the container gear train 205 in order to advance the film in the X direction until the selected map number is sensed.

An exemplary block diagram of an arrangement which performs such functions is shown in FIG. 9, to which reference is made herein. Such an arrangement is assumed to be included in the map and display control unit 35 (see FIG. 2). It includes an input stage 221 of 12 input lines which receive signals from the chart select switch 36 (FIG. 4). Each group of four input lines supplies, in binary coded decimal (BCD), a different digit of a three digit number which represents the number of the selected map to be displayed. Another input stage 222 is shown receiving signals from a reader which reads the five data tracks (see FIG. 6).

The signals supplied to the two input stages are in turn supplied to a comparator 225. When the latter receives a control signal from the chart change (CHT CHG) push button 38, the comparator compares the signals from the two input stages which represent the numbers of a presently displayed chart and that of a desired chart. The function of comparator 225 is to supply a drive signal on an output line 226, which represents the results of the comparison of the two numbers. The drive signal is preferably supplied to a chart select motor 230 whose output shaft, like that of the servo motor in unit 177, is coupled to the container gear train 205 (FIG. 8). When the number received from 221 is greater than the number from the reader, the drive signal causes motor 230 to drive the film 100 towards its end, i.e., in a direction along X represented by arrow 112 (FIG. 6). On the other hand, the film is driven to its beginning, as indicated by arrow 122 in FIG. 6, when the number from the reader is greater than that supplied by the chart select switch. When the two numbers are the same, motor 230 is stopped and the selected map is displayed, with its center coinciding with center 30.

Thus, in the presently described embodiment of the invention, two motors are assumed to be coupled to the container gear train 205. Motor 230 is used to move film 100 in the X direction until the selected chart is displayed along axis 157, and motor 184 in unit 177, is used to control the position of the displayed map in the X direction, so that a selected portion thereof is displayed at any given time, with a particular point of the selected portion being displayed at center 30 of display surface 24. Similarly, motor 184 in unit 179 controls the displayed map portion in the Y direction.

For a complete explanation of the operation of symbol generator 190 (FIG. 7), which is used to generate the RSI and VDI, reference is first made to FIGS. 10 and 11. The angle $\theta$ in FIG. 10 is the rotational angle or bearing of the RSI and VDI, and the distance $\rho$ is the distance of the RSI from the present aircraft position, which is at the center 30 of the screen in the illustrated system. It is to be noted that the distance of the VDI from center 30, which is a fixed multiple of $\rho$, does not have to be separately controlled from the computer in the illustrated system. A projector 240 (FIG. 11) includes symbol plates and lenses, as will be explained subsequently, with the position of the symbol plates controlled by internal cams 242 and 244. A gear 246 is attached to the cams 242 and 244, controlling the distance $\rho$ with the angle of rotation thereof to the segmented RSI and the distance to the VDI line, which is a predetermined multiple or function of $\rho$.

A gear 248 is mounted on the body of the projector 240 and the angular position thereof determines the angle $\theta$ which is related to the direction of the commanded navigation route relative to the displayed map. A differential gear structure 250 is provided, including bevel gears 252, 254 and a spider gear 256. Gears 252 and 254 are rotatably mounted, with bearings, on a shaft 258 and gear 256 is rotatably mounted by bearing 260 on a shaft, which in turn is fixedly mounted to the shaft 258. A gear 262 is provided to mesh with the gear 246 and rotate on the shaft 258 in response to a motor and gear train 266 of a servo unit 28 providing rotation of the bevel gear 254.

The gear 248 is controlled through a suitably mounted idler gear 270 by a gear 272, rotatably mounted on the shaft 258 by suitable bearings. A drive gear 274 responds to a motor and gear train 276 of a servo unit 280 to rotate the gear 272, the gear 248, and to rotate the bevel gear 252, the gears 256, 254, 262 and 246, and to control the angle $\theta$ as the structure 240 rotates on a fixed housing structure 241. The bevel gears 252 and 254 are fixedly mounted to respective gears 272 and 262.

When motor 266 is driven while motor 276 is held fixed, the spider gear 256 rotates. Since gear 274 is fixed, gear 254 rotates, causing gears 262 and, more importantly, gear 246, to rotate. This results in a change in the dimension $\rho$. Thus, motor 266 controls the distance $\rho$. On the other hand, when motor is fixedly held and only motor 276 is driven, gear 274 rotates. This causes the rotation of gear 248 and through spider gear 256 the rotation of gear 254 and gears 262 and 246. Thus, driving motor 276 causes the rotation of both gears 246 and 248, resulting in a change in the angle $\theta$.

Motor 266 receives properly amplified signals from a resolver 278 of unit 268. The resolver receives signals sin $\rho$ and cos $\rho$ from the computer. It in turn supplies the computer with a feedback or null signal $^\rho$null. Similarly, motor 276 of unit 280 receives properly amplified signals from a resolver 279, which is supplied with signals sin $\theta$ and cos $\theta$ and which supplies a feedback signal $^\theta$null.

Referring now to FIG. 12, the display control projector 240 includes the housing 241, having a display mechanism as indicated generally at 280, rotatably mounted thereto by suitable ball bearing structures 282 and 283. Thus, the entire mechanism is free to rotate within the housing 241 in response to movement of the gear 248, which is fixedly mounted to an extending structure 286 of the mechanism 280 by an appropriate clamp 290. The gear 246, which is rotatably mounted to the structure 280, also moves with the gear 248 so that the $\rho$ dimension does not vary with angular movement. Mounted within the cylindrical structure 286 is a lens (not shown) which, in response to light from lamp 185 (FIG. 7), produces a light beam which is projected through cavities 292 and 293 of the structure 280. A peripheral flange 301 is provided, extending radially outward from the structure 280, and fixedly mounted to a circular flange structure 303 of the structure 280. The flange 301 is generally circular in form, and is provided with an elongated cavity or slot 305, which provides a slide area, for a pair of reticle holders 310 and 312. The reticle holders 310 and 312 are free to move in the elongated cavity 305 and are parallel to the axis thereof. Projecting pins 314 and 316 are provided at the ends of respective reticle holders 310 and 312 and ride on the inner surface of respective internal cams 244 and 242. A coiled spring 321 (FIG. 13) interconnects the pins 176 and 178 to bias the reticle holder 310 upward and the reticle holder 312 downward in the side view of FIG. 12. The cams 244 and 242 and the gear 246 are bolted together to form a unit rotatable on a bearing surface 320 provided on the periphery of the flange 303 and the flange 301. The bearing surface 320 may be a suitable dry lubrication or a teflon material as is well known in the art.

As shown in FIG. 13, the spring 321 is coupled to pins 176 and 178, in turn mounted on respective plates 312 and 310. The slot 304 of the flange 303 contains the reticle holders 312 and 310, each of which may include a respective reticle plate 330 and 332. Referring temporarily to FIGS. 16 and 17, the reticle plate 330 includes lines 340 and 342 and the reticle holder 332 includes a line 344. The plates 330 and 332 may be formed of a normally transparent material such as a plastic or glass, having a major portion of the surface aluminized as at 348 to render it opaque.

The clear areas of lines 340, 342 and 344 pass light therethrough to define the route segment, and vernier deviation lines. The plates 330 and 332 when in surface abutting juxtaposition, may be moved so that the slot 344 is longitudinally aligned with the opaque segment between the transparent slots or lines 340 and 342. Thus, as the reticle holders 310 and 312 move longitudinally in the cavity 305 to a central point, the slot 344 may be contiguously aligned with the slots 340 and 242 to present in the plane of projection, a continuous line accommodating the passage of light therethrough. The light passing through the slots 340 and 342 when projected to the viewing screen 24 (FIG. 3) will define the route segment (RSI) lines 26, and the slot 344, when projected as shown in FIG. 3, will define on the surface 24 the vernier deviation indicator (VDI) line 32. The flange 301 is mounted to the flange structure 303 by suitable bolts indicated at 307 of FIG. 13, so that the reticle holders 310 and 312 are retained in the cavity 305.

Referring now principally to FIGS. 14 and 15, the cams 242 and 244 are formed of plates which define respective cam openings 350 and 353. The vernier deviation cam 242 has an internal surface 256, and the route segment cam 244 has an internal surface 194 on which respective pins 166 and 164 ride. Each surface, 354 or 356, controls movement of the lines on either side of the center or crossover point so that rapid 180-degree rotation of the structure is not required. The slope of the surface 354 is a selected multiple or function of the slope of the surface 356, such as five times the slope. Also, in accordance with the invention, the slope of the surface 354 may be an exponential or any varying function of the slope of the surface 256, so that a small deviation of flight path is shown magnified at a greater proportional rate than a large deviation of flight path.

A limit surface 355 of the cam 94 is provided so that no pin movement is provided along the slot and the vernier deviation indicator line will remain at the edge of the screen 24 for large flight position errors. During this condition, only the route segment indicator will move outward in response to additionally flight position error. Points 361 and 363 are the center or crossover position of the surfaces 354 and 356. Limit surfaces are also provided for the cam 242 to limit the maximum movement of the route segment indicator line to the edge of the display surface.

In the illustrated arrangement, the variation in rise and fall of the cam surfaces is such that the reticle holder 310, though moving in the same direction as the reticle holder 312, will consistently move at a rate that is five times greater than that of the reticle holder 312 (except at the limit). It will thus be apparent that any movement of the projected route segment indicators 26 and vernier deviation indicator 32, of the surface 24, will be in identical direction from the center of the display, but the vernier segment 32 will have a movement that is clearly magnified. Thus, as shown in FIG. 3, the map is projected on the surface 24 at a changing position relative to the aircraft position indication at the center 30 of the screen, so that the present position is presented on the display. The RSI lines 26 are controlled to indicate the actual commanded or desired route relative to the projected map with the VDI line 32, magnifying any error in aircraft deviation from the commanded route.

As previously explained and described in conjunction with FIG. 3, in accordance with the teachings of the present invention, in addition to displaying a map portion (lines 15), the RSI and VDI lines, an aircraft symbol 28 is displayed, as well as a command heading 68 and a compass rose 70. The assemblies necessary to control the display of the latter three symbols or elements are shown in isometric views in FIGS. 18, 19 and 20, to which reference is made herein.

Figure 18:
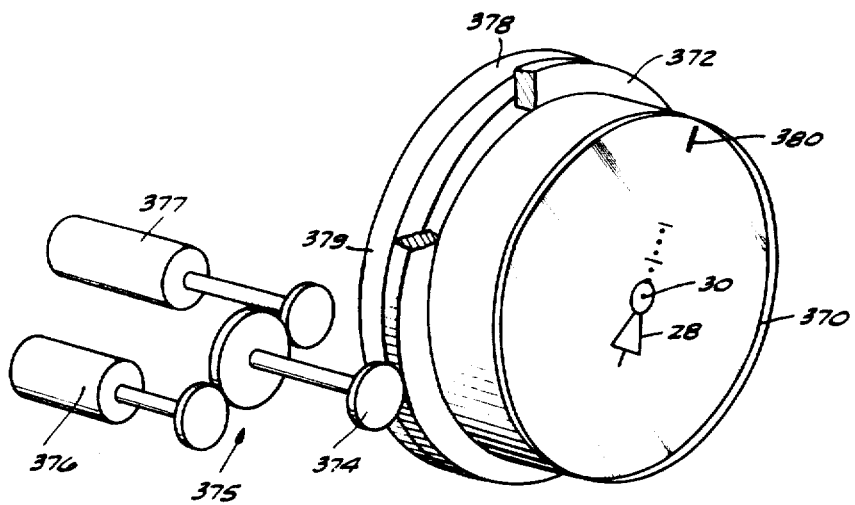
FIG. 18 is an isometric view of a mechanical assembly for controlling the angular orientation of an Aircraft Heading indicator.

As shown in FIG. 18, the aircraft symbol 28 is engraved at the center 30 of a screen 370 which is analogous to display surface 24 (FIG. 3). The screen is supported within a gear 372 whose outer surface meshes a driving gear 374 which defines the output gear of a gear train 375. The latter is connected to a driving motor 376 and to a resolver 377. The motor, the resolver and the gear train may be thought of as a servo unit, similar to the arrangement of FIG. 8a. The resolver receives signals sin $\psi$ and cos $\psi$ from the computer 16 (FIG. 1) to control the rotation of gear 374 and thereby the rotational positioning or display of symbol 28. Resolver 377 may all supply the computer with a null signal $\psi_{null}$. A four point contact bearing 378 is utilized to support the entire screen assembly behind the display surface 24. Slip rings on the rear surface of bearing 378 may be utilized to provide energy to lamps (not shown) buried in the aircraft symbol 28 at the center of the screen. Such lamps would illuminate the symbol 28 after the aircraft position push button 62 is actuated. An aircraft heading pointer 380 may also be engraved at the periphery of screen 370, to facilitate the determination of the aircraft's heading with respect to compass rose 70.

Figure 19:
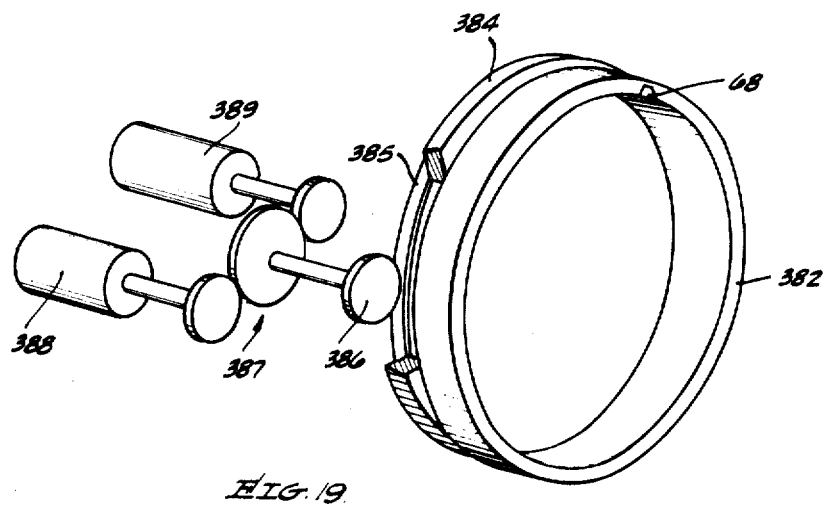
FIG. 19 is an isometric view of a mechanical assembly for controlling the angular position of a Command Heading indicator.

A similar arrangement is employed for controlling the display of command heading pointer 68, which is shown in FIG. 19. Pointer 68 is engraved on the front surface of a ring 382, which is supported in a four point contact bearing 384. Ring 382 is supported in a gear 385 which is meshed to a drive gear 386. The latter is the output gear of a gear train 387, which is driven by a motor 388. The motor is energized by properly amplified signals from a resolver 389 which receives signals sin $\psi_c$ and cos $\psi_c$. Also, the resolver 389 provides a null signal $\psi_{c(null)}$ to the computer.

Figure 20:
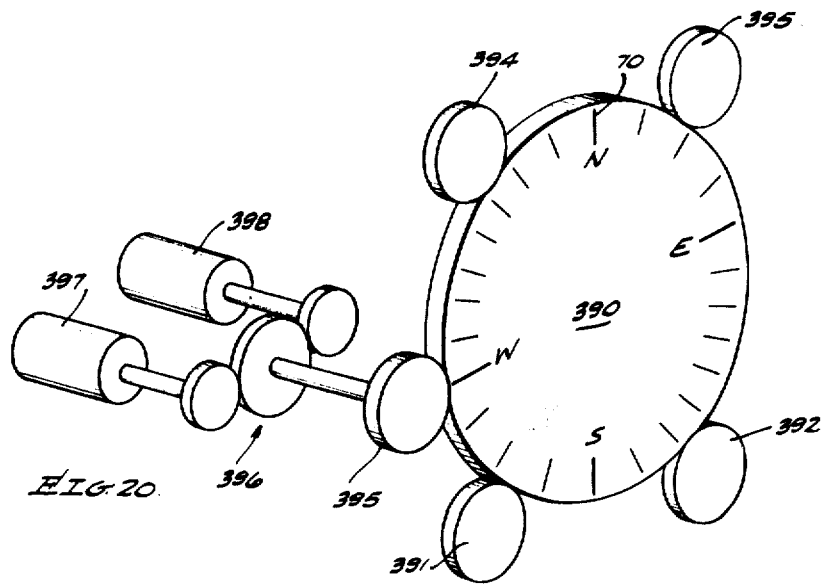
FIG. 20 is an isometric mechanical arrangement for controlling the angular position of a compass rose.

As seen from FIG. 20, the compass rose 70 consists of a disc 390 on which the compass rose is engraved. The disc 390, which in one embodiment is supported ahead of screen 370 (FIG. 18) and behind a cover glass plate (not shown) of display surface 24, is shown supported on four guide rollers 391 through 394. Teeth are defined about the circumferential side of the disc 390, so that the disc could serve as a gear which engages a drive gear 395. The latter is the output gear of a gear train 396 which is coupled to a drive motor 397. Like in the previously described arrangements, motor 397 responds to amplified signals from a resolver 398, which is energized by signals sin $\delta$ and cos $\delta$ from the computer. The resolver in turn supplies the computer with a null signal $\delta_{null}$.

It should be pointed out that in the NORTH UP position of switch 72 (FIG. 3) motor 97 drives the disc 390 so that NORTH points up and thereafter the disc remains stationary. On the other hand in the HEADING UP position of switch 72 it is motor 388 (FIG. 19) which drives pointer 68 to the up position and thereafter maintains ring 382 to be stationary. It should further be pointed out that in the NORTH UP position, assuming that each map or chart is oriented so that NORTH points upward, the Pechan prism structure 159 (FIG. 7) is fixedly maintained. However, in the HEADING UP mode of operation, it is necessary to continuously rotate the prism structure 159 just as the compass rose 70 is rotated. The rotation of the prism structure is achieved by supplying servo motor 183 with appropriate signals to rotate the structure 159 about axis 157. In practice, structure 159 is coupled to servo motor 183 by a gear train similar to train 396 shown in FIG. 20 with the servo motor 183 being analogous to the drive motor 397. A feedback signal may also be supplied to the computer to indicate the rotational orientation of the prism structure, when the system is operated in the HEADING UP display mode.

The major features of the system of the present invention, thus far described, may be summarized as consisting of a main display surface, which is used to display symbols or elements and a map portion. The combination of the various displayed elements provides a pilot with nearly all the information necessary to navigate an aircraft along a selected route.

The system includes means (such as 36 and 38, see FIG. 4) with which a particular map or chart from a plurality of stored charts may be selected. The selected map can then be moved so that a particular portion thereof is displayed and a particular point within the portion is located at a predetermined point on the display surface. The predetermined point is preferably the center of the display surface. In the manual mode, the map can be moved by manually actuable means (46 and 48, see FIG. 4) so that a selected point which may either be a start point or a destination point is located at the display surface center. In such a mode, the system also includes means such as push buttons (52 and 54) which when actuated supply a computer with signals from which the computer calculates and determines the coordinates of the selected points. In the automatic mode of operation, the system includes means which automatically respond to signals from the computer so that, during flight, the displayed map portion is controlled to insure that the aircraft's actual position on the displayed map portion is at the display center.

At the display center, an aircraft symbol is displayed. The orientation of the symbol is continuously controlled to indicate the orientation or direction of the aircraft in flight. In addition, a route segment indicator RSI (lines 26) is displayed. The RSI defines the direction or the selected route between previously selected start and destination points. The distance between the center and the RSI indicates the off-course error of the aircraft. In order to enable a pilot to easily determine the off-course error, a vernier deviation indicator (VDI) is also displayed. The VDI is displayed at a distance from the center which is a multiple of the off-course error. To facilitate the aircraft's navigation, a compass rose is also displayed, together with a heading marker which is automatically controlled to indicate to the pilot the required navigation correction to maintain the aircraft in flight along the selected route.

In order to enable the computer to compute the selected route and to automatically control the displayed map portion so that the aircraft's actual position is displayed at the center 30 of the displayed surface, prior to flight time, coordinate information for each of the maps, stored in film container 155, is stored in the computer. For example, the coordinates of the center point of each map may be supplied. During flight time, conventional navigation instrumentation aboard the aircraft such as VORTAC receivers, receive signals from VORTAC transmitting stations and supply them to the computer, wherein the actual aircraft position is computed. Knowing the coordinates of the center point of a particularly displayed map, the computer then computes the signals which have to be supplied through the X and Y motors 177 and 179 (FIG. 8) in order to display the map portion, so that the aircraft's actual position is displayed at the center. In addition, either prior to flight time or during flight, the computer is supplied with instructions and data which are used to determine the selected route, based on the start and destination points, manually selected by the pilot.

The computer 16 is also programmed to determine the ground speed (GDSP), the estimated time en route (ETE), and the distance (DIST) to the destination point stored therein. Anyone of these values is displayable on panel 84 (FIG. 3) by controlling the position of switch 82. If during flight time, VORTAC signals are not received, or, for some reason the computer fails to compute the aircraft's actual position on the basis of received navigation signals, the computer is programmed to estimate the aircraft's position on the basis of a dead-reckoning subroutine which will be described hereafter in detail. When such computations are performed, a Dead Reckoning indicator or plaque 86 (FIG. 3) is illuminated. Also, if the aircraft's actual position, as computed by the computer, is not present in the particular selected chart, the OFF CHART indicator 74 is illuminated.

The computer is further programmed to determine the time of arrival to the destination point and to provide the pilot with indications when the aircraft is a given number of minutes from the destination point. For example, the computer, as will be explained hereafter, is preferably programmed so that 5 minutes prior to the arrival at the destination point, a light is displayed on the control panel 22 (FIG. 4). Furthermore, when the aircraft is only one minute from the destination, the RSI and VDI are caused to flash, to further alert the pilot of his approach to his selected destination point.

In the embodiment in which a plurality, such as four, destination points may be entered by means of push button 95 (FIG. 4), as the aircraft approaches the first destination point, the computer automatically uses the destination point as the start point for a succeeding route to be displayed so that the pilot may navigate the aircraft toward the second destination point.

The operational relationship between the computer 16 (FIG. 1), the display unit 12 and the control unit 14 may best be explained by first summarizing the various types of signals which are supplied to or from the I/O unit 18. Briefly, as seen from FIG. 1, signals are supplied to unit 18 from the units 12 and 14, as well as from the navigation instruments on board the aircraft, while signals which the computer supplies to unit 18 are supplied therefrom to either the display unit 12 or the control unit 14.

Figure 21:
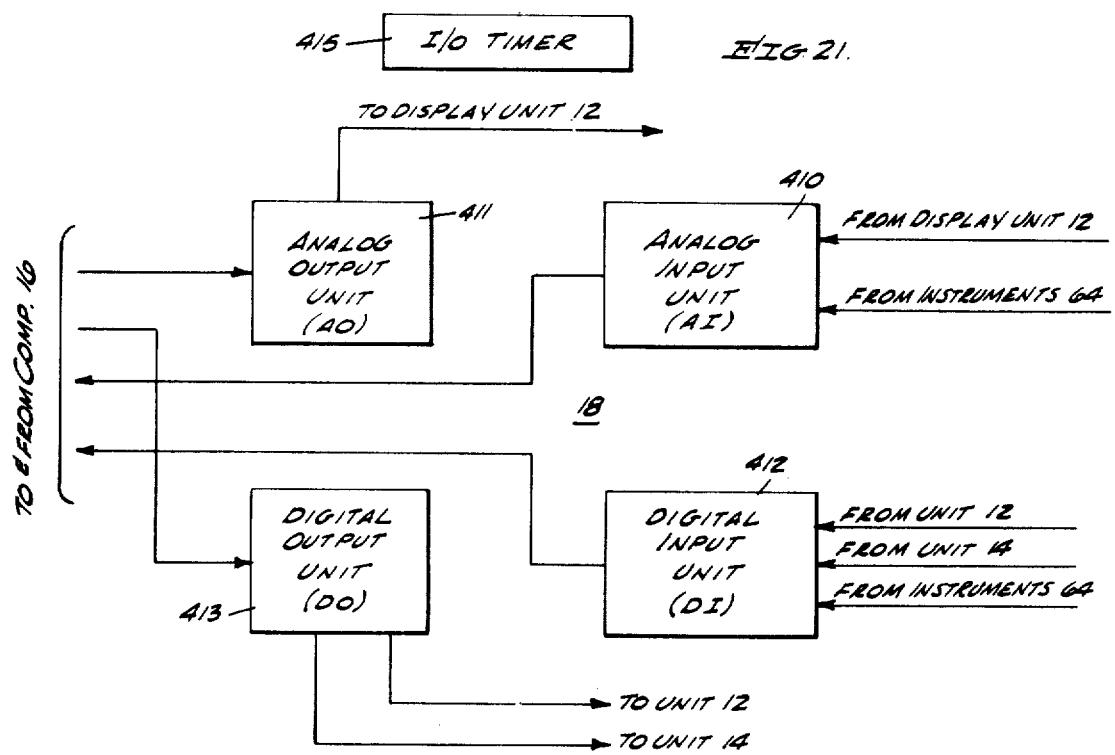
FIG. 21 is a simplified block diagram of the Input/Output unit 18, shown in FIG. 1.

As shown in FIG. 21, to which reference is made herein, the I/O unit 18 may be thought of as consisting of four signal storing units, two of which, designated 410 and 411, store analog signals and the other two, designated 412 and 413, store digital signals, generally in the form of binary digits or bits. The I/O unit may also include a timer or clock 415. The various signals stored in units 410–414 are listed in FIGS. 22a, 22b, 23 and 24, respectively.

In accordance with the teachings of the present invention, the 64 analog quantities, listed in FIGS. 22a and 22b, are continually sequentially interrogated. To obtain a given analog input signal, or simply an AI, the computer does not execute an input instruction, but merely accesses the cell in unit 410, assigned to the particular AI. Similarly, an analog output signal or AO is supplied by the computer by merely loading the particular cell assigned to the AO. It should be pointed out that appropriate analog-to-digital (A/D) and digital-to-analog (D/A) converters have to be used if the computer 16 is a digital computer, as is assumed herein.

Figure 24:
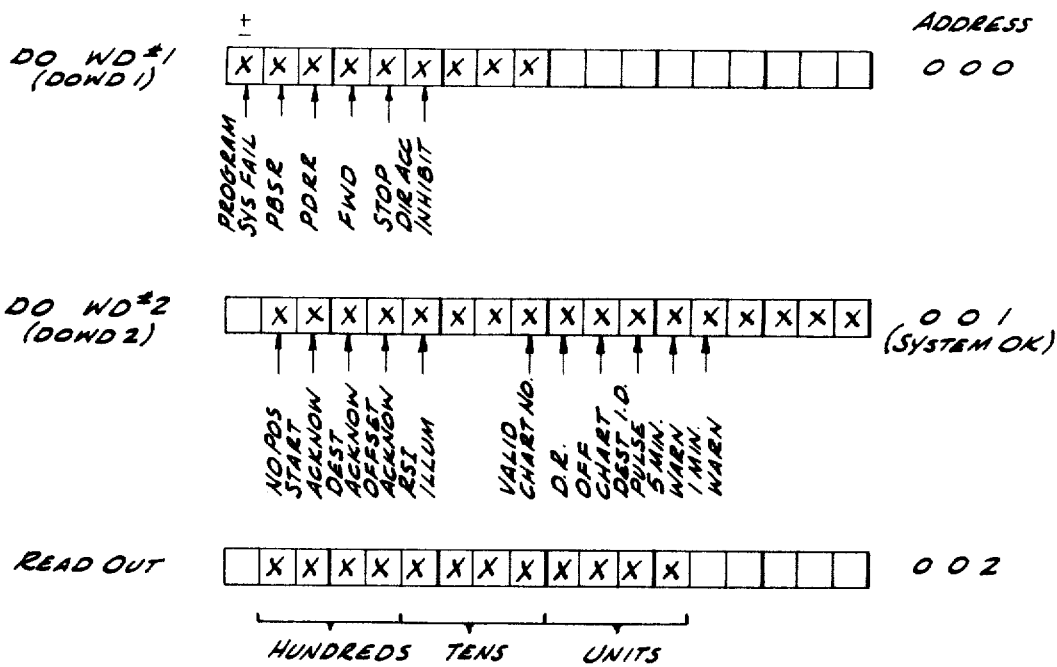

Unlike the analog signals, which are assumed to be stored in individual cells, the digital input signals (DIs) and the digital output signals (DOs), are arranged in groups or words, each of 18 bits. Each word is stored at a unique address, as shown in FIGS. 23 and 24.

When a DI instruction, with a certain address, is executed by the computer, the states (1 or 0) of all the discretes or bits, assigned to that address, are read from the I/O unit to a register of the computer. Of the 18-bits which are available per address, some are unused as indicated by zeros (0's), some are spares as indicated by X's without labeled arrows. The label associated with each discrete input corresponds to its 1 state. Thus, for example, when the computer addresses discrete word No. 2 (DSCWD2) at address 006, and the bit on the left-hand side, labeled HEADING UP, is a 1, it means that switch 72 (FIG. 3) is in the downward position, so that all computations should be performed and the various symbols displayed in a HEADING UP mode, rather than in the NORTH UP mode, which is diagrammed in the figure. The 18-bit group or word, designated DATA BUFFER REG, is used to sequentially enter words of 18-bits into the computer from film 100 (FIGS. 5, 6 and 8), which as herebefore indicated contains all the data, as well as the computer program instructions necessary for the computer's operation.

In discrete word No. 1 (DSCWD1), only 5-bits are utilized to provide indication pertaining to the validity of the various signals received from the navigation instruments aboard the aircraft. These include the validity of the aircraft's magnetic heading, the validity of the range and bearing from VORTAC receiver 1 and the validity of the range and bearing of VORTAC receiver 2.

Of the words stored at address 002, only a few of the bits are used to provide timing signals from a real time clock. The word designated MAP CODE stores the number of the map, which is displayed at any given time, in binary-coded-decimal (BCD). The 18th-bit (extreme left-hand side) is used as a parity check bit.

The words stored at addresses 004 and 005 provide the various signals from the VORTAC receivers 1 and 2, respectively, while the bits in discrete word No. 2 (DSCWD2) at address 006, indicate the status of the various switches and push buttons on the display and control units (FIGS. 3 and 4). Four of the bits of DSCWD3 are used to identify the status of the multidestination button 95 (FIG. 4), while the bits designated FDR, FPE and FCON, are used to supply control signals to the computer which are used when data from the film 100 is loaded into the computer. For example, bit FDR (flag data ready) is set whenever the DATA BUFFER REG is full. Bit FCON (flag control word) is set when a word read out of the film is sensed to be a control word, and bit FPE (flag parity error) is set to indicate a parity error in a word read off film 100.

A plurality of 18-bit words, as shown in FIG. 24, are also used to provide discrete outputs (DOs) from the computer. For example, the left-hand bit in the DO word No. 1 (DOWD1) is used to provide a discrete output, indicating system failure. When this bit is set, it causes the illumination of the SYSTEM FAILED plaque 96 (FIG. 3) on the display panel 20. DOWD1 may also include discrete outputs which are utilized during the loading of the computer with the data, stored on the film.

The various bits in DO word No. 2 (DOWD2) are used to illuminate the various plaques on the display and control units (FIGS. 3 and 4). The 12-bits of the READOUT WORD, stored at address 002, are used to provide signals in binary coded decimal which represent hundreds, tens and units for display on the multidigit display panel 84 (see FIG. 3).

When a discrete output address (DOA) instruction, with a certain address is executed by the computer, all of the DOs assigned to that address are set according to the bit pattern in a register of the computer at the time of the execution. Thus, for example, when the computer addresses DOWD2, and sets the bit labeled D·R·, the Direct Reckoning plaque 86 (FIG. 3) is illuminated. The execution of DOA 001, in addition to setting the bits, is also an indication that the system functions properly, i.e., a system O.K. indication. When the I/O unit 18 detects a 001 address it resets a timer. If the timer runs out before being reset by the program, the I/O unit issues a system fail discrete. This feature is a protection against "lost programs."

Figure 25:
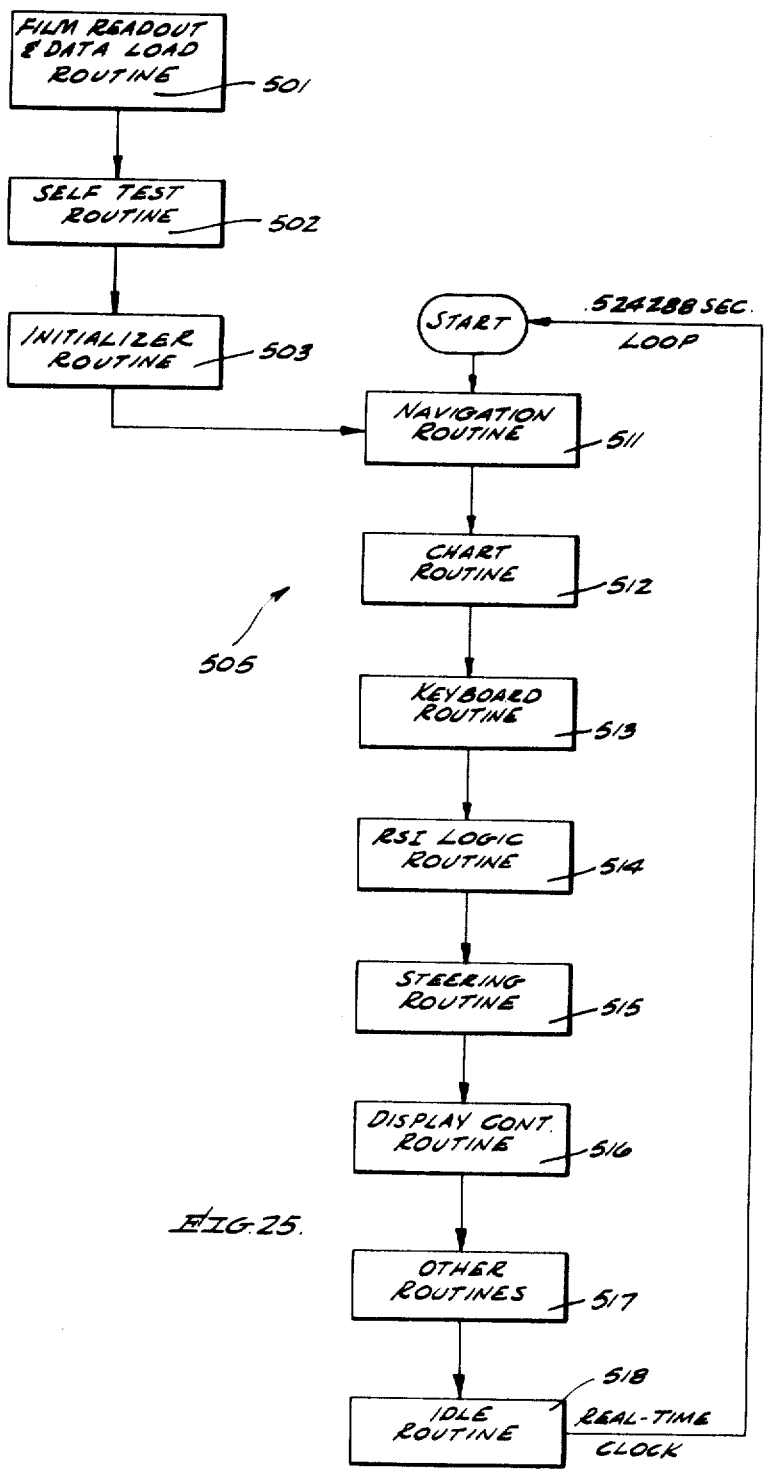
FIG. 25 is a simplified flow diagram of the various routines which computer 16 performs in order to properly control the navigation system of the present invention.

The operation of the system of the present invention will be explained in further detail by detailing the operations of the computer 16. Since flow charts or diagrams are extensively used, by those familiar with the operation of computers, and particularly computer programmers, it is believed that the computer's operations may best be explained by resorting to the use of such charts. FIG. 25, to which reference is now made, is a simple flow diagram of various routines which computer 16 performs in order to properly control the system, as hereinbefore explained. In the figure, block 501 represents a Film Readout and Data Load routine, which is performed by the computer in order to load all the data which is read off film 100.

The instruction list, necessary for the computer to perform routine 501 may be prestored in the computer, so that each time the system is turned ON, the computer performs routine 501. Preferably, however, in one embodiment actually reduced to practice, the instructions for routine 501 are stored in the first block of data in film 100. Then, when the system is turned ON, the system automatically enters a BOOTSTRAP mode, during which the first block of data is stored into the memory of the computer through the I/O unit 18. At the end of the BOOTSTRAP mode, the instructions for routine 501 are stored in the computer, which is thereafter put in a RUN mode. During the latter mode, routing 501 is performed, controlling the storing of the rest of the data on the film into the computer.

As previously explained, the data, stored in the computer, includes all the required information pertaining to the VORTAC stations, all the data required to define each of the charts or maps and the instructions required for the performance of the computer's programs. The data from each chart includes a core apex to map center radius $r_c$, the longitude of map center $u_c$, and the scale factor, which, in one particular embodiment is 5, 15 or 30 nautical miles-per-inch (nmi).

After all the data is stored in the computer, a Self Test routine, designated by block 502, is performed. This routine is included in order to automatically check and advertise by means of the system FAILED plaque 96 (see FIG. 3) the failure of any hardware in the system that would result in an incorrect display of information to the pilot. In particular, the routine is designed to advertise all failures that would endanger the flight safety of the aircraft. An exemplary list of tests which are performed during routine 502 will hereafter be described in some detail. However, for the present discussion, let it be assumed that all the tests indicate proper system performance.

After routine 502 is completed, the computer enters an Initializer routine 503, which, together with the rest of the routines shown in FIG. 25, comprise the main system flight program, generally designated by numeral 505. Briefly, the flight program includes a Navigation routine 511, a Chart routine 512, a Keyboard routine 513, a RSI Logic routine 514, a Steering routine 515, a Display Control routine 516, Other routines 517 and an Idle routine 518.

Except for the Initializer routine 503, the flight program 505 is executed continuously in a loop, which in the described example is of 0.524288 seconds duration. The timing of the loop may be controlled by timer 415 in the I/O unit 18 (see FIG. 21), which controls certain bits of the REAL TIME CLOCK WORD (FIG. 23). When the most significant bit of the clock changes state, an input-output interrupt is generated which directs the program back to the START POINT (FIG. 25) of the loop. Since there are 8 bits in the REAL TIME CLOCK word in address 002, and the least significant bit is shown to be worth 4.096 msecs. msecs., the interrupt will occur every 128 times 4.096 msecs., or once every 0.524288 seconds, which is approximately a half a second. This defines the minor cycle duration.

In the particular exemplary operation to be described, the aircraft dead-reckoning computations, responses to pilot inputs, steering computations, and display outputs, will occur approximately twice per second. As will be explained hereafter, VORTAC information, which is used to compute smoothed aircraft position parameters, is processed at a lower rate of once every 8 minor cycles, or approximately once every four seconds. Wind estimates, on the other hand, are performed once every 16 seconds.

As seen from FIG. 25, the Initializer routine 503, of the flight program 505, is entered upon successful completion of the Self Test routine 502. The Initializer routine exits to a point in the Navigation routine 511 and from then on the program is in the continuous loop.

FUNCTIONS OF FLIGHT PROGRAM ROUTINES

Before proceeding to describe each of the routines in sufficient detail to enable those familiar with the art to practice the invention, a brief description of the functions of each of the routines of the flight program 505 is believed to be in order.

The function of the Initializer routine 503 is to perform certain initial conditions, housekeeping functions, and to accept the initial aircraft position. As hereinbefore explained, the pilot supplies the computer with the aircraft's actual position by first positioning the point on a map representing the present aircraft position at center 34 (FIG. 3), and thereafter depressing the A/C POS push button 62 (FIG. 4). Only after receipt of the aircraft's present position does the Initializer routine exit to the Navigation routine 511 of the flight program. It is for this reason that the pilot, as a first step, enters the aircraft's present position, after the system is turned ON and all the data is properly stored in the computer.

The function of the Navigation routine 511 is to perform aircraft dead-reckoning (DR) computations. These produce signals which are supplied to the X and Y servo units (FIG. 8), which automatically control the portion of the map which is displayed at center 30, so that the point on the map corresponding to the aircraft's actual position is displayed thereat. Once every 16 seconds or once every 32 minor cycles, wind values are updated. These values are used in the dead-reckoning computations, performed every minor cycle. Also, during the Navigation routine, once every 4 seconds or once every 8 minor cycles, VORTAC information is processed and is used to produce aircraft position smoothing. That is, the processed VORTAC information is used to adjust the values which are obtained from the dead-reckoning computations during the previous 7 minor cycles. As previously indicated, if, for some reason VORTAC information cannot be used to produce aircraft position smoothing, the aircraft position is computed only by dead reckoning, and the DEAD RECKONING plaque 86 (FIG. 3) is illuminated.

After the Navigation routine 511, the program continues with the Chart routine 512. The function of the latter is to determine the number of the chart which is being displayed, determine whether it is a valid chart and flag a legal number. For example, assuming that the largest chart number is 255, if, during the Chart routine, the number of the displayed chart, which is supplied to the computer by the MAP CODE word (see FIG. 23) is greater than 255, an illegal flag bit is set in the computer. This causes the illumination of the light 38× (FIG. 4) which is associated with and is adjacent to the CHART CHANGE push button 38. The Chart routine 512 is performed twice per minor cycle for reasons to be explained hereafter in detail.

After the Chart routine, the Keyboard routine 513 is performed. Its main function is to process and acknowledge pilot inputs from the control panel which are supplied to the computer by setting different bits of the DISCRETE WORD No. 2 (FIG. 23).

The next routine to be performed is the RSI Logic routine 514, whose main function is to determine the display conditions of the RSI, and VDI and to determine whether steering should occur. During this routine, destination warnings, such as the five minute and one minute warnings hereinbefore explained, and sequencing operations between successive destinations are performed. Also, computations and display of the digital readout quantities on panel 84 (FIG. 3) are performed during this portion of the flight program.

Thereafter, the flight program performs the Steering routine 515 during which the command heading, necessary to steer the aircraft along the selected course, is computed. The Display Control routine 516 is next to be performed. Its function is to compute from the navigation and steering variables, previously determined by the foregoing routines and available in the computer, display servo control signals which have to be supplied to the various servos, (see FIG. 22b) in order to properly control the display of the various symbols and lines on the display surface 24.

The Display Control routine 516 in essence completes the portion of the flight program 505, which is necessary for the control of the display unit 12 and the control unit 14 (FIGS. 3 and 4). However, the flight program may include other routines generally designated by flock 517. Such routines may include an inflight monitor routine, during which a continuous self check of the system's performance is produced during the flight, once each minor cycle, i.e., once every one half second. After the other routines are performed, the Idle routine 518 is entered. Its function is to provide idling at the end of the flight program until the interrupt signal occurs at the end of the minor cycle. Although the number of computations which the computer has to perform during each minor cycle is quite significant, many general purpose computers are presently in existence which are capable of performing all the required computations within the allotted time.

Before proceeding to describe the various routines in greater detail, a glossary of important flight program variables is incorporated in the following tables:

TABLE I

| SYMBOL | DEFINITION | |
|---|---|---|
| $\mu_{DR}$ | | Longitude |
| $\bar{\lambda}$ | A/C Smoothed | Latitude |
| $\bar{\mu}$ | | Longitude |
| $\lambda_s$ | Start Point | Latitude |
| $\mu_s$ | | Longitude |
| $\lambda_D$ | Destination | Latitude |
| $\mu_D$ | | Longitude |
| $\lambda_{BD}$ | Buffered Dest | Latitude |
| $\mu_{BD}$ | | Longitude |
| $\lambda_{D1}$ | Destination 1 | Latitude |
| $\mu_{D1}$ | | Longitude |
| $\lambda_{D2}$ | Destination 2 | Latitude |
| $\mu_{D2}$ | | Longitude |
| $\lambda_{D3}$ | Destination 3 | Latitude |
| $\mu_{D3}$ | | Longitude |
| $\lambda_{D4}$ | Destination 4 | Latitude |
| $\mu_{D4}$ | | Longitude |
| $\lambda_{wa}$ | Wind D.R. | Latitude |
| $\mu_{wa}$ | | Longitude |
| $\lambda_{e1}$ | VORTAC1 Meas-D.R. | Latitude |
| $\mu_{e1}$ | | Longitude |
| $\lambda_{e2}$ | VORTAC2 Meas-D.R. | Latitude |
| $\mu_{e2}$ | | Longitude |
| $\Delta t_{DR}$ | Time in dead-reckoning | |
| $\delta$ | Local Magnetic Variation | |
| MAPXR | Current Map No. +02000₈ | |
| DOWD2 | Discrete Output Word No. 2(001) | |
| DSCWD1 | Discrete Input Word No. 1(001) | |
| DSCWD2 | Discrete Input Word No. 2(006) | |
| DSTCMD | Destination Command | |
| DSTINP | Destination Input(I.D. Counter) | |
| DSTMR | Destination Timer | |
| $\sin \psi$ | sin | |
| $\cos \psi$ | cos | A/C Heading |
| $\sin \Delta \psi$ | sin | |
| $\cos \Delta \psi$ | cos | Delta Cmd Hdg |
| $\sin \delta$ | sin | |
| $\cos \delta$ | cos | Mag Variation |
| $\sin (L\Delta\mu)$ | sin | |
| $\cos (L\Delta\mu)$ | cos | Chart Heading |
| $\sin \theta$ | sin | |
| $\cos \theta$ | cos | RSI Bearing |
| $\sin \rho$ | sin | |
| $\cos \rho$ | cos | RSI Distance |
| $f_{ST}$ | VORTAC Station Frequency | |
| $\lambda_{ST}$ | | Latitude |
| $\mu_{ST}$ | | Longitude |
| $\delta_{ST}$ | | Mag. Var. |
| $h_{ST}$ | | Altitude |
| $r_c$ | Map Center Radius | |
| $\mu_c$ | Map Center Longitude | |
| $V_w$ | A/C West Ground Speed | |
| $W_N$ | Wind North Velocity | |
| $W_W$ | Wind West Velocity | |
| $\Delta\lambda_{DR}$(Rem) | D. R. Remainder | Latitude |
| $\Delta\mu_{DR}$(Rem) | D. R. Remainder | Longitude |
| $h$ | A/C Altitude | |
| $V_A$ | A/C True Airspeed | |
| $R_{N-S}$ | Earth N-S Radius of Curvature | |
| $R_{E-W}$ | Earth E-W Radius of Curvature | |
| $R_{E-w}$ | Earth E-W Radius of Curvature | |
| $R_E$ | Earth Radius | |
| $R_\lambda$ | $(R_{N-S} + H)$ | |
| $R_\mu$ | $(R_{EW} + h)\cos \bar{\lambda}$ | |
| $\sin\bar{\lambda}$ | sine (Smoothed lat) | |
| $\cos\bar{\lambda}$ | cosine (Smoothed b lat) | |
| $X_m$ | Map X coordinate | |
| $Y_m$ | Map Y coordinate | |
| $X_c$ | Map X command | |
| $Y_c$ | Map Y command | |
| $\rho$ | A/C offtrack distance (RSI $\rho$) | |
| $S$ | Map Scale Factor (At film) | |
| $R_{S_1}$ | VORTAC 1 Slant Range | |
| $R_{S_2}$ | VORTAC 2 Slant Range | |
| $Q_1$ | VORTAC 1 Filter Weight | |
| $Q_2$ | VORTAC 2 Filter Weight | |
| $q$ | VORTAC cycles/wind cycle | |

Also included is the following TABLE II, in which are listed flags or control bits which are used in the computer during the performance of the Various routines. The minus (−) or set state of a flag corresponds to its definition:

TABLE II

| FLAGS | DEFINITION |
|---|---|
| NABF | Not Airborne |
| IVF1 | VORTAC No. 1 Invalid |
| IVF2 | VORTAC No. 2 Invalid |
| UNRF | Filter Correction Unreasonable |
| DRF | Dead Reckon |
| CCHF | Chart Change |
| SVF | Start Valid |
| DEF | Destination Entered |
| DVF | Destination (0) Valid |
| DVF1 | Destination 1 Valid |
| DVF2 | Destination 2 Valid |
| DVF3 | Destination 3 Valid |
| DVF4 | Destination 4 Valid |

| | |
|---|---|
| DKMDF | Dark Mode |
| DRSTF | Destination Reset |
| STEERF | Steering |
| STCKF | S. T. Check (Map Servos) |

INITIALIZER ROUTINE

Figure 26:
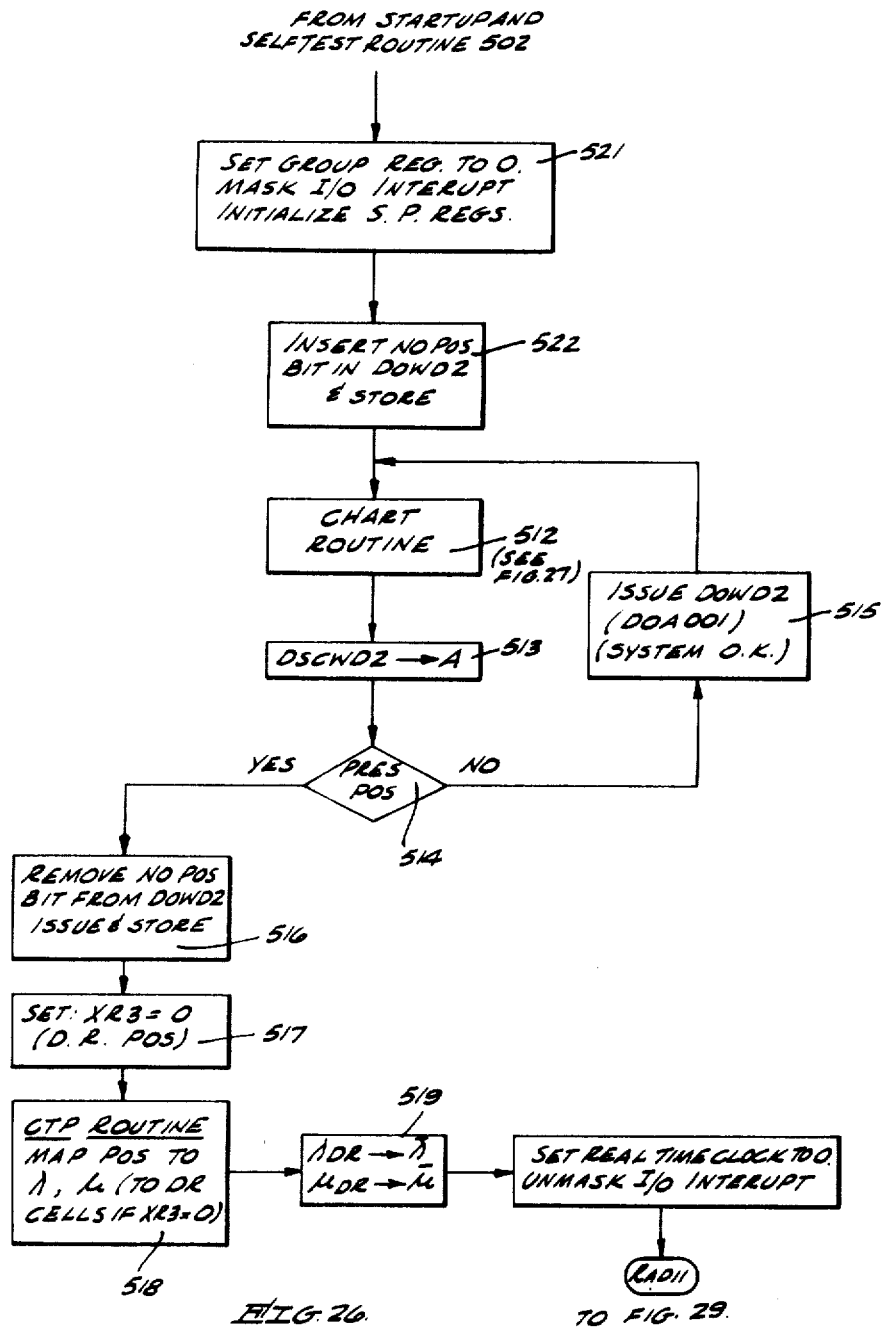
FIG. 26 is a flow chart of the Initializer routine.

Reference is now made to FIG. 26, which is a flow chart of the Initializer routine 503. In the first block of the chart, designated 521, a group register of the computer 16 is set to zero (0), since non-zero values of the group register are not required in a flight program. The I/O interrupt is masked out, since the 0.5 second timing of the real time clock is not required in the Initializer routine. Next, various scratch pad registers, used during the flight program, are set to their initial states. Such initialization will set all the destination valid flags (VDF1, VDF2, etc.,) to their invalid or (+) state.

In the second block, designated 522, the bit NO POS (FIG. 24) in DOWD2 is set and the word is issued and stored at 001 in the I/O unit 18.

When the bit pattern in DOWD2 is output to address 001, the presence of a set NO POS bit will light up the NO POSITION plaque 64, (FIG. 3). This indicates to the pilot that the startup program, which includes the storing of all the data in the computer and the performance of all the cell tests, has been completed and that the computer is ready to accept a chart change and aircraft initial position entries.

Figure 27:
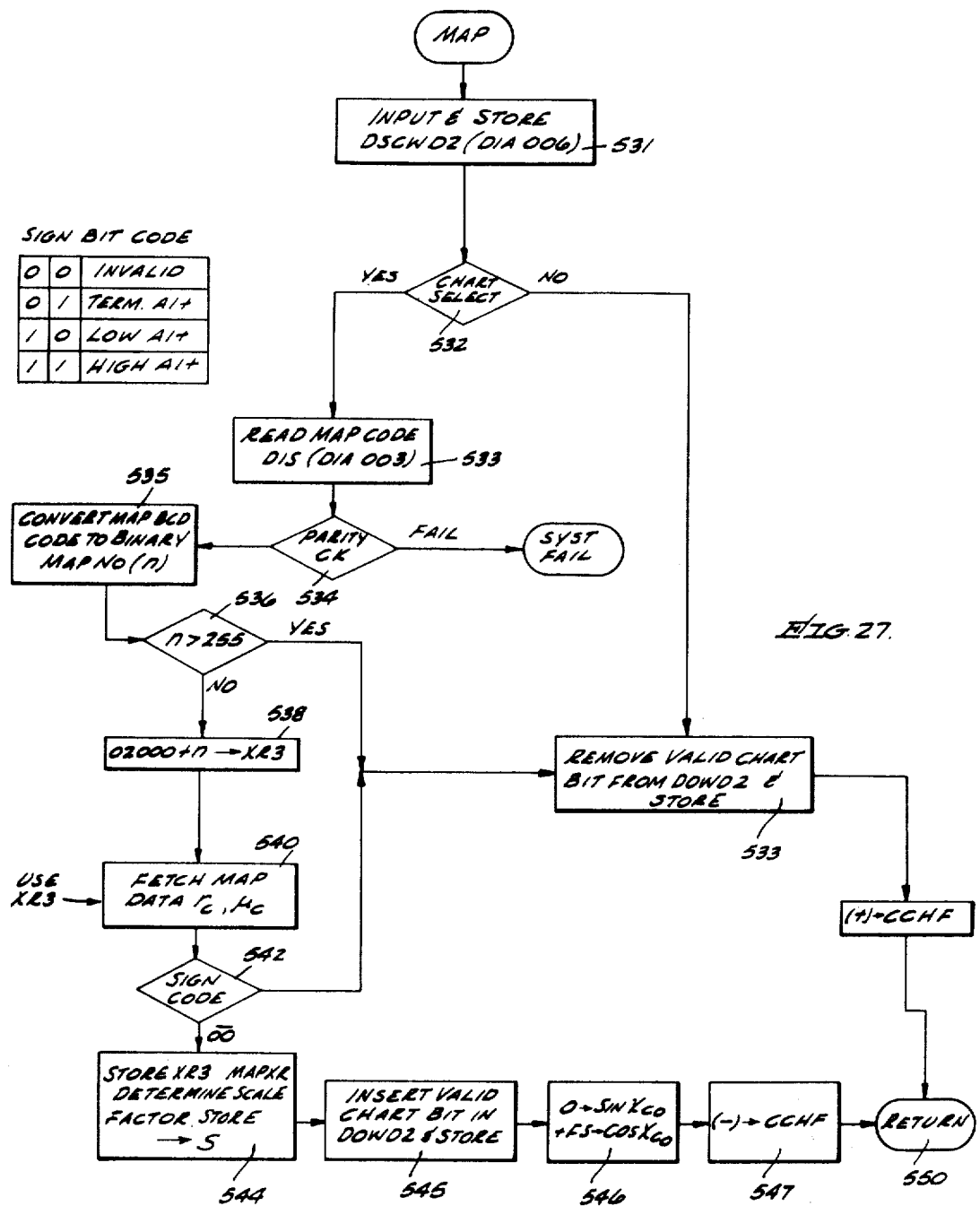
FIG. 27 is a flow chart of Chart routine.

After outputting DOWD2, the computer moves to perform the Chart routine 512, which is detailed in FIG. 27, to which reference is made herein. Briefly, the Chart routine is entered at this point to detect a chart change and to determine the number and scale factor of any selected chart or map.

After the Chart routine, the initializer routine continues (see FIG. 26), by transferring DSCWD2 at address 006 (see FIG. 23), to a register A (block 513). Once DSCWD2 is in register A, the computer checks (block 514) the A/C PRES POS bit to determine whether the bit is set (in a 1 state), which occurs after the pilot has depressed push button 62 (FIG. 4). If the discrete is not present, i.e., the bit is in a clear or 0 state, the DOWD2 is issued as represented by block 515, and the program returns to the Chart routine to look for chart changes.

The reason for issuing DOWD2 and restoring it at address 001 is because an output from the computer to address 001 is an indication to the I/O unit that the program is not lost. Thus, an output from the computer to address 001 serves as a SYSTEM O.K. signal. Failure of such a signal for more than 0.75 seconds, will result in a system fail being issued by the I/O unit. This is achieved by setting the discrete or bit PROGRAM SYS. FAIL in DOWD1 (FIG. 24). This in turn will illuminate the SYSTEM FAILED plaque on the display panel 20 (FIG. 3).

If, however, the A/C PRES POS discrete is present, it signifies that the pilot has positioned the aircraft's present position at center 30 of the display surface 24. The program then removes (block 516) the NO POS bit from DOWD2 and issues it to address 001. By removing the NO POS bit, the NO POSITION plaque 64 (FIG. 3) goes dark. Thereafter, as represented by block 517, an index register 3 (XR3) is set to zero. This indicates that the converted map position of the point at center 30 should be stored in cells assigned to the aircraft's dead-reckoning position.

Since each map is stored in the computer in terms of its map center radius $r_c$ and map center longitude $\mu_c$ and its scale, it is necessary to enter a conversion routine, represented by block 518, in order to convert the present map position at center 30 to an equivalent latitude and longitude ($\lambda,\mu\mu$). The computed $\lambda$ and $\mu$ are stored in cells which are determined by the state of XR3. When this register is set to zero, the computed $\lambda$ and $\mu$ are stored in the aircraft's dead-reckoning position cells as $\lambda_{DR}$ and $\mu_{DR}$. These values are also stored (block 519) in the smoothest position cells, to represent $\bar{\lambda}$ and $\bar{\mu}$. Thus, at this point in the program, the longitude and latitude parameters of the point displayed at center 30, are stored in both the dead-reckoning and smoothed-position cells.

CHART ROUTINE

Reference is now made to FIG. 27 which, as hereinbefore indicated, represents a detailed flow chart of the Chart routine, included in the Initializer routine just described. Briefly, the purpose of the Chart routine is to detect chart change requests, to determine the number and scale factor of the selected chart, and to inhibit the chart change process if an illegal chart number is selected. By an illegal chart number is meant a number which is greater than the largest chart number on the film 100.

In the present invention, the charts or maps are numbered consecutively from 0 through 255, inclusive. Map numbers beyond 255 will not be present and some charts in the 0–255 range may be blank. Two parameters for each chart are required for the map transformation equations, in addition to the map scale factor. These parameters are the LAMBERT cone-apex-to-map-center radius, $r_c$, and the map center longitude, $\mu_c$. These parameters are stored in the computer memory, in a sequence in which the $r_c$ parameters of all the maps are stored first, followed by the $\mu_c$ parameters of the maps. The sequence is $r_{c0}, r_{c1}...r_{c254}, r_{c255}, \mu_{c0}, \mu_{c1}...\mu_{c254}$ and $\mu_{c255}$, wherein $r_{c0}$ and $\mu_{c0}$ are the parameters for map numbers 0, etc. Since the $r_c$ and $\mu_c$ parameters are both positive numbers, their sign bits can be used as a code for the map scale factor. The full possible combinations correspond to the three map scale factors plus one for blank charts. If both sign bits are 0's it represents a blank, and when both are 1's it indicates a map scale of 30 nmi. A 0–1 sign bit combination represents a 5 nmi scale, while a 1–0 bit combination represents a map scale of 15 nmi.

The Chart routine begins by inputting and storing in the computer DSCWD2 located at I/O address 006 (FIG. 23), an operation represented in FIG. 27 by block 531. Thereafter, the word is examined to determine the presence of a CHART SELECT discrete, an operation represented by block 532. Such a discrete is present only if the pilot has actuated the CHART CHANGE push button 38 (FIG. 4). If a chart has not been selected, i.e., the CHART SELECT bit is in a reset state, the VALID CHART bit from DOWD2 (FIG. 24) is removed and the word is restored, as represented by block 533. Thereafter, the chart change flag (CCHF) is reset to a 1 (+) and the Chart routine reaches its end.

On the other hand, if the CHART SELECT discrete is present (block 532), the routine continues to read the MAP CODE word at address 003, as shown in FIG. 23. Twelve of the bits of the word represent the selected chart number, in binary coded decimal, while one of the bits serves as a parity bit. The latter is used for a parity check (block 534). Failure of the parity check indicates system failure. If, however, the parity check passes, the chart number in binary coded decimal is converted to a binary map number (block 535), and the binary map number ($n$) is checked (block 536) to see whether it is greater than 255.

If $n$ is greater than 255, thereby indicating that the selected map number represents an illegal chart, the routine continues to block 533. On the other hand, if $n$ is less than 255, thereby indicating that a valid chart may have been selected, the number $n$ is added to a preselected address such as 02000, and the sum is stored in register XR3 (block 538). Thereafter, the number in XR3 is used to fetch the parameters $r_c$ and $\mu_c$ of the map whose binary number is $n$. This operation is represented by block 540.

The sign bits of the map parameters, which as hereinbefore indicated define either the map scale or a blank chart, are checked (block 542) to determine what they represent. If both bits are 0's they indicate a blank chart and the program continues to block 533. On the other hand, if the two sign bits are not 0's, their combination represents the map's scale. The content of XR3 register is transferred to a MAPXR cell and the scale of the selected map is determined by analyzing the combination of the two sign bits. This operation is represented by block 544.

Therefrom the Chart routine continues to block 545 to insert a VALID CHART bit in DOWD2 (FIG. 24), and the word is stored. The display unit 12 may be coupled to the computer through the I/O unit in such a way that only when the word DOWD2 is issued with a VALID CHART bit, can a chart change take place. This would prevent the system from actuating the film storage unit, unless a proper or valid chart has been selected. After issuing DOWD2, the AOs sin $X_{co}$ and cos $X_{co}$ are set to 0 and + full scale (+FS), respectively (block 546). These AOs are supplied to the resolver in the X servo unit 177 (FIG. 8) in order to properly position the selected chart so that the center thereof is displayed at center 30 of the display surface 24 (FIG. 3). The chart change flag (CCHF) is set (−) (block 547) to indicate that a chart change is in progress.

Since the Chart routine has to be performed more than once during a minor cycle, it is coded as an enterable subroutine, and is exited or returned back to the main program or routine which entered it. Thus, the exit of the Chart routine in FIG. 27 is diagrammed by block 550, which encloses the word RETURN.

NAVIGATION ROUTINE

As seen in FIG. 25, the Initializer routine 503 exits to the Navigation routine 511 which is in the minor cycle loop. The basic function of the Navigation routine is to compute aircraft position parameters (latitude $\lambda$, and longitude $\mu$), by updating position parameters from aircraft position parameters computed during a preceding minor cycle. The Initializer routine is exited into the Navigation routine, so that when the aircraft becomes airborne, the present aircraft position parameters, stored as $\lambda_{DR}$ and $\mu_{DR}$, will be available in the computer to update the aircraft position as it advances from the Take-off point.

As is appreciated by those familiar with aircraft navigation techniques, various systems and/or techniques are presently known which may be employed to determine an aircraft's position in flight. Thus, the following description of the Navigation routine, incorporated in the present system, should be regarded only as one example of a sequence of computations resulting in the determination of the aircraft position during each minor cycle of the computer's operation.

Figure 28:
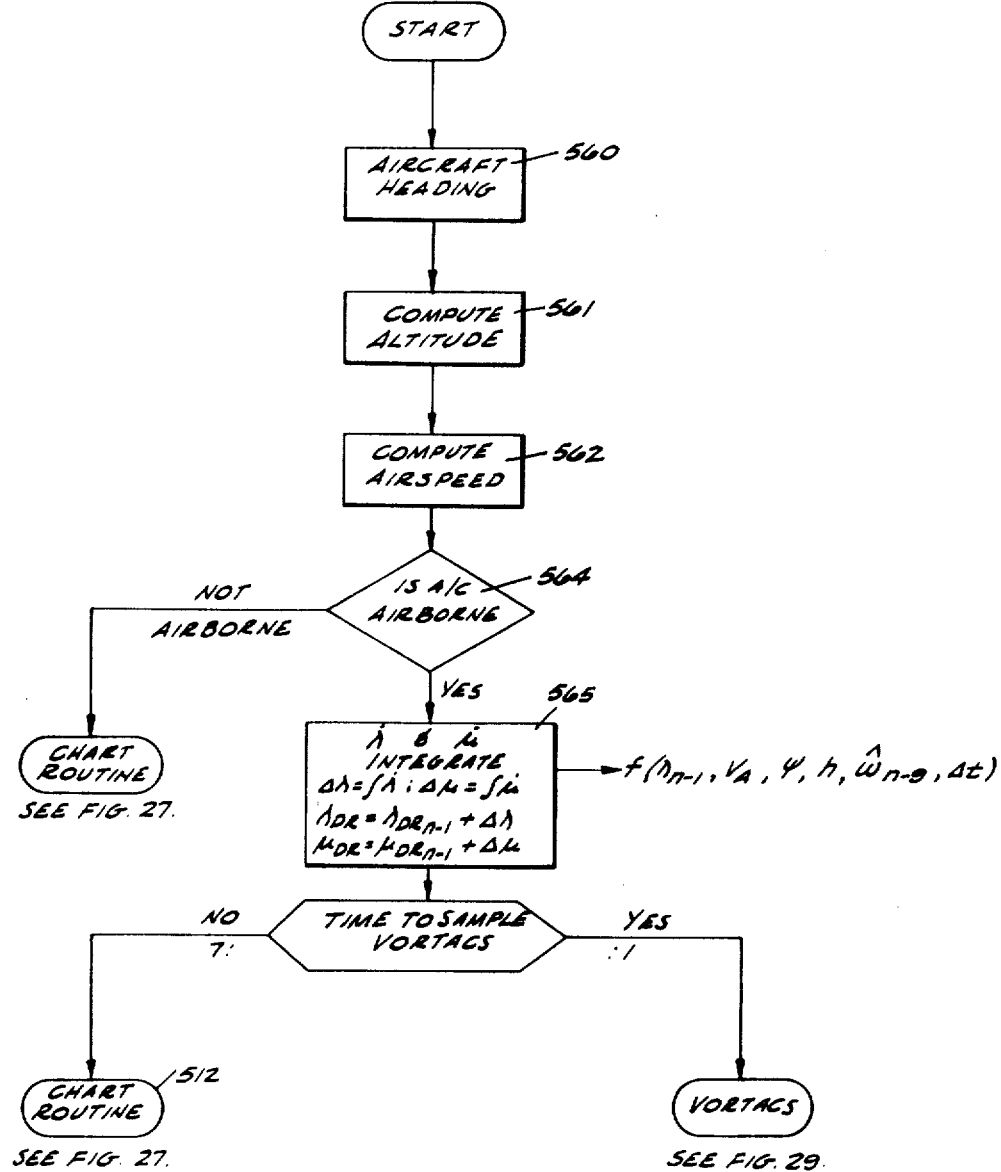
FIGS. 28 and 29 are flow charts of the Navigation routine.
Figure 29:
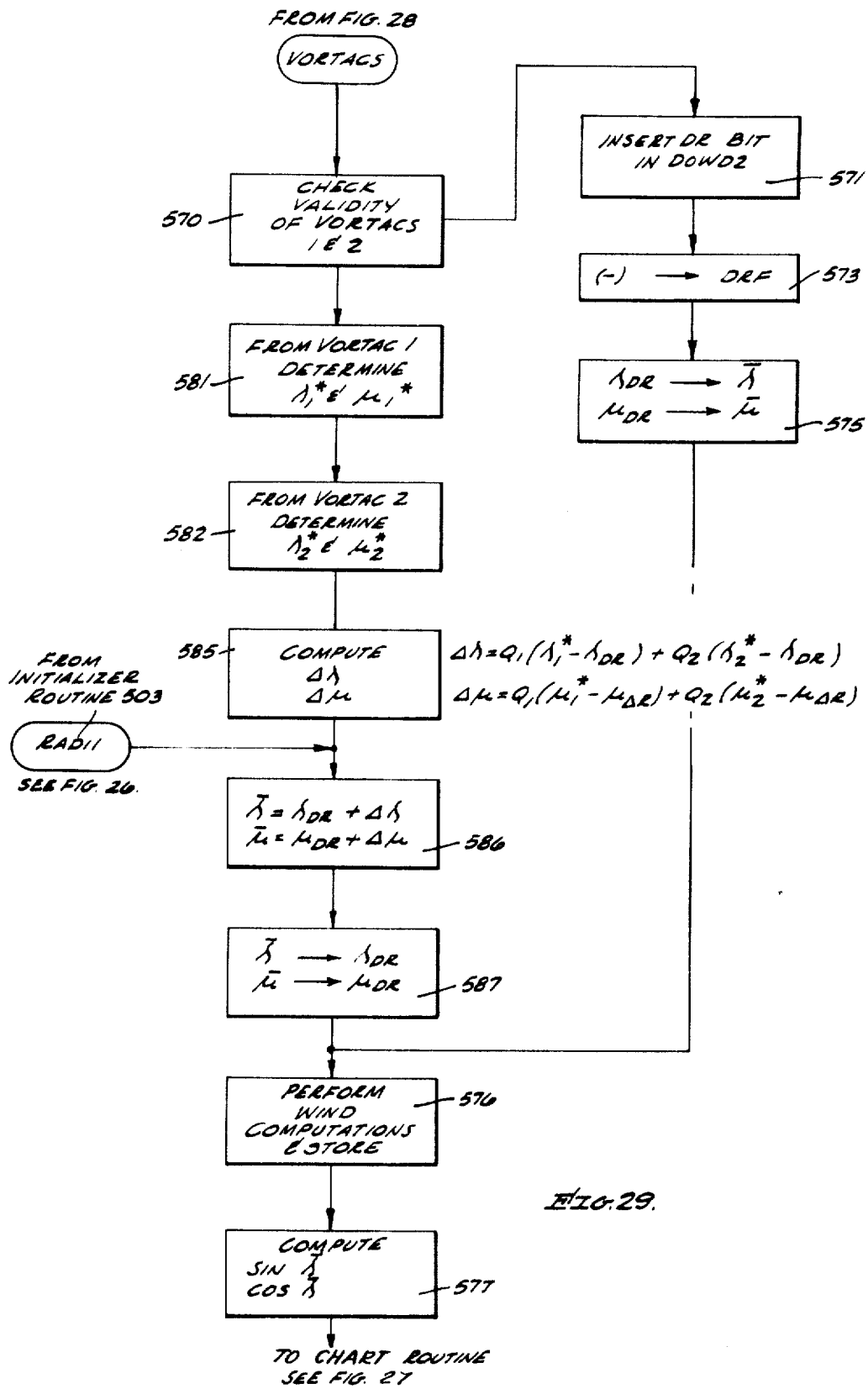

This routine may best be explained by referring to the flow charts on FIGS. 28 and 29. The Navigation routine during each minor cycle computes the aircraft heading sin $\psi$ and cos $\psi$, which are supplied to resolver 377 (SEE FIGS. 18 and 22). Sin $\psi$ equals sin $(\psi_m+\delta)$ and cos $\psi$ equals cos $(\psi_m+\delta)$, where $\psi_m$ are the signals received from the aircraft compass and $\delta$ is the local magnetic variation. This computation is represented in FIG. 28 by block 560. Thereafter, as represented by blocks 561 and 562, the computer utilizes the altitude signals and the true air speed signals received through the I/O unit from the aircraft's air data computer (see FIG. 21) to compute the aircraft's altitude and speed.

Then, a determination is made whether the aircraft is airborne or not, an operation represented by block 564. If the air speed, computed in block 562, is less than a selected air speed threshold level, it indicates that the aircraft is not airborne and the Navigation routine exits to the Chart routine which is the succeeding routine to be performed in the minor cycle. If, however, the aircraft is determined to be airborne, the $\lambda$ and $\mu$ parameters of the aircraft position, computed during the previous minor cycle and stored as $\lambda_{DR}$ and $\mu_{DR}$, are updated. The updating is accomplished by computing the rate of change of the parameters $\lambda$ and $\mu$ and integrating the rates over the minor cycle period. This operation is represented by block 565.

Basically, the new value for parameter $\lambda$, representing the new latitude of the aircraft position, is computed as a function of various factors. These include the aircraft's latitutde during a previous minor cycle, $\psi_{n-1}$, the aircraft's true air speed $V_A$, the aircraft's heading $\psi$, its altitude $h$, the change in the wind, previously estimated by the computer during a previous wind-estimation cycle and stored therein, and as a function of the minor cycle $\Delta t$, which in the present example is approximately one-half second. The new $\mu$ value is also derived by using similar parameters. Thus, at the end of the operation, represented by block 565, new latitude and longitude parameters for the latest aircraft position are available and stored in the computer. It should, however, be pointed out that these new or updated aircraft position parameters are based on computations which so far have not included any of the information or data from the two VORTAC receivers.

As previously stated, once every 8 minor cycles, VORTAC information is utilized in the Navigation routine in order to modify the aircraft position parameters, previously computed by dead reckoning and wind estimates only and to produce smoothed aircraft position parameters. Thus, as seen in FIG. 28, after the computations, represented by block 565, are completed, the Navigation routine proceeds to determine whether the time for sampling the VORTAC has arrived. This is represented by block 567. If the time has not arrived, the Navigation routine is completed and it exits to the next routine, i.e., the Chart routine 512 (FIG. 25). In such a case, the aircraft position parameters $\lambda_{DR}$ and $\mu_{DR}$ computed in block 565 are the ones, later used, to control the operations of the computer in subsequent routines.

On the other hand, if the time for utilizing the VORTAC information has arrived, i.e., it is the eighth minor cycle, the Navigation routine proceeds to check the validity of the signals from the two VORTAC receivers 1 and 2, as represented by block 570 in FIG. 29. The validity of VORTAC information is checked by utilizing the valid discretes in DSCWD1, stored at address 001 (see FIG. 23). If the VORTAC receivers 1 and 2 are found to be invalid, the program continues to block 571, which indicates that the computer inserts the dead reckoning (DR) bit in discrete output word No. 2 (see FIG. 24). Also, as represented by block 573 the dead reckoning flag DRF is set. When the DR bit in DOWD2 is set, the dead reckoning plaque 86 (FIG. 3) is illuminated, thereby indicating to the pilot that the aircraft position is computed by dead reckoning rather than on the basis of smoothed parameters achieved by the utilization of VORTAC information.

The aircraft position parameters $\lambda_{DR}$ and $\mu_{DR}$ are also stored in the smoothed $\overline{\lambda}$ and $\overline{\mu}$ cells. Smoothed aircraft position parameters are represented by $\overline{\lambda}$ and $\overline{\mu}$. This transfer is represented by block 575. Therefrom, the program continues to perform wind computations (block 576) and derive estimated wind parameters, which are stored in the computer. These estimated wind parameters are used during a succeeding minor cycle when the computations, represented by block 565 (FIG. 28), are performed. After the wind is estimated and the parameters stored in the computer, the program continues to compute sin $\overline{\lambda}$ and cos $\overline{\lambda}$. The computation is represented by block 577, the last block of the Navigation routine which exits to the Chart routine 512.

Attention is now directed to block 570 in FIG. 29. If the discretes in DSCWD1 (FIG. 23) at address 001 indicate that the VORTAC receivers 1 and 2 are valid, the Navigation routine continues to determine the latitude $(\lambda_1^*)$ and longitude $(\mu_1^*)$ of the aircraft's present position from the signals from VORTAC receiver 1, as represented by block 581, and the longitude $(\lambda_2^*)$ and latitude $(\mu_2^*)$ of the aircraft position from the signals received from VORTAC receiver 2, an operation represented by block 582. After $\lambda_1^*$, $\mu_1^*$, $\lambda_2^*$ and $\mu_2^*$ are derived, the program continues to block 585 to compute $\Delta\lambda$ and $\Delta\mu$ where, $\Delta\lambda = Q_1 (\lambda_1^* - \lambda_{DR}) + Q_2(\lambda_2^* - \lambda_{DR})$ and $\Delta\mu = Q_1 (\mu_1^* - \mu_{DR}) + Q_2 (\mu_2^* - \mu_{DR})$.

$Q_1$ and $Q_2$ represent filter weights.

After $\Delta\lambda$ and $\Delta\mu$ are computed, smoothed aircraft position parameters $\overline{\lambda}$ and $\overline{\mu}$ are computed (see block 586), where, $\overline{\lambda} = \lambda_{DR} + \Delta\lambda$ and $$\bar{\mu} = \mu_{DR} + \Delta\mu.$$

It should be pointed out that there last two parameters, i.e., $\bar{\lambda}$ and $\bar{\mu}$ represent the smoothed aircraft position parameters. They are a function of dead reckoning computations and wind estimates which produce the terms $\lambda_{DR}$ and $\mu_{DR}$, as well as computations in which signals received from the two VORTAC receivers are used to derive the terms $\Delta\lambda$ and $\Delta\mu$. The updating of the aircraft position parameters by the smoothed VORTAC signals is only accomplished once every 8 minor cycles. During the other seven minor cycles, the updating is done by dead reckoning computations, performed in block 565 which is shown in FIG. 28.

After $\bar{\lambda}$ and $\bar{\mu}$ are computed, these values are inserted in the cells storing $\lambda_{DR}$ and $\mu_{DR}$ thereby replacing the aircraft position parameters, previously computed by dead reckoning with new smoothed parameters. This operation is represented by block 587. Then, the Navigation routine continues to perform the operations represented by blocks 576 and 577, which have been explained hereinbefore.

In one specific implementation of the Navigation routine, the following navigation equations were solved to derive the dead-reckoning parameters $\lambda_{DR}$ and $\mu_{DR}$ and the smoothed aircraft position parameters $\bar{\lambda}$ and $\bar{\mu}$:

$$\bar{\lambda}_n = \lambda_{DR} + Q_1(\lambda_1^* - \lambda_{DR}) + Q_2(\lambda_2^* - \lambda_{DR})$$
$$\bar{\mu}_n = \mu_{DR} + Q_1(\mu_1^* - \mu_{DR}) + Q_2(\mu_2^* - \mu_{DR})$$

$$\lambda_{DR} = \bar{\lambda}_{n-1} + \sum_{i=1}^{k} \dot{\lambda}_i \Delta t$$

$$\mu_{DR} = \bar{\mu}_{n-1} + \sum_{i=1}^{k} \dot{\mu}_i \Delta t$$

$$\dot{\lambda}_i = (V_{A_i} \cos \psi_i + \hat{W}_{N_{n-q}})/R_{\lambda_i}$$
$$\dot{\mu}_i = (V_{A_i} (-\sin \psi_i) + \hat{W}_{W_{n-q}})/R_{\mu_i} \quad (\mu \text{ is } (+) \text{ West}),$$

where, $(\bar{\lambda}, \bar{\mu})$ = Aircraft smoothed position
$(\lambda_{DR}, \mu_{DR})$ = Aircraft dead-reckoned position
$(\lambda_j^*, \mu_j^*)$ = Aircraft measured position from VORTAC receiver $j$
$Q_1, Q_2$ = Filter Weights
$k$ = No. of minor cycles/VORTAC cycle
$\Delta t$ = Minor cycle time (0.524 288 sec.)
$V_{A_i}$ = Aircraft true airspeed at minor cycle $i$
$\psi_i$ = Aircraft true heading at minor cycle $i$ $(W_{N_{n-q}} W_{W_{n-q}})$ = Latest North and West wind estimates (updated every $q$ VORTAC cycles)
$R\lambda_i$ = Latitudinal radius of curvature at minor cycle $i$
= (Earth N-S radius of curvature at $\bar{\lambda}_{n-1}$) +$h_i$
$R\mu_i$ = Longitudinal radius of curvature at minor cycle $i$
= [(Earth E-W radius of curvature at $\bar{\lambda}_{n-1}$)+$h_i$]cos $\bar{\lambda}_{n-1}$.

The filter weights are typically an inverse function of range (since VORTAC measured position error is nearly directly proportional to range) and also a function of whether one or two stations are available. If only one receiver is invalid, its $Q$ is set to 0. If neither VORTAC receiver is giving valid range and bearing, the smoothed position is set equal to the D.R. position and pure dead-reckoning is in effect.

Every $q$th ($q$=4 nominally) VORTAC cycle a new estimate of the wind is computed, provided at least one of the VORTAC measurements is valid in that cycle. The wind estimation equations are:

$$\hat{W}_{N_n} = \hat{W}_{N_{n-q}} + \frac{R_\lambda(\bar{\lambda}_n - \lambda_{W_n})}{\Delta t_W + \tau_2}$$

$$\hat{W}_{W_n} = \hat{W}_{W_{n-q}} + \frac{R\mu(\bar{\mu}_n - \mu_{W_n})}{\Delta t_W + \tau_2}$$

where
$(\hat{W}_{N_n}, \hat{W}_{W_n})$ = New North and West wind estimates respectively,
$\lambda_{W_n}$ = Long term wind D.R. latitude, $$= \bar{\lambda}_{n-q} + \sum_{i=1}^{qk} \dot{\lambda}_i \Delta t,$$

$\mu_{W_n}$ = Long term wind D.R. longitude, $$= \bar{\mu}_{n-q} + \sum_{i=1}^{qk} \dot{\mu}_i \Delta t,$$

$\Delta t_W$ = Wind computing interval (Usually = $4 k \Delta t$), and
$\tau_2$ = Wind smoothing time constant.

Wind is not computed during pure dead-reckoning and the system operates with the last computed wind. After a period of pure dead-reckoning, a new wind is estimated as soon as a valid VORTAC measurement becomes available.

From the routine described so far, it should be appreciated that at the end of the Navigation routine the computer stores $\lambda_{DR}$ and $\mu_{DR}$ which are updated by dead reckoning computations and wind estimates during each minor cycle. Once every eight minor cycles, VORTAC information is utilized to produce smoothed aircraft position parameters $\bar{\lambda}$ and $\bar{\mu}$ which are stored in smoothed parameter cells. It is these smoothed parameters which are used to control the displayed map, so that the point on a displayed map, representing the aircraft position, appears at center 30 of the display surface. After the Navigation routine, the flight program exits to the Chart routine previously explained, and therefrom to the Keyboard routine which will be explained in conjunction with the three FIGS. 30, 31 and 32, in that order.

KEYBOARD ROUTINE

The purpose of the Keyboard routine is to process and acknowledge pilot inputs from the control panel. The routine performs the following functions:

1. Determination of the current state of a DEST I.D. counter (DSTINP), which consists of 4 of the discretes in DSCWD3 (see FIG. 23).
2. Driving the DEST I.D. counter into coincidence with a computer command value (DSTCMD) or accepting pilot commanded destinations via the DEST push button 95, as represented by the discretes in DSCWD3 (see FIG. 23).
3. Processing and acknowledgement of A/C PRES POS, START, DEST and CLEAR pilot entries, indicated by discretes in DSCWD2.
4. Servicing the destination acknowledge discrete as a function of the state of the DEST push button 95.
5. Processing and acknowledgement of pilot requested track offsets, indicated by the states of the OFF SET discretes in DSCWD2.

Figure 30:
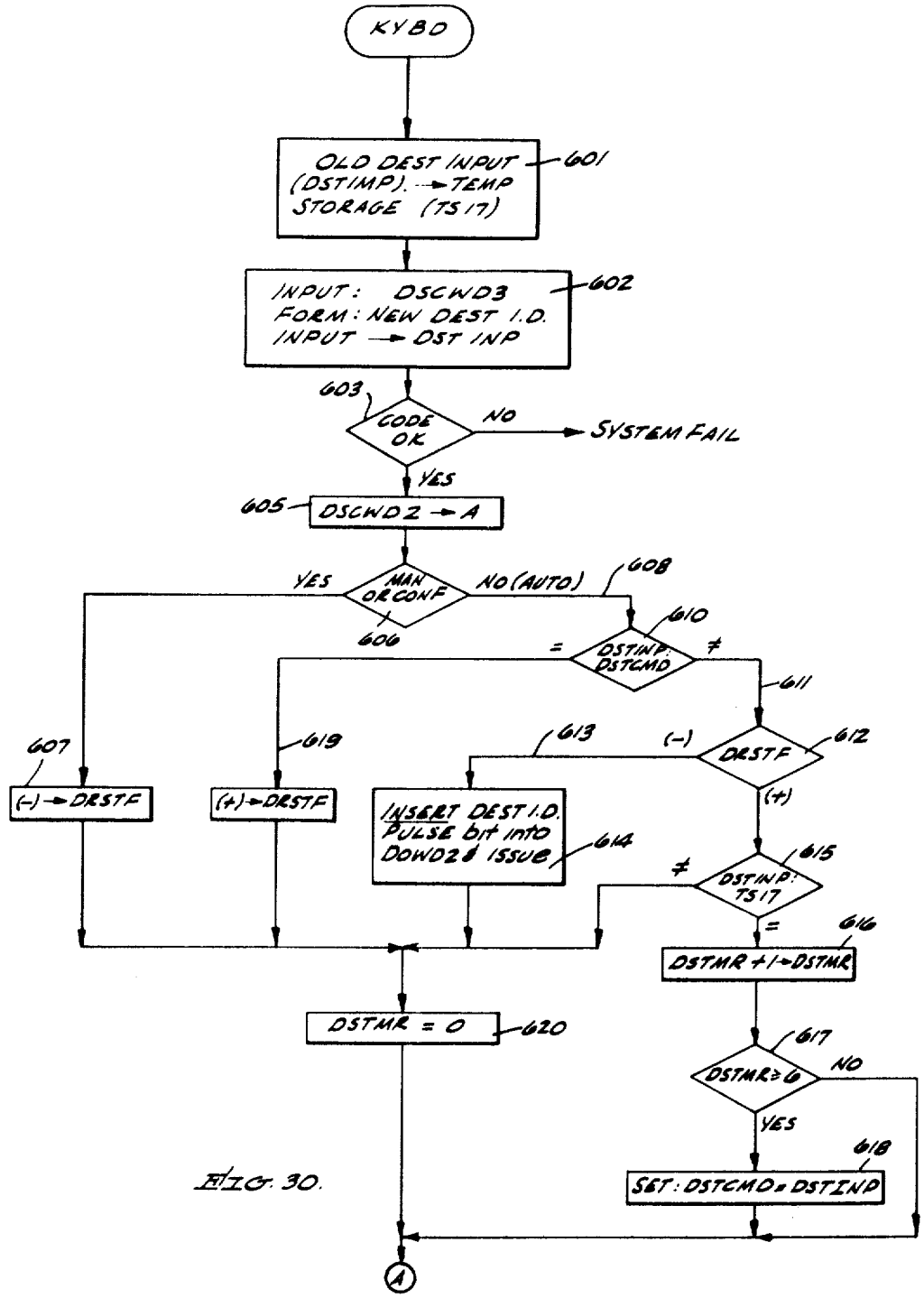
FIGS. 30, 31 and 32 are flow charts of the Key Board routine.

Items (1) and (2) are performed by the routine portion, diagrammed in FIG. 30. The previous (last cycle) destination input is first saved in a temporary storage cell 17 (TS17) for possible later use block 601). The current state of the DEST I.D. counter is obtained from DSCWD3 (block 602). The input is coded to aid in detecting system failures. The code is a "3 times" type, as follows:

| Destination | Counter Code | | | |
|---|---|---|---|---|
| | 4 | 3 | 2 | 1 |
| 0 | 0 | 0 | 0 | 0 |
| 1 | 0 | 0 | 1 | 1 |
| 2 | 0 | 1 | 1 | 0 |
| 3 | 1 | 0 | 0 | 1 |
| 4 | 1 | 1 | 0 | 0 |

All other combinations are invalid and, when detected by the program (in block 603), the system fail branch is entered. The code, if good, is converted to one of the numbers 0–4 and stored as the current DEST I.D. input (DSTINP).

Function (2) is performed next. DSCWD2 is transferred to a register A (block 605) and the word is checked for the presence of either discrete MANUAL or CONFIRM (block 606). In the manual or confirm modes, the DEST push button 95 can be used by the pilot to select a destination number entry or confirm a destination point. In these modes, the program (block 607) sets (−) the destination reset flag (DRSTF) to signify that, on return to the auto mode, the DEST I.D. counter is to be pulsed back to the computer command destination.

In the auto mode (line 608), the routine compares (block 610) the destination input with the destination command. If they do not compare, (line 611) the reset mode flag (DRSTF) is checked (block 612). If it is set (line 613), i.e., the reset mode is in effect, the DEST I.D. counter is pulsed, once per cycle, (block 614) until coincidence between input and command is achieved.

If the pilot wishes to change the current destination command manually, he waits for a steady state condition of the DEST I.D. number in the auto mode, and then advances the DEST I.D. counter to the desired destination number by actuating push button 95. The Keyboard routine detects this change and, after the change has been in effect for 3 seconds (block 617), the routine sets the destination command (DSTCMD) equal to the destination input as depicted in block 618 of the flow chart.

Figure 31:
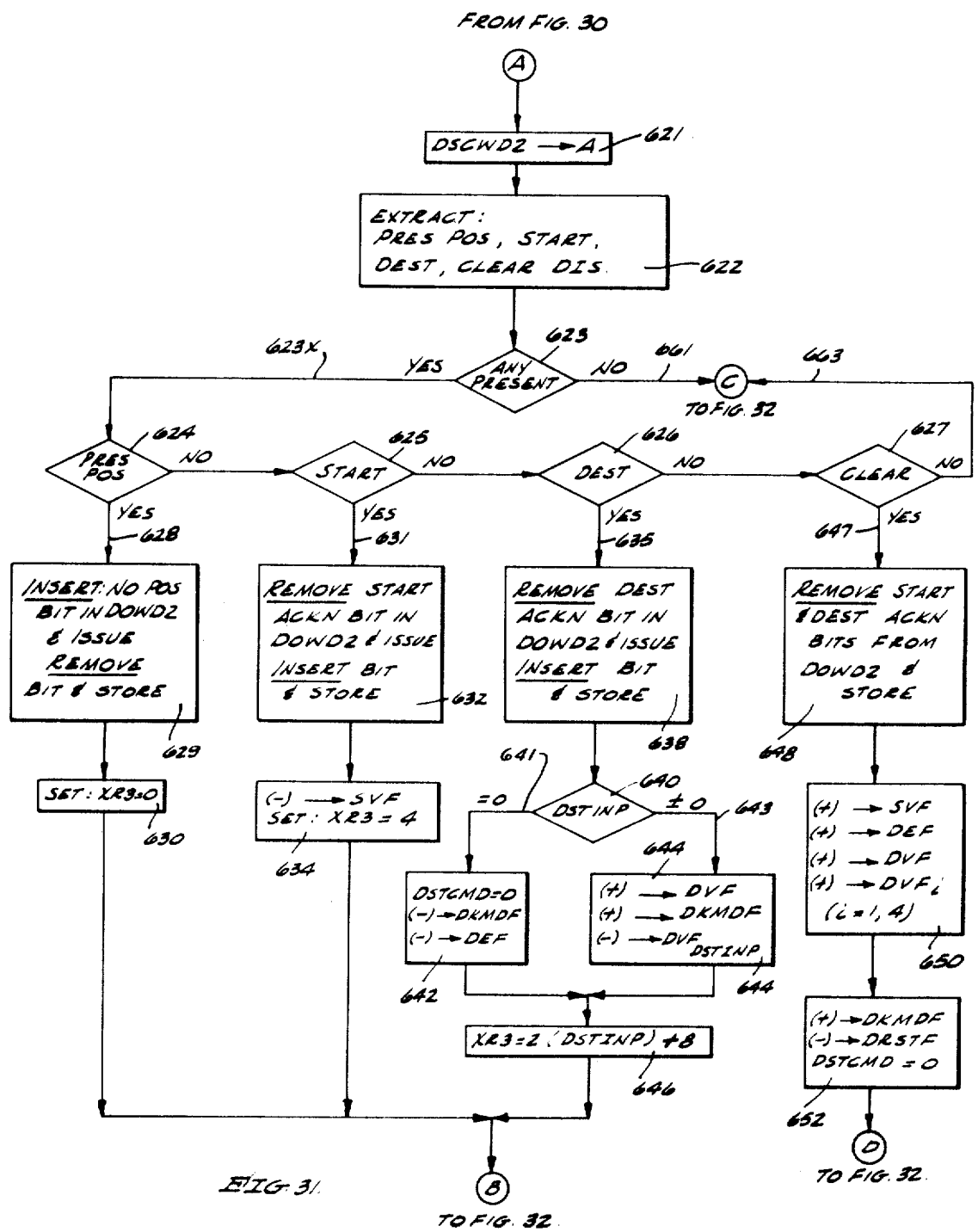
Figure 32:
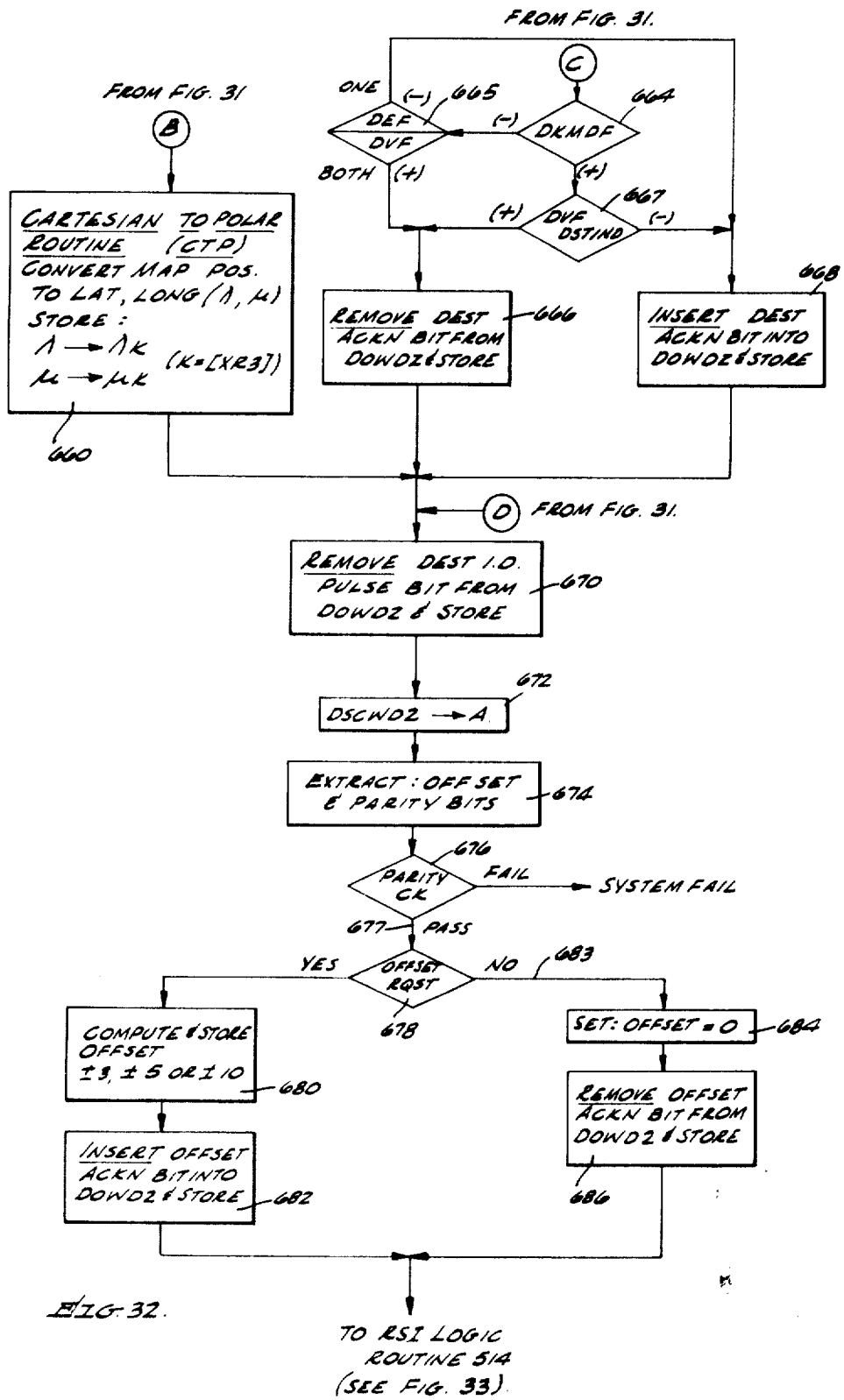

Function (3) is performed by the routine portion, shown in FIG. 31. DSCWD2 previously stored in register A (block 621) is examined for the presence of an A/C PRES POS, START, DEST or a CLEAR discrete. (Blocks 622 through 627.) The corresponding push buttons are interlocked so that only one of these discretes can be present at any given time. If any of these discretes is present (line 623×), an acknowledgement function takes place. The acknowledgement serves a dual purpose; it provides the pilot with a visual indication, via lights 52×, 54× and 78× (FIG. 4) on the push buttons, that his entry has been accepted by the computer, and it electronically resets the input discrete so that it does not appear during the next minor cycle. A/C PRES POS is acknowledged when the NO POSITION plaque 64 (FIG. 3) goes dark. CLEAR is acknowledged by deenergizing lights 52× and 54×.

If a PRES POS condition is indicated, (line 628), the NO POS bit is removed from DOWD2 (see block 629) and the word is stored at address 001 (FIG. 24). Then, register XR3 is set to 0 (block 630). If a start point entry is made (line 631), the START ACKN bit is stored in DOWD2 (block 632). Also, the start valid flag (SVF) is set (block 634), indicating that a valid start point exists in the computer and XR3 is set to 4.

For a destination entry (line 635), the DEST ACKN bit is set in DOWD2 (block 638) and the state of the DEST I.D. counter is examined for a zero or nonzero state (block 640). Entry of a 0 destination (line 641) which occurs when push button 95 is dark sets the dark mode flag (DKMDF), indicating that destinations will be entered as the flight progresses. The destination entered flag (DEF) is also set (−) and the command destination is set to 0. These steps are represented by block 642.

Entry of a nonzero destination (line 643) sets the "light mode" by clearing (+) dark mode flag (DKMDF) in block 644, and thereby indicating that several destinations are preloaded and that multiple destination computations are in effect. The destination valid flag (DVF) for the particular destination number entered (DVF$_{DSTINP}$) is also set. It should be noted that the nature of the last destination entry determines the light or dark mode. The XR3 reg is set to 2 (D-STINP) +8 (in block 646).

For a clear entry, (line 647) the START and DEST ACKN bits are removed from DOWD2 (block 648). This darkens the lights 52× and 54× and thereby acts to acknowledge the CLEAR command. Then, the start valid flag (SVF), the destination entered flag (DEF), and all of the destination valid flags are cleared or reset in block 650. The destination reset flag is set, the destination command flag (DKMDF) is cleared and the destination command counter is set to 0 (block 652) to drive the DEST I.D. push button 95 dark.

For PRES POS, START and DEST entries, the map position under the equivalent latitude and longitude ($\lambda$, $\mu$). Index register 3 (XR3) is set in each of the three branches (see blocks 630, 634 and 646) to store the subsequently computed ($\lambda$ and $\mu$) in the proper cells. For a 0 destination entry, the $\lambda$ and $\mu$ are stored in the "buffered destinations" cells $\lambda_{BD}$ and $\mu_{BD}$, determined by XR3 being equal to 8 (see block 646) since, in the dark mode, a destination may be entered and the old destination remain in effect temporarily. The Cartesian to Polar (CTP) map transformation subroutine is entered (block 660 in FIG. 32) to convert the map Cartesian coordinates to $\lambda$ and $\mu$. The subroutine uses XR3 to route the computed values to the proper cells.

If none of the input discretes discussed above is present (lines 661 and 663 in FIG. 31), the Keyboard routine sets the DEST ACKNOWLEDGE bit in DOWD2 (FIG. 24) as a function of the destination input number and the destination valid flags. This is accomplished by blocks 664–668 in FIG. 32. The DEST ACKN bit controls the illumination of light 54×. Thus, whatever number is shown illuminated on the DEST I.D. push button 95, the light 54× indicates to the pilot whether or not the destination corresponding to that number is valid. In the following block (670) of the program, the DEST I.D. pulse bit in DOWD2 (FIG. 24) is reset (+) in case it had been inserted and set earlier.

In the final section of the routine, pilot-requested track offsets are processed. The offset information comes into the computer on 4 discrete lines in DSCWD2 (FIG. 23), which is first transferred to register A (block 672). From this word, 3 offset bits and 1 parity bit, for a total of 4 bits, are extracted in block 674. The 4 bits are coded as follows:

| Parity | | | | | |
|---|---|---|---|---|---|
| 1 | 0 | 0 | 0 | | No OFFSET |
| 0 | 0 | 0 | 1 | | 3 mi. RGHT |
| 0 | 0 | 1 | 0 | | 5 mi. RGHT |
| 1 | 0 | 1 | 1 | | 10 mi. RGHT |
| 1 | 1 | 0 | 1 | | 3 mi. LEFT |
| 1 | 1 | 1 | 0 | | 5 mi. LEFT |
| 0 | 1 | 1 | 1 | | 10 mi. LEFT |

Parity is checked, in block 676, and if a failure is detected the system fail branch is entered. If the parity check passes (line 677), and an offset is requested, as determined in block 678, the desired offset is computed in block 680 and stored in cell OFFSET for use in future computations. Nonzero offset requests are acknowledged with a set OFFSET ACKN bit in DOWD2 (block 682) which lights either light 104 or 106 on the control panel 22 (see FIG. 4). If an offset is not requested (line 683), the cell OFFSET is set to zero (block 684) and the OFFSET ACKN bit in DOWD2 is reset or cleared (block 686).

RSI LOGIC ROUTINE

Following the Keyboard routine the program progresses to the RSI LOGIC routine 514, whose main functions are to determine when steering should occur, to sequence the destinations, to perform destination warning functions, and to compute and to output the digital quantities which are displayable on the digital display plaque 84 (FIG. 3). This routine may best be described by referring to FIGS. 33–37.

Figure 33:
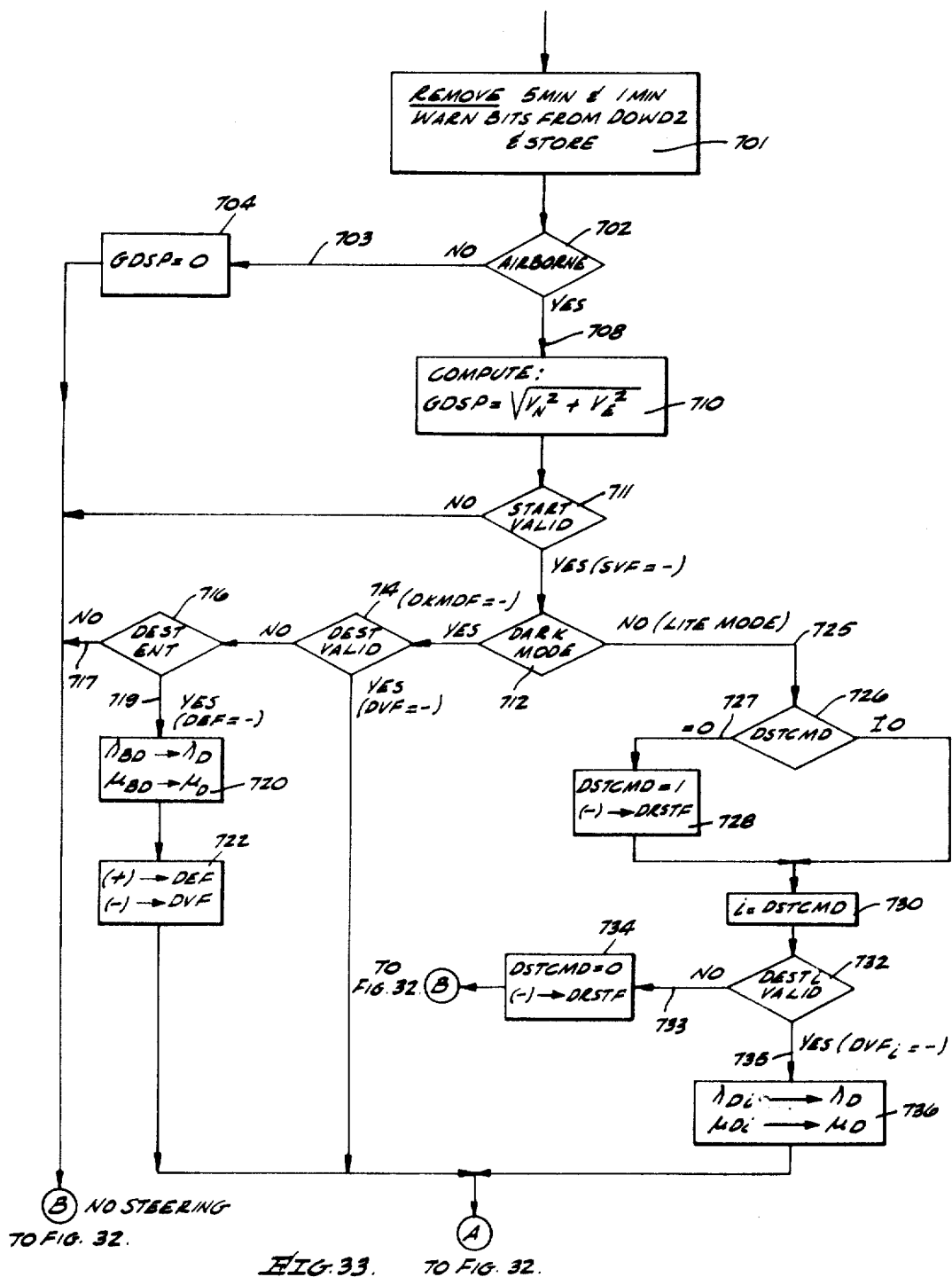

As seen from block 701 in FIG. 33, the first step in the routine is the removal of the 5 MIN WARN and the 1 MIN WARN discretes from DOWD2 (FIG. 24) and the storing of the word in the computer. Then, a check is performed (block 702) to see whether the aircraft is airborne. If it is not (line 703), the ground speed (GDSP) is set to 0 (block 704) and steering will not take place, during the succeeding Steering routine 515. This is achieved by advancing from block 704 through block 705 (FIG. 35) to block 706 in FIG. 36, wherein the steering flag (STEERF) is cleared (+).

Figure 35:
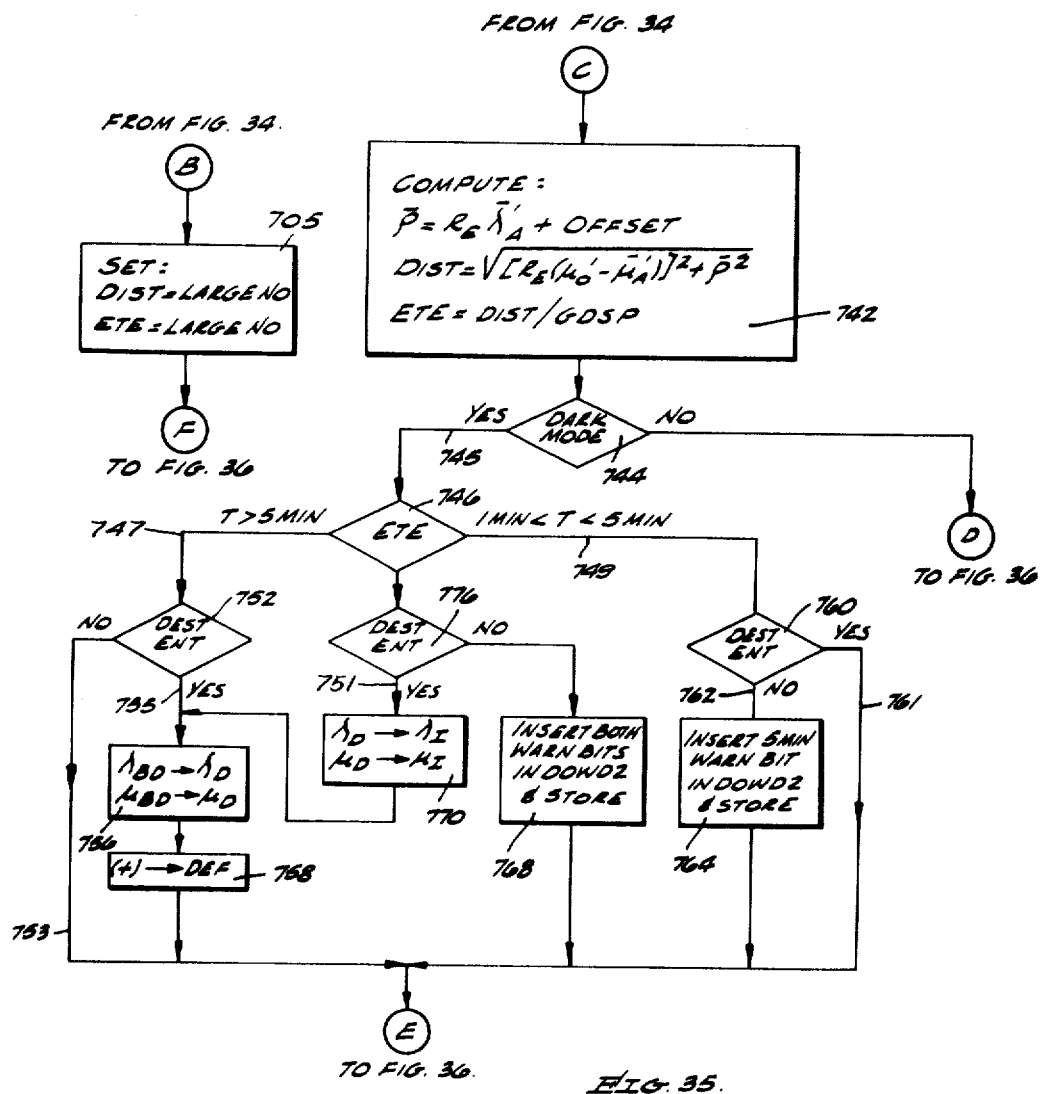

If, however, the aircraft is airborne (line 708 in FIG. 33), the GDSP is computed in block 710 and the state of the start valid flag (SVF) is checked (block 711). If the flag is not valid (+), steering will not be performed. If it is valid (−), the dark mode flag (DKMDF) is checked in 712. If the system is in the dark mode, meaning that the multidestination button 95 (FIG. 4) is not used, and the destination valid flag (DVF) is in a clear state (+) as determined in block 714, a destination entry is looked for (block 716), by checking the state of the destination entry flag (DEF). If a destination has not been entered (line 717) the program progresses to block 705 (FIG. 35).

If, however, a destination is present (line 719), the parameters of the entered destination which during the Keyboard routine were stored as $\lambda_{BD}$ and $\mu_{BD}$ are transferred to cells $\lambda_D$ and $\mu_D$, as shown by block 720. Flags DEF and DVF are cleared or reset (+) and set (−) respectively (block 722), and the routine progresses to block 724 in FIG. 34.

If, however, the system is in the multidestination mode of operation (line 725 in FIG. 33), the destination command (DSTCMD) is checked in block 726. If it is 0 (line 727), which is the case after system turn ON or after CLEAR, the DSTCMD is sequenced to 1 and DRSTF is set (block 730) and the destination, corresponding to the destination command $i$, is checked for validity in block 732. If it is not valid (line 733), DSTCMD is set to 0 and the destination reset flag (DRSTF) is set (block 734). This would cause the multidestination button 95 to be driven dark. If, however, the present commanded destination is valid, i.e., $DVF_i = -$, (line 735), its latitude and longitude $\lambda_{Di}$ and $\mu_{Di}$ are fetched and stored in the destination cells $\lambda_D$ and $\mu_D$ (block 736).

Thereafter, the routine advances to block 724 (FIG. 34) to determine a transformation matrix for a relocated pole coordinate system and to compute the aircraft present position and the destination point in the relocated system. Briefly, in the relocated system, which can be simply explained in conjunction with FIG. 34a, the relocated equator passes through the desired ground track or great circle route between the start and destination points. In FIG. 34a these points are designated by I and D, respectively. Dashed line 740 represents the relocated equator, dashed line 741 represents a relocated prime meridian which passes through I, and point D is arranged to have a positive longitude. Point X represents the relocated pole and point A represents the aircraft position.

Basically, the position parameters of the aircraft ($\overline{\lambda}$ and $\overline{\mu}$), the start point ($\lambda_I$ and $\mu_I$) and the destination point ($\lambda_D$ and $\mu_D$), which are in the computer are operated upon to produce position parameters in the relocated system. the aircraft's new position parameters are $\overline{\lambda}_A'$ and $\overline{\mu}_A'$, the start point parameters are $\lambda_I'$ and $\mu_I'$, and the destination point parameters are $\lambda_D'$ and $\mu_D'$. It should be pointed out that since both points I and D are on a relocated equator, their latitudes are 0 ($\mu_I'$ and $\lambda_D'+ = 0$). Also, since the start point I is on the relocated primary maridian, its longitude $\mu_I' = 0$. Actually the aircraft's relocated latitude $\overline{\lambda}_A'$ is proportional to its off-track distance, and its relocated longitude $\overline{\mu}_A'$ is proportional to its along track distance from I.

In order to proceed with the description of the RSI LOGIC routine, a detailed discussion of the relocated pole system computations is delayed to the end of the description of all the routines shown in FIG. 25. For the present discussion, it is sufficient to assume that after the computations, which are represented by block 724, are performed, the parameters $\overline{\lambda}_A'$, $\overline{\mu}_A'$ and $\mu_D'$ are available.

The routine continues to check whether the aircraft passed the destination point. This is represented by block 732, where $\delta_1$ is a small threshold value. If the aircraft passed the present destination (line 733), and a new track has not been defined (block 734), the present destination becomes invalid, by resetting $DVF_i$ (block 736) and steering stops. Also, the present destination parameters $\lambda_{Di}$ and $\mu_{Di}$ are stored as $\mu_I$ and $\mu_I$ (block 736), since the last destination point is the most likely start point for a new track to be followed. If the aircraft did not pass the destination point and it is not between the start and destination points (I and D), as compared with respect to a small threshold level or pad $\delta_2$ (see block 738) steering stops. If however, it is between I and D (line 739) steering will take place by advancing the routine to block 742 (FIG. 35).

At this point in the routine, the aircraft offset $\overline{p}$ is computed, where $R_E$ represents the Earth's radius and "OFFSET" indicates the pilot select offset, which was processed in the preceding Keyboard routine. Also, the distance to the destination (DIST) and the estimated time en route (ETE) are computed. It should be noted that when steering does not occur DIST and ETE are set to large numbers (block 705), such as 999. If desired, they may be set to an all zero state, i.e., 000.

Figure 36:
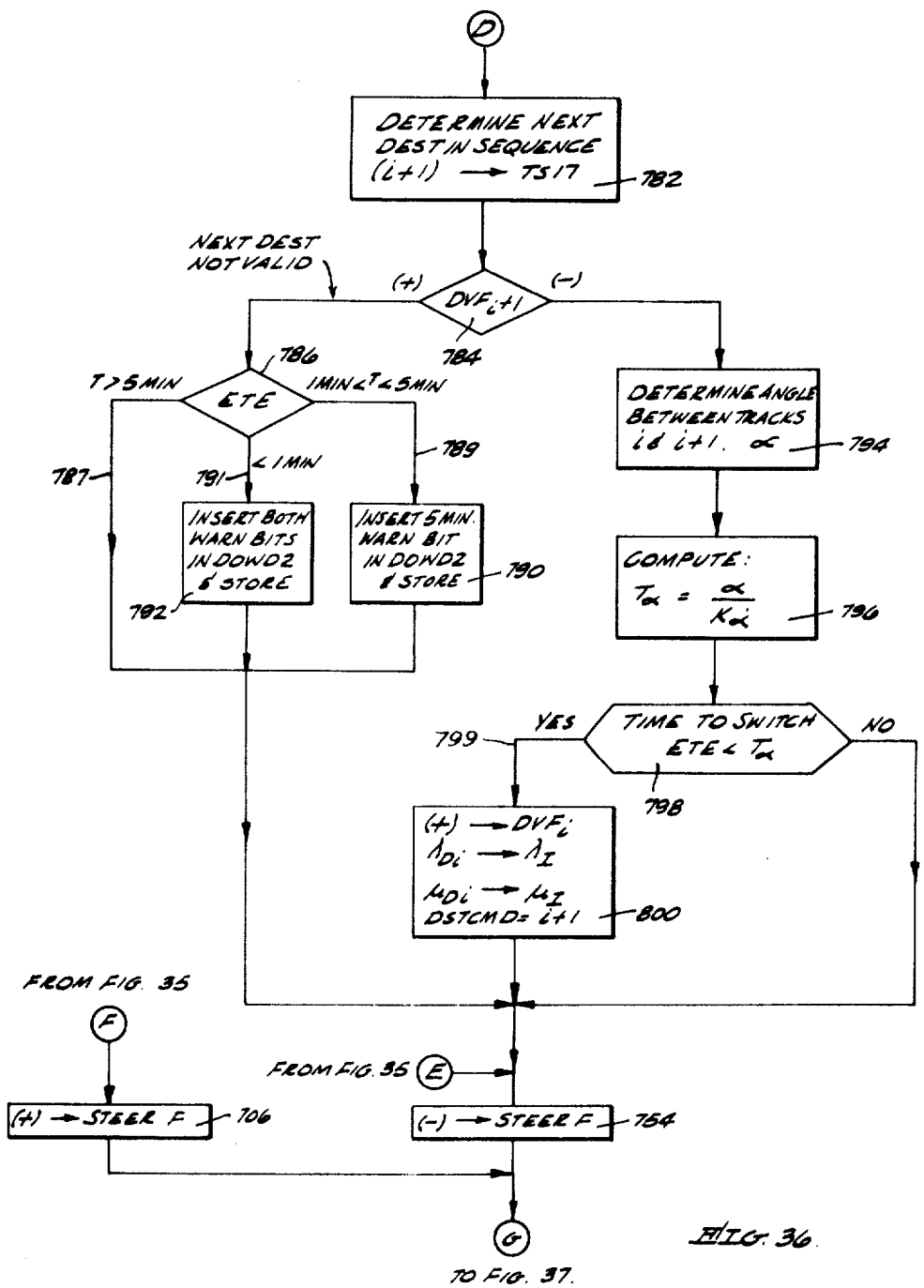
Figure 37:
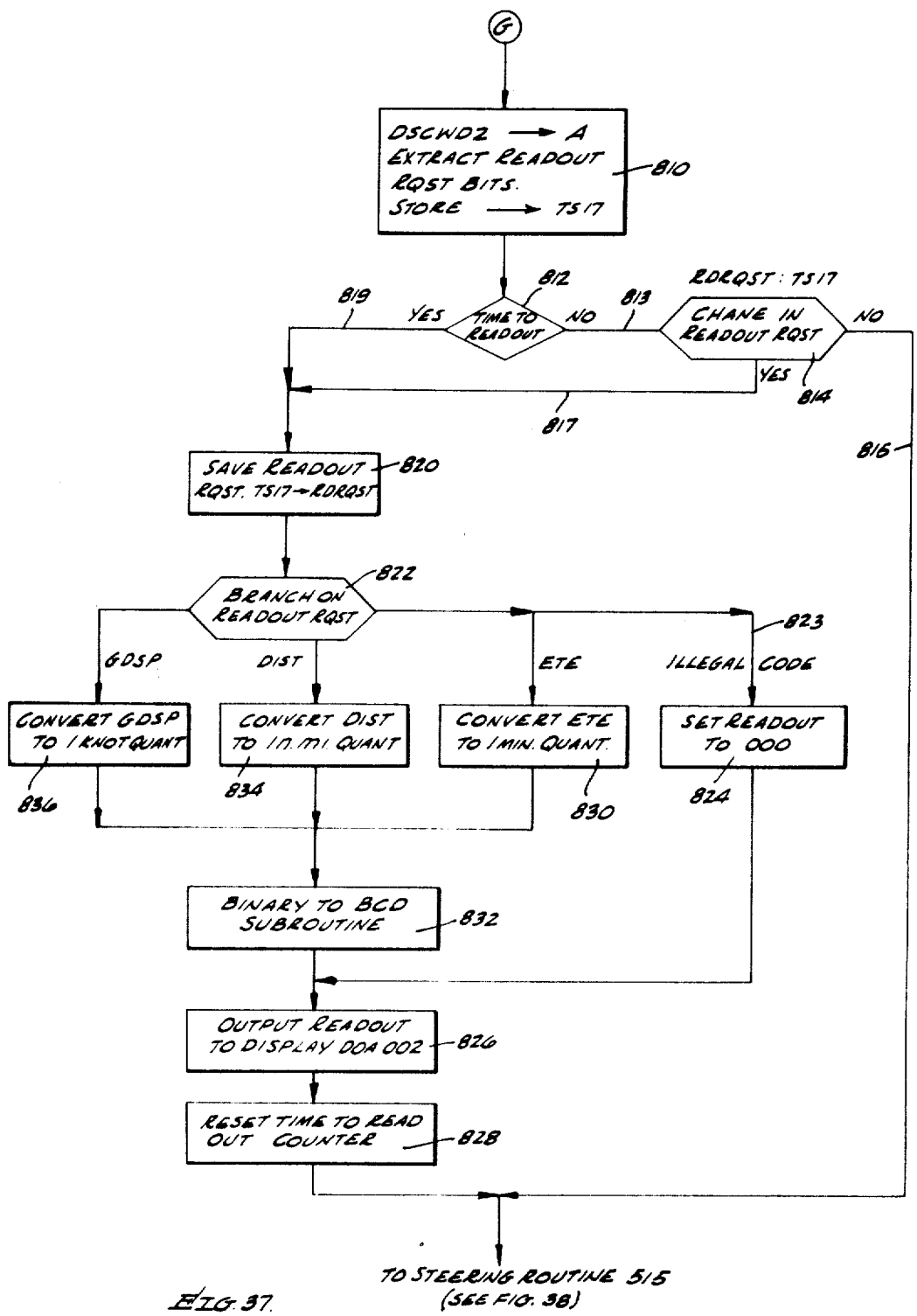

After block 742 the routine checks (block 744) whether the system is in the dark (single destination) mode. If it is (line 745), ETE is used (in block 746) to determine whether ETE is greater than 5 minutes (line 747), between 1 and 5 minutes (line 749) or less than 1 minute (line 751). If ETE is more than 5 minutes, the entering of a new destination is checked (block 752). If it is not entered (line 753), the routine progresses to set the steering flag (STEERF), as shown by block 754 in FIG. 36. If, however, a new destination has been entered (line 755), the parameters of this new destination which are stored as $\lambda_{BD}$ and $\mu_{BD}$ are transferred and stored in cell $\lambda_D$ and $\mu_D$ (block 756) and destination entered flag (DEF) is reset (block 758). If ETE is between 1 and 5 minutes, the entering of a new destination is checked (in block 760) and if the answer is positive (line 761), the program continues to block 754 (FIG. 36). If a new destination has not been entered (line 762) the 5 MIN warning bit is inserted (block 764) in DOWD2 (see FIG. 24), and the word is stored at address 001. As previously stated, when the 5 MIN discrete is present, the warning light 54z (FIG. 4) is illuminated. This indicates to the pilot that ETE is less than 5 minutes and that a new destination is not stored in the computer.

If, however, ETE is less than 1 minute, and a new destination is not entered, (as determined in block 776), the routine continues (to block 768) to insert both the 1 MIN WARN and 5 MIN WARN bits in DOWD2 (see FIG. 24) and the word is stored at 001. If, however, a new destination were entered, the old destination parameters ($\lambda_D$ and $\mu_D$) are transferred (by block 770) to the cells of the start point parameters ($\lambda_I$ and $\mu_I$). Then, the program continues to block 756.

If the system is found to be in the multidestination mode (block 744), the program continues to block 782 which is at the top of FIG. 36. Therein, the next destination in the sequence is determined by storing $i+1$ in TS17. The destination valid flag of $i+1$ ($DVF_{i+1}$) is checked (block 784). If it is clear (+), ETE is checked (block 786) to determine whether it is greater than 5 minutes between 5 and 1 minute or less than 1 minute.

If ETE is greater than 5 minutes (line 787) the routine progresses directly to block 754. If ETE is between 1 and 5 minutes (line 789), the 5 MIN WARN bit is inserted in DOWD2 (FIG. 24) and the word stored at address 001 (see block 790). If, however, ETE is less than 1 minute (line 791), both the 1 and 5 MIN WARN bits are inserted in DOWD2 (see block 792).

Referring again to block 784 in FIG. 36, if $DVF_{i+1}$ is set (−), indicating that destination $i+1$ is valid, the routine advances to block 794 to determine an angle $\alpha$ between the tracks to destination $i$ and to destination $i+1$. The angle $\alpha$ may be thought of as the difference between the bearing of the two tracks. Thereafter, a value $T_\alpha$ is computed in block 796. $T_\alpha = \alpha/K\dot{\alpha}$, where $K\dot{\alpha}$ is the aircraft's turning rate.

As long as $ETE > T_\alpha$ (as determined in block 798), it is not time to switch to the new track. Consequently, the routine continues to block 754. If however $ETE > T_\alpha$ (line 799) the destination valid flag for destination $i$ ($DVF_i$) is cleared (+) and the parameters of the destination point $i$ ($\lambda_{Di}$ and $\mu_{Di}$) are converted and become the parameters of the new start point I (see block 800). Also, the destination command (DSTCMD) is made equal to $i+1$, thereby indicating that the parameters of destination point $i+1$ should be used to compute the new track.

Therefrom, the RSI Logic routine advances to a routine portion (FIG. 37) which controls the display of digital data on the display panel 84. The discrete word No. 2 (DSCWD2) is first transferred to the computer's A register (block 810) and the readout request bits or discretes ETE, DIST and GDSP (see FIG. 23) are stored in TS17. One of these discretes is always set or present. In order to avoid a noisy display, a readout counter is included which limits updating of read out to once every 4 seconds. However, if there is a change in display request (e.g., from ETE to DIST), the request is acted upon within 0.5 seconds.

In block 812, the time to read out is checked. It if is less than 4 seconds from the previous update (line 813), a determination is made (in block 814), whether a change in request occurred. This is done by comparing the latest state of the request bits stored in TS17 with their states during a preceding cycle, which was stored in a readout request scratch pad (RDRQST). If there is no change in request (line 815), the routine exits to the next routine, which is the Steering routine.

If, however, a change in request is sensed (line 817) or the time for updating has arrived (line 819), the latest readout request in TS17 is transferred (in block 820) to RDRQST for use in 814 during a succeeding cycle, and the type of request is analyzed in block 822. If the three bits represent an illegal combination or code (line 823), the bits of the READOUT word (see FIG. 24) are set to all zero (block 824), and the word is output to address 002 (block 826), so that panel 84 (FIG. 3) displays 3 zeros. Also the readout timer is reset (block 828) and the routine exits to the Steering routine.

If an ETE request is detected in block 822, the ETE value is converted to 1 minute quantities (block 830) and then converted to BCD in block 832, which also sets the bits of the READOUT word before advancing to block 826. A DIST request, causes the DIST value in the computer to be converted (in block 834) to 1 nmi quantities, while a GDSP request results in the conversion of the ground speed to 1 knot quantities (block 836).

STEERING ROUTINE

After the read out of the requested digital quantity, the flight program exits to the Steering routine, whose main purpose is to compute a command heading for the aircraft to capture and/or be maintained along the selected ground track. The steering command is in the form of $\psi$ command $\Delta\hat{\psi}=\hat{\psi}-\psi$, where $\hat{\psi}$ is the desired command heading and $\psi$ is aircraft heading. It is based on distance and distance rate off-course. The routine will be explained in conjunction with FIGS. 38 and 39.

Figure 38:
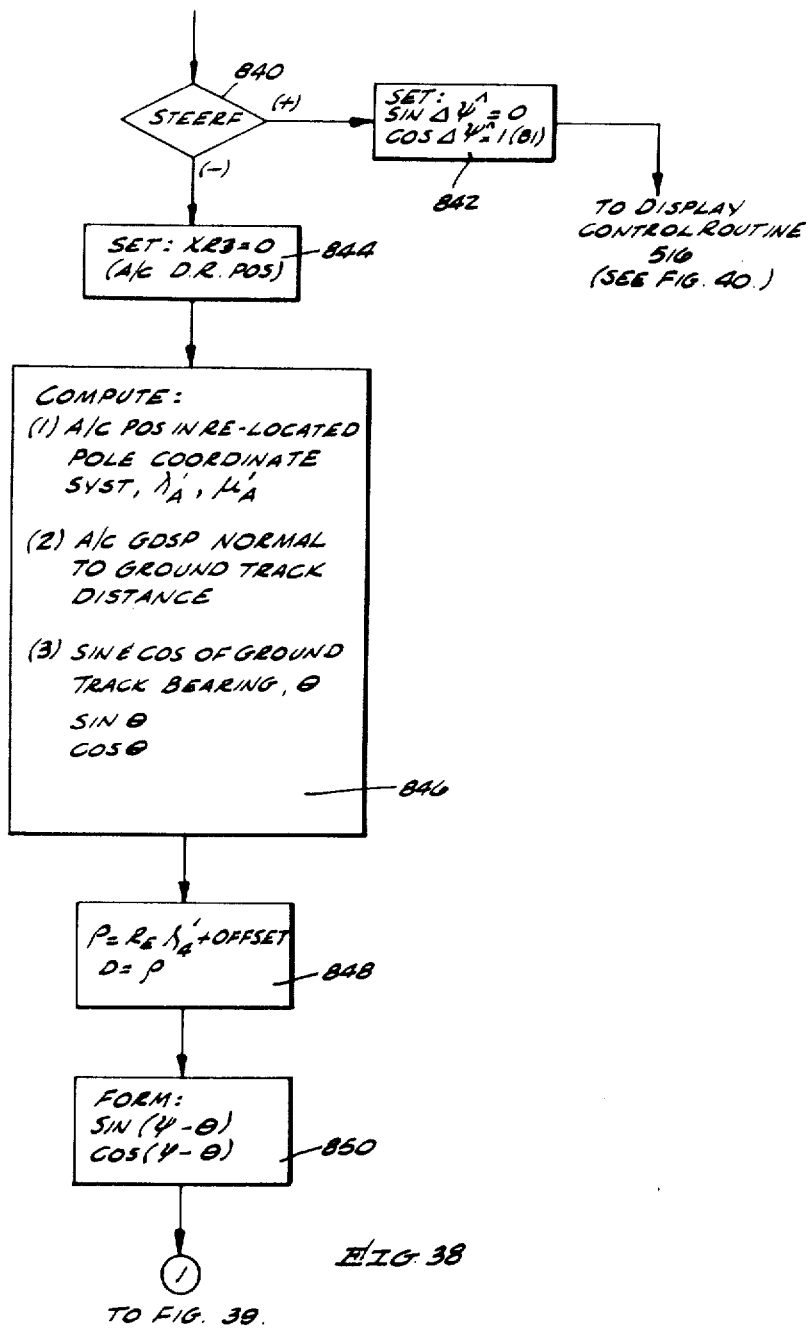
FIGS. 38 and 39 are flow charts of the Steering routine.

As seen from FIG. 38, on entering the routine, the steering flag (STEERF) (set by the RSI Logic routine) is checked (block 840). If it is set (+), indicating that steering commands are not to be generated, $\Delta\hat{\psi}$ is made equal to 180° by setting sin $\Delta\hat{\psi}=0$ and cos $\Delta\hat{\psi}=-1$ (in block 842). This command will drive the command heading marker 68 (FIG. 3) directly opposite the aircraft heading marker 28. This position is represented in FIG. 3 by marker 68X, shown in dashed lines.

If the steering flag is set (−), register XR3 is set to 0 (block 844), to retrieve the aircraft position parameters $\lambda_{DR}$ and $\mu_{DR}$. Then the aircraft position in the relocated pole coordinate system is computed (block 846). In this system, the relocated aircraft latitude $\lambda_A'$ is proportional to its off-track distance $\rho$. The computations are based on A/C D.R. position, which is updated every 0.524 seconds. In addition to aircraft position ($\lambda_A'$ and $\mu_A'$), the ground speed of the aircraft normal to the ground track (D) and the bearing of the ground track ($\theta$) are computed. Since the ground track is a great circle, its bearing is a function of position along it. The bearing will be computed at the relocated longitude of the aircraft.

Thereafter (in block 848), the RSI value $\rho$, which is used to displace the RSI (lines 26) from the aircraft symbol (28) on the display, is computed as the aircraft distance from the primary course, plus any pilot selected offset. A parameter D, used in steering and later limited, is set equal to $\rho$. In the last block 850, of FIG. 38, the sin and cos of the aircraft heading ($\psi$) minus the ground track bearing ($\rho$) are computed to aid in steering decisions.

Figure 39:
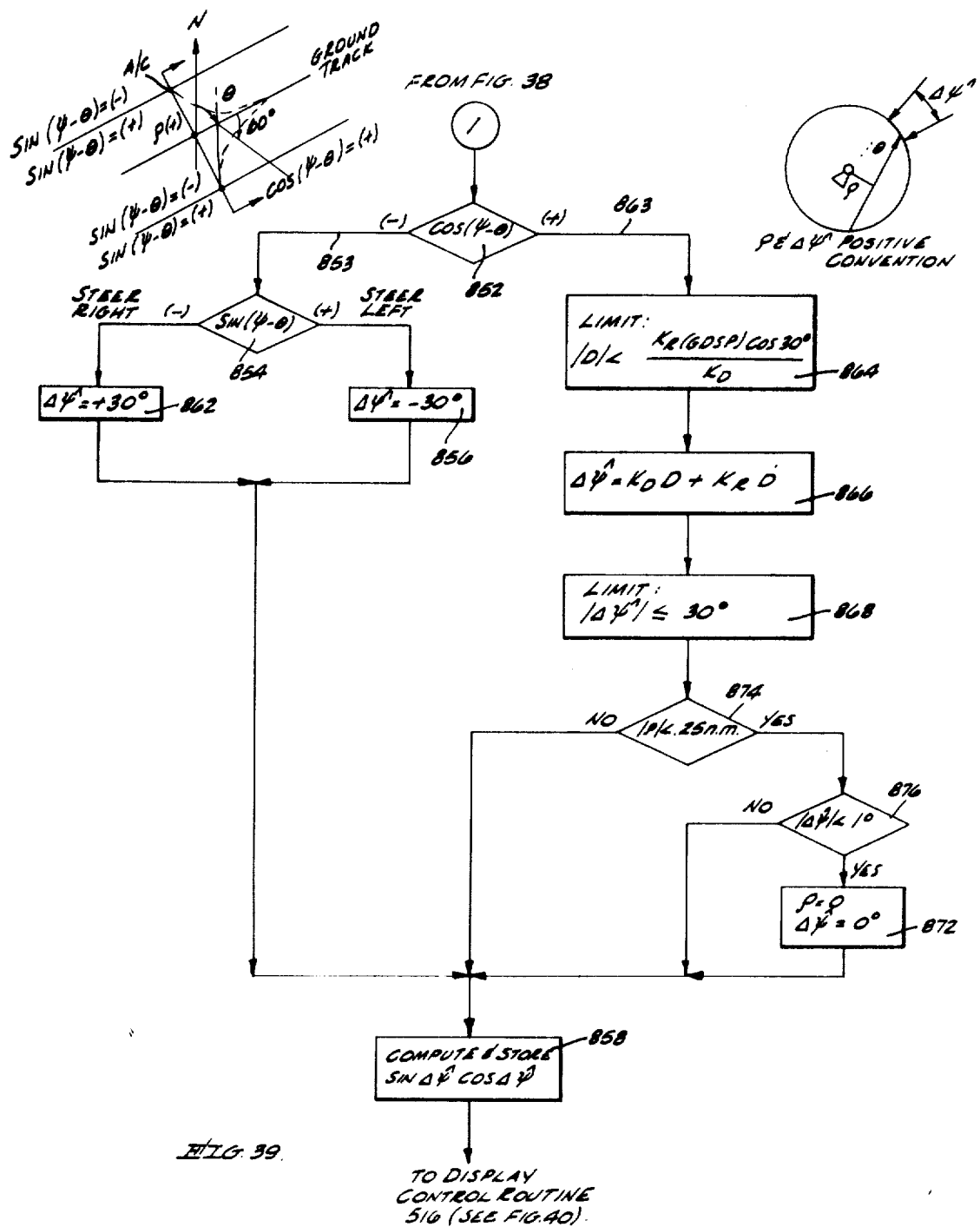

Therefrom the routine continues to block 852 of FIG. 39 in which the sign of cos ($\psi-\theta$) is checked to see if the aircraft is pointed in the general direction of the ground track. If not (line 853), the sign of sin ($\psi-\theta$) is checked in block 854. If it is positive (+), $\Delta\hat{\psi}$ is made equal to −30° (block 856) and the routine advances to compute and store the sin and cos of $\Delta\hat{\psi}$ in block 858. If sin ($\psi-\theta$) is a negative (−), $\Delta\hat{\psi}$ is made equal to +30° in block 862.

If the aircraft has a heading within ±90° of the ground track bearing (line 863), the normal steering computations take place. The steering law is:

$\Delta\hat{\psi} = K_D D + K_R \dot{D}$ where,
$\Delta\hat{\psi} = \hat{\psi} - \psi$ (Delta Command Hdg.)
$D$ = Distance of aircraft off-course
$\dot{D}$ = Aircraft ground speed normal to course
$K_D$ = Position gain
$K_R$ = Rate gain.

At large off-track distances, the position term (if not limited) will dominate, and in certain situations could cause steering signals of the wrong polarity. In addition, when the aircraft is far off-course, it is desirable to steer it to the selected ground track along an intercept track. In the present case, an intercept line making an angle of 60° with the ground track was chosen. For the above reasons, D is limited (in block 864) before being used in the steering computations, in block 866. Now, when the aircraft is pointed to one side of the intercept line, the position term is larger, and when pointing to the opposite side the rate term predominates. Thus, the aircraft will be steered along the intercept line until D falls below its limit and then the steering will flare the aircraft into the selected ground track. The steering command ($\Delta\hat{\psi}$) is also limited (in block 868) to be less than 30°.

Since the signals used for steering and display will be noisy, it may be desirable to set $\rho$ and $\Delta\hat{\psi}$ to 0 if the aircraft is nearly on course and the delta heading command is below a certain limit. This limiting is achieved in block 872 after $\rho$ has been found to be very small, such as less than 0.25 nm; (in block 874) and $\Delta\hat{\psi}$ was found to be less than 1° (in block 876). The final block of the routine is block 858, in which as previously explained, the sin and cos of $\Delta\hat{\psi}$ are computed. The program then exits to the Display Control routine.

DISPLAY CONTROL ROUTINE

The Display Control routine provides program logic and computations to produce sine and cosine signals (see FIG. 22) which are supplied to the various resolvers or servos in the display unit 12. The computations are based on the various variables computed during the navigation and steering routines and input discretes in discrete word No. 2 (FIG. 23). The Display Control routine will be explained in conjunction with FIGS. 40, 41 and 42.

Figure 40:
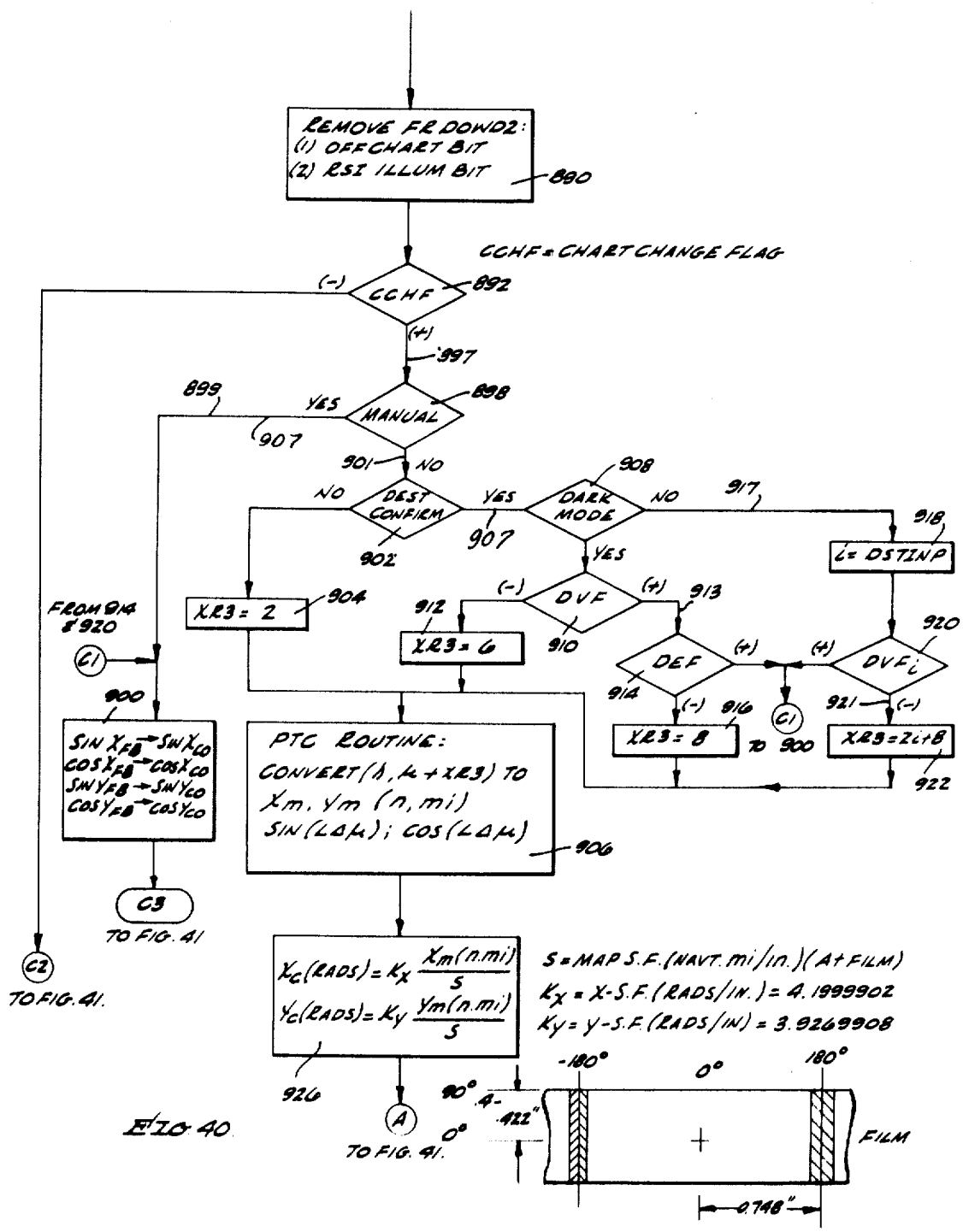
FIGS. 40, 41 and 42 are flow charts of the Display Control routine.

On entering the routine, the OFF CHART and RSI ILLUM bits are removed from DOWD2, an operation represented by block 890 in FIG. 40. These bits will be inserted only in certain program paths of this routine. Next, the state of the chart change flag (CCHF) is checked in block 892. If the flag is set (−), which may have been performed during the Chart routine, it indicates that a chart change is in progress, in which case the map (X and Y) servo commands should be 0°. This accomplished by block 894 in FIG. 41, which is followed by block 896 in which the chart heading command ($\lambda\Delta\mu$) is also set at zero.

If, however, a chart change does not occur (line 897 in FIG. 40), a mode check is performed (in block 898). If the system is in manual(line 899), the X and Y map servo commands are all set to be equal to the map feedback position signals, an operation represented by block 900. This will hold the map at the manual position, if, for example, when the system is turned to the automatic mode, the aircraft's present position happens to be off chart.

If the system is not in manual (line 901 in FIG. 40), and the system is not in a destination confirm condition, which is determined by block 902, the aircraft's present position latitude and longitude must be converted to an equivalent map coordinates $X_m$ and $Y_m$. This is accomplished by setting the register XR3 to 2 (block 904) and thereby retrieving the aircraft's smoothed position parameters $\bar{\lambda}$ and $\bar{\mu}$, which are converted to $X_m$ and $Y_m$ parameters in block 906. In the latter, the sine and cosine for the chart heading command $\lambda\Delta\mu$ are also computed.

If the system is in a destination confirm mode (line 907 in FIG. 40), the program logic is somewhat more involved. If the system is in the dark mode, i.e., a single destination mode (determined in block 908), and the destination valid flag (DVF) is set (block 910), the actual destination parameters determined by XR3=6 (represented by block 912) are transferred to block 906. If, however, the DVF is reset (+) (line 913) and the destination entered flag DEF is set (−), (determined in block 914), the buffered destination (XR3=8, represented by block 916) is transferred to block 906.

If the system is in the multidestination or light mode (line 917), the present state of the destination push button 95, represented by $i$ (block 918) is checked for validity in block 920. If the DVF$_i$ is set (line 921), the parameters of that particular destination retrieved when XR3=2+8 (block 922) are transferred to block 906. If, however, either the destination entered flag or the destination valid flag of the ith destination (blocks 914 and 920) is reset, the display is held at its present position and the program continues to block 900.

The nautical mile values of $X_m$ and $Y_m$ from the routine performed in block 906 have to be converted to equivalent servo command values $X_c$ and $Y_c$ in radians, using known servo scale factors $K_x$ and $K_y$, and the map scale factor S which is stored by the Chart routine. In a particular embodiment, wherein each map is 1.496 inches long in the X direction and 0.844 inches in the Y direction, $K_x$ is equal to 4.1999902 radians per inch and $K_y$ is equal to 3.9269908 radians per inch.

Figure 41:
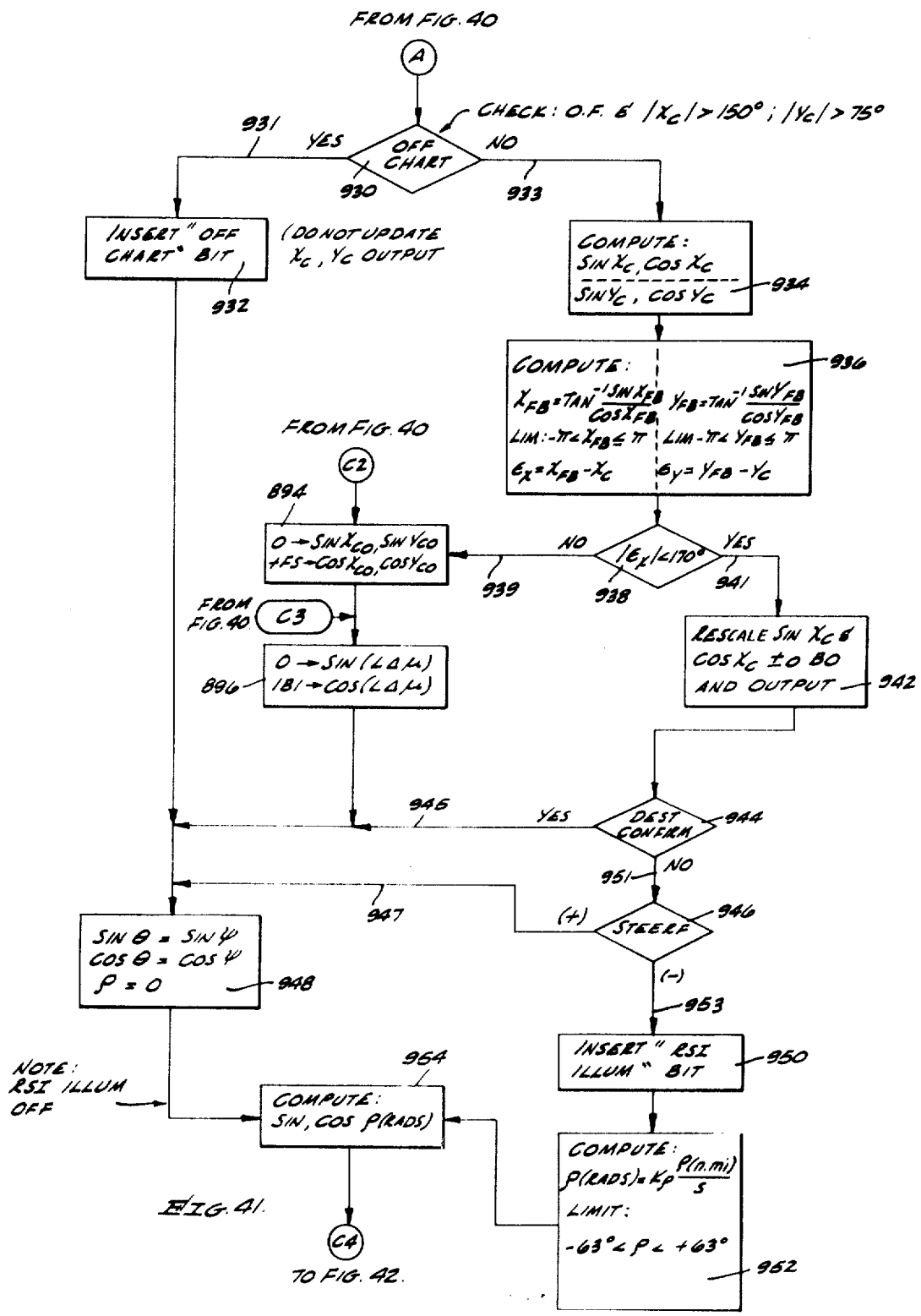

From block 926, the routine advances to check for an off chart condition, this check is represented by block 930 at the top of FIG. 41. For the purposes of this check, Xc is limited to 150° and $Y_c$ is limited to 75°. If either is exceeded (line 931) the OFF CHART bit is inserted into DOWD2 (block 932), and the X and Y map servo commands are not updated. Thus, the chart remains at the fixed position and the OFF CHART plaque 74 (FIG. 3) is lit. However, if an OFF CHART situation does not exist (line 933), the sine and cosine of the map command positions $X_c$ and $Y_c$ are computed in block 934 and stored in temporary storage.

Next, (block 936) the map feedback positions $X_{FB}$ and $Y_{FB}$ (in radians) are computed, using the map feedback resolver sine and cosine inputs to the computer (see addresses 430 through 433 in FIG. 21a). The errors $e_X$ and $e_Y$, between actual and commanded map positions are then formed. If an X error, $e_X$, of 180° or greater were allowed, the map X servo would drive to the next adjacent chart, since the command $X_c$ would have an image point on the chart closer to the actual map position and the servo would take the shortest path possible. To prevent this situation, the X error, $e_X$ is checked (in block 938) against 170° to be conservative. If $e_X$ is greater than 170° (line 939), the map X and Y commands are set to 0 in block 894, until the error is driven below the limit. If, however, the error $e_X$ is less than 170° (line 941) the sine and cosine values of the command position are rescaled and stored in the analog output cells to be supplied to the resolvers in servo units 177 and 179 (see addresses 464 through 467 in FIG. 21b).

The routine continues to check whether the system is in a destination confirm mode, a check performed by block 944. If the system is in a destination confirm mode (line 945) or the steering flag (STEERF) is reset (+) (line 947), the program branches to block 948. This path is taken to inhibit the display of the RSI and is used in other modes as well. In this case, the RSI bearing $\theta$ is set equal to the aircraft heading $\psi$ and the RSI distance $\rho$ is set to 0. Thus, in this situation, the RSI will be under the aircraft symbol 28 (FIG. 3) and pointing in the direction of the aircraft heading. It will not be illuminated however, since the RSI ILLUM bit, which was removed at the beginning of the routine (see block 890 in FIG. 40) is not inserted. Note however, that a valid command heading may exist at this point.

If, however, the system is not in the destination confirm mode (line 951 in FIG. 41) and the steering flag is set (line 953) as determined in block 946, the program continues to block 950, wherein the RSI ILLUM bit is inserted in DOWD2 word (FIG. 24). Also, in the succeeding block 952, the $\rho$ servo command (in radians) is computed from $\rho$(in nautical miles), generated by the preceding Steering routine. Preferably, $\rho$ is limited to be less than +63° and greater than −63°. Finally, the sine and cosine of $\rho$ in radians are computed for the $\rho$ servo (in block 954).

Figure 42:
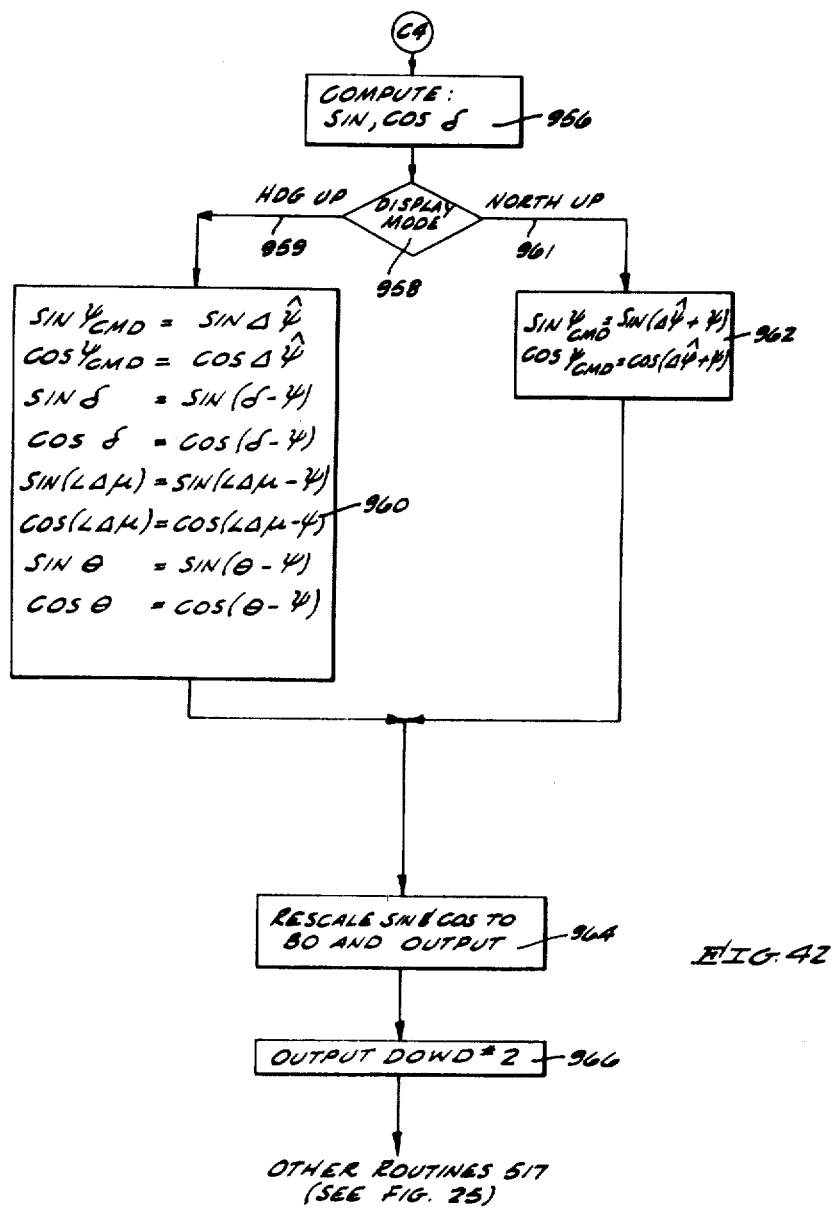

Therefrom, the Display Control routine continues to block 956, at the top of FIG. 42. Therein, the sine and cosine of $\delta$, which is the local magnetic variation, are computed. At this point in the program, the following display quantities exist in the buffer storage area of the computer:

$$\left.\begin{array}{l}\sin\psi\\ \cos\psi\end{array}\right\}\text{(Aircraft True Heading)}$$

$$\left.\begin{array}{l}\sin\Delta\psi\\ \cos\Delta\psi\end{array}\right\}\text{(Heading Cmd, }\psi_{CMD}=\psi+\Delta\hat{\psi}\text{)}$$

$$\left.\begin{array}{l}\sin\delta\\ \cos\delta\end{array}\right\}\text{(Local Mag Var)}$$

$$\left.\begin{array}{l}\sin(L\Delta\mu)\\ \cos(L\Delta\mu)\end{array}\right\}\text{(Chart Heading)}$$

$$\left.\begin{array}{l}\sin\theta\\ \cos\theta\end{array}\right\}\text{(RSI Bearing)}$$

$$\left.\begin{array}{l}\sin\rho\\ \cos\rho\end{array}\right\}\text{(RSI Distance)}$$

These quantities exist in a buffer area rather than the analog output cells (see FIGS. 21 and 22b) because: (a) they are not carried for computation at the proper scaling for output, and (b) some of them will need to be transformed before output. After block 956, the routine continues to check the display mode, i.e., the position of switch 72, shown in FIG. 3. This is accomplished in block 958 by determining the state of the HEADING UP bit in the discrete word No. 2, shown in FIG. 23. If the system is to operate in a heading up mode, i.e., the bit is set (line 959 in FIG. 42), the various displays have to be controlled with respect to the aircraft's heading $\psi$. Thus, $\psi$ is subtracted in block 960 from the magnetic variation $\delta$, the chart heading change $\lambda\Delta\mu$, and the RSI bearing $\theta$. On the other hand, in a NORTH UP mode (line 961) $\psi$ command is made equal to $\Delta\hat{\psi}+\psi$. Therefore, in block 962 sin $\psi$ command is made equal to sin $(\Delta\hat{\psi}+\psi)$ and cos $\psi$ command is made equal to cos $\Delta\hat{\psi}+\psi$. The transformed quantities (sines and cosines) are then stored in the analog output cells in the I/O unit 18 (block 964) and DOWD2 is stored at address 001 (block 966).

From the display Control routine, the flight program continues to perform the other routines, designated in FIG. 25 by block 517, and the Idle routine 518. Routines 517 may include in-flight monitoring routines in which the performance of various system elements may be checked. Since such routines are not pertinent to the understanding of the present invention they will not be described in any detail. The Idle routine at the end of the flight program merely provides idle time at the end of each minor cycle until the interrupt signal is received.

As seen from FIGS. 34 and 38 and the foregoing description, at the points during the routines so far described, a transformation matrix for a relocated pole coordinate system is determined and computed. The computations are represented by blocks 724 and 846 in FIGS. 34 and 38, respectively. The relocated pole coordinate system has been described briefly in conjunction with FIG. 34a.

For a complete description of the transformation matrix attention is now directed to FIGS. 43a through 43e. In these figures the letter and numerical designations are directly related to the following description which for clarity purposes is presented as an analysis under a separate heading.

RELOCATED POLE COORDINATE SYSTEM

For great circle track navigation from point I to point D (see FIG. 43a), it is convenient to establish a relocated pole coordinate system (spherical) whose prime meridian and equator intersect at I. This system is oriented so that point D lies on the relocated equator with a positive relocated longitude, $\mu'_D$. Note that if the ground track is to the right of a point when facing D, that point will have a positive relocated latitude, $\lambda'$. The advantage of the relocated system is that the relocated latitude of the aircraft is proportional to its off track distance and its relocated longitude is proportional to its distance from I.

Let the 0 cartesian system ($X_o$, $Y_o$, $Z_o$) be as shown. A point, P, on the earth's surface may be defined in terms of its latitude and longitude ($\lambda_P$, $\mu_P$), or in terms of a unit VECTOR $\bar{r}_P$, in the direction of a line from the center of the earth to P. Thus, (1) $$\bar{r}_P = X_P^{(o)}\bar{X}_o + Y_P^{(o)}\bar{Y}_o + Z_P^{(o)}\bar{Z}_o$$

thus,

2.
$X_P^{(o)} = \sin \lambda_P$
$Y_P^{(o)} = \cos \lambda_P \sin \mu_P$
$Z_P^{(o)} = \cos \lambda_P \cos \mu_P$.

Consider the following sequence of rotations:

I. About $-X_o$ through $\mu_I$ (see FIG. 43b), $$\begin{bmatrix} X_1 \\ Y_1 \\ Z_1 \end{bmatrix} = \begin{bmatrix} 1 & 0 & 0 \\ 0 & C\mu_I & -S\mu_I \\ 0 & S\mu_I & C\mu_I \end{bmatrix} \begin{bmatrix} X_o \\ Y_o \\ Z_o \end{bmatrix} = [\mu_I] \begin{bmatrix} X_o \\ Y_o \\ Z_o \end{bmatrix}$$

II. About $+Y_1$ through $\lambda_I$ (see FIG. 43c), $$\begin{bmatrix} X_2 \\ Y_2 \\ Z_2 \end{bmatrix} = \begin{bmatrix} C\lambda_I & 0 & -S\lambda_I \\ 0 & 1 & 0 \\ S\lambda_I & 0 & C\lambda_I \end{bmatrix} \begin{bmatrix} X_1 \\ Y_1 \\ Z_1 \end{bmatrix} = [\lambda_I] \begin{bmatrix} X_1 \\ Y_1 \\ Z_1 \end{bmatrix}$$

$$= [\lambda_I][\mu_I] \begin{bmatrix} X_o \\ Y_o \\ Z_o \end{bmatrix} = [C'] \begin{bmatrix} X_o \\ Y_o \\ Z_o \end{bmatrix}$$

III. Finally, clockwise (about $-Z_2$) through $_I$ such that $X_3$ lies in the plane formed by I, D and the earth's center. It should be noted that now, $Y_3$ points to the relocated pole. (See FIG. 43d.)

$$\begin{bmatrix} X_3 \\ Y_3 \\ Z_3 \end{bmatrix} = \begin{bmatrix} C\theta_I & -S\theta_I & 0 \\ S\theta_I & C\theta_I & 0 \\ 0 & 0 & 1 \end{bmatrix} \begin{bmatrix} X_2 \\ Y_2 \\ Z_2 \end{bmatrix}$$

Note that $\theta_I$ is the ground track bearing angle at point I. The transformation from the 0 system to the 3 system may now be expressed by the following matrix equation:

(3)
$$\begin{bmatrix} X_3 \\ Y_3 \\ Z_3 \end{bmatrix} = \begin{bmatrix} C\theta_I & -S\theta_I & 0 \\ S\theta_I & C\theta_I & 0 \\ 0 & 0 & 1 \end{bmatrix} [\lambda_I][\mu_I] \begin{bmatrix} X_o \\ Y_o \\ Z_o \end{bmatrix} = [C] \begin{bmatrix} X_o \\ Y_o \\ Z_o \end{bmatrix}$$

It remains to determine $[\theta_I]$. The position of D in the 3 system is:

$X_D^{(3)} = X_D^{(2)} \cos \theta_I - Y_D^{(2)} \sin \theta_I$
$Y_D^{(3)} = X_D^{(2)} \sin \theta_I + Y_D^{(2)} \cos \theta_I$
$Z_D^{(3)} = Z_D^{(3)}$ where $X_D^{(2)}$, $Y_D^{(2)}$, $Z_D^{(2)}$ are obtained by application of (2) and $[\lambda_I][\mu_I]$ to $(\lambda_D, \mu_D)$.

Now, $Y_D^{(3)} = 0$ and $X_D^{(3)} = \sqrt{1-[Z_D^{(3)}]^2} = \sqrt{1-[Z_D^{(2)}]^2}$, where the plus root is taken since the final rotation is made, such that D will have a positive $X_3$. (See FIG. 43e)
From the above we obtain:

(4)
$$\sin \theta_I = \frac{-Y_D^{(2)}}{\sqrt{1-[Z_D^{(2)}]^2}}$$

$$\cos \theta_I = \frac{X_D^{(2)}}{\sqrt{1-[Z_D^{(2)}]^2}}$$

With $\sin \theta_I$ and $\cos \theta_I$ determined, the matrix $[C]$ can be computed. The relocated longitude of $D$ is given by:

(5)
$$\mu_D' = \tan^{-1} \frac{\sqrt{1-[Z_D^{(2)}]^2}}{Z_D^{(2)}}$$

The relocated latitude and longitude of the aircraft ($\lambda_A'$, $\mu_A'$) can now be obtained by the following sequence of computations:

$X_A^{(o)} = \sin \lambda_A$
$Y_A^{(o)} = \cos \lambda_A \sin \mu_A$  ($\lambda_A, \mu_A) = (\lambda_{DR}, \mu_{DR})$ or $(\bar{\lambda}, \bar{\mu})$
$Z_A^{(o)} = \cos \lambda_A \cos \mu_A$ $$\begin{bmatrix} X_A \\ Y_A \\ Z_A \end{bmatrix}_3 = [C] \begin{bmatrix} X_A \\ Y_A \\ Z_A \end{bmatrix}_o$$

$\sin \lambda_A' = Y_A^{(3)} = \lambda_A'$

6.
$\mu_A' = \tan^{-1}(X_A^{(3)}, Z_A^{(3)})$

Furthermore:

$P = R_E \lambda_A'$

7.
$\text{DIST} = R_E (\mu_D' - \mu_A')$.

To find the aircraft ground speed normal to the ground track, first resolve the components, $V_N$ and $V_W$ into the 0 system.

$V_X^{(o)} = V_N \cos \mu_A$

8.
$V_Y^{(o)} = -V_N \sin \lambda_A \sin \mu_A - V_W \cos \mu_A$
$V_Z^{(o)} = -V_N \sin \lambda_A \cos \mu_A + V_W \sin \mu_A$, 9.
$\dot{D} = V_Y^{(3)} = C_{21} V_X^{(o)} + C_{22} V_Y^{(o)} + C_{23} V_Z^{(o)}$.

Figure 44:
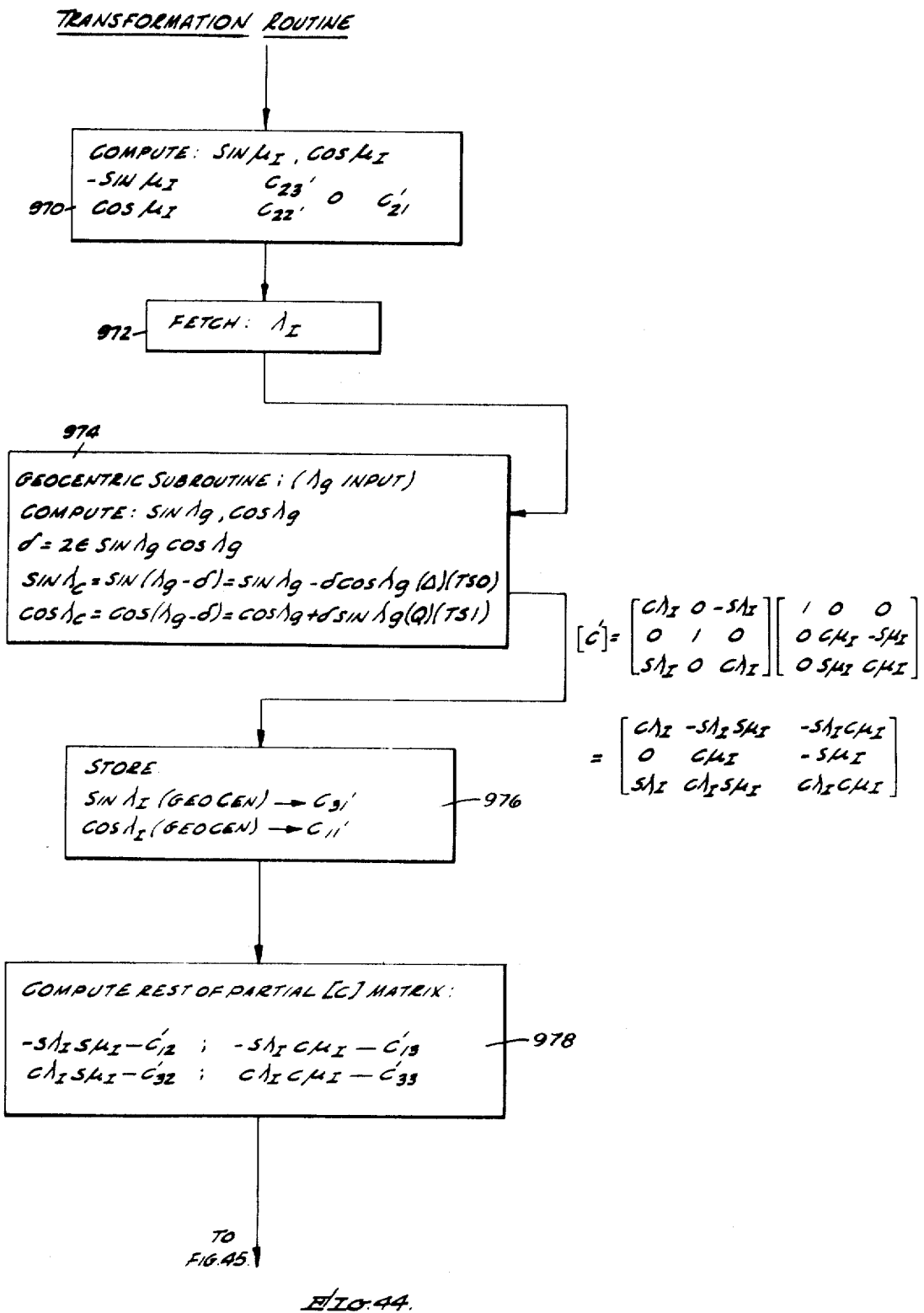
FIGS. 44 and 45 are flow charts of the Transformation Matrix routine.
Figure 45:
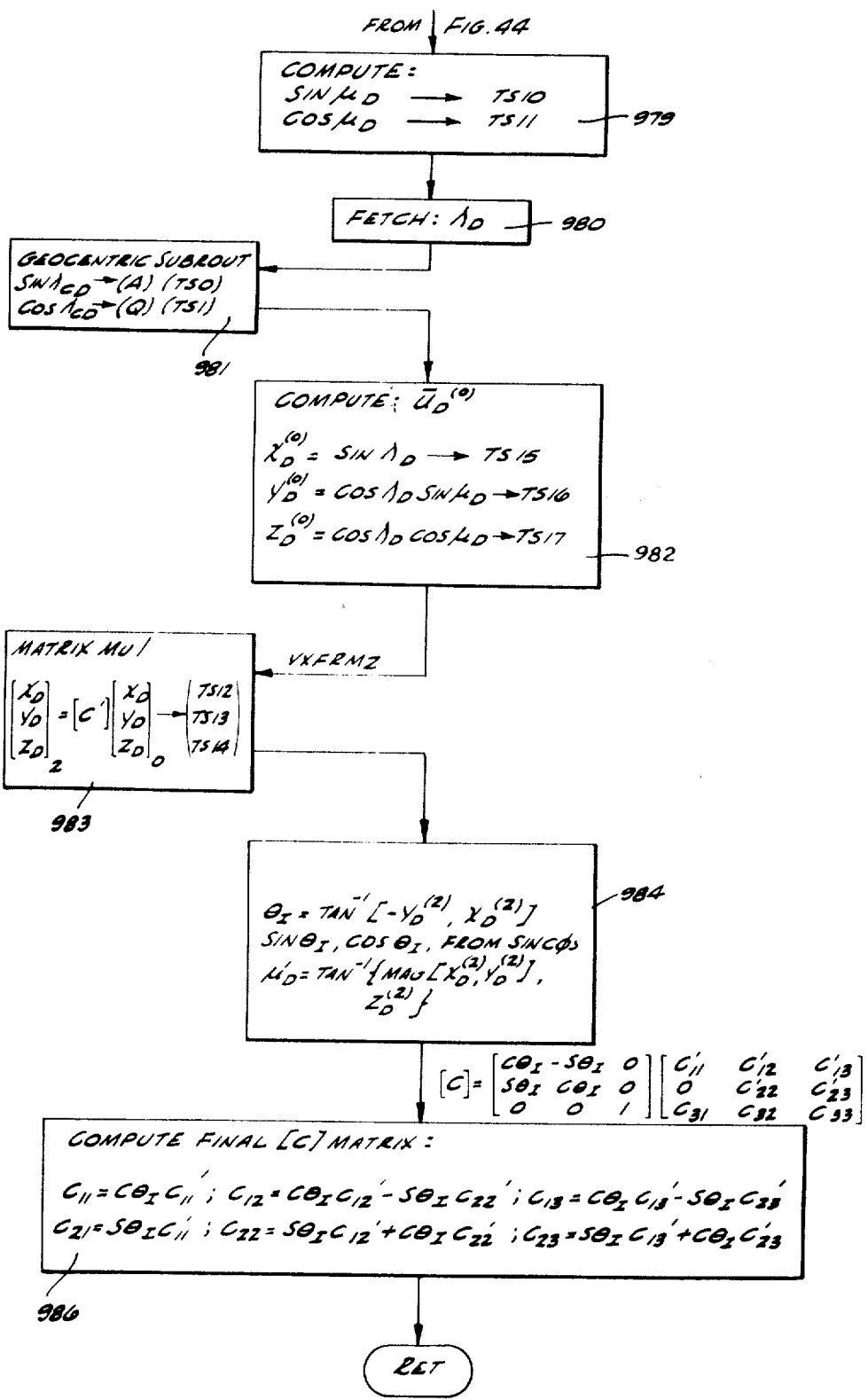
Figure 46:
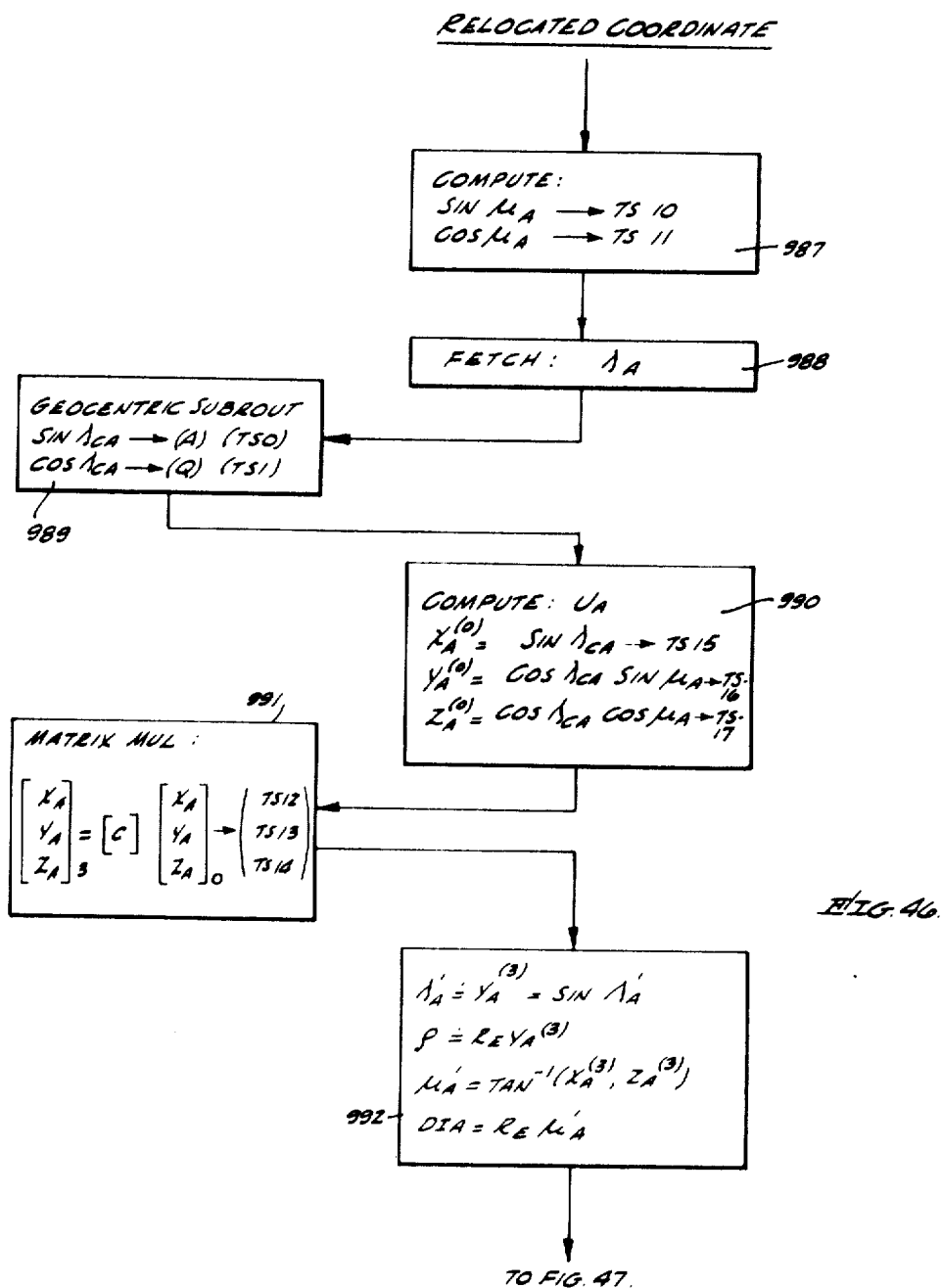
FIGS. 46 and 47 are flow charts of the Relocation routine.

The sequence of computations necessary to perform the transformation matrix as herebefore outlined are best explained and diagrammed in conjunction with the flow diagrams shown as FIGS. 44 through 47 and 47a, 47b and 47c. Therein, FIG. 44 represents the flow diagram for computing the partial matrix $[C']$ where $[C'] = [\mu_I][\lambda_I]$ and FIG. 45 represents the flow diagram which uses the partial matrix $[C']$ and $\lambda_D$ to compute the final matrix $[C]$. On the other hand FIG. 46 represents the flow diagram to determine $\rho$ which is the aircraft off-coarse error and $\theta$ which is the aircraft heading in the new relocated coordinate system. In these FIGS. $C_{11}$, $C_{12}$, $C_{13}$, $C_{21}$, $C_{22}$, $C_{23}$, $C_{31}$, $C_{32}$ and $C_{33}$ represent cells in a scratch-pad type memory and TS 0 through TS 17 represent storage cells.

As seen from FIG. 44 the Transformation routine begins with computing the sin and cos of $\mu_I$ in block 970. Then $\lambda_I$ is fetched (block 972) and a geocentric subroutine, represented by block 974, is entered to compute the sin and cos of the geocentric latitude of the start point I. Therein $\delta$ represents the difference between the geographic and geocentric latitudes of a point and $\epsilon$ represents the elepticity of the Earth. The sin $\lambda_I$ (Geocen.) and cos $\lambda_I$ (Geocen.) are then stored (block 976) and the partial matrix $[C']$ is computed (block 978).

Next in the routine (see FIG. 45) sin $\mu_D$ and cos $\mu_D$ are computed (block 979) and the destination point latitude $\lambda_D$ is fetched (block 980). The destination point geocentric latitude is computed in the geocentric subroutine, represented again by block 981 and, thereafter, $\mu_D$ is computed (block 982) as $X_D{}^{(o)}$, $Y_D{}^{(o)}$ and $Z_D{}^{(o)}$. Then, the matrix $$\begin{bmatrix} X_D \\ Y_D \\ Z_D \end{bmatrix}_o$$

is computed in block 983.

Thereafter, the routine continues to compute sin $\theta_I$ and cos $\theta_I$ and the relocated longitude of the destination point $\mu_D{}'$ (see block 984). The last term is used in block 985 to compute the distance along the route I to D as DID $=R_E\mu'_D$, where $R_E$ is the radius of the Earth. The final transformation matrix [C] is computed in block 986. The various terms are stored in the various scratch pad cells as shown in block 986 in FIG. 45.

Figure 47:
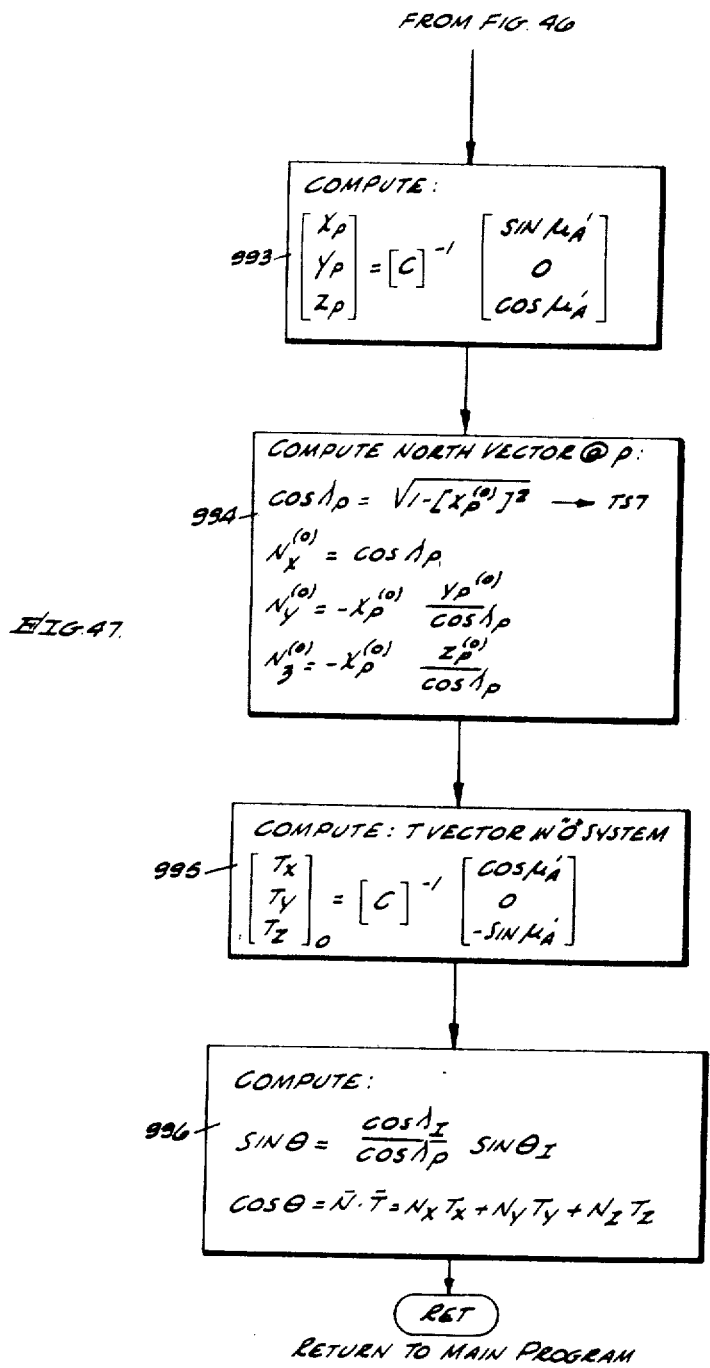

The off-course error $\rho$ and aircraft heading $\theta$ are computed by the routines in FIG. 46 and 47. To compute $\rho$, the sin and cos of $\mu_A$ are first computed (block 987). Then $\lambda_A$ is fetched (block 988) and the geocentric latitude is computed (block 989). The matrix $$\begin{bmatrix} X_A{}^{(o)} \\ Y_A{}^{(o)} \\ Z_A{}^{(o)} \end{bmatrix}$$

is then derived (block 990) and is used together with the [C] matrix to derive $$\begin{bmatrix} X_A \\ Y_A \\ Z_A \end{bmatrix}_a$$

(see block 991). Therefrom the latitude and longitude of the aircraft in the relocated coordinate system are computed in block 992, together with the off-course error $\rho$ and DIA which represent the distance from I to the aircraft position A. DIA = $R_E\mu'_A$.

Figures 47A, 47B, 47C:
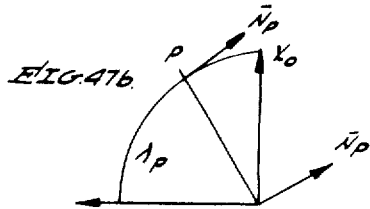
FIGS. 47a, 47b and 47c are small vector diagrams in which various vectors, referred to in conjunction with the flow chart shown in FIG. 47, are diagrammed.

The heading of the aircraft is derived by the routine shown in FIG. 47 which will be explained in conjunction with FIGS. 47a, 47b and 47c. First a matrix $$\begin{bmatrix} X_P \\ Y_P \\ Z_P \end{bmatrix}_o$$

is computed in block 993 (FIG. 47), where P represents the foot of a perpendicular from the aircraft onto the selected route or course. (See FIGS. 47a, 47b and 47c.) Thereafter a North vector at point P is computed in block 994 (see FIG. 47b). Next the matrix $$\begin{bmatrix} T_X \\ T_Y \\ T_Z \end{bmatrix}_o$$

is computed (block 995) for a unit vector T extending from P in a direction parallel to the selected route (see FIG. 47a). The last computations (block 996) produce the sin and cos of the aircraft heading in terms of the cos of the geocentric latitudes of the start point I, the point P, the bearing of the start point $\theta_I$ and the unit vectors N and T.

It should be appreciated by those familiar with computers and their programming, that the foregoing described routines may be executed or performed by either a special-purpose computer or a properly programmed general-purpose computer. In either case data storage capacity sufficient to store all required data is needed. This data includes the coordinates and frequencies of the VORTAC stations and map information such as scales and center-point coordinates. Since the computation results produced during certain phases of the computations are required for later use, any computer to be used should include temporary data-storage capabilities, such as multicell scratch pads. Clearly, all circuits required to perform the various computations are required. These are generally included in the computer processor.

It is submitted that the teachings of the invention are not limited to the use of any specific computer. It is further believed that the foregoing description is sufficient to teach one familiar with the art of navigation, in which computers are employed, how to practice the invention. However, in order to further highlight the invention, a specific computer which was employed in a reduction of the invention to practice will be described hereafter, together with the instruction repertoire, addressing format and other characteristics of the computer that are needed by programmers.

Figure 49:
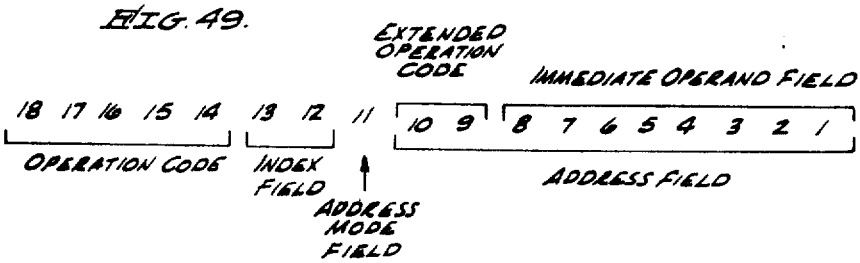
FIG. 49 is the instruction format used in the particular processor which is diagrammed in FIG. 48.
Figure 43A:
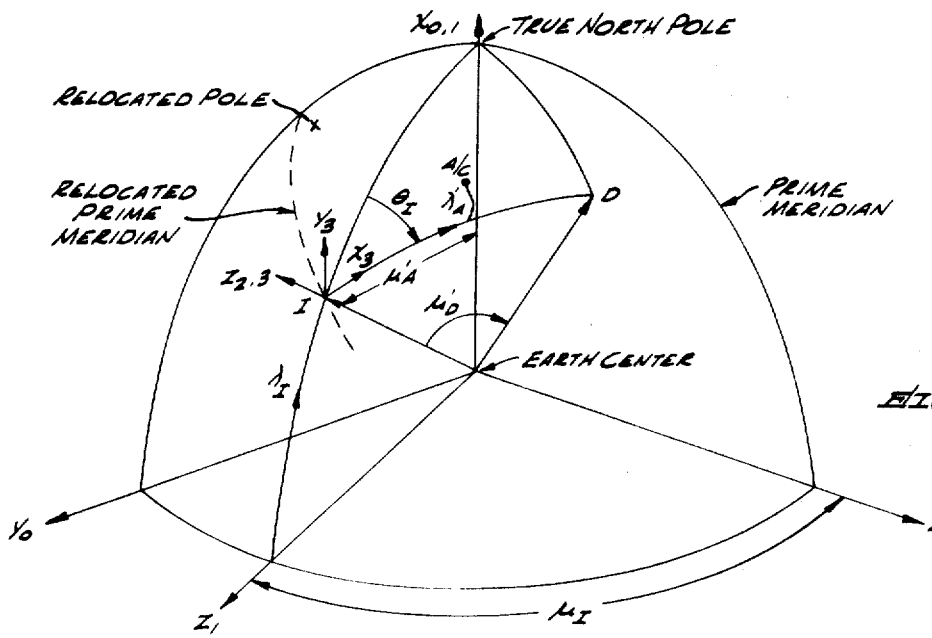
FIG. 43a is a three-dimensional diagram useful in explaining a great circle route transformation, referred to in several of the prior described routines.
Figure 43C:
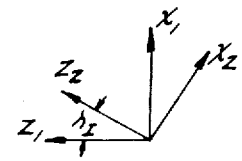
FIGS. 43b through 43e are small diagrams in which various vectors, referred to in the great circle route transformation explanation, are shown.
Figure 43B:
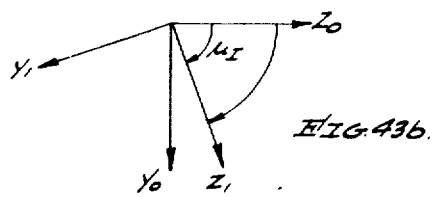
Figure 43E:
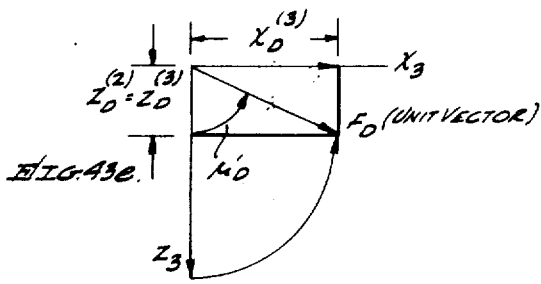
Figure 43D:
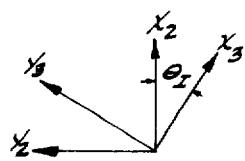
Figure 48:
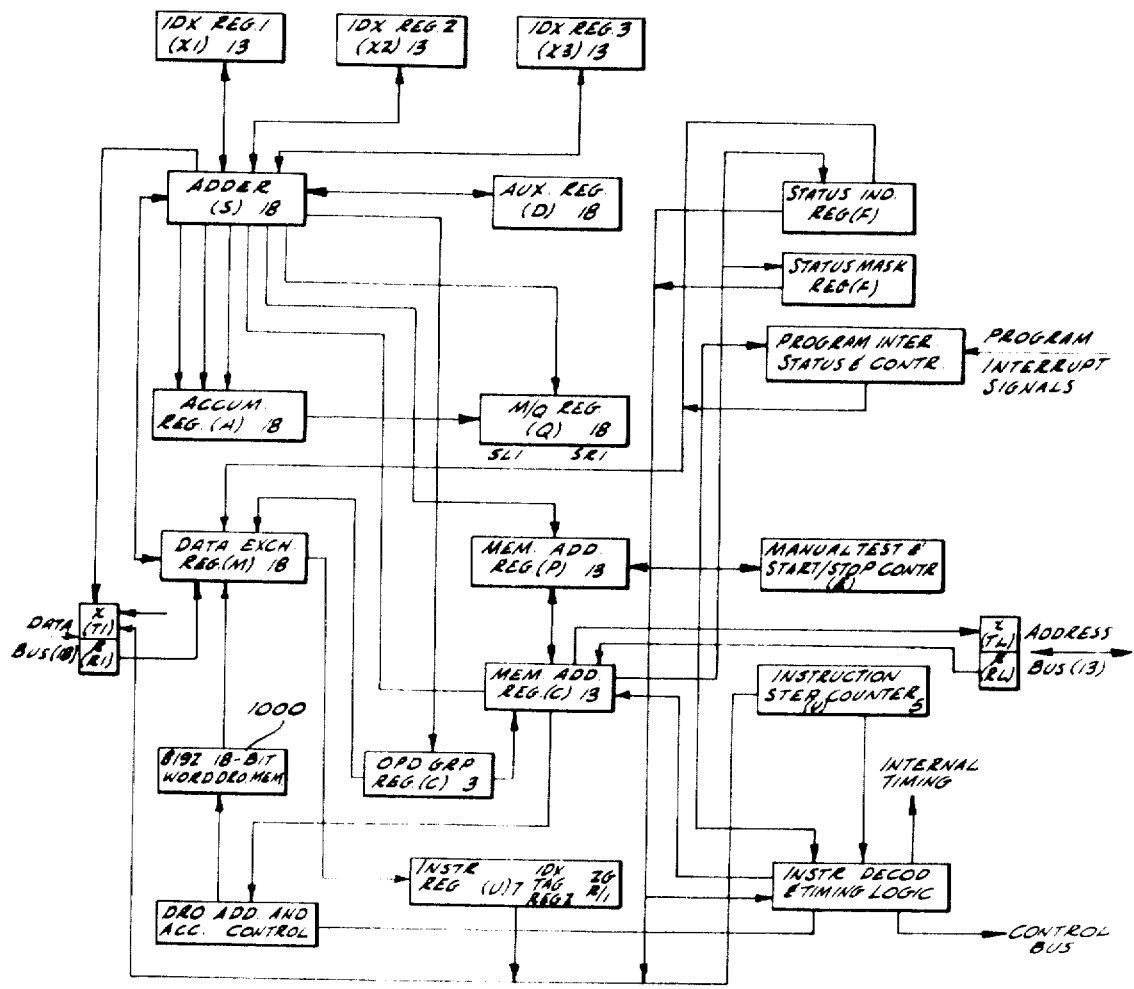
FIG. 48 is a general block diagram of a central processor of a computer.

Attention is now directed to FIG. 48 which is a general block diagram of the particular computer, and to FIG. 49 which represents the instruction format therefor. Basically, the computer is an 18-bit parallel digital computer using two's complement, fractional arithmetic. The data words are 17 bits plus the sign in the most significant bit position (bit 18). All instructions are 18-bit single address words. In FIG. 48 the memory of the computer is designated by numeral 1000. It is a single destructive readout (DRO) core unit of 8192 18-bit words with a clear-write cycle time of 2.0 microseconds. The registers and information transmission paths of the central processor are shown in FIG. 48.

For the particular computer the required programming information is furnished by the following material under the heading "Programmer Manual." Therein the instruction word format and addressing are explained in detail in second 1.0, where Table 2 summarizes the instruction repertoire. Sections 2.0 and 3.0 describe the input-output system and program-interrupt features, respectively. A functional description of each of the computer's instructions is given in section 4.0. Thereafter, the language to be for assembling the computers code is described in section 1.0 through 7.0 under the heading "Assembler Language."

PROGRAMMER MANUAL 1.0 Instruction Formats and Memory Addressing 1.1 Instruction Fields The HCM-205 instruction format is shown in FIG. 49. Those instructions which do not reference memory may have an extended operation code and/or an operand specified in the immediate operand field, while those instructions which do reference memory have a 10-bit address field.

The operation code which occupies bits 14–18 and may extend into bits 9 and 10 specifies the instruction to be performed. These bits may also affect the interpretation of the index field and addressing mode field. These differences in interpretation are discussed below. A non-zero content in the 2-bit index field is used to specify one of three index registers. The resulting action, if any, is a function of the instruction specified in the operation code and the content of the address mode field.

Since a 10-bit address is inadequate to address the entire memory, the content of the 1-bit address mode field specifies the manner in which the additional addressing information may be determined. Since the addressing modes for different classes of instructions are generally quite different, the interpretation of this field is also a function of the operation code and index fields as discussed in section 1.3.

1.2 Memory Addressing

Those instructions which address memory contain a 10-bit operand address field whose content is used in determining the effective address for the memory. The manner in which this field is used and the effective address obtained in a function of the contents of the other three instruction fields. The rules for forming effective addresses are summarized in Table 1 and discussed below. The addressing mode field, bit 11, is interpreted as a zero group designator bit for non-transfer type instructions and as an indirect addressing designator on transfer type instructions.

1.3 Instruction Format and Addressing

The 10 least significant bits of the instruction of the 18-bit instruction word as shown in FIG. 49, form the immediate address field. These are labeled "AF" in Table 1 and are used as shown there in determining the 10 least significant bits of the effective address. They are the 10 L.S.B. of the effective address unless indexing is specified, in which case the 10 L.S.B. of the specified index register are added to the "AF." The most significant bits of the effective address are dependent, as shown in Table 1, on the conditions specified in bits 11, 12 and 13. Reference should be made to Table 1 for the determination of an effective address.

Relative/Indirect (R/I) addressing or zero group designation (selection of one of the first 1024 memory locations) can be specified by use of bit 11 for all instructions for which these operations have meaning. The relative/indirect addressing is available for branch instructions only. If relative addressing is used, the address specified by the instruction (in the AF) is appended to the group address specified in bits 11, 12 and 13 of the Program Address Register. A 1 in bit 11 specifies indirect addressing for the branch instructions and a 0 specifies relative addressing. For all instructions that obtain an operand from memory or store an operand in memory a 1 in bit 11 specifies use of the operand group register to determine bits 11-13 of the effective address while a 0 designates zero for the group address. For all other instructions (those with a dash in column 11 of Table 2), bit 11 has no meaning and is not decoded. Table 2 lists all HCM-205 instructions, their operation codes, execution times and whether bit 11 is used as a relative/indirect or a zero group designator.

Bits 12 and 13 specify address indexing for all instructions except those which perform operations on the index registers (i.e., the LXR, SXR and BXD instructions). If the instruction is not an LXR, SXR or BXD instruction, bits 13 and 12 specify which of the three index registers are to be used for the address modification. 01, 10 or 11 are used to specify index register X1, X2 or X3, respectively.

TABLE 1

| Condition | | Effective Address | |
|---|---|---|---|
| Bit 11 | Indexing | Group Address (3 Bits) | Location (10 Bits) |
| ZG=0 | NO | ZG | AF |
| ZG=0 | YES | ZG** | AF+XR10 |
| ZG=1 | NO | OGR | AF |
| ZG=1 | YES | XR3 | AF+XR10 |
| R/I=0 | NO | PAR3 | AF |
| R/I=0 | YES | XR3 | AF+XR10 |
| R/I=1 | NO | ((OGR | AF)) |
| R/I=1 | YES | ((XR3 | AF+XR10 )) |
| KEY: | ZG-Zero Group, The first 1024 memory locations. | | |

ZG**-ZERO GROUP ONLY, NO CARRY IS ALLOWED INTO BIT 11 OF THE EFFECTIVE ADDRESS FROM AF+XR10.

IN ALL OTHER CASES, A CARRY FROM AF+XR10 WILL MODIFY THE GROUP ADDRESS.

AF-THE 10 BIT OPERAND ADDRESS OF THE INSTRUCTION.

XR10-THE 10 L.S.B. OF THE SPECIFIED INDEX REGISTER.

XR3-BITS 11, 12 & 13 OF THE SPECIFIED INDEX REGISTER.

OGR-THE OPERAND GROUP REGISTER (3 BITS).

PAR3-BITS 11, 12 & 13 OF THE PROGRAM ADDRESS REGISTER (PAR3 WILL THUS BE THE GROUP OF THE NEXT INSTRUCTION TO BE EXECUTED).

(( ))-INDIRECT ADDRESSING IS SPECIFIED SO THE CONTENTS OF THE ENCLOSED (( )) ADDRESS BECOME THE EFFECTIVE ADDRESS.

TABLE 2

| Type Inst. | MNEM. | Exec. Time 1CT=1us | Operation Code 18 17 16 15 14 | index 13 12 11 | Exten. Op. Code 10 9 |
|---|---|---|---|---|---|
| Store: | | | | | |
| Store Accumulator Reg | STO | 4CT | 1 1 0 1 0 | ZG | |
| Store Index Register | SXR | 4CT | 0 1 0 0 0 | ZG | |
| Store Q Register | SQR | 4CT | 0 1 0 0 1 | ZG | |
| Store Indicator & Group Reg | SIR | 4CT | 1 1 0 0 1 | ZG | |
| Store Address | STA | 4CT | 1 0 1 0 1 | ZG | |
| Load: | | | | | |
| Load Accumulator Reg | LAR | 4CT | 0 0 0 1 0 | ZG | |
| Load Twos Complement | LTC | 4CT | 0 0 1 0 1 | ZG | |
| Load Positive Magnitude | LPM | 4CT | 0 0 1 1 1 | ZG | |
| Load Q Register | LQR | 4CT | 0 0 1 1 0 | ZG | |
| Load D Register | LDR | 4CT | 1 0 1 1 1 | ZG | |
| Load Index Register | LXR | 4CT | 1 1 0 1 1 | ZG | |
| Load Indicator Reg. from Instr | LIJ | 4CT | 1 1 1 0 0 | — | 1 1 |
| Load Group Register from Instr | LGI | 4CT | 1 0 0 1 0 | — | |
| Arithmetic: | | | | | |
| Add | ADD | 4CT | 0 0 0 1 1 | ZG | |
| Subtract | SUB | 4CT | 0 0 1 0 0 | ZG | |
| Multiply | MPY | 22CT | 1 0 0 0 0 | ZG | |
| Divide | DIV | 25CT | 1 0 0 1 1 | ZG | |
| Add D to A | ADA | 4CT | 1 1 0 0 0 | — — — | 1 0 |
| Subtract D from A | SDA | 4CT | 1 1 0 0 0 | — — — | 1 1 |
| Logic: | | | | | |
| OR to Accumulator | ORA | 4CT | 0 0 0 0 0 | ZG | |
| AND to Accumulator | ANA | 4CT | 0 0 0 0 1 | ZG | |
| Shift: | | | | | |
| Logical Left Shift | LLS | (4+N)CT | 0 1 0 1 0 | — | 0 0 |
| Long Rotate Left | LRL | (4+N)CT | 0 1 0 1 0 | — | 0 1 |
| Logical Right Shift | LRS | (4+N)CT | 0 1 0 1 0 | — | 1 0 |
| Algebraic Right Shift | ARS | (4+N)CT | 0 1 0 1 0 | — | 1 1 |
| Branch: | | | | | |
| Branch Unconditionally | BRU | 4CT | 0 1 1 0 0 | R/I | |
| Branch Non-Zero | BNZ | 4CT | 0 1 1 0 1 | R/I | |
| Branch on Minus | BMI | 4CT | 0 1 1 1 0 | R/I | |
| Branch on Indicator Register | BIR | 4CT | 0 1 1 1 1 | R/I | |
| Branch Enable Interrupt | BIR | 4CT | 0 1 0 1 1 | R/I | |
| Branch Set Exit | BSE | 6CT | 1 0 1 0 0 | R/I | |
| Branch with Index Decremented | BXD | 4CT | 1 0 1 1 0 | R/I | |
| RegisterTransfers: | | | | | |
| Place A in D Register | PAD | 4CT | 1 1 0 0 0 | — — — | 0 0 |
| Place A in Index Reg | PAX | 4CT | 1 1 1 0 0 | — — — | 1 0 |
| Place Index in D Reg | PXD | 4CT | 1 1 0 0 0 | — — — | 0 1 |
| Input-Output: | | | | | |
| Digital Output from Accumulator | DOA | 4CT | 1 1 1 0 0 | — | 0 0 |
| Digital Input to Accumulator | DIA | 5CT | 1 1 1 0 1 | — | 0 1 |
| Digital Output from Memory | DOM | 4CT | 1 1 1 1 0 | ZG | |

TABLE 2 — Continued

| Type Inst. | MNEM. | Exec. Time 1CT=1us | Operation Code 18 17 16 15 14 | Index 13 12 11 | Exten. Op. Code 10 9 |
|---|---|---|---|---|---|
| Control: | | | | | |
| Halt and Branch | HBR | 4CT | 1 0 0 1 1 | R/I | |
| Control Instruction | CON | 4CT | 1 1 1 0 0 | — | 0.1 |
| Continue Test Sequence | CTS | 4CT | 1 1 1 0 1 | — | 0.0 |

If bits 12 and 13 are 00, no indexing is specified for these instructions. For the LXR, SXR and BXD instructions, bits 12 and 13 specify the index register to be operated upon. The SXR with 00 in bits 12 and 13 is a "store zero" instruction. Bits 14–18 of an instruction word are always operation code bits. For some instructions that do not require addressing the memory the operation code is extended into bits 9 and 10. The detailed specification of each instruction's operation code may be obtained from Table 2.

2.0 INPUT-OUTPUT INTERFACE

The exchange of information between the central processor and the external units is accomplished on one two-way data bus, one two-way address bus, and a control bus that carries sufficient interface control and synchronization information. Since the I/O can operate autonomously from the arithmetic and control section of the computer, feeding data to memory and fetching data from memory during cycles when the A and C is not calling for instructions or data, available memory cycles can be used for I/O data exchange with no loss in computing speed.

The data bus consists of 18 pairs of lines with a transmitter and a receiver pair in each unit connected to the two-way bus. The address bus consists of 13 pairs of lines with a transmitter and a receiver pair in each unit connected to the two-way bus. The control bus consists primarily of one-way transmitter-receiver(s) to provide necessary synchronization between units.

Two basic methods for exchanging information are employed by the central processor; (1) direct mode (program control channel), and (2) buffered I/O mode (direct access channel).

Program Control Channel

The program control channel makes use of the digital input and digital output instructions. Execution of a digital input to accumulator (DIA) instruction places the contents of the address register on the address bus to specify a desired address in the input-output unit. The parallel data selected by the address is placed on the 18-bit data bus by the input-output unit and entered into the accumulator register. Execution of a digital output from accumulator (DOA) instruction places the contents of the address register on the address bus to specify a desired address in the input-output unit. The parallel data contained in the accumulator is placed on the data bus for use in the input-output unit. Execution of the digital output from memory (DOM) instruction places the contents of the selected memory location on the data bus.

Direct Access Channel

The direct access channel (buffered I/O mode) utilizes the 18-bit data bus, the 13-bit address bus, and control bus signals to synchronize data exchange between the computer memory and the input-output unit. The direct access channel allows the input-output unit to communicate with the memory without intervention of the computer program. Three control signals are explained below.

1. Direct Access Request Signal:
    The direct access (DA) request signal is accepted by the CP and is used to initiate single or multiple direct accesses to the memory.

2. Read/Write Signal:
    The read/write signal is accepted by the Central Processor to initiate a read or write memory cycle request during the direct access cycle.

3. Direct Access Acknowledge Signal:
    This signal is provided by the CP to indicate to the input-output that the requested memory access will start during the next clock time. All of the control signals are logical ones when the direct access signal is requesting action.

3.0 PROGRAM INTERRUPT SYSTEM

The central processor is capable of responding to a number of internal and external program interrupt signals. As the interrupt signals appear, they are stored in the interrupt status indicator register. All interrupt signals have an assigned priority and are allowed to interrupt the program in the assigned order or priority. Also, a mask register is provided to allow deactivation of some of the interrupts under program control. When an interrupt is allowed to proceed, the next instruction address of the current program is automatically stored in a dedicated memory location assigned to the particular interrupt, and the next instruction address is obtained from the next higher memory location dedicated to that particular interrupt. These addresses are referred to below by enclosing them in parenthesis.

Input-Output Interrupt

One external interrupt is recognized by the CP priority interrupt logic.

The input-output interrupt signal causes wired interrupt logic to branch to location (4) assigned to the interrupt, where it stores the current program address. It then obtains the entry address for the interrupt subroutine from location (5). The input-output interrupt status indicator is maskable under program control.

Internal Interrupts

Four internal interrupt signals are recognized by the program priority interrupt logic and are described below in the order of priority.

1. A power transient (also power shutdown) signal from the power supply causes wired interrupt logic to branch to location (0) assigned to the orderly shut-down interrupt where it stores the current program address, and then obtains the entry address of the shut-down subroutine from location (1). The subroutine stores in the scratch pad memory contents of all pertinent registers, indicators, etc., as required by the system application. The power transient signal has the highest priority among the interrupt signals and is not maskable under program control.

2. A power turn-on signal causes wired interrupt logic to obtain the address of the first instruction of the power turn-on subroutine from memory location (3) after the CP logic and the CP memory reach the ready states. The power turn-on signal is not maskable under program control.

3. A re-start signal causes wired interrupt logic to obtain the address of the first instruction of the re-start subroutine from memory location (7) after the CP logic and the CP memory reach the ready state. The re-start signal is generated only if the power supply has been down for less than 3 ±1 seconds. The re-start signal is not maskable under program control.

4. An arithmetic indicator signal causes wired interrupt logic to branch to memory location (10)$_8$ assigned to the arithmetic indicator interrupt where it stores the current program address, and then obtains the entry address of the arithmetic indicator subroutine from address (11)$_8$. The arithmetic indicator status indicator is maskable under program control.

4.0 INSTRUCTION DESCRIPTION

Functional descriptions of the HCM–205 instructions are given below. The execution times include both the instruction and the operand access times. CT represents clock times. An extended operation code (e.g., 11000,10 for ADA) is written with a comma separating bits 18–14 (the 11000 for the example above) and bits 10 and 9 (the 10).

Store Accumulator — STO (4 CT)

The contents of the accumulator are stored in the specified memory location without modifying the contents of the accumulator. The STO instruction requires 4 CT for execution, is indexable, and uses the operation code 11010. Bit 11 is used as the zero group designator.

Store Index Register — SXR (4 CT)

The contents of the specified index register (X1, X2 or X3) are stored in the 13 least significant bits of the specified memory location. Bits 14 through 18 of that location are cleared to zero. Bits 13 and 12 of the SXR instruction are used to determine which index register is to be stored in memory. 01, 10 and 11 are used to specify X1, X2 and X3, respectively. Selection of index zero (00 in bits 13 and 12) stores all zeros in the selected memory location. The contents of the specified index register are not modified. The SXR instruction requires 4 CT, is not indexable, and has the operation code 01000. Bit 11 is used as the zero group designator.

Store Q Register — SQR (4 CT)

The contents of the Q register are stored in the specified memory location without modifying the contents of the Q register. The SQR instruction requires 4 CT for execution, is indexable, and uses the operation code 01001. Bit 11 is used as the zero group designator.

Store Indicator and Group Register — SIR (4 CT)

The contents of the input-output interrupt flip-flop, the input-output mask flip-flop, the overflow indicator flip-flop, and the overflow mask flip-flop, respectively, are stored in bit positions 3–6 of the specified memory location. The contents of the Group Register are stored in bit positions 11, 12 and 13 of the specified memory location. All other bits of that memory word are cleared to zero. The SIR instruction is indexable and has the option of using the zero group designator. The SIR instruction requires 4 CT for its execution and uses the operation code 11001.

Store Address Field — STA (4 CT)

The operand address field (bits 1 through 10) of the accumulator are stored in the address field of the specified memory location. Bits 11 through 18 (the instruction field) of the memory location are not modified. The contents of the accumulator are not modified. The STA instruction requires 4 CT for execution, is indexable, and has the operation code 10101. Bit 11 is used as the zero group designator.

Load Accumulator Register — LAR (4 CT)

The contents of the specified location in memory are transferred to the accumulator without modifying the contents of the memory location. The load accumulator instruction requires 4 CT for execution, is indexable, and uses the operation code 00010. Bit 11 is used as the zero group designator.

Load Two's Complement — LTC (4 CT)

The two's complement of the contents of the specified memory location is transferred to the accumulator without modifying the contents of the memory location. The LTC instruction requires 4CT, is indexable and has the operation code 00101. Bit 11 is used as the zero group designator.

Load Positive Magnitude — LPM (4 CT)

The positive magnitude of the contents of the specified memory location is transferred to the accumulator. That is, if the memory word is positive it is loaded into the accumulator and if the memory word is negative, its two's complement is loaded into the accumulator. The contents of the memory location are not modified. The LPM instruction requires 4 CT for execution, is indexable, and has the operation code 00111. Bit 11 is used as the zero group designator.

Load Q Register — LQR (4 CT)

The contents of the specified memory location are transferred to the Q register without modifying the contents of the memory location. The LQR instruction requires 4 CT, is indexable, and has the operation code 00110. Bit 11 is used as the zero group designator.

Load D Register — LDR (4 CT)

The contents of the specified memory location are transferred to the D register without modifying the contents of the memory location. The LDR instruction requires 4 CT for execution, is indexable and has the operation code 10111. Bit 11 is used as the zero group designator.

Load Index Register — LXR (4 CT)

The 13 least significant bits of the specified memory location are transferred to the specified index register without modifying the contents of the memory location. The desired index register is selected with bits 13 and 12 being 01, 10 or 11 for index register X1, X2 or X3, respectively. This instruction is a "no-op" for 00 in bits 12 and 13. The LXR instruction requires 4 CT, is not indexable and has the operation code 11011. Bit 11 is used as the zero group designator.

Load Indicator Register From Instruction — LII (4 CT)

Any of the indicator register flip-flops can be set or reset with the LII instruction. Bits 1 to 6 and bit 8 of the address portion of the instruction are used to set or reset the indicator register flip-flops. The following table shows the correspondence between functions and bit positions.

| Bit | Indicator Register Flip-flop Functions |
| --- | --- |
| 1 | Power Failure Interrupt |
| 2 | Restart Interrupt |
| 3 | I/O Interrupt |
| 4 | I/O Mask |
| 5 | Overflow Indicator |
| 6 | Overflow Indicator Mask |

Bits 1 to 6 can be any desired combination of logical 1's and 0's.

When bit 8 is a logical 1, any of the bits 1–6 that contain a 1 set the flip-flops they control and bits containing a 0 keep the flip-flops they control in the same state they were in before the LII instruction was given. When bit 8 is a logical 0, any of the bits 1-6 that contain a 0 keep the flip-flops they control in the same state they were in before the LII instruction was given. The LII instruction requires 4 CT for its execution and has the operation code 11100,11. Indexing is used to modify the address portion of the instruction (bits 1-10) before setting or resetting the indicators. The addressing mode field is not decoded.

Load Group Register From Instruction — LGI (4 CT)

The 3 bit group register is loaded with the three least significant bits of the LGI instruction's address field. This is the only means by which the memory address group register can be modified. The LGI instruction requires 4 CT for execution, is indexable, and uses the operation code 10010. The addressing mode field is not decoded.

Add — ADD (4 CT)

The contents of the specified memory location are added to the contents of the accumulator with the sum appearing in the accumulator. The contents of the memory location are not modified. The overflow indicator flip-flop is set if an overflow occurs. The add instruction requires 4 CT and is indexable. The ADD instruction code is 00011. Bit 11 is used as the zero group designator.

Subtract — SUB (4 CT)

The contents of the specified memory location are subtracted from the contents of the accumulator with the difference appearing in the accumulator. The contents of the memory location are not modified. The overflow indicator flip-flop is set if an overflow occurs. The subtract instruction requires 4 CT, is indexable, and has the operation code 00100. Bit 11 is used as the zero group designator

Multiply — MPY (22 CT)

The contents of the specified memory location are multiplied by the contents of the accumulator. The multiplicand is brought from memory and stored in the D register during multiplication. The double length product appears in the accumulator and the Q registers. The sign of the product appears in the sign position of the most significant word of the product which is stored in the accumulator. The sign bit of the least significant half of the product, stored in the Q register, is always zero. The contents of the specified DRO location are not modified. $(-1) \times (-1)$ will generate $(-1)$ with no overflow indication. The MPY instruction requires 22 CT for execution and uses the instruction code 10000. Indexing may be specified and bit 11 is used as the zero group designator.

Divide — DIB V (25 CT)

The contents of the accumulator and the seventeen least significant bits of the Q register are treated as a double length dividend and are divided by the contents of the specified memory location. The divisor is brought from the memory and stored in the D register during division. The quotient appears in the accumulator and the correct remainder in the Q register. The contents of the memory location are not modified. If an overflow occurs, the overflow indicator flip-flop is set. Positive overflow will leave $+(1-2^{-17})$ in the accumulator and an arbitrary number in the Q register. Negative overflow will leave $-(1)$ in the accumulator and an arbitrary number in the Q register. The divide instruction requires 25 CT, is indexable, and uses the operation code 10001. Bit 11 is used as the zero group designator.

Add D Register To Accumulator — ADA (4 CT)

The sum of the contents of the D register and the contents of the accumulator is placed in the accumulator. The contents of the D register are not modified. The indicator flip-flop is set if an overflow occurs. The ADA instruction requires 4 CT and has the operation code 11000,10. Indexing is allowed, but does nothing. The addressing mode field designator is not decoded.

Subtract D Register From Accumulator — SDA (4 CT)

The contents of the D register are subtracted from the contents of the accumulator with the difference appearing in the accumulator. The contents of the D register are not modified. The indicator flip-flop is set if an overflow occurs. The SDA instruction requires 4 CT and uses the operation code 11000,11. Indexing is allowed, but has no meaning. The addressing mode field can be used, but is not decoded.

OR To Accumulator — ORA (4 CT)

The logical OR (inclusive) of the contents of the accumulator and the contents of the specified memory location replace the contents of the accumulator. The contents of the memory location are not modified. The ORA instruction requires 4 CT, is indexable, and has the instruction code 00000. Bit 11 is used as the zero group designator.

AND To Accumulator — ANA (4 CT)

The logical AND of the contents of the accumulator and the contents of the specified location in memory replace the contents of the accumulator. The contents of the memory location are not modified. The ANA instruction requires 4 CT, is indexable, and has the instruction code 00001. Bit 11 is used as the zero group designator.

Logical Left Shift — LLS 4 CT plus 1 CT Per Shift)

The contents of the accumulator are shifted to the left the number of bits specified by the five least significant bits of the effective address which is the sum of the contents of any specified index register and the address portion of the instruction. A zero is written into the least significant bit of the accumulator every time the accumulator is left shifted one bit. The sign bit is shifted out and lost. The LLS instruction uses the operation code 01010,11 and requires 4 CT plus 1 CT for each bit shifted. The addressing mode field is not decoded for LLS. The maximum shift length is 28 bits. A shift request for more than 28 bits results in a 28 bit shift.

Long Rotate Left — LRL (4 CT Plus 1 CT Per Shift)

The contents of the accumulator and the Q register (placed at the right of the accumulator) are left cycled the number of places specified by the 5 least significant bits of the effective address of the instruction. Bit 18 of the Q register is shifted into bit 1 of the accumulator and bit 18 of the accumulator is shifted into bit 1 of the Q register. Indexing can be used to modify the number of shifts. The LRL instruction requires 4 CT plus 1 CT for each bit shifted and uses the operation code 01010,01. The maximum shift length is 28 bits, and a request for more results in a 28 bit shift. The addressing mode field is not decoded.

Logical Right Shift — LRS (4 CT Plus 1 CT Per Shift)

The contents of the accumulator are shifted to the right the number of bits specified by the 5 least significant bits of the effective address of the instruction. A zero is written into the most significant bit (the sign bit) of the accumulator every time the accumulator is right shifted one bit. The least significant bit is lost at each shift. The LRS instruction uses the operation code 01010,10 and requires 4 CT plus 1 CT for each bit shifted. Indexing can be used to modify the number of shifts. The addressing mode field is not decoded for LRS. The maximum shift length is 28 bits, and a request for more results in a 28 bit shift. A shift length of 18 or more bits clears the accumulator.

Algebraic Right Shift — ARS (4 CT Plus 1 CT Per Shift)

The contents of the accumulator are shifted to the right the number of bits specified by the 5 least significant bits of the effective address of the instruction.

The most significant (or sign) bit of the accumulator is preserved at each shift and also transmitted to the right. The ARS instruction requires 4 CT plus 1 CT for each bit shifted. Indexing can be used to modify the number of shifts. The ARS operation code is 01010,11. The addressing mode field is not decoded for ARS. The maximum shift length is 28 bits and a request for more results in a 28 bit shift. A shift length of 18 or more bits either clears the accumulator of fills it with ones, depending on its initial sign.

Branch Unconditional — BRU (4 CT)

The Program Address Register is set to the effective address of the instruction. If indirect addressing is not specified, the effective address is determined by appending bits 11, 12 and 13 of the Program Address Register to the 10 bits of the instruction's address field when indexing is not used, and by the sum of the specified index register and the address field when indexing is used. If bit 11 specifies indirect addressing, the effective address is determined by appending the Operand Group Register to the address field of the instruction when indexing is not used, and by the sum of the specified index register and the address field when indexing is used. The BRU instruction requires 4 CT for execution and uses the operation code 01100.

Branch On Non-Zero — BNZ (4 CT)

The program counter is set to the effective address of the BNZ instruction if the contents of the accumulator are not zero. Otherwise, the program counter is incremented in the normal manner and the next instruction is executed. The BNZ instruction requires 4 CT for execution and uses the operation code 01101.

Branch On Minus — BMI (4 CT)

The program counter is set to the effective address of the BMI instruction if the sign of the contents of the accumulator is negative. If the sign is positive, the next instruction in sequence is read. The BMI instruction can be indexed and indirectly addressed, requires 4 CT for execution, and uses the operation code 01110.

Branch On Indicator Register — BIR (4 CT)

The program counter is set to the effective address of the instruction if the overflow indicator is on; otherwise, the next instruction in sequence is executed. The indicator is set by an overflow in addition, subtraction, or division. The indicator is reset at the beginning of add, subtract, and division instructions, and after program interrupt due to the overflow indicator interrupt. The BIR instruction can be indexed and/or indirectly addressed, requires 4 CT for execution, and uses the operation code 01111.

Branch Enable Interrupt — BEI (4 CT)

The BEI instruction enables the computer to be interrupted and places the instruction's effective address into the program counter. Each interrupt disables future interrupts until a BEI enables interrupts again. If a one is in bit 11, indirect addressing is specified. If bits 12 and 13 are not 00 indexing is specified. The BEI instruction requires 4 CT for execution and uses the operation code 01011.

Branch And Set Exit — BSE (6 CT)

The contents of the program counter are incremented by one and stored in the specified memory location (K). The instruction in the (K + 1) location is then executed next. The BSE instruction requires 6 CT for execution, can be indexed and indirectly addressed, and uses the operation code 10100.

Branch With Index Decremented — BXD (4 CT)

The index register specified in bits 12 and 13 of the instruction is decremented by one and, unless the 10 least significant bits of the index register were all zeros before being decremented, control is transferred to the effective address of the BXD instruction. The BXD is a "no-op" if bits 12 and 13 are 00. If the 10 least significant bits of the specified index register were all zeros, the next instruction in sequence is executed. The instruction is not indexable, but indirect addressing can be specified. The BXD instruction requires 4 CT for execution and uses the operation code 10110.

Place Accumulator in D Register — PAD (4 CT)

The contents of the accumulator are transferred to the D register without modifying the contents of the accumulator. The PAD instruction requires 4 CT for execution and uses the operation code 11000,00. Indexing is allowed, but has no meaning. The addressing mode field is not decoded.

Place Accumulator In Index Register — PAX (4 CT)

The 13 least significant bits of the accumulator are transferred to the specified index register without modifying the contents of the accumulator. The index register is selected from bits 13 and 12. PAX is a "no-op" if 00 are used in bits 12 and 13. The PAX instruction requires 4 CT, is not indexable, and uses the operation code 11100,10. The addressing mode field is not decoded.

Place Index Register In D Register — PXD (4 CT)

The contents of the specified index register are transferred to the D register. Bits 14 through 18 of the D register are cleared to zero. The contents of the 13 bit index register specified are not modified. The D register is cleared to zero if 00 are in bits 12 and 13. The PXD instruction requires 4 CT for execution, is not indexable, and uses the operation code 11000,01. The addressing mode field is not decoded.

Digital Output From Accumulator — DOA (4 CT)

The contents of the accumulator are transferred in parallel to the information bus via the M register. The digital output instruction is indexable and requires 4 CT for its execution. The operation code of the DOA is 11100,00. The addressing mode field is not decoded.

Digital Input To Accumulator — DIA (5 CT)

The digital input to accumulator instruction transfers the 18 bits of data from the information bus via the M register to the accumulator. The effective address field specifies to the input/output unit which group of 18 bits should be placed on the information bus for transfer to the accumulator. The DIA instruction is indexable. Its operation code is 11101,01 and it requires 5 CT for execution. The addressing mode field is not decoded.

Digital Output From Memory — DOM (4 CT)

The digital output from memory instruction places the 18 bits of data from the specified memory location on the data bus. The effective address of the memory location is made available on the address bus. The DOM instruction is indexable and uses the addressing mode field as a zero group designator. The operation code is 11110 and this instruction requires 4 CT for execution.

Halt And Branch — HBR (4 CT)

In the normal mode (tactical), execution of the HBR instruction (except during power shutdown) causes a program interrupt which stores the location of the next instruction in location (0006)$_8$ and obtains the entry address to the halt subroutine from location (0007)$_8$. In the test mode (AGE) and during power shutdown, the program counter is set to the effective address of the HBR instruction (thus forming a next instruction address) and the computer halts. The computer may be manually restarted by depressing the start push button. The instruction with bits 9 and 10 logical zeros is used to halt the computer after execution of a successful self-test program and to hold the self-test pass light in the "on" condition. All other combinations of bits 9 and 10 used with the HBR order in the test mode cause flashing of the self-test light, thus indicating a failure of a self-test program. Relative/indirect addressing may be specified by the addressing mode field. The HBR instruction requires 4 CT for execution and uses the operation code 10011.

Control Instruction — CON (4 CT)

The control instruction is used in the input/output unit and is explained in the I/O logic description of Section 3.0. The control instruction is also used in the AGE unit for the purpose of starting and stopping the tape. The CON instruction requires 4 CT for execution, is indexable, and its operation code is 11100,01. The addressing mode field is not decoded.

Continue Test Sequence — CTS (4 CT)

Whether in the normal mode or the test mode, the execution of the CTS is the same as a no operation instruction, as far as the A & C is concerned. That is, no action takes place in the A & C except for the incrementation of the program counter. When the system is in the test mode, this instruction is used to pulse a fail light on the computer base plate at 0.1 second intervals and prevents its flashing as long as the tests being performed continue to pass. This instruction is indexable, requires 4 CT for execution and uses the operation code 11101,00. The addressing mode field is not decoded.

ASSEMBLER LANGUAGE

1.0 CODING SHEET FORMAT

The format to use on coding sheets is the following:
There are three fields, label field (col 1–6), the operation field (col 8–11) and the operand or variable field (col 16 on). Three blanks terminate the variable field.
This format can readily fit on 7094 coding sheets.

```
Example:    col 1      8  11    16
            Symbol     Opr      Start of
                                Variable Field
                       Opr*     $+4
```

2.0 LABEL FIELD

A symbol is defined to be from 1 to 6 alphanumeric characters, the first of which must be alphabetic.
The label field may have either a symbol or blank. An * in col 1 makes the entire card a comments card.

3.0 OPERATION FIELD

All of the mnemonic operation codes consist of three alphabetic characters. The complete instruction set with mnemonics is shown as Appendix A.

3.1 Indirect Addressing and Zero Group

An asterisk (*) in col 11 is used to set bit 11 of the 205 computer word. This is used for direct-indirect addressing for branch orders and zero group designator for arithmetic orders.

4.0 VARIABLE FIELD

The programmer has many options at his disposal. The variable field is broken down into two subfields, the address field followed by the tag field. In the event a tag is specified but the address is not, a zero must be present in the address field.

```
Example:
            PAX        0,1
```

All numbers in the variable field are either octal or decimal. If an octal number is desired a zero must precede it. (e.g., 0777 is an octal but 777 is decimal). It should be noted that the assembler location counter is 12 bits long, whereas the address field is only 10 bits in length. Only the 10 least significant bits of the location counter will be placed into the address portion of the word. The address portion of the variable field may have any of the following formats:

4.1 Address Field:

Symbolic Address:
The variable field may contain a symbol. This symbol must be defined in the location field some place in the program.

```
Example:
            ADD        ALPHA

ALPHA  DATA           10
```

Relative Addressing:
The relative addressing of symbolic locations is permitted. A symbol may be followed by + or − and then an octal or decimal integer.

```
Example:
                       STO        TABLE+10
            HERE       BRU        HERE−017
```

Absolute Addressing:
This option allows the programmer to specify a particular core location.

```
Example:
            ADD        0277       Octal absolute address
            ADD        4095       Decimal absolute address
```

Literals:
The assembler also has the capability of handling literals. The assembler will generate constants as defined in the variable field.
An equal sign (=) must precede the value.

```
Example:
            ADD        =10        Add the value ten
            SUB        =077       Subtract octal mask
```

Current Location:
One can refer to the present value of the location counter by the symbol "$." Relative addressing may be employed with the dollar sign.

```
Example:
            BRU        $−8
```

Immediate Addresses:

```
Shift:      The variable field of shift instructions
            can be any of the above, but
            normally is a decimal absolute
            address. A shift must be less than
            28₁₀. Otherwise a flag will be
            generated.
Example:
                       ARS        6
LGI:        The variable field of this command is
            similar to the shift with the
            exception that the limit is 3.
Example:
                       LGI        3
```

5.0 TAG FIELD

The tag field specifies indexing. It can contain a 1, 2 or 3 corresponding to the desired index register. If no indexing is desired or allowed, this field should contain a zero or blank.

6.0 ASSEMBLER DIRECTIVES

There are three types of assembler directives (sometimes called pseudo-operations), (1) Data generating (2) Assembly control, and (3) Fill tape control.

6.1 Assembly Control:

| | | | |
|---|---|---|---|
| ORIGIN | This will reset the assembly location counter to the value in the variable field. | | |
| Example: | | | |
| | ORIGIN | 4090 | |
| | ORIGIN | 07772 | Both set to same location |
| EQU | Equates the symbol in the lable field to the value (or value of the symbol) in the variable field. Any reference to the symbol defined by an EQU must physically follow the EQU. | | |
| Example: | | | |
| | ABE BSS | 10 | |
| | TABLE BSS | 012 | A table of ten cells |
| END | This control card must be physically at the end of every assembly deck. | | |

6.2 Data Generating:

| | | | | |
|---|---|---|---|---|
| DATA | | This directive will generate a full 18-bit, right justified constant, either octal or decimal. | | |
| TEN | DATA | 10 | ten (decimal) | 000012 |
| MASK1 | DATA | 077700 | an octal mask | 077700 |

7.0 ERROR CODES

The assembler contains error codes. Each error consists of a single character which is printed on the source line where the error occurred.

Error Codes and Their Meaning

| Error | |
|---|---|
| T | Truncation error — this implies that one or more values where larger than the field they were to be put into. |
| I | Illegal operation — this implies that the operation was not defined to the assembler. |
| U | Undefined symbol — this implies that one or more symbols on this source line are undefined. |
| S | Syntax error — this implies that the source line does not follow the correct syntax. |
| D | Double defined label — this implies that the same symbol appears in more than one label field. This error flag is set for each label double defined and all the references to it. |
| E | Miscellaneous errors — this covers errors such as no label field on an EQU, etc. |
| P | This flag may have many meanings. It will be given under the following conditions:<br>a. Location counter greater than $4095_{10}$<br>b. Shift greater than $27_{10}$<br>c. LGI greater than 3 |

In the reduction of the invention to practice the computer was programmed to perform the aforedescribed routines with the instruction listing which is attached herein as Appendix A. The octal address and the contents of the addressed cell in octal code at the sequence numbers (Seq. No.) are listed at the left portion of Appendix A and show the data that is loaded into each cell of the computer memory to perform the steps of all the sequences. The mnemonics used in the Appendix and the description correspond to those described under the headings "Programmer Manual" and "Assembler Language." Also, the various registers or circuits shown in FIG. 48 and the routines herebefore described are referred to in the Appendix. For example, the transformation matrix operations required to convert the initial and destination points and the aircraft position in the relocated coordinate system are represented by sequences 1962 through 2139. Sequences 1 through 750 represent the loading of data into the computer memory. The Chart routine herebefore described in conjunction with FIG. 27 is performed by sequences 2141 through 2205. For example, the inputing and storing DSCWD2 shown in FIG. 27 as block 53 is performed by sequences 2143–2145, the chart select step represented by block 532 (FIG. 27) is performed by sequences 2146 and 2147, and so on.

It should again be pointed out that the listing of Appendix A is related to the performance of the aforedescribed routines in the particular computer described herein. When using a different computer, a different listing would be produced to conform to the programming and operational characteristics of such a computer.

There has accordingly been shown and described herein a novel course-oriented navigation system. The system included a manually and automatically controlled display unit which displays an aircraft position with respect to a pilot-defined course, so as to indicate the aircraft off-course error. The aircraft and course indications are superimposed on a manually-selected map, which is also automatically controlled for display purposes, so that the aircraft indication is displayed at a point on the map representing aircraft.

Although particular embodiments of the invention have been described and illustrated herein, it is recognized that modifications and variations may readily occur to those skilled in the art and consequently it is intended that the claims be interpreted to cover such modifications and equivalents

APPENDIX

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| | | 1 | | ASSMB | META | |
| | | 2 | *(Comment Card) | | | |
| | | 3 | * | | FLIGHT PROGRAM | |
| | | 4 | * | | | |
| | | 5 | * | | | |
| | | 6 | * | | GROUP 0 | |
| | | 7 | * | | | |
| 00000 | | 8 | | ORIGIN | 00000 | |
| | | 9 | * | | INTERUPTS | |
| 00000 | 000000 | 10 | | DATA | 0 | |
| 00001 | 000000 | 11 | | DATA | 0 | POWER TRANSIENT |
| 00002 | 000000 | 12 | | DATA | 0 | |
| 00003 | 000000 | 13 | | DATA | 0 | POWER ON |
| 00004 | 000000 | 14 | | DATA | 0 | |
| 00005 | 000000 | 15 | | DATA | 0 | I/O |
| 00006 | 000000 | 16 | | DATA | 0 | |
| 00007 | 000000 | 17 | | DATA | 0 | RE-START |
| 00010 | 000000 | 18 | | DATA | 0 | |
| 00011 | 000000 | 19 | | DATA | 0 | O.F. |
| 00012 | 000000 | 20 | | DATA | 0 | |
| 00013 | 000000 | 21 | | DATA | 0 | HBR TRAP IN NON-TEST MODE |
| 00014 | 000000 | 22 | XFAIL | DATA | 0 | FAIL PT STORAGE WD |
| 00015 | 000000 | 23 | TDOO | DATA | 0 | DOWD1 FOR RE-START |
| 00016 | 000000 | 24 | CSTEST | DATA | 0 | CK SUM TEST DUMMY LABEL |
| 00017 | 000000 | 25 | XRDIDF | DATA | 0 | RESET DEST I.D. FLAG |

Bits 1-13 Of One Address

Card Column 1
Column 8
Column 11
Column 16
Column 34 or greater
End Column 72 or less

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| | | 26 | * | | | |
| 00160 | | 27 | | ORIGIN | 00160 (ASSY DIRECTIVE) | |
| | | 28 | * | | | FLIGHT PROGRAM VARIABLES |
| 00160 | 000000 | 29 | TS0 | DATA | 0 | TEMPORARY STORAGE |
| 00161 | 000000 | 30 | TS1 | DATA | 0 | |
| 00162 | 000000 | 31 | TS2 | DATA | 0 | |
| 00163 | 000000 | 32 | TS3 | DATA | 0 | |
| 00164 | 000000 | 33 | TS4 | DATA | 0 | |
| 00165 | 000000 | 34 | TS5 | DATA | 0 | |
| 00166 | 000000 | 35 | TS6 | DATA | 0 | |
| 00167 | 000000 | 36 | TS7 | DATA | 0 | |
| 00170 | 000000 | 37 | TS10 | DATA | 0 | |
| 00171 | 000000 | 38 | TS11 | DATA | 0 | |
| 00172 | 000000 | 39 | TS12 | DATA | 0 | |
| 00173 | 000000 | 40 | TS13 | DATA | 0 | |
| 00174 | 000000 | 41 | TS14 | DATA | 0 | |
| 00175 | 000000 | 42 | TS15 | DATA | 0 | |
| 00176 | 000000 | 43 | TS16 | DATA | 0 | |
| 00177 | 000000 | 44 | TS17 | DATA | 0 | |
| 00200 | 000000 | 45 | LAT | DATA | 0 | A/C LATITUDE. RADS AT PI |
| 00201 | 000000 | 46 | LNG | DATA | 0 | A/C LONGITUDE. RADS AT PI |
| 00202 | 000000 | 47 | LATWN | DATA | 0 | WIND D.R. LAT |
| 00203 | 000000 | 48 | LNGWN | DATA | 0 | WIND D.R. LONG |
| 00204 | 000000 | 49 | LATI | DATA | 0 | START PT LAT |
| 00205 | 000000 | 50 | LNGI | DATA | 0 | START PT LONG |
| 00206 | 000000 | 51 | LATD | DATA | 0 | DEST LAT |
| 00207 | 000000 | 52 | LNGD | DATA | 0 | DEST LONG |
| 00210 | 000000 | 53 | LATBD | DATA | 0 | BUFFERED DEST LAT |
| 00211 | 000000 | 54 | LNGBD | DATA | 0 | BUFFERED DEST LONG |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 00212 | 000000 | 55 | LATD1 | DATA | 0 | DEST 1 LAT |
| 00213 | 000000 | 56 | LNGD1 | DATA | 0 | LONG |
| 00214 | 000000 | 57 | LATD2 | DATA | 0 | DEST 2 |
| 00215 | 000000 | 58 | LNGD2 | DATA | 0 | |
| 00216 | 000000 | 59 | LATD3 | DATA | 0 | DEST 3 |
| 00217 | 000000 | 60 | LNGD3 | DATA | 0 | |
| 00220 | 000000 | 61 | LATD4 | DATA | 0 | DEST 4 |
| 00221 | 000000 | 62 | LNGD4 | DATA | 0 | |
| 00222 | 000000 | 63 | LATE1 | DATA | 0 | VORTAC 1 (MEAS-DR) LAT |
| 00223 | 000000 | 64 | LNGE1 | DATA | 0 | VORTAC 1 (MEAS-DR) LNG |
| 00224 | 000000 | 65 | LATE2 | DATA | 0 | VORTAC 2 (MEAS-DR) LAT |
| 00225 | 000000 | 66 | LNGE2 | DATA | 0 | VORTAC 2 (MEAS-DR) LNG |
| 00226 | 000000 | 67 | DLAT | DATA | 0 | D.R. REMAINDERS. RADS/PI AT B-14 |
| 00227 | 000000 | 68 | DLNG | DATA | 0 | |
| 00230 | 000000 | 69 | VN | DATA | 0 | A/C NORTH VEL. KNOTS AT B11 |
| 00231 | 000000 | 70 | VW | DATA | 0 | A/C WEST VEL. |
| 00232 | 000000 | 71 | WN | DATA | 0 | WIND NORTH. KNOTS AT B11 |
| 00233 | 000000 | 72 | WW | DATA | 0 | WIND WEST. |
| 00234 | 000000 | 73 | H | DATA | 0 | ALTITUDE. FT AT B16 |
| 00235 | 000000 | 74 | VA | DATA | 0 | TRUE AIRSPEED. KNOTS AT B10 |
| 00236 | 000000 | 75 | RNS | DATA | 0 | N-S RADIUS N.MI. AT B12 |
| 00237 | 000000 | 76 | REW | DATA | 0 | E-W RADIUS |
| 00240 | 000000 | 77 | RE | DATA | 0 | EARTH RADIUS |
| 00241 | 000000 | 78 | RLAT | DATA | 0 | (RNS+H) |
| 00242 | 000000 | 79 | RLNG | DATA | 0 | (REW+H)*COS(LATS) |
| 00243 | 000000 | 80 | SLATS | DATA | 0 | SIN(LATS) B1 |
| 00244 | 000000 | 81 | CLATS | DATA | 0 | COS |
| 00245 | 000000 | 82 | STHETI | DATA | 0 | SIN(THETAI) B1 |
| 00246 | 000000 | 83 | CTHETI | DATA | 0 | COS |
| 00247 | 000000 | 84 | CLATI | DATA | 0 | COS(LATI) B1 (GEOCENTRIC) |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 00250 | 000000 | 85 | XM | DATA | 0 | MAP X N.MI. AT B9 |
| 00251 | 000000 | 86 | YM | DATA | 0 | Y |
| 00252 | 000000 | 87 | XC | DATA | 0 | MAP X CMD. RADS AT PI |
| 00253 | 000000 | 88 | YC | DATA | 0 | MAP Y CMD. |
| 00254 | 000000 | 89 | RHO | DATA | 0 | RSI RHO N.MI. AT B8 |
| 00255 | 000000 | 90 | OFFSET | DATA | 0 | TRACK OFFSET B12 |
| 00256 | 000000 | 91 | D | DATA | 0 | D=RHO OR FILTERED RHO. N.MI. B8. |
| 00257 | 000000 | 92 | INTD | DATA | 0 | INTEGRAL OF D. N.MI.-SECS AT B8. |
| 00260 | 000000 | 93 | DID | DATA | 0 | DISTANCE I TO D. N.MI. AT B12. |
| 00261 | 000000 | 94 | DIA | DATA | 0 | DISTANCE I TO A/C. N.MI. AT B12. |
| 00262 | 000000 | 95 | RS1 | DATA | 0 | VORTAC 1 SLANT RANGE. N.MI. AT B12 |
| 00263 | 000000 | 96 | RS2 | DATA | 0 | VORTAC 2 SLANT RANGE. |
| 00264 | 000000 | 97 | Q1 | DATA | 0 | FILTER WEIGHT VORTAC 1 |
| 00265 | 000000 | 98 | Q2 | DATA | 0 | FILTER WEIGHT VORTAC 2 |
| 00266 | 000000 | 99 | SMQ | DATA | 0 | VORTAC CYCS/WIND CYC. |
| 00267 | 000000 | 100 | DTDR | DATA | 0 | DEAD RECKON TIME. (VORTAC CYCS AT B17) |
| 00270 | 000000 | 101 | DEL | DATA | 0 | LOCAL MAG VARIATION. RADS AT PI |
| 00271 | 000000 | 102 | DSTCMD | DATA | 0 | DEST COMMAND |
| 00272 | 000000 | 103 | DSTINP | DATA | 0 | DEST INPUT |
| 00273 | 000000 | 104 | DSTMR | DATA | 0 | DEST TIMER |
| 00274 | 000000 | 105 | RDRQST | DATA | 0 | READOUT REQUEST |
| 00275 | 000000 | 106 | GDSP | DATA | 0 | GROUND SPEED. KNOTS AT B11. |
| 00276 | 000000 | 107 | DIST | DATA | 0 | A/C TO DEST DISTANCE. N.MI. AT B12. |
| 00277 | 000000 | 108 | ETE | DATA | 0 | EST TIME ENROUTE. MINS AT B9. |
| 00300 | 000000 | 109 | SXR1 | DATA | 0 | SAVE XR1 |
| 00301 | 000000 | 110 | SXR2 | DATA | 0 | SAVE XR2 |
| 00302 | 000000 | 111 | TSX | DATA | 0 | |
| 00303 | 000000 | 112 | MAPXR | DATA | 0 | MAP INDEX |
| 00304 | 000000 | 113 | RC | DATA | 0 | MAP CENTER RADIUS. N.MI. AT B13. |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 00305 | 000000 | 114 | LNGC | DATA | 0 | MAP CENTER LONG. RADS AT PI |
| 00306 | 000000 | 115 | S | DATA | 0 | MAP SCALE FACTOR. |
| 00307 | 000000 | 116 | THETI | DATA | 0 | GND TRACK BRG ANGLE AT I. RADS AT PI. |
| 00310 | 000000 | 117 | C11 | DATA | 0 | XFORMATION MATRIX ELEMENTS.B1 |
| 00311 | 000000 | 118 | C12 | DATA | 0 | |
| 00312 | 000000 | 119 | C13 | DATA | 0 | |
| 00313 | 000000 | 120 | C21 | DATA | 0 | |
| 00314 | 000000 | 121 | C22 | DATA | 0 | |
| 00315 | 000000 | 122 | C23 | DATA | 0 | |
| 00316 | 000000 | 123 | C31 | DATA | 0 | |
| 00317 | 000000 | 124 | C32 | DATA | 0 | |
| 00320 | 000000 | 125 | C33 | DATA | 0 | |
| 00321 | 000000 | 126 | VORSC | DATA | 0 | VORTAC SHIFT COUNTER |
| 00322 | 000000 | 127 | WNDSC | DATA | 0 | WIND SHIFT COUNTER |
| 00323 | 000000 | 128 | RDSC | DATA | 0 | READOUT SHIFT COUNTER |
| 00324 | 000000 | 129 | HDGFLC | DATA | 0 | HEADING FAIL COUNTER |
| 00325 | 000000 | 130 | ADCFLC | DATA | 0 | AIR DATA COMP FAIL COUNTER |
| 00326 | 000000 | 131 | DSCWD1 | DATA | 0 | DISCRETE WORD 1 |
| 00327 | 000000 | 132 | DSCWD2 | DATA | 0 | DISCRETE WORD 2 |
| 00330 | 000000 | 133 | DOWD2 | DATA | 0 | DO WORD 2 |
| | | 134 | * | | FLAGS | |
| 00331 | 000000 | 135 | NABF | DATA | 0 | NOT AIRBORNE FLAG |
| 00332 | 000000 | 136 | IVF1 | DATA | 0 | VORTAC 1 INVALID FLAG |
| 00333 | 000000 | 137 | IVF2 | DATA | 0 | VORTAC 2 INVALID FLAG |
| 00334 | 000000 | 138 | UNRF | DATA | 0 | FILTER CORRECTION UNREASONABLE FLAG |
| 00335 | 000000 | 139 | DRF | DATA | 0 | DEAD RECKON FLAG |
| 00336 | 000000 | 140 | CCHF | DATA | 0 | CHART CHANGE FLAG |
| 00337 | 000000 | 141 | SPCHF | DATA | 0 | SPECIAL CHART FLAG |
| 00340 | 000000 | 142 | SVF | DATA | 0 | START PT VALID FLAG |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 00341 | 000000 | 143 | DVF | DATA | 0 | DEST VALID FLAG |
| 00342 | 000000 | 144 | DEF | DATA | 0 | DEST ENTERED FLAG |
| 00343 | 000000 | 145 | DVF1 | DATA | 0 | DEST 1 VALID FLAG |
| 00344 | 000000 | 146 | DVF2 | DATA | 0 | DEST 2 |
| 00345 | 000000 | 147 | DVF3 | DATA | 0 | DEST 3 |
| 00346 | 000000 | 148 | DVF4 | DATA | 0 | DEST 4 |
| 00347 | 000000 | 149 | DKMDF | DATA | 0 | DARK MODE FLAG |
| 00350 | 000000 | 150 | STCKF | DATA | 0 | SELF TEST CHECK FLAG |
| 00351 | 000000 | 151 | STRF | DATA | 0 | STEERING FLAG |
|  |  | 152 | * |  |  |  |
| 00400 |  | 153 |  | ORIGIN | 0400 |  |
|  |  | 154 | * |  | ANALOG INPUTS |  |
| 00400 | 000000 | 155 | SGAM1 | DATA | 0 | VORTAC 1 BRG. SIN |
| 00401 | 000000 | 156 | CGAM1 | DATA | 0 | COS |
| 00402 | 000000 | 157 | S1RU1 | DATA | 0 | DME 1 UNITS. SIN(RU1) |
| 00403 | 000000 | 158 | S2RU1 | DATA | 0 | SIN(RU1+120) |
| 00404 | 000000 | 159 | S1RT1 | DATA | 0 | DME 1 TENS |
| 00405 | 000000 | 160 | S2RT1 | DATA | 0 |  |
| 00406 | 000000 | 161 | S1RH1 | DATA | 0 | DME 1 HUNDS |
| 00407 | 000000 | 162 | S2RH1 | DATA | 0 |  |
| 00410 | 000000 | 163 | SGAM2 | DATA | 0 | VORTAC 2 BRG. SIN |
| 00411 | 000000 | 164 | CGAM2 | DATA | 0 | COS |
| 00412 | 000000 | 165 | S1RU2 | DATA | 0 | DME 2 UNITS. SIN(RU2) |
| 00413 | 000000 | 166 | S2RU2 | DATA | 0 | SIN(RU2+120) |
| 00414 | 000000 | 167 | S1RT2 | DATA | 0 | DME 2 TENS |
| 00415 | 000000 | 168 | S2RT2 | DATA | 0 |  |
| 00416 | 000000 | 169 | S1RH2 | DATA | 0 | DME 2 HUNDS |
| 00417 | 000000 | 170 | S2RH2 | DATA | 0 |  |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 00420 | 000000 | 171 | S1PSIM | DATA | 0 | A/C MAG HDG. SIN(PSIM) |
| 00421 | 000000 | 172 | S2PSIM | DATA | 0 | A/C MAG HDG. SIN(PSIM+120) |
| 00422 | 000000 | 173 | S1HHI | DATA | 0 | ALTIMETER HI SPEED SHAFT. SIN(HHI) |
| 00423 | 000000 | 174 | S2HHI | DATA | 0 | SIN(HHI+120) |
| 00424 | 000000 | 175 | S1HLO | DATA | 0 | ALTIMETER LO SPEED SHAFT. SIN(HLO) |
| 00425 | 000000 | 176 | S2HLO | DATA | 0 | SIN(HLO+120) |
| 00426 | 000000 | 177 | S1VA | DATA | 0 | TRUE AIRSPEED SIN(VA) |
| 00427 | 000000 | 178 | S2VA | DATA | 0 | SIN(VA+120) |
| 00430 | 000000 | 179 | SXFB | DATA | 0 | MAP X FEEDBACK. SIN |
| 00431 | 000000 | 180 | CXFB | DATA | 0 | COS |
| 00432 | 000000 | 181 | SYFB | DATA | 0 | MAP Y FEEDBACK. SIN |
| 00433 | 000000 | 182 | CYFB | DATA | 0 | COS |
| 00434 | 000000 | 183 | PSINL | DATA | 0 | HDG SERVO NULL |
| 00435 | 000000 | 184 | PSICNL | DATA | 0 | CMD HDG NULL |
| 00436 | 000000 | 185 | DELNL | DATA | 0 | COMPASS ROSE NULL |
| 00437 | 000000 | 186 | LDMUNL | DATA | 0 | MAP HDG NULL |
| 00440 | 000000 | 187 | THETNL | DATA | 0 | RSI BRG NULL |
| 00441 | 000000 | 188 | RHONL | DATA | 0 | RSI RHO NULL |
| 00442 | 000000 | 189 | | DATA | 0 | AI SPARES |
| 00443 | 000000 | 190 | | DATA | 0 | |
| 00444 | 000000 | 191 | | DATA | 0 | |
| 00445 | 000000 | 192 | | DATA | 0 | |
| 00446 | 000000 | 193 | | DATA | 0 | |
| 00447 | 000000 | 194 | | DATA | 0 | |
| | | 195 | * | | | ANALOG OUTPUTS |
| 00450 | 000000 | 196 | SPSIO | DATA | 0 | A/C HDG OUTPUT. SIN AT B1. |
| 00451 | 000000 | 197 | CPSIO | DATA | 0 | COS AT B1. |
| 00452 | 000000 | 198 | SPSICO | DATA | 0 | CMD HDG |
| 00453 | 000000 | 199 | CPSICO | DATA | 0 | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 00454 | 000000 | 200 | SDELO | DATA | 0 | COMPASS ROSE |
| 00455 | 000000 | 201 | CDELO | DATA | 0 | |
| 00456 | 000000 | 202 | SLDMUO | DATA | 0 | MAP HDG |
| 00457 | 000000 | 203 | CLDMUO | DATA | 0 | |
| 00460 | 000000 | 204 | STHETO | DATA | 0 | RSI BRG |
| 00461 | 000000 | 205 | CTHETO | DATA | 0 | |
| 00462 | 000000 | 206 | SRHOO | DATA | 0 | RSI RHO |
| 00463 | 000000 | 207 | CRHOO | DATA | 0 | |
| 00464 | 000000 | 208 | SXCO | DATA | 0 | MAP X CMD |
| 00465 | 000000 | 209 | CXCO | DATA | 0 | |
| 00466 | 000000 | 210 | SYCO | DATA | 0 | MAP Y CMD |
| 00467 | 000000 | 211 | CYCO | DATA | 0 | |
| 00470 | 000000 | 212 | | DATA | 0 | AO SPARES |
| 00471 | 000000 | 213 | | DATA | 0 | |
| 00472 | 000000 | 214 | | DATA | 0 | |
| 00473 | 000000 | 215 | | DATA | 0 | |
| 00474 | 000000 | 216 | | DATA | 0 | |
| 00475 | 000000 | 217 | | DATA | 0 | |
| 00476 | 000000 | 218 | APO | DATA | 0 | AUTO-PILOT OUTPUT |
| 00477 | 000000 | 219 | BSTRF | DATA | 0 | BOOTSTRAP FLAG |
| | | 220 | * | | VARIABLES BEFORE OUTPUT | |
| 00500 | 000000 | 221 | SPSI | DATA | 0 | A/C HDG. SIN AT B1. |
| 00501 | 000000 | 222 | CPSI | DATA | 0 | COS AT B1. |
| 00502 | 000000 | 223 | SPSIC | DATA | 0 | CMD HDG |
| 00503 | 000000 | 224 | CPSIC | DATA | 0 | |
| 00504 | 000000 | 225 | SDEL | DATA | 0 | DELTA (COMPASS ROSE) |
| 00505 | 000000 | 226 | CDEL | DATA | 0 | |
| 00506 | 000000 | 227 | SLDMU | DATA | 0 | MAP HDG |
| 00507 | 000000 | 228 | CLDMU | DATA | 0 | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 00510 | 000000 | 229 | STHET | DATA | 0 | RSI BRG |
| 00511 | 000000 | 230 | CTHET | DATA | 0 | |
| 00512 | 000000 | 231 | | DATA | 0 | |
| 00513 | 000000 | 232 | | DATA | 0 | |
| 00514 | 000000 | 233 | | DATA | 0 | |
| 00515 | 000000 | 234 | | DATA | 0 | |
| 00516 | 000000 | 235 | PHIC | DATA | 0 | COMPUTED ROLL CMD. DEGS. AT B11 |
| 00517 | 000000 | 236 | PHICO | DATA | 0 | OUTPUT ROLL CMD. DEGS. AT B11 |
| | | 237 | * | | | |
| 00700 | | 238 | | ORIGIN | 0700 | |
| | | 239 | * | | SUB ROUT ENTRANCES | |
| 00700 | 000000 | 240 | SINCOS | DATA | 0 | |
| 00701 | 006000 | 241 | | DATA | SICO1 | |
| 00702 | 000000 | 242 | ARCTAN | DATA | 0 | |
| 00703 | 006034 | 243 | | DATA | ARTAN1 | |
| 00704 | 000000 | 244 | INPCON | DATA | 0 | INPUT CONVERSION |
| 00705 | 006110 | 245 | | DATA | INPCN1 | |
| 00706 | 000000 | 246 | SQRT | DATA | 0 | |
| 00707 | 006122 | 247 | | DATA | SQRT1 | |
| 00710 | 000000 | 248 | BCDBN | DATA | 0 | BCD TO BINARY |
| 00711 | 006156 | 249 | | DATA | BCDBN1 | |
| 00712 | 000000 | 250 | BNBCD | DATA | 0 | BINARY TO BCD |
| 00713 | 006173 | 251 | | DATA | BNBCD1 | |
| 00714 | 000000 | 252 | SCSUM | DATA | 0 | SIN,COS (SUM) |
| 00715 | 006214 | 253 | | DATA | SCSUM1 | |
| 00716 | 000000 | 254 | SCDIFF | DATA | 0 | SIN,COS (DIFF) |
| 00717 | 006216 | 255 | | DATA | SCSUM2 | |
| 00720 | 000000 | 256 | RNG | DATA | 0 | RANGE (DME) |
| 00721 | 006242 | 257 | | DATA | RNG1 | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 00722 | 000000 | 258 | MAG | DATA | 0 | MAGNITUDE |
| 00723 | 006305 | 259 | | DATA | MAG1 | |
| 00724 | 000000 | 260 | HORZ | DATA | 0 | HORIZONTAL RANGE |
| 00725 | 006333 | 261 | | DATA | MAG4 | |
| 00726 | 000000 | 262 | LAMGT | DATA | 0 | LAMBERT GROUND TRACK |
| 00727 | 006340 | 263 | | DATA | LAMGT1 | |
| 00730 | 000000 | 264 | XMTX | DATA | 0 | RELOCATED SYST XFORMATION MATRIX |
| 00731 | 006404 | 265 | | DATA | XMTX1 | |
| 00732 | 000000 | 266 | GCSC | DATA | 0 | GEOCENTRIC SINE-COSINE |
| 00733 | 006473 | 267 | | DATA | GCSC1 | |
| 00734 | 000000 | 268 | VXFRM | DATA | 0 | VECTOR XFORMATION |
| 00735 | 006511 | 269 | | DATA | VXFRM1 | |
| 00736 | 000000 | 270 | RELOC | DATA | 0 | RELOCATED COORDS |
| 00737 | 006551 | 271 | | DATA | RELOC1 | |
| 00740 | 000000 | 272 | MINMP | DATA | 0 | MATRIX INVERSE MULTIPLY |
| 00741 | 006627 | 273 | | DATA | MINMP1 | |
| 00742 | 000000 | 274 | MAP | DATA | 0 | CHART ROUTINE |
| 00743 | 006646 | 275 | | DATA | MAP1 | |
| 00744 | 000000 | 276 | GTPTC | DATA | 0 | GROUND TRACK PTC |
| 00745 | 006745 | 277 | | DATA | GTPTC1 | |
| 00746 | 000000 | 278 | RVSLT | DATA | 0 | LAMBERT R VS LAT |
| 00747 | 006765 | 279 | | DATA | RVSLT1 | |
| 00750 | 000000 | 280 | PTC | DATA | 0 | POLAR TO CARTESIAN. |
| 00751 | 007000 | 281 | | DATA | PTC1 | |
| 00752 | 000000 | 282 | CTP | DATA | 0 | CARTESIAN TO POLAR. |
| 00753 | 007022 | 283 | | DATA | CTP1 | |
| 00754 | 000000 | 284 | ZELAY | DATA | 0 | FOR DELAYS |
| 00755 | 007070 | 285 | | DATA | ZELAY1 | |
| 00756 | 000000 | 286 | FAIL | DATA | 0 | FAILURE DETECTED |
| 00757 | 007100 | 287 | | DATA | FAIL1 | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| | | 288 | * | | | |
| 01000 | | 289 | | ORIGIN | 01000 | |
| | | 290 | * | | CONSTANTS | |
| 01000 | 000000 | 291 | KZ | DATA | 00 | |
| 01001 | 000001 | 292 | K1B17 | DATA | 01 | |
| 01002 | 000002 | 293 | K2B17 | DATA | 02 | |
| 01003 | 000003 | 294 | K3B17 | DATA | 03 | |
| 01004 | 000004 | 295 | K4B17 | DATA | 04 | |
| 01005 | 000005 | 296 | K5B17 | DATA | 05 | |
| 01006 | 000006 | 297 | K6B17 | DATA | 06 | |
| 01007 | 000007 | 298 | K7B17 | DATA | 07 | |
| 01010 | 000010 | 299 | K1B14 | DATA | 0000010 | |
| 01011 | 000020 | 300 | K1B13 | DATA | 0000020 | |
| 01012 | 000040 | 301 | K1B12 | DATA | 0000040 | |
| 01013 | 000100 | 302 | K1B11 | DATA | 0000100 | |
| 01014 | 000200 | 303 | K1B10 | DATA | 0000200 | |
| 01015 | 000400 | 304 | K1B9 | DATA | 0000400 | |
| 01016 | 001000 | 305 | K1B8 | DATA | 0001000 | |
| 01017 | 002000 | 306 | K1B7 | DATA | 0002000 | |
| 01020 | 004000 | 307 | K1B6 | DATA | 0004000 | |
| 01021 | 010000 | 308 | K1B5 | DATA | 0010000 | |
| 01022 | 020000 | 309 | K1B4 | DATA | 0020000 | |
| 01023 | 040000 | 310 | K1B3 | DATA | 0040000 | |
| 01024 | 100000 | 311 | K1B2 | DATA | 0100000 | |
| 01025 | 200000 | 312 | K1B1 | DATA | 0200000 | |
| 01026 | 300000 | 313 | K3B2 | DATA | 0300000 | 3/4 |
| 01027 | 377777 | 314 | PMAX | DATA | 0377777 | POSITIVE MAXIMUM. |
| 01030 | 400001 | 315 | NMAX | DATA | 0400001 | NEGATIVE MAXIMUM. |
| 01031 | 400000 | 316 | MS | DATA | 0400000 | MINUS SIGN. |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 01032 | 121372 | 317 | K1DPI | DATA | 41722 | I/PI AT BO |
| 01033 | 222100 | 318 | KS1 | DATA | 74816 | +.570794852 BO FOR SIN-COS. |
| 01034 | 532512 | 319 | KS3 | DATA | -84662 | -.645920978 BO |
| 01035 | 121312 | 320 | KS5 | DATA | 41674 | +.079487663 B-2 |
| 01036 | 756103 | 321 | KS7 | DATA | -9149 | -.004362476 B-4 |
| 01037 | 121364 | 322 | KA1 | DATA | 41716 | +.3182672 BO FOR ARCTAN |
| 01040 | 745053 | 323 | KA3 | DATA | -13781 | -.1051376 BO |
| 01041 | 016535 | 324 | KA5 | DATA | 7517 | +.0573407 BO |
| 01042 | 771040 | 325 | KA7 | DATA | -3552 | -.0270987 BO |
| 01043 | 001546 | 326 | KA9 | DATA | 870 | +.0066320 BO |
| 01044 | 322051 | 327 | KAR | DATA | 107561 | 6722.58 B13 FOR PTC. R VS LAT |
| 01045 | 462726 | 328 | KBR | DATA | -105002 | -4177.92*(PI) AT B14 |
| 01046 | 257462 | 329 | KCR | DATA | 89906 | 1138.68*(PI)**2 AT B14 |
| 01047 | 566516 | 330 | KDR | DATA | -70322 | -567.003*(PI)**3 AT B15 |
| 01050 | 241320 | 331 | L | DATA | 82640 | MAP COMPRESSION CONST. 0.6304965 |
| 01051 | 202463 | 332 | KAL | DATA | 66867 | 1.602683/PI FOR CTP LAT VS R |
| 01052 | 720560 | 333 | KBL | DATA | -24208 | -.708286E-04/PI AT B-13 |
| 01053 | 561620 | 334 | KCL | DATA | -72816 | -.520138E-07/PI AT B-25 |
| 01054 | 133011 | 335 | KDL | DATA | 46601 | .406348E-11/PI AT B-38 |
| 01055 | 265012 | 336 | KS45 | DATA | 92682 | SIN(45) AT BO |
| 01056 | 335550 | 337 | KS120 | DATA | 113512 | SIN(120) AT BO |
| 01057 | 000012 | 338 | K10B17 | DATA | 10 | |
| 01060 | 001750 | 339 | K1KB17 | DATA | 1000 | |
| 01061 | 330000 | 340 | K27B5 | DATA | 0330000 | ALTIMETER GEAR RATIO |
| 01062 | 234200 | 341 | KHSF | DATA | 80000 | ALTIMETER S.F. 5000 FT/REV(FINE).B13 |
| 01063 | 175000 | 342 | KVSF | DATA | 64000 | AIRSPEED S.F. 500 KNTS/180 DEG. B10 |
| 01064 | 062000 | 343 | KVB | DATA | 25600 | AIRSPEED BIAS 200 KNTS. B10 |
| 01065 | 034600 | 344 | KVST | DATA | 14720 | STALL SPEED.(AIRBORNE THRESHOLD) 115KT |
| 01066 | 240000 | 345 | K10B4 | DATA | 0240000 | DME GEAR RATIO |

3,652,836

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 01067 | 012000 | 346 | KRSF | DATA | 5120 | DME S.F. 10 N.MI./REV. B8 |
| 01070 | 006200 | 347 | KHUND | DATA | 3200 | 100 N.MI. AT B12 |
| 01071 | 014300 | 348 | KRUL | DATA | 6336 | DME U.L. 198 N.MI. B12 |
| 01072 | 000240 | 349 | KDPAD | DATA | 160 | DEST PAD. 5 N.MI. AT B12 |
| 01073 | 000240 | 350 | KIPAD | DATA | 160 | START PAD. 5 N.MI. AT B12 |
| 01074 | 276003 | 351 | KNMI | DATA | 97283 | 6080.2 FT/NMI. B13 |
| 01075 | 074000 | 352 | K60B8 | DATA | 30720 | 60 MIN/HR |
| 01076 | 100000 | 353 | KTR | DATA | 0100000 | TURN RATE CONST. (90DEG/MIN/180) B1 |
| 01077 | 000400 | 354 | KQ1 | DATA | 256 | SINGLE STA Q GAIN. 8 AT B12 |
| 01100 | 000552 | 355 | KQ2 | DATA | 362 | DOUBLE STA Q GAIN. 1.4*8 AT B12 |
| 01101 | 314632 | 356 | KQLIM | DATA | 104858 | Q LIMIT. 0.8 AT B0 |
| 01102 | 141160 | 357 | DELT | DATA | 49776 | MINOR CYCLE TIME (HRS)/PI AT B-13. |
| 01103 | 004416 | 358 | TAU2 | DATA | 2318 | WND SMOOTHING CONST. HRS/PI B1. 400SEC |
| 01104 | 000671 | 359 | EPS | DATA | 441 | EARTH ELLIPTICITY. 1/297 B0 |
| 01105 | 327067 | 360 | A | DATA | 110135 | EARTH SEMI-MAJOR AXIS. 3441.734 B12 |
| 01106 | 004573 | 361 | KSTLIM | DATA | 2427 | STATION I.D. AMBG. LIMIT. 200 ARC MINS |
| 01107 | 000075 | 362 | KDSLIM | DATA | 61 | FILTER CORRECTION LIMIT. 5 ARC MINS |
| 01110 | 004211 | 363 | KGCLIM | DATA | 2185 | GREAT CIRCLE G.T. LIMIT. 180 ARC MINS |
| 01111 | 002400 | 364 | KDWLIM | DATA | 1280 | WIND CHANGE LIMIT. 20 KNOTS |
| 01112 | 060000 | 365 | WUL | DATA | 24576 | WIND LIMIT AT HUL. 384 KNOTS |
| 01113 | 012000 | 366 | WLL | DATA | 5120 | WIND LIMIT AT SL. 80 KNOTS |
| 01114 | 210560 | 367 | HUL | DATA | 70000 | ALT FOR WUL. 35K FT |
| 01115 | 253077 | 368 | KX | DATA | 87615 | X SERVO S.F. RADS/IN/PI AT B1. |
| 01116 | 240000 | 369 | KY | DATA | 81920 | Y |
| 01117 | 261616 | 370 | KRHO | DATA | 91022 | RHO B2. |
| 01120 | 325253 | 371 | XLIM | DATA | 109227 | X OFF CHART LIMIT. (150 DEG) |
| 01121 | 152525 | 372 | YLIM | DATA | 54613 | Y OFF CHART LIMIT. (75 DEG) |
| 01122 | 131463 | 373 | RHOLIM | DATA | 45875 | RHO OFF CHART LIMIT. (63 DEG) |
| 01123 | 001330 | 374 | RHOTHR | DATA | 728 | RHO THRESHOLD ( 1 DEG) |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 01124 | 361616 | 375 | EPSLIM | DATA | 123790 | EPSX LIMIT. (170 DEG) |
| 01125 | 035500 | 376 | SLO | DATA | 15168 | LO ALT MAP S.F. 118.5 NMI/IN B10 |
| 01126 | 130700 | 377 | SMD | DATA | 45504 | MED ALT MAP S.F. 355.5 NMI/IN B10 |
| 01127 | 261600 | 378 | SHI | DATA | 91008 | HI ALT MAP S.F. 711. NMI/IN B10 |
| 01130 | 000140 | 379 | K3MI | DATA | 96 | 3 MILE OFFSET B12 |
| 01131 | 000240 | 380 | K5MI | DATA | 160 | 5 |
| 01132 | 000500 | 381 | K10MI | DATA | 320 | 10 |
| 01133 | 000400 | 382 | K1MIN | DATA | 0000400 | 1 MINUTE AT B9 |
| 01134 | 002400 | 383 | K5MIN | DATA | 0002400 | 5 MINUTES AT B9 |
| 01135 | 154000 | 384 | KH | DATA | 55296 | OUTER LOOP STEERING GAIN. 27 B6 |
| 01136 | 156664 | 385 | KLM1 | DATA | 56756 | SIN(INTERCEPT ANGLE) .866 B1 |
| 01137 | 046315 | 386 | KLM2 | DATA | 19661 | ON COURSE THRESHOLD .300 B1 |
| 01140 | 003100 | 387 | KPCLM1 | DATA | 1600 | ROLL CMD LIMIT-OFF COURSE 25 DEGS B11 |
| 01141 | 000700 | 388 | KPCLM2 | DATA | 448 | ROLL CMD LIMIT-ON COURSE 7 DEGS B11 |
| 01142 | 221727 | 389 | KG1 | DATA | 74711 | ROLL CMD GAIN -OFF COURSE .57 DEGS/KT |
| 01143 | 221727 | 390 | KG2 | DATA | 74711 | ROLL CMD GAIN -ON COURSE .57 DEGS/KT |
| 01144 | 000500 | 391 | KDPCLM | DATA | 320 | MAX ROLL CMD CHANGE/ CYCLE 5 DEGS B11 |
| 01145 | 031463 | 392 | KQD | DATA | 13107 | D FILTER GAIN. 0.1 B0 |
| 01146 | 004234 | 393 | RNGAMB | DATA | VRTC4+2 | RANGE AMBIGUOUS SPECIAL EXIT. |
| 01147 | 004512 | 394 | LINK1 | DATA | WND4 | |
| 01150 | 000016 | 395 | LINK2 | DATA | CSTEST | |
| 01151 | 007106 | 396 | LINK3 | DATA | STR | |
| 01152 | 005367 | 397 | LINK4 | DATA | CON | |
| 01153 | 000000 | 398 | LINK5 | DATA | 0 | SPARES |
| 01154 | 000000 | 399 | LINK6 | DATA | 0 | |
| 01155 | 000000 | 400 | LINK7 | DATA | 0 | |
| 01156 | 000500 | 401 | K1XR | DATA | SPSI | |
| 01157 | 000510 | 402 | K2XR | DATA | STHET | |
| 01160 | 000011 | 403 | K3XR | DATA | 011 | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 01161 | 000014 | 404 | K4XR | DATA | 014 | |
| 01162 | 002064 | 405 | K5XR | DATA | LATST1-1 | |
| 00163 | 000245 | 406 | K6XR | DATA | STHETI | |
| 01164 | 000160 | 407 | K7XR | DATA | TS0 | |
| 01165 | 000170 | 408 | K8XR | DATA | TS10 | |
| 01166 | 000177 | 409 | K9XR | DATA | 0177 | |
| 01167 | 760000 | 410 | MASK1 | DATA | 0760000 | |
| 01170 | 300000 | 411 | MASK2 | DATA | 0300000 | |
| 01171 | 060000 | 412 | MASK3 | DATA | 0060000 | |
| 01172 | 377770 | 413 | MASK4 | DATA | 0377770 | |
| 01173 | 000036 | 414 | MASK5 | DATA | 0000036 | |
| 0001010 | | 415 | K8B17 | EQU | K1B14 | |
| 0000160 | | 416 | TSSIN | EQU | TS0 | |
| 0000161 | | 417 | TSCOS | EQU | TS1 | |
| 0000200 | | 418 | LATDR | EQU | LAT | D.R. LAT. A/C POS BTWN VRTC CYCS. |
| 0000201 | | 419 | LNGDR | EQU | LNG | D.R. LONG. |
| 0000200 | | 420 | LATS | EQU | LAT | SMOOTHED LAT. A/C POS END OF VRTC CYC. |
| 0000201 | | 421 | LNGS | EQU | LNG | SMOOTHED LONG. |
| 0000017 | | 422 | DRSTF | EQU | XRDIDF | DEST RESET FLAG |
| 0000330 | | 423 | DOWD | EQU | DOWD2 | |
| 0000174 | | 424 | RI | EQU | TS14 | LAMBERT R AT I. B13 |
| | | 425 | * | | | |
| | | 426 | * | | | FLIGHT PROGRAM INITIALIZER ROUTINE |
| | | 427 | * | | | |
| 01174 | 440000 | 428 | BEGIN | LGI | 000 | SET GROUP REG=0 |
| 01175 | 701477 | 429 | | LII | 077 | I/O AND D.F. INTERUPTS DISABLED |
| 01176 | 041000 | 430 | | LAR | KZ | 0 TO A |
| 01177 | 141025 | 431 | | LQR | K1B1 | 1/2 TO Q (FS A0 OUTPUT) |
| 01200 | 640464 | 432 | | STO | SXCO | MAP X CMD=0 DEG |
| 01201 | 220465 | 433 | | SQR | CXCO | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 01202 | 640466 | 434 | | STO | SYCO | MAP Y CMD=0 DEG |
| 01203 | 220467 | 435 | | SQR | CYCO | |
| 01204 | 640476 | 436 | | STO | APO | 0 TO AUTO PILOT |
| 01205 | 700000 | 437 | | DOA | 00 | SYST FAIL OFF |
| 01206 | 700002 | 438 | | DOA | 02 | READ OUT TO 0 |
| 01207 | 665166 | 439 | | LXR | K9XR,1 | |
| 01210 | 644200 | 440 | | STO | LAT,1 | ZERO FLT PROG VARS |
| 01211 | 545210 | 441 | | BXD | $-1,1 | |
| 01212 | 671160 | 442 | | LXR | K3XR,2 | I.C.'VARS BEFORE OUTPUT' |
| 01213 | 230500 | 443 | | SQR | SPSI,2 | 1B1 TO COS |
| 01214 | 551215 | 444 | | BXD | $+1,2 | |
| 01215 | 650500 | 445 | | STO | SPSI,2 | 0 TO SIN |
| 01216 | 551213 | 446 | | BXD | $-3,2 | |
| 01217 | 640516 | 447 | | STO | PHIC | ROLL CMD=0 |
| 01220 | 640517 | 448 | | STO | PHICO | |
| 01221 | 041016 | 449 | | LAR | K1B8 | |
| 01222 | 640323 | 450 | | STO | RDSC | I.C. READOUT COUNTER |
| 01223 | 220330 | 451 | | SQR | DOWD2 | I.C. DOWD2 (NO POS BIT IN) |
| 01224 | 041031 | 452 | | LAR | MS | |
| 01225 | 640331 | 453 | | STO | NABF | |
| 01226 | 640017 | 454 | | STO | DRSTF | |
| 01227 | 040330 | 455 | BEGIN1 | LAR | DOWD2 | |
| 01230 | 700001 | 456 | | DOA | 001 | ISSUE DO WORD2. |
| 01231 | 502742 | 457 | | BSE* | MAP | TO MAP ROUT. LOOK FOR CHART CHANGE. |
| 01232 | 040327 | 458 | | LAR | DSCWD2 | |
| 01233 | 240001 | 459 | | LLS | 1 | |
| 01234 | 341236 | 460 | | BMI | $+2 | - IS A/C PRES POS ENTRY |
| 01235 | 301227 | 461 | | BRU | BEGIN1 | |
| 01236 | 041000 | 462 | | LAR | KZ | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 01237 | 640330 | 463 | | STO | DOWD2 | REMOVE NO POS BIT |
| 01240 | 700001 | 464 | | DOA | 001 | ACKNOWLEDGE INPUT |
| 01241 | 675000 | 465 | | LXR | KZ,3 | |
| 01242 | 502752 | 466 | | BSE* | CTP | CONV MAP X,Y TO LAT,LNG |
| 01243 | 720402 | 467 | | DIA | 002 | CLEAR REAL TIME CLOCK |
| 01244 | 701610 | 468 | | LII | 0210 | ENABLE I/O INTERUPT |
| 01245 | 303147 | 469 | | BRU* | LINK1 | EXIT TO MAIN FLT PROG. |
| | | 470 | * | | | |
| | | 471 | * | | GROUP 1 | |
| | | 472 | * | | | |
| 02000 | | 473 | | ORIGIN | 02000 | |
| | | 474 | * | | | |
| | | 475 | * | | VORTAC TABLES. | |
| | | 476 | * | | | |
| | | 477 | * | | STATION FREQUENCIES | (2 OUT OF 5 CODE) |
| 02000 | 022250 | 478 | FST1 | DATA | 0022250 | VTU 108.2 MC |
| 02001 | 024610 | 479 | | DATA | 0024610 | PMD 114.5 |
| 02002 | 012610 | 480 | | DATA | 0012610 | FIM 112.5 |
| 02003 | 015210 | 481 | | DATA | 0015210 | LAX 113.6 |
| 02004 | 031410 | 482 | | DATA | 0031410 | LGB 115.7 |
| 02005 | 030310 | 483 | | DATA | 0030310 | OCN 115.3 |
| 02006 | 012250 | 484 | | DATA | 0012250 | ONT 112.2 |
| 02007 | 060450 | 485 | | DATA | 0060450 | SAN 117.8 |
| 02010 | 044510 | 486 | | DATA | 0044510 | POM 110.4 |
| 02011 | 050250 | 487 | | DATA | 0050250 | TRM 116.2 |
| 02012 | 024250 | 488 | | DATA | 0024250 | TNP 114.2 |
| 02013 | 031050 | 489 | | DATA | 0031050 | IPL 115.9 |
| 02014 | 061050 | 490 | | DATA | 0061050 | PKE 117.9 |
| 02015 | 060510 | 491 | | DATA | 0060510 | BLH 117.4 |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD | |
|---|---|---|---|---|---|---|---|
| 02016 | 050450 | 492 | | DATA | 0050450 | YUM | 116.8 |
| 02017 | 045210 | 493 | | DATA | 0045210 | BXK | 110.6 |
| 02020 | 051210 | 494 | | DATA | 0051210 | GBN | 116.6 |
| 02021 | 031210 | 495 | | DATA | 0031210 | PHX | 115.6 |
| 02022 | 060150 | 496 | | DATA | 0060150 | TUS | 117.1 |
| 02023 | 044510 | 497 | | DATA | 0044510 | CIE | 110.4 |
| 02024 | 024450 | 498 | | DATA | 0024450 | CZG | 114.8 |
| 02025 | 025110 | 499 | | DATA | 0025110 | JLI | 114.0 |
| 02026 | 022250 | 500 | | DATA | 0022250 | OLM | 108.2 |
| 02027 | 024610 | 501 | | DATA | 0024610 | ELP | 114.5 |
| 02030 | 012610 | 502 | | DATA | 0012610 | AUS | 112.5 |
| 02031 | 015210 | 503 | | DATA | 0015210 | TCC | 113.6 |
| 02032 | 031410 | 504 | | DATA | 0031410 | RBL | 115.7 |
| 02033 | 030310 | 505 | | DATA | 0030310 | SHR | 115.3 |
| 02034 | 012250 | 506 | | DATA | 0012250 | BAM | 112.2 |
| 02035 | 060450 | 507 | | DATA | 0060450 | BOY | 117.8 |
| 02036 | 050250 | 508 | | DATA | 0050250 | CPR | 116.2 |
| 02037 | 024250 | 509 | | DATA | 0024250 | CGT | 114.2 |
| 02040 | 031050 | 510 | | DATA | 0031050 | HOU | 115.9 |
| 02041 | 061050 | 511 | | DATA | 0061050 | RNO | 117.9 |
| 02042 | 060510 | 512 | | DATA | 0060510 | LRD | 117.4 |
| 02043 | 050450 | 513 | | DATA | 0050450 | SAT | 116.8 |
| 02044 | 045210 | 514 | | DATA | 0045210 | SAF | 110.6 |
| 02045 | 051210 | 515 | | DATA | 0051210 | PDX | 116.6 |
| 02046 | 031210 | 516 | | DATA | 0031210 | GAG | 115.6 |
| 02047 | 060150 | 517 | | DATA | 0060150 | AVE | 117.1 |
| 02050 | 024450 | 518 | | DATA | 0024450 | SIE | 114.8 |
| 02051 | 025110 | 519 | | DATA | 0025110 | BSR | 114.0 |
| 02052 | 050150 | 520 | | DATA | 0050150 | GMN | 116.1 |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD | |
|---|---|---|---|---|---|---|---|
| 02053 | 030510 | 521 | | DATA | 0030510 | BFL | 115.4 |
| 02054 | 012510 | 522 | | DATA | 0012510 | SBP | 112.4 |
| 02055 | 060610 | 523 | | DATA | 0060610 | FLW | 117.5 |
| 02056 | 050610 | 524 | | DATA | 0050610 | GVO | 116.5 |
| 02057 | 025050 | 525 | | DATA | 0025050 | SBA | 114.9 |
| 02060 | 050150 | 526 | | DATA | 0050150 | HUO | 116.1 |
| 02061 | 030510 | 527 | | DATA | 0030510 | SSO | 115.4 |
| 02062 | 012510 | 528 | | DATA | 0012510 | GJT | 112.4 |
| 02063 | 050610 | 529 | | DATA | 0050610 | SUX | 116.5 |
| 02064 | 025050 | 530 | | DATA | 0025050 | GUX | 114.9 |
| | | 531 | * | | STATION LATITUDES. | DEGREES/180 (+ NORTH) | |
| 02065 | 060412 | 532 | LATST1 | DATA | 24842 | VTU | 34-06-54 |
| 02066 | 061202 | 533 | | DATA | 25218 | PMD | 34-37-53 |
| 02067 | 060672 | 534 | | DATA | 25018 | FIM | 34-21-24 |
| 02070 | 060205 | 535 | | DATA | 24709 | LAX | 33-55-59 |
| 02071 | 060030 | 536 | | DATA | 24600 | LGV | 33-47-00 |
| 02072 | 057215 | 537 | | DATA | 24205 | OCN | 33-14-26 |
| 02073 | 060173 | 538 | | DATA | 24699 | ONT | 33-55-06 |
| 02074 | 056477 | 539 | | DATA | 23871 | SAN | 32-46-56 |
| 02075 | 060357 | 540 | | DATA | 24815 | POM | 34-04-42 |
| 02076 | 057647 | 541 | | DATA | 24487 | TRM | 33-37-41 |
| 02077 | 060410 | 542 | | DATA | 24840 | TNP | 34-06-44 |
| 02100 | 056447 | 543 | | DATA | 23847 | IPL | 32-44-56 |
| 02101 | 060400 | 544 | | DATA | 24832 | PKE | 34-06-07 |
| 02102 | 057620 | 545 | | DATA | 24464 | BLH | 33-35-46 |
| 02103 | 056465 | 546 | | DATA | 23861 | YUM | 32-46-05 |
| 02104 | 057450 | 547 | | DATA | 24360 | BXK | 33-27-12 |
| 02105 | 056676 | 548 | | DATA | 23998 | GBN | 32-57-22 |
| 02106 | 057430 | 549 | | DATA | 24344 | PHX | 33-25-53 |

| COMP. OCTAL ADDRESS | OCTAL CELL CONTENTS | SEQ.NO. | LABEL FIELD MNEMONIC | OPERATIONS FIELD MNEMONIC | VARIABLE FIELD | | COMMENT FIELD |
|---|---|---|---|---|---|---|---|
| 02107 | 055537 | 550 | | DATA | 23391 | TUS | 32-07-21 |
| 02110 | 055436 | 551 | | DATA | 23326 | CIE | 32-02-00 |
| 02111 | 056613 | 552 | | DATA | 23947 | CZG | 32-53-09 |
| 02112 | 057104 | 553 | | DATA | 24132 | JLI | 33-08-26 |
| 02113 | 102634 | 554 | | DATA | 34204 | OLM | 46-58-19 |
| 02114 | 055165 | 555 | | DATA | 23157 | ELP | 31-48-03 |
| 02115 | 053157 | 556 | | DATA | 22127 | AUS | 30-23-11 |
| 02116 | 062023 | 557 | | DATA | 25619 | TCC | 35-10-56 |
| 02117 | 071017 | 558 | | DATA | 29199 | RBL | 40-05-57 |
| 02120 | 077615 | 559 | | DATA | 32653 | SHR | 44-50-32 |
| 02121 | 071546 | 560 | | DATA | 29542 | BAM | 40-34-09 |
| 02122 | 075641 | 561 | | DATA | 31649 | BOY | 43-27-48 |
| 02123 | 075222 | 562 | | DATA | 31378 | CPR | 43-05-27 |
| 02124 | 073023 | 563 | | DATA | 30227 | CGT | 41-30-36 |
| 02125 | 052121 | 564 | | DATA | 21585 | HOU | 29-38-32 |
| 02126 | 070162 | 565 | | DATA | 28786 | RNO | 39-31-53 |
| 02127 | 047051 | 566 | | DATA | 20009 | LRD | 27-28-43 |
| 02130 | 052122 | 567 | | DATA | 21586 | SAT | 29-38-38 |
| 02131 | 062430 | 568 | | DATA | 25880 | SAF | 35-32-26 |
| 02132 | 101041 | 569 | | DATA | 33313 | PDX | 45-44-53 |
| 02133 | 063541 | 570 | | DATA | 26465 | GAG | 36-20-37 |
| 02134 | 062545 | 571 | | DATA | 25957 | AVE | 35-38-49 |
| 02135 | 067464 | 572 | | DATA | 28468 | SIE | 39-05-43 |
| 02136 | 063352 | 573 | | DATA | 26346 | BSR | 36-10-53 |
| 02137 | 061400 | 574 | | DATA | 25344 | GMN | 34-48-15 |
| 02140 | 062357 | 575 | | DATA | 25839 | BFL | 35-29-05 |
| 02141 | 062106 | 576 | | DATA | 25670 | SBP | 35-15-08 |
| 02142 | 061722 | 577 | | DATA | 25554 | FLW | 35-05-35 |
| 02143 | 061071 | 578 | | DATA | 25145 | GVO | 34-31-53 |

| COMP. OCTAL ADDRESS | OCTAL CELL CONTENTS | SEQ.NO. | LABEL FIELD MNEMONIC | OPERATIONS FIELD MNEMONIC | VARIABLE FIELD | | COMMENT FIELD |
|---|---|---|---|---|---|---|---|
| 02144 | 061051 | 579 | | DATA | 25129 | SBA | 34-30-35 |
| 02145 | 072712 | 580 | | DATA | 30154 | HUO | 41-24-35 |
| 02146 | 055712 | 581 | | DATA | 23498 | SSO | 32-16-09 |
| 02147 | 067432 | 582 | | DATA | 28442 | GJT | 39-03-35 |
| 02150 | 074162 | 583 | | DATA | 30834 | SUX | 42-20-40 |
| 02151 | 066540 | 584 | | DATA | 28000 | GUC | 38-27-08 |
| | | 585 | * | | STATION LONGITUDES. | | DEGREES/180 (+ WEST) |
| 02152 | 251241 | 586 | LNGST1 | DATA | 86689 | VTU | 119-02-55 |
| 02153 | 247723 | 587 | | DATA | 85971 | PMD | 118-03-47 |
| 02154 | 251046 | 588 | | DATA | 86566 | FIM | 118-52-49 |
| 02155 | 250337 | 589 | | DATA | 86239 | LAX | 118-25-52 |
| 02156 | 247714 | 590 | | DATA | 85964 | LGB | 118-03-14 |
| 02157 | 246774 | 591 | | DATA | 85500 | OCN | 117-25-01 |
| 02160 | 247116 | 592 | | DATA | 85582 | ONT | 117-31-44 |
| 02161 | 246560 | 593 | | DATA | 85360 | SAN | 117-13-28 |
| 02162 | 247411 | 594 | | DATA | 85769 | POM | 117-47-10 |
| 02163 | 245151 | 595 | | DATA | 84585 | TRM | 116-09-34 |
| 02164 | 244515 | 596 | | DATA | 84301 | TNP | 115-46-09 |
| 02165 | 244216 | 597 | | DATA | 84110 | IPL | 115-30-28 |
| 02166 | 243064 | 598 | | DATA | 83508 | PKE | 114-40-53 |
| 02167 | 243156 | 599 | | DATA | 83566 | BLH | 114-45-37 |
| 02170 | 242773 | 600 | | DATA | 83451 | YUM | 114-36-07 |
| 02171 | 240354 | 601 | | DATA | 82156 | BXK | 112-49-26 |
| 02172 | 240176 | 602 | | DATA | 82046 | GBN | 112-40-25 |
| 02173 | 237102 | 603 | | DATA | 81474 | PHX | 111-53-17 |
| 02174 | 235471 | 604 | | DATA | 80697 | TUS | 110-49-12 |
| 02175 | 234063 | 605 | | DATA | 79923 | CIE | 109-45-27 |
| 02176 | 237121 | 606 | | DATA | 81489 | CZG | 111-54-29 |
| 02177 | 245637 | 607 | | DATA | 84895 | JLI | 116-35-06 |

| COMP. OCTAL ADDRESS | OCTAL CELL CONTENTS | SEQ.NO. | LABEL FIELD MNEMONIC | OPERATIONS FIELD MNEMONIC | VARIABLE FIELD | | COMMENT FIELD |
|---|---|---|---|---|---|---|---|
| 02200 | 256625 | 608 | | DATA | 89493 | OLM | 122-54-02 |
| 02201 | 227125 | 609 | | DATA | 77397 | ELP | 106-17-17 |
| 02202 | 212746 | 610 | | DATA | 71142 | AUS | 097-41-56 |
| 02203 | 223256 | 611 | | DATA | 75438 | TCC | 103-35-53 |
| 02204 | 255661 | 612 | | DATA | 89009 | RBL | 122-14-07 |
| 02205 | 230207 | 613 | | DATA | 77959 | SHR | 107-03-38 |
| 02206 | 246224 | 614 | | DATA | 85140 | BAM | 116-55-17 |
| 02207 | 232015 | 615 | | DATA | 78861 | BOY | 108-17-57 |
| 02210 | 227114 | 616 | | DATA | 77388 | CPR | 106-16-35 |
| 02211 | 174430 | 617 | | DATA | 63768 | CGT | 087-34-17 |
| 02212 | 207376 | 618 | | DATA | 69374 | HOU | 095-16-14 |
| 02213 | 252132 | 619 | | DATA | 87130 | RNO | 119-39-18 |
| 02214 | 215311 | 620 | | DATA | 72393 | LRD | 099-25-02 |
| 02215 | 214021 | 621 | | DATA | 71697 | SAT | 098-27-40 |
| 02216 | 226662 | 622 | | DATA | 77234 | SAF | 106-03-52 |
| 02217 | 256264 | 623 | | DATA | 89268 | PDX | 122-35-25 |
| 02220 | 216032 | 624 | | DATA | 72730 | GAG | 099-52-47 |
| 02221 | 252505 | 625 | | DATA | 87365 | AVE | 119-58-39 |
| 02222 | 152304 | 626 | | DATA | 54468 | SIE | 074-48-03 |
| 02223 | 255000 | 627 | | DATA | 88576 | BSR | 121-38-28 |
| 02224 | 251030 | 628 | | DATA | 86552 | GMN | 118-51-38 |
| 02225 | 251303 | 629 | | DATA | 86723 | BFL | 119-05-47 |
| 02226 | 253576 | 630 | | DATA | 87934 | SBP | 120-45-31 |
| 02227 | 252363 | 631 | | DATA | 87283 | FLW | 119-51-53 |
| 02230 | 252627 | 632 | | DATA | 87447 | GVO | 120-05-24 |
| 02231 | 252256 | 633 | | DATA | 87214 | SBA | 119-46-12 |
| 02232 | 152054 | 634 | | DATA | 54316 | HUO | 074-35-31 |
| 02233 | 233313 | 635 | | DATA | 79563 | SSO | 109-15-45 |
| 02234 | 232564 | 636 | | DATA | 79220 | GJT | 108-47-31 |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD | |
|---|---|---|---|---|---|---|---|
| 02235 | 210775 | 637 | | DATA | 70141 | SUX | 096-19-24 |
| 02236 | 230170 | 638 | | DATA | 77944 | GUC | 107-02-21 |
| | | 639 | * | | STATION MAGNETIC VARIATIONS. DEGREES/180 (+EAST) | | |
| 02237 | 025253 | 640 | DELST1 | DATA | 10923 | VTU | 15. |
| 02240 | 025253 | 641 | | DATA | 10923 | PMD | 15. |
| 02241 | 025253 | 642 | | DATA | 10923 | FIM | 15. |
| 02242 | 025253 | 643 | | DATA | 10923 | LAX | 15. |
| 02243 | 025253 | 644 | | DATA | 10923 | LGB | 15. |
| 02244 | 025253 | 645 | | DATA | 10923 | OCN | 15. |
| 02245 | 025253 | 646 | | DATA | 10923 | ONT | 15. |
| 02246 | 025253 | 647 | | DATA | 10923 | SAN | 15. |
| 02247 | 025253 | 648 | | DATA | 10923 | POM | 15. |
| 02250 | 025253 | 649 | | DATA | 10923 | TRM | 15. |
| 02251 | 025253 | 650 | | DATA | 10923 | TNP | 15. |
| 02252 | 023722 | 651 | | DATA | 10194 | IPL | 14. |
| 02253 | 025253 | 652 | | DATA | 10923 | PKE | 15. |
| 02254 | 023722 | 653 | | DATA | 10194 | BLH | 14. |
| 02255 | 023722 | 654 | | DATA | 10194 | YUM | 14. |
| 02256 | 023722 | 655 | | DATA | 10194 | BXK | 14. |
| 02257 | 023722 | 656 | | DATA | 10194 | GBN | 14. |
| 02260 | 023722 | 657 | | DATA | 10194 | PHX | 14. |
| 02261 | 022372 | 658 | | DATA | 9466 | TUS | 13. |
| 02262 | 022372 | 659 | | DATA | 9466 | CIE | 13. |
| 02263 | 023722 | 660 | | DATA | 10194 | CZG | 14. |
| 02264 | 025253 | 661 | | DATA | 10923 | JLI | 15. |
| 02265 | 037224 | 662 | | DATA | 16020 | OLM | 22. |
| 02266 | 021042 | 663 | | DATA | 8738 | ELP | 12. |
| 02267 | 014632 | 664 | | DATA | 6554 | AUS | 09. |
| 02270 | 021042 | 665 | | DATA | 8738 | TCC | 12. |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD | |
|---|---|---|---|---|---|---|---|
| 02271 | 031463 | 666 | | DATA | 13107 | RBL | 18. |
| 02272 | 026603 | 667 | | DATA | 11651 | SHR | 16. |
| 02273 | 031463 | 668 | | DATA | 13107 | BAM | 18. |
| 02274 | 026603 | 669 | | DATA | 11651 | BOY | 16. |
| 02275 | 025253 | 670 | | DATA | 10923 | CPR | 15. |
| 02276 | 002660 | 671 | | DATA | 1456 | CGT | 02. |
| 02277 | 013301 | 672 | | DATA | 5825 | HOU | 08. |
| 02300 | 031463 | 673 | | DATA | 13107 | RNO | 18. |
| 02301 | 014632 | 674 | | DATA | 6554 | LRD | 09. |
| 02302 | 014632 | 675 | | DATA | 6554 | SAT | 09. |
| 02303 | 022372 | 676 | | DATA | 9466 | SAF | 13. |
| 02304 | 035674 | 677 | | DATA | 15292 | PDX | 21. |
| 02305 | 016162 | 678 | | DATA | 7282 | GAG | 10. |
| 02306 | 026603 | 679 | | DATA | 11651 | AVE | 16. |
| 02307 | 763146 | 680 | | DATA | -6554 | SIE | -09. |
| 02310 | 026603 | 681 | | DATA | 11651 | BSR | 16. |
| 02311 | 026603 | 682 | | DATA | 11651 | GMN | 16. |
| 02312 | 026603 | 683 | | DATA | 11651 | BFL | 16. |
| 02313 | 026603 | 684 | | DATA | 11651 | SBP | 16. |
| 02314 | 026603 | 685 | | DATA | 11651 | FLW | 16. |
| 02315 | 026603 | 686 | | DATA | 11651 | GVO | 16. |
| 02316 | 026603 | 687 | | DATA | 11651 | SBA | 16. |
| 02317 | 760266 | 688 | | DATA | -8010 | HUO | -11. |
| 02320 | 022372 | 689 | | DATA | 9466 | SSO | 13. |
| 02321 | 025253 | 690 | | DATA | 10923 | GJT | 15. |
| 02322 | 014632 | 691 | | DATA | 6554 | SUX | 09. |
| 02323 | 023722 | 692 | | DATA | 10194 | GUC | 14. |
| | | 693 | * | | STATION ALTITUDES. | FEET AT B16. | |
| 02324 | 006060 | 694 | HST1 | DATA | 3120 | VTU | 1560. |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD | |
|---|---|---|---|---|---|---|---|
| 02325 | 011610 | 695 | | DATA | 5000 | PMD | 2500. |
| 02326 | 010460 | 696 | | DATA | 4400 | FIM | 2200. |
| 02327 | 000550 | 697 | | DATA | 360 | LAX | 180. |
| 02330 | 000050 | 698 | | DATA | 40 | LGB | 20. |
| 02331 | 000264 | 699 | | DATA | 180 | OCN | 90. |
| 02332 | 005454 | 700 | | DATA | 2860 | ONT | 1430. |
| 02333 | 000024 | 701 | | DATA | 20 | SAN | 10. |
| 02334 | 004754 | 702 | | DATA | 2540 | POM | 1270. |
| 02335 | 777444 | 703 | | DATA | -220 | TRM | -110. |
| 02336 | 005214 | 704 | | DATA | 2700 | TNP | 1350. |
| 02337 | 777730 | 705 | | DATA | -40 | IPL | -20. |
| 02340 | 003720 | 706 | | DATA | 2000 | PKE | 1000. |
| 02341 | 001464 | 707 | | DATA | 820 | BLH | 410. |
| 02342 | 000404 | 708 | | DATA | 260 | YUM | 130. |
| 02343 | 004110 | 709 | | DATA | 2120 | BXK | 1060. |
| 02344 | 003054 | 710 | | DATA | 1580 | GBN | 790. |
| 02345 | 004470 | 711 | | DATA | 2360 | PHX | 1180. |
| 02346 | 013200 | 712 | | DATA | 5760 | TUS | 2880. |
| 02347 | 020414 | 713 | | DATA | 8460 | CIE | 4230. |
| 02350 | 005120 | 714 | | DATA | 2640 | CZG | 1320. |
| 02351 | 025560 | 715 | | DATA | 11120 | JLI | 5560. |
| 02352 | 000620 | 716 | | DATA | 400 | OLM | 200. |
| 02353 | 017524 | 717 | | DATA | 8020 | ELP | 4010. |
| 02354 | 002760 | 718 | | DATA | 1520 | AUS | 760. |
| 02355 | 017714 | 719 | | DATA | 8140 | TCC | 4070. |
| 02356 | 001200 | 720 | | DATA | 640 | RBL | 320. |
| 02357 | 021164 | 721 | | DATA | 8820 | SHR | 4410. |
| 02360 | 021570 | 722 | | DATA | 9080 | BAM | 4540. |
| 02361 | 035374 | 723 | | DATA | 15100 | BOY | 7550. |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 02362 | 026710 | 724 | | DATA | 11720 | CPR 5860. |
| 02363 | 002354 | 725 | | DATA | 1260 | CGT 630. |
| 02364 | 000144 | 726 | | DATA | 100 | HOU 50. |
| 02365 | 027150 | 727 | | DATA | 11880 | RNO 5940. |
| 02366 | 002210 | 728 | | DATA | 1160 | LRD 580. |
| 02367 | 004420 | 729 | | DATA | 2320 | SAT 1160. |
| 02370 | 030350 | 730 | | DATA | 12520 | SAF 6260. |
| 02371 | 000764 | 731 | | DATA | 500 | PDX 250. |
| 02372 | 011374 | 732 | | DATA | 4860 | GAG 2430. |
| 02373 | 002614 | 733 | | DATA | 1420 | AVE 710. |
| 02374 | 000024 | 734 | | DATA | 20 | SIE 10. |
| 02375 | 017740 | 735 | | DATA | 8160 | BSR 4080. |
| 02376 | 023160 | 736 | | DATA | 9840 | GMN 4920 |
| 02377 | 002114 | 737 | | DATA | 1100 | BFL 550. |
| 02400 | 005524 | 738 | | DATA | 2900 | SBP 1450. |
| 02401 | 017074 | 739 | | DATA | 7740 | FLW 3870. |
| 02402 | 012170 | 740 | | DATA | 5240 | GVO 2620. |
| 02403 | 016110 | 741 | | DATA | 7240 | SBA 3620. |
| 02404 | 005050 | 742 | | DATA | 2600 | HUO 1300. |
| 02405 | 016040 | 743 | | DATA | 7200 | SSO 3600. |
| 02406 | 033570 | 744 | | DATA | 14200 | GJT 7100. |
| 02407 | 004160 | 745 | | DATA | 2160 | SUX 1080. |
| 02410 | 042064 | 746 | | DATA | 17460 | GUC 8730. |
| | | 747 | * | | MAP TABLES. | |
| 02411 | | 748 | RCO | BSS | 256 | MAP CENTER RADII. N.MI. AT B13 |
| 03011 | | 749 | LNGCO | BSS | 256 | MAP CENTER LONGITUDES. RADS AT PI |
| 03411 | 000000 | 750 | | DATA | 0 | |
| | | 751 | * | | | |
| | | 752 | * | | GROUP 2 | |
| | | 753 | * | | | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 04000 | | 754 | | ORIGIN | 04000 | |
| | | 755 | * | | | |
| | | 756 | * | | | NAVIGATION ROUTINE |
| | | 757 | * | | | |
| 04000 | 720401 | 758 | START | DIA | 001 | INPUT DISCRETE WORD 1. |
| 04001 | 640326 | 759 | | STO | DSCWD1 | |
| 04002 | 665001 | 760 | | LXR | K1B17,1 | VORTAC VALIDITY CHECK |
| 04003 | 040326 | 761 | | LAR | DSCWD1 | |
| 04004 | 025170 | 762 | | ANA | MASK2,1 | |
| 04005 | 105170 | 763 | | SUB | MASK2,1 | |
| 04006 | 320010 | 764 | | BNZ | $+2 | NZ IS VORTAC INVALID |
| 04007 | 300011 | 765 | | BRU | $+2 | |
| 04010 | 644332 | 766 | | STO | IVF1,1 | - TO VORTAC INVALID FLAG |
| 04011 | 544003 | 767 | | BXD | $-6,1 | |
| 04012 | 040326 | 768 | | LAR | DSCWD1 | |
| 04013 | 340024 | 769 | | BMI | HDG-1 | - IS HDG VALID |
| 04014 | 040324 | 770 | | LAR | HDGFLC | HDG INVALID |
| 04015 | 061001 | 771 | | ADD | K1B17 | INCREMENT |
| 04016 | 640324 | 772 | | STO | HDGFLC | FAIL COUNTER |
| 04017 | 101013 | 773 | | SUB | K1B11 | 32 SECS |
| 04020 | 340034 | 774 | | BMI | ADCCK | COUNTER-LIMIT |
| 04021 | 041020 | 775 | | LAR | K1B6 | HDG FAIL |
| 04022 | 502756 | 776 | | BSE* | FAIL | TO FAIL S.R |
| 04023 | 300034 | 777 | | BRU | ADCCK | OR HBR ADCCK |
| 04024 | 200324 | 778 | | SXR | HDGFLC,0 | HDG VALID. ZERO FAIL COUNTER. |
| 04025 | 040420 | 779 | HDG | LAR | S1PSIM | A/C MAG HDG |
| 04026 | 140421 | 780 | | LQR | S2PSIM | |
| 04027 | 502704 | 781 | | BSE* | INPCON | COMP PSIM |
| 04030 | 060270 | 782 | | ADD | DEL | MAG VAR |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 04031 | 502700 | 783 | | BSE* | SINCOS | SIN,COS TRUE HDG |
| 04032 | 640500 | 784 | | STO | SPSI | B1 |
| 04033 | 220501 | 785 | | SQR | CPSI | B1 |
| 04034 | 040326 | 786 | ADCCK | LAR | DSCWD1 | AIR DATA COMP CHECK |
| 04035 | 021021 | 787 | | ANA | K1B5 | |
| 04036 | 320041 | 788 | | BNZ | $+3 | NZ IS ADC INVALID |
| 04037 | 200325 | 789 | | SCR | ADCFLC,0 | ADC VALID. ZERO FAIL COUNTER. |
| 04040 | 300053 | 790 | | BRU | ALT | |
| 04041 | 040325 | 791 | | LAR | ADCFLC | ADC INVALID |
| 04042 | 061001 | 792 | | ADD | K1B17 | INCREMENT |
| 04043 | 640325 | 793 | | STO | ADCFLC | FAIL COUNTER. |
| 04044 | 101013 | 794 | | SUB | K1B11 | 32 SECS |
| 04045 | 340051 | 795 | | BMI | $+4 | COUNTER-LIMIT |
| 04046 | 041017 | 796 | | LAR | K1B7 | ADC FAIL |
| 04047 | 502756 | 797 | | BSE* | FAIL | TO FAIL S.R. |
| 04050 | 300051 | 798 | | BRU | $+1 | OR HBR $+1 |
| 04051 | 040235 | 799 | | LAR | VA | USE LAST VA |
| 04052 | 300106 | 800 | | BRU | DRUP-3 | |
| 04053 | 040424 | 801 | ALT | LAR | S1HLO | |
| 04054 | 140425 | 802 | | LQR | S2HLO | |
| 04055 | 502704 | 803 | | BSE* | INPCON | COMPUTE A(LO)/PI |
| 04056 | 401061 | 804 | | MPY | K27B5 | 27*A(LO)/2PI AT 5-1=4 |
| 04057 | 640170 | 805 | | STO | TS10 | K+F(LO) AT B4 |
| 04060 | 021167 | 806 | | ANA | MASK1 | |
| 04061 | 640171 | 807 | | STO | TS11 | K AT B4. |
| 04062 | 040422 | 808 | | LAR | S1HHI | |
| 04063 | 140423 | 809 | | LQR | S2HHI | |
| 04064 | 502704 | 810 | | BSE* | INPCON | COMPUTE A(HI)/PI |
| 04065 | 241005 | 811 | | LRS | 5 | A(HI)/2PI=F(HI) (AT B4) |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 04066 | 060171 | 812 | | ADD | TS11 | |
| 04067 | 640172 | 813 | | STO | TS12 | K+F(HI). FINE SYNCHRO REVS AT B4 |
| 04070 | 040170 | 814 | | LAR | TS10 | |
| 04071 | 100172 | 815 | | SUB | TS12 | F(LO)-F(HI) |
| 04072 | 061021 | 816 | | ADD | K1B5 | ROUND |
| 04073 | 021167 | 817 | | ANA | MASK1 | |
| 04074 | 060172 | 818 | | ADD | TS12 | K+F(HI) CORRECTED |
| 04075 | 401062 | 819 | | MPY | KHSF | 4+13=17 |
| 04076 | 240001 | 820 | | LLS | 1 | |
| 04077 | 640234 | 821 | | STO | H | ALT AT B16 |
| 04100 | 040426 | 822 | AIRSP | LAR | S1VA | |
| 04101 | 140427 | 823 | | LQR | S2VA | |
| 04102 | 502704 | 824 | | BSE* | INPCON | COMPUTE SHAFT ANGLE/PI |
| 04103 | 401063 | 825 | | MPY | KVSF | B10 |
| 04104 | 061064 | 826 | | ADD | KVB | BIAS |
| 04105 | 640235 | 827 | | STO | VA | TRUE A/S AT B10 |
| 04106 | 101065 | 828 | | SUB | KVST | |
| 04107 | 640331 | 829 | | STO | NABF | NOT AIRBORNE FLAG. (VA-V(STALL)) |
| 04110 | 340601 | 830 | | BMI | NAVEND | - IS NOT AIRBORNE |
| 04111 | 040234 | 831 | DRUP | LAR | H | OR UPDATE |
| 04112 | 401015 | 832 | | MPY | K1B9 | |
| 04113 | 421074 | 833 | | DIV | KNMI | 16+9-13=12 |
| 04114 | 600000 | 834 | | PAD | | H IN N.MI. AT 12 |
| 04115 | 060236 | 835 | | ADD | RNS | |
| 04116 | 640241 | 836 | | STO | RLAT | (RNS+H) B12 |
| 04117 | 040237 | 837 | | LAR | REW | |
| 04120 | 601000 | 838 | | ADA | | |
| 04121 | 400244 | 839 | | MPY | CLATS | |
| 04122 | 240001 | 840 | | LLS | 1 | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 04123 | 640242 | 841 | | STO | RLNG | (REW+H)*COS(LATS) B12 |
| 04124 | 120500 | 842 | | LTC | SPSI | |
| 04125 | 140501 | 843 | | LQR | CPSI | |
| 04126 | 220160 | 844 | | SQR | TS0 | |
| 04127 | 640161 | 845 | | STO | TS1 | |
| 04130 | 665001 | 846 | | LXR | K1B17,1 | |
| 04131 | 040235 | 847 | DRUP1 | LAR | VA | |
| 04132 | 404160 | 848 | | MPY | TS0,1 | |
| 04133 | 064232 | 849 | | ADD | WN,1 | |
| 04134 | 644230 | 850 | | STO | VN,1 | A/C GND SPEED. B11 |
| 04135 | 401102 | 851 | | MPY | DELT | MINOR CYCLE TIME (HRS)/PI AT B-13. |
| 04136 | 424241 | 852 | | DIV | RLAT,1 | 11-13-12=-14 |
| 04137 | 064226 | 853 | | ADD | DLAT,1 | |
| 04140 | 644226 | 854 | | STO | DLAT,1 | DR REMAINDER. RADS/PI AT B-14. |
| 04141 | 061022 | 855 | | ADD | K1B4 | ROUND |
| 04142 | 241416 | 856 | | ARS | 14 | |
| 04143 | 640164 | 857 | | STO | TS4 | |
| 04144 | 064200 | 858 | | ADD | LATDR,1 | |
| 04145 | 644200 | 859 | | STO | LATDR,1 | DR POS. RADS/PI |
| 04146 | 040164 | 860 | | LAR | TS4 | |
| 04147 | 064202 | 861 | | ADD | LATWN,1 | WIND DR POS |
| 04150 | 644202 | 862 | | STO | LATWN,1 | |
| 04151 | 120164 | 863 | | LTC | TS4 | |
| 04152 | 240016 | 864 | | LLS | 14 | |
| 04153 | 064226 | 865 | | ADD | DLAT,1 | |
| 04154 | 644226 | 866 | | STO | DLAT,1 | NEW REMAINDER. RADS/PI AT B-14. |
| 04155 | 544131 | 867 | | BXD | DRUP1,1 | |
| 04156 | 040321 | 868 | | LAR | VORSC | |
| 04157 | 240001 | 869 | | LLS | 1 | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 04160 | 340163 | 870 | | BMI | VRTC | - IS TIME FOR VORTAC PROC |
| 04161 | 640321 | 871 | | STO | VORSC | |
| 04162 | 300601 | 872 | | BRU | NAVEND | |
| | | 873 | * | | VORTAC PROCESSING | |
| 04163 | 041027 | 874 | VRTC | LAR | PMAX | REMOVE |
| 04164 | 101015 | 875 | | SUB | K1B9 | DR BIT FR |
| 04165 | 020330 | 876 | | ANA | DOWD | DO WORD |
| 04166 | 640330 | 877 | | STO | DOWD | |
| 04167 | 040266 | 878 | | LAR | SMQ | INCREMENT VORTAC CYC COUNTER. |
| 04170 | 061001 | 879 | | ADD | K1B17 | |
| 04171 | 640266 | 880 | | STO | SMQ | SMALL Q. VRTC CYCS/WIND CYC. |
| 04172 | 040333 | 881 | | LAR | IVF2 | |
| 04173 | 340200 | 882 | | BMI | VRTC1 | - IS VORTAC 2 INVALID |
| 04174 | 665001 | 883 | | LXR | K1B17,1 | VORTAC 2 VALID |
| 04175 | 671010 | 884 | | LXR | K8B17,2 | |
| 04176 | 041002 | 885 | | LAR | K2B17 | |
| 04177 | 300204 | 886 | | BRU | VRTC2 | |
| 04200 | 040332 | 887 | VRTC1 | LAR | IVF1 | |
| 04201 | 340355 | 888 | | BMI | VRTC9 | - IS VORTAC 1 INVALID |
| 04202 | 665000 | 889 | | LXR | KZ,1 | VORTAC 1 VALID |
| 04203 | 671000 | 890 | | LXR | KZ,2 | |
| 04204 | 204300 | 891 | VRTC2 | SXR | SXR1,1 | SAVE XRS |
| 04205 | 210301 | 892 | | SXR | SXR2,2 | |
| 04206 | 640302 | 893 | | STO | TSX | 0 OR 2 |
| 04207 | 502720 | 894 | | BSE* | RNG | COMP SLANT RANGE |
| 04210 | 724404 | 895 | | DIA | 004,1 | INPUT FREQ |
| 04211 | 021172 | 896 | | ANA | MASK4 | |
| 04212 | 640173 | 897 | | STO | TS13 | |
| 04213 | 675162 | 898 | | LXR | K5XR,3 | TABLE SEARCH |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 04214 | 056000 | 899 | VRTC3 | LAR* | FST1,3 | |
| 04215 | 100173 | 900 | | SUB | TS13 | |
| 04216 | 320232 | 901 | | BNZ | VRTC4 | |
| 04217 | 040200 | 902 | | LAR | LATDR | MATCH FOUND. CHECK IF A/C IN RNG |
| 04220 | 116065 | 903 | | SUB* | LATST1,3 | |
| 04221 | 640163 | 904 | | STO | TS3 | (LATDR-LATST) |
| 04222 | 040201 | 905 | | LAR | LNGDR | |
| 04223 | 116152 | 906 | | SUB* | LNGST1,3 | |
| 04224 | 400244 | 907 | | MPY | CLATS | |
| 04225 | 240001 | 908 | | LLS | 1 | (LNGDR-LNGST)*COS(LATS) |
| 04226 | 140163 | 909 | | LQR | TS3 | |
| 04227 | 502722 | 910 | | BSE* | MAG | COMP A/C TO STA RNG (RADS AT PI) |
| 04230 | 101106 | 911 | | SUB | KSTLIM | |
| 04231 | 340237 | 912 | | BMI | VRTC5 | - IS A/C IN RNG. SEARCH DONE. |
| 04232 | 554214 | 913 | VRTC4 | BXD | VRTC3,3 | CONT SEARCH. |
| 04233 | 664300 | 914 | | LXR | SXR1,1 | NO STA FOUND |
| 04234 | 041031 | 915 | | LAR | MS | MARK THIS VORTAC INVALID. |
| 04235 | 644332 | 916 | | STO | IVF1,1 | |
| 04236 | 300314 | 917 | | BRU | VRTC7 | |
| 04237 | 670301 | 918 | VRTC5 | LXR | SXR2,2 | COMP BEARING. A/C TO STATION |
| 04240 | 050400 | 919 | | LAR | SGAM1,2 | |
| 04241 | 150401 | 920 | | LQR | CGAM1,2 | |
| 04242 | 502702 | 921 | | BSE* | ARCTAN | REMOVE S.F. ERROR |
| 04243 | 076237 | 922 | | ADD* | DELST1,3 | STA MAG VAR |
| 04244 | 502700 | 923 | | BSE* | SINCOS | |
| 04245 | 640174 | 924 | | STO | TS14 | SIN (GAMMA) B1 |
| 04246 | 220175 | 925 | | SQR | TS15 | COS (GAMMA) |
| 04247 | 664300 | 926 | | LXR | SXR1,1 | |
| 04250 | 056237 | 927 | | LAR* | DELST1,3 | SAVE MAG VAR |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 04251 | 644176 | 928 | | STO | TS16,1 | |
| 04252 | 040234 | 929 | VRTC6 | LAR | H | CONE ANGLE CHECK. |
| 04253 | 116324 | 930 | | SUB* | HST1,3 | |
| 04254 | 401015 | 931 | | MPY | K1B9 | |
| 04255 | 421074 | 932 | | DIV | KNMI | (H-HST) IN NMI AT (16+9-13=12) |
| 04256 | 640162 | 933 | | STO | TS2 | |
| 04257 | 141000 | 934 | | LQR | KZ | |
| 04260 | 424262 | 935 | | DIV | RS1,1 | SIN(CONE ANGLE) AT B0 |
| 04261 | 101055 | 936 | | SUB | KS45 | SIN(45) |
| 04262 | 340264 | 937 | | BMI | $+2 | - IS OUTSIDE CONE OF SILENCE. |
| 04263 | 303146 | 938 | | BRU* | RNGAMB | MARK STA INVALID |
| 04264 | 040162 | 939 | | LAR | TS2 | COMP HORIZONTAL RANGE |
| 04265 | 144262 | 940 | | LQR | RS1,1 | SLANT RNG |
| 04266 | 502724 | 941 | | BSE* | HORZ | |
| 04267 | 640167 | 942 | | STO | TS7 | RH AT 12 |
| 04270 | 670302 | 943 | | LXR | TSX,2 | |
| 04271 | 120167 | 944 | | LTC | TS7 | |
| 04272 | 400175 | 945 | | MPY | TS15 | -RH*COS(GAMMA) |
| 04273 | 420236 | 946 | | DIV | RNS | |
| 04274 | 240001 | 947 | | LLS | 1 | TO B0 |
| 04275 | 401032 | 948 | | MPY | K1DPI | 1/PI |
| 04276 | 076065 | 949 | | ADD* | LATST1,3 | |
| 04277 | 100200 | 950 | | SUB | LATDR | |
| 04300 | 650222 | 951 | | STO | LATE1,2 | (MEAS-DR) LAT AT PI |
| 04301 | 040237 | 952 | | LAR | REW | |
| 04302 | 400244 | 953 | | MPY | CLATS | |
| 04303 | 640161 | 954 | | STO | TS1 | COS(LATS)*REW |
| 04304 | 040167 | 955 | | LAR | TS7 | |
| 04305 | 400174 | 956 | | MPY | TS14 | +RH*SIN(GAMMA) |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 04306 | 420161 | 957 | | DIV | TS1 | |
| 04307 | 401032 | 958 | | MPY | K1DPI | 1/PI |
| 04310 | 076152 | 959 | | ADD* | LNGST1,3 | |
| 04311 | 100201 | 960 | | SUB | LNGDR | |
| 04312 | 650223 | 961 | | STO | LNGE1,2 | (MEAS-DR) LNG AT PI |
| 04313 | 664300 | 962 | | LXR | SXR1,1 | |
| 04314 | 544200 | 963 | VRTC7 | BXD | VRTC1,1 | CHECK FOR BOTH DONE |
| 04315 | 040332 | 964 | | LAR | IVF1 | |
| 04316 | 340355 | 965 | | BMI | VRTC9 | - IS 1 INVALID |
| 04317 | 040333 | 966 | | LAR | IVF2 | |
| 04320 | 340352 | 967 | | BMI | VRTC8 | - IS 2 INVALID |
| 04321 | 040262 | 968 | | LAR | RS1 | BOTH VALID |
| 04322 | 640161 | 969 | | STO | TS1 | |
| 04323 | 060263 | 970 | | ADD | RS2 | |
| 04324 | 640162 | 971 | | STO | TS2 | |
| 04325 | 040263 | 972 | | LAR | RS2 | |
| 04326 | 640160 | 973 | | STO | TS0 | |
| 04327 | 665001 | 974 | | LXR | K1B17,1 | COMP 2 STATION Q'S |
| 04330 | 044160 | 975 | | LAR | TS0,1 | |
| 04331 | 141000 | 976 | | LQR | KZ | |
| 04332 | 420162 | 977 | | DIV | TS2 | |
| 04333 | 401100 | 978 | | MPY | KQ2 | 2 STA GAIN. |
| 04334 | 424262 | 979 | | DIV | RS1,1 | |
| 04335 | 644264 | 980 | | STO | Q1,1 | FILTER WTS AT B0 |
| 04336 | 101101 | 981 | | SUB | KQLIM | |
| 04337 | 340342 | 982 | | BMI | $+3 | Q-LIMIT |
| 04340 | 041101 | 983 | | LAR | KQLIM | |
| 04341 | 644264 | 984 | | STO | Q1,1 | |
| 04342 | 544330 | 985 | | BXD | $-10,1 | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 04343 | 040263 | 986 | | LAR | RS2 | |
| 04344 | 100262 | 987 | | SUB | RS1 | |
| 04345 | 340350 | 988 | | BMI | $+3 | RS2-RS1 |
| 04346 | 040176 | 989 | | LAR | TS16 | STA 1 MAG VAR |
| 04347 | 300372 | 990 | | BRU | VRTC10 | |
| 04350 | 040177 | 991 | | LAR | TS17 | STA 2 MAG VAR |
| 04351 | 300372 | 992 | | BRU | VRTC10 | |
| 04352 | 665000 | 993 | VRTC8 | LXR | KZ,1 | 1 VALID, 2 INVALID |
| 04353 | 200265 | 994 | | SXR | Q2,0 | Q2=0 |
| 04354 | 300361 | 995 | | BRU | $+5 | |
| 04355 | 040333 | 996 | VRTC9 | LAR | IVF2 | |
| 04356 | 340437 | 997 | | BMI | DR | - IS BOTH INVALID |
| 04357 | 665001 | 998 | | LXR | K1B17,1 | 1 INVALID, 2 VALID |
| 04360 | 200264 | 999 | | SXR | Q1,0 | Q1=0 |
| 04361 | 041077 | 1000 | | LAR | KQ1 | SINGLE STA Q GAIN |
| 04362 | 141000 | 1001 | | LQR | KZ | |
| 04363 | 424262 | 1002 | | DIV | RS1,1 | |
| 04364 | 644264 | 1003 | | STO | Q1,1 | FILTER WT AT B0 |
| 04365 | 101101 | 1004 | | SUB | KQLIM | |
| 04366 | 340371 | 1005 | | BMI | $+3 | Q-LIMIT |
| 04367 | 041101 | 1006 | | LAR | KQLIM | |
| 04370 | 644264 | 1007 | | STO | Q1,1 | |
| 04371 | 044176 | 1008 | | LAR | TS16,1 | MAG VAR |
| 04372 | 640270 | 1009 | VRTC10 | STO | DEL | |
| 04373 | 502700 | 1010 | | BSE* | SINCOS | |
| 04374 | 640504 | 1011 | | STO | SDEL | SIN(DEL) B1 |
| 04375 | 220505 | 1012 | | SQR | CDEL | COS(DEL) B1 |
| | | 1013 | * | | POSITION SMOOTHING | |
| 04376 | 665001 | 1014 | POSM | LXR | K1B17,1 | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 04377 | 044222 | 1015 | | LAR | LATE1,1 | |
| 04400 | 400264 | 1016 | | MPY | Q1 | |
| 04401 | 644170 | 1017 | | STO | TS10,1 | |
| 04402 | 044224 | 1018 | | LAR | LATE2,1 | |
| 04403 | 400265 | 1019 | | MPY | Q2 | |
| 04404 | 064170 | 1020 | | ADD | TS10,1 | |
| 04405 | 644170 | 1021 | | STO | TS10,1 | DEL LAT, DEL LNG AT PI |
| 04406 | 544377 | 1022 | | BXD | POSM+1,1 | |
| 04407 | 040335 | 1023 | | LAR | DRF | |
| 04410 | 340430 | 1024 | | BMI | POSM1 | - IS RETURNING FR DR |
| 04411 | 040171 | 1025 | | LAR | TS11 | REASONABLENESS CHECK |
| 04412 | 400244 | 1026 | | MPY | CLATS | |
| 04413 | 240001 | 1027 | | LLS | 1 | |
| 04414 | 140170 | 1028 | | LQR | TS10 | |
| 04415 | 502722 | 1029 | | BSE* | MAG | COS(LATS)*DEL(LNG), DEL(LAT) |
| 04416 | 101107 | 1030 | | SUB | KDSLIM | |
| 04417 | 340430 | 1031 | | BMI | POSM1 | DS-DSLIM |
| 04420 | 040334 | 1032 | | LAR | UNRF | |
| 04421 | 340430 | 1033 | | BMI | POSM1 | - IS UNREASONABLE LAST CYCLE |
| 04422 | 041031 | 1034 | | LAR | MS | DS TOO LARGE |
| 04423 | 640334 | 1035 | | STO | UNRF | |
| 04424 | 040330 | 1036 | | LAR | DOWD | LITE NO POS PLAQUE |
| 04425 | 001025 | 1037 | | ORA | K1B1 | |
| 04426 | 640330 | 1038 | | STO | DOWD | |
| 04427 | 300450 | 1039 | | BRU | WND | |
| 04430 | 200334 | 1040 | POSM1 | SXR | UNRF,0 | MAKE CORRECTION |
| 04431 | 665001 | 1041 | | LXR | K1B17,1 | |
| 04432 | 044200 | 1042 | | LAR | LATDR,1 | |
| 04433 | 064170 | 1043 | | ADD | TS10,1 | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 04434 | 644200 | 1044 | | STO | LATS,1 | SMOOTHED POS. RADS AT PI |
| 04435 | 544432 | 1045 | | BXD | $-3,1 | |
| 04436 | 300450 | 1046 | | BRU | WND | |
| | | 1047 | * | | PURE DEAD RECKON | |
| 04437 | 040330 | 1048 | DR | LAR | DOWD | INSERT |
| 04440 | 001015 | 1049 | | DRA | K1B9 | DR BIT |
| 04441 | 640330 | 1050 | | STO | DOWD | IN DO WORD |
| 04442 | 040267 | 1051 | | LAR | DTDR | INCREMENT DR TIME |
| 04443 | 061001 | 1052 | | ADD | K1B17 | |
| 04444 | 640267 | 1053 | | STO | DTDR | |
| 04445 | 041031 | 1054 | | LAR | MS | |
| 04446 | 640335 | 1055 | | STO | DRF | - TO DR FLAG |
| 04447 | 300521 | 1056 | | BRU | WND5 | TO WIND LIMIT |
| | | 1057 | * | | WIND COMPUTATION | |
| 04450 | 040335 | 1058 | WND | LAR | DRF | |
| 04451 | 340457 | 1059 | | BMI | WND1 | - IS RET FR DR |
| 04452 | 040322 | 1060 | | LAR | WNDSC | |
| 04453 | 240001 | 1061 | | LLS | 1 | |
| 04454 | 340461 | 1062 | | BMI | WND2 | - IS TIME TO COMP WIND |
| 04455 | 640322 | 1063 | | STO | WNDSC | |
| 04456 | 300521 | 1064 | | BRU | WND5 | TO WIND LIMIT |
| 04457 | 200335 | 1065 | WND1 | SXR | DRF,0 | RET FR DR. + TO DR FLAG |
| 04460 | 200267 | 1066 | | SXR | DTDR,0 | |
| 04461 | 040266 | 1067 | WND2 | LAR | SMQ | SMALL Q. VORTAC CYCLES/WIND CYCLE.B17 |
| 04462 | 240003 | 1068 | | LLS | 3 | 8 MINOR CYCLES/VORTAC CYCLE |
| 04463 | 401102 | 1069 | | MPY | DELT | MINOR CYCLE TIME (HRS)/PI AT B-13 |
| 04464 | 421023 | 1070 | | DIV | K1B3 | 17+(-13)-3=1 |
| 04465 | 061103 | 1071 | | ADD | TAU2 | SMOOTHING CONST. |
| 04466 | 640161 | 1072 | | STO | TS1 | WIND CYCLE+TAU2. HRS/PI AT B1. |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 04467 | 665001 | 1073 | | LXR | K1B17,1 | |
| 04470 | 044200 | 1074 | WND3 | LAR | LATS,1 | |
| 04471 | 104202 | 1075 | | SUB | LATWN,1 | (SMOOTHED-WIND DR) POS |
| 04472 | 404241 | 1076 | | MPY | RLAT,1 | |
| 04473 | 420161 | 1077 | | DIV | TS1 | 12-1=11 |
| 04474 | 360512 | 1078 | | BIR | WND4 | |
| 04475 | 644172 | 1079 | | STO | TS12,1 | WIND CORRECTION. B11 |
| 04476 | 544470 | 1080 | | BXD | WND3,1 | |
| 04477 | 140173 | 1081 | | LQR | TS13 | |
| 04500 | 502722 | 1082 | | BSE* | MAG | MAG WIND CHANGE |
| 04501 | 101111 | 1083 | | SUB | KDWLIM | |
| 04502 | 340504 | 1084 | | BMI | $+2 | DW-DWLIM |
| 04503 | 300512 | 1085 | | BRU | WND4 | SKIP CORRECTION |
| 04504 | 040232 | 1086 | | LAR | WN | |
| 04505 | 060172 | 1087 | | ADD | TS12 | |
| 04506 | 640232 | 1088 | | STO | WN | NEW NORTH WIND |
| 04507 | 040233 | 1089 | | LAR | WW | |
| 04510 | 060173 | 1090 | | ADD | TS13 | |
| 04511 | 640233 | 1091 | | STO | WW | NEW WEST WIND |
| 04512 | 040200 | 1092 | WND4 | LAR | LATS | SET WIND DR=SMOOTHED POS |
| 04513 | 140201 | 1093 | | LQR | LNGS | |
| 04514 | 640202 | 1094 | | STO | LATWN | |
| 04515 | 220203 | 1095 | | SQR | LNGWN | |
| 04516 | 041022 | 1096 | | LAR | K1B4 | RESET WIND SHIFT COUNT. |
| 04517 | 640322 | 1097 | | STO | WNDSC | |
| 04520 | 200266 | 1098 | | SXR | SMQ,0 | RESET SMALL Q. |
| 04521 | 041112 | 1099 | WND5 | LAR | WUL | WIND LIMITING |
| 04522 | 101113 | 1100 | | SUB | WLL | |
| 04523 | 400234 | 1101 | | MPY | H | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 04524 | 421114 | 1102 | | DIV | HUL | |
| 04525 | 061113 | 1103 | | ADD | WLL | WLIM IN A |
| 04526 | 101112 | 1104 | | SUB | WUL | |
| 04527 | 340532 | 1105 | | BMI | $+3 | WLIM-WUL |
| 04530 | 041112 | 1106 | | LAR | WUL | |
| 04531 | 300533 | 1107 | | BRU | $+2 | |
| 04532 | 061112 | 1108 | | ADD | WUL | |
| 04533 | 640174 | 1109 | | STO | TS14 | ALT DEPENDENT WIND LIMIT. |
| 04534 | 040232 | 1110 | | LAR | WN | |
| 04535 | 140233 | 1111 | | LQR | WW | |
| 04536 | 502722 | 1112 | | BSE* | MAG | COMP WIND MAG |
| 04537 | 640175 | 1113 | | STO | TS15 | W |
| 04540 | 100174 | 1114 | | SUB | TS14 | |
| 04541 | 340550 | 1115 | | BMI | RADII | W-WLIM |
| 04542 | 665001 | 1116 | | LXR | K1B17,1 | DIRECTION PRESERVING LIMITING |
| 04543 | 044232 | 1117 | | LAR | WN,1 | |
| 04544 | 400174 | 1118 | | MPY | TS14 | |
| 04545 | 420175 | 1119 | | DIV | TS15 | |
| 04546 | 644232 | 1120 | | STO | WN,1 | |
| 04547 | 544543 | 1121 | | BXD | $-4,1 | |
| | | 1122 | * | | | |
| 04550 | 040200 | 1123 | RADII | LAR | LATS | |
| 04551 | 502700 | 1124 | | BSE* | SINCOS | |
| 04552 | 640243 | 1125 | | STO | SLATS | B1 |
| 04553 | 220244 | 1126 | | SQR | CLATS | B1 |
| 04554 | 240001 | 1127 | | LLS | 1 | |
| 04555 | 400243 | 1128 | | MPY | SLATS | |
| 04556 | 401104 | 1129 | | MPY | EPS | AT B0 |
| 04557 | 640161 | 1130 | | STO | TS1 | EPS(SIN(LATS)**2) AT B1 |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 04560 | 240001 | 1131 | | LLS | 1 | |
| 04561 | 060161 | 1132 | | ADD | TS1 | |
| 04562 | 101104 | 1133 | | SUB | EPS | |
| 04563 | 640160 | 1134 | | STO | TS0 | 3(TS1)-2(EPS) AT B1 |
| 04564 | 120161 | 1135 | | LTC | TS1 | |
| 04565 | 640162 | 1136 | | STO | TS2 | |
| 04566 | 665002 | 1137 | | LXR | K2B17,1 | |
| 04567 | 044160 | 1138 | | LAR | TS0,1 | |
| 04570 | 061025 | 1139 | | ADD | K1B1 | |
| 04571 | 401105 | 1140 | | MPY | A | |
| 04572 | 240001 | 1141 | | LLS | 1 | |
| 04573 | 644236 | 1142 | | STO | RNS,1 | RADII IN N.MI. AT B12 |
| 04574 | 544567 | 1143 | | BXD | $-5,1 | |
| 04575 | 200332 | 1144 | | SXR | IVF1,0 | CLEAR INVALID FLAGS |
| 04576 | 200333 | 1145 | | SXR | IVF2,0 | |
| 04577 | 041016 | 1146 | | LAR | K1B8 | |
| 04600 | 640321 | 1147 | | STO | VORSC | |
| 04601 | 502742 | 1148 | NAVEND | BSE* | MAP | TO CHART ROUTINE. |
| | | 1149 | * | | | |
| | | 1150 | * | | KEYBOARD ROUTINE | |
| | | 1151 | * | | | |
| 04602 | 040272 | 1152 | KYBD | LAR | DSTINP | SAVE PREVIOUS DEST INPUT |
| 04603 | 640177 | 1153 | | STO | TS17 | |
| 04604 | 720407 | 1154 | | DIA | 007 | DISCRETE WD 3. |
| 04605 | 241012 | 1155 | | LRS | 10 | |
| 04606 | 021173 | 1156 | | ANA | MASK5 | EXTRACT DEST INP CODE. |
| 04607 | 141000 | 1157 | | LQR | KZ | |
| 04610 | 421026 | 1158 | | DIV | K3B2 | 3*(DSTINP) AT B16/3 AT B2 |
| 04611 | 061001 | 1159 | | ADD | K1B17 | ROUND |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 04612 | 640176 | 1160 | | STO | TS16 | DSTINP+REM AT B14 |
| 04613 | 021006 | 1161 | | ANA | K6B17 | EXTRACT 2 LEADING REM BITS. |
| 04614 | 320616 | 1162 | | BNZ | $+2 | NZ IS CODE WRONG |
| 04615 | 300621 | 1163 | | BRU | $+4 | |
| 04616 | 041016 | 1164 | | LAR | K1B8 | DEST I.D. FAIL BIT |
| 04617 | 502756 | 1165 | | BSE* | FAIL | TO FAIL S.R. |
| 04620 | 300621 | 1166 | | BRU | $+1 | REPLACE WITH HBR $+1 IF FAIL DANGEROUS |
| 04621 | 040176 | 1167 | | LAR | TS16 | |
| 04622 | 241003 | 1168 | | LRS | 3 | |
| 04623 | 640272 | 1169 | | STO | DSTINP | NEW DEST INP |
| 04624 | 705000 | 1170 | | PAX | 0,1 | |
| 04625 | 041004 | 1171 | KYBD1 | LAR | K4B17 | |
| 04626 | 061021 | 1172 | | ADD | K1B5 | |
| 04627 | 020327 | 1173 | | ANA | DSCWD2 | |
| 04630 | 320634 | 1174 | | BNZ | $+4 | NZ IS MAN OR CONF |
| 04631 | 040271 | 1175 | | LAR | DSTCMD | AUTO MODE |
| 04632 | 100272 | 1176 | | SUB | DSTINP | |
| 04633 | 320636 | 1177 | | BNZ | $+3 | (CMD-INP)DEST |
| 04634 | 640017 | 1178 | | STO | DRSTF | DEST RESET FLAG |
| 04635 | 300666 | 1179 | | BRU | KYBD3-1 | |
| 04636 | 040017 | 1180 | | LAR | DRSTF | |
| 04637 | 320661 | 1181 | | BNZ | KYBD2 | NZ IS RESET MODE |
| 04640 | 040272 | 1182 | | LAR | DSTINP | |
| 04641 | 100177 | 1183 | | SUB | TS17 | |
| 04642 | 320666 | 1184 | | BNZ | KYBD3-1 | (NEW-OLD)INP |
| 04643 | 040273 | 1185 | | LAR | DSTMR | INCREMENT DEST TIMER |
| 04644 | 061001 | 1186 | | ADD | K1B17 | |
| 04645 | 640273 | 1187 | | STO | DSTMR | |
| 04646 | 101006 | 1188 | | SUB | K6B17 | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 04647 | 340667 | 1189 | | BMI | KYBD3 | TIMER-LIMIT |
| 04650 | 040272 | 1190 | | LAR | DSTINP | |
| 04651 | 640271 | 1191 | | STO | DSTCMD | SET CMD=INP |
| 04652 | 320656 | 1192 | | BNZ | $+4 | |
| 04653 | 041031 | 1193 | | LAR | MS | NEW DSTCMD=0 |
| 04654 | 640347 | 1194 | | STO | DKMDF | SET DARK MODE |
| 04655 | 300667 | 1195 | | BRU | KYBD3 | |
| 04656 | 200347 | 1196 | | SXR | DKMDF,0 | SET LITE MODE |
| 04657 | 200341 | 1197 | | SXR | DVF,0 | ERASE DEST 0 VALID |
| 04660 | 300667 | 1198 | | BRU | KYBD3 | |
| 04661 | 040330 | 1199 | KYBD2 | LAR | DOWD | PULSE DEST I.D. COUNTER |
| 04662 | 001013 | 1200 | | ORA | K1B11 | |
| 04663 | 700001 | 1201 | | DOA | 001 | |
| 04664 | 101013 | 1202 | | SUB | K1B11 | |
| 04665 | 640330 | 1203 | | STO | DOWD | |
| 04666 | 200273 | 1204 | | SXR | DSTMR,0 | DEST TIMER=0 |
| 04667 | 040327 | 1205 | KYBD3 | LAR | DSCWD2 | |
| 04670 | 240001 | 1206 | | LLS | 1 | |
| 04671 | 340701 | 1207 | | BMI | KYBD4 | - IS PRES POS |
| 04672 | 240001 | 1208 | | LLS | 1 | |
| 04673 | 340710 | 1209 | | BMI | KYBD5 | - IS START |
| 04674 | 240001 | 1210 | | LLS | 1 | |
| 04675 | 340722 | 1211 | | BMI | KYBD6 | - IS DEST |
| 04676 | 240001 | 1212 | | LLS | 1 | |
| 04677 | 340750 | 1213 | | BMI | KYBD7 | - IS CLEAR |
| 04700 | 300765 | 1214 | | BRU | KYBD8 | NO DISCRETES |
| 04701 | 040330 | 1215 | KYBD4 | LAR | DOWD | PRES POS |
| 04702 | 001025 | 1216 | | ORA | K1B1 | |
| 04703 | 700001 | 1217 | | DOA | 001 | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 04704 | 101025 | 1218 |  | SUB | K1B1 |  |
| 04705 | 640330 | 1219 |  | STO | DOWD |  |
| 04706 | 675000 | 1220 |  | LXR | KZ,3 |  |
| 04707 | 300746 | 1221 |  | BRU | KYBD7-2 |  |
| 04710 | 041027 | 1222 | KYBD5 | LAR | PMAX | START |
| 04711 | 101024 | 1223 |  | SUB | K1B2 |  |
| 04712 | 020330 | 1224 |  | ANA | DOWD |  |
| 04713 | 700001 | 1225 |  | DOA | 001 |  |
| 04714 | 001024 | 1226 |  | ORA | K1B2 |  |
| 04715 | 640330 | 1227 |  | STO | DOWD |  |
| 04716 | 041031 | 1228 |  | LAR | MS |  |
| 04717 | 640340 | 1229 |  | STO | SVF | - TO START VALID FLAG |
| 04720 | 675004 | 1230 |  | LXR | K4B17,3 |  |
| 04721 | 300746 | 1231 |  | BRU | KYBD7-2 |  |
| 04722 | 041027 | 1232 | KYBD6 | LAR | PMAX | DEST |
| 04723 | 101023 | 1233 |  | SUB | K1B3 |  |
| 04724 | 020330 | 1234 |  | ANA | DOWD |  |
| 04725 | 700001 | 1235 |  | DOA | 001 |  |
| 04726 | 001023 | 1236 |  | ORA | K1B3 |  |
| 04727 | 640330 | 1237 |  | STO | DOWD |  |
| 04730 | 040272 | 1238 |  | LAR | DSTINP |  |
| 04731 | 320736 | 1239 |  | BNZ | $+5 | NZ IS LITE MODE |
| 04732 | 640271 | 1240 |  | STO | DSTCMD | DEST CMD=0 |
| 04733 | 041031 | 1241 |  | LAR | MS |  |
| 04734 | 640347 | 1242 |  | STO | DKMDF | - TO DARK MODE FLAG |
| 04735 | 300741 | 1243 |  | BRU | $+4 |  |
| 04736 | 200341 | 1244 |  | SXR | DVF,0 | LITE MODE. + TO DVF |
| 04737 | 200347 | 1245 |  | SXR | DKMDF,0 | + TO DARK MODE FLAG |
| 04740 | 041031 | 1246 |  | LAR | MS |  |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 04741 | 644342 | 1247 | | STO | DEF,1 | - TO DEF OR DVF1,2,3, OR 4 |
| 04742 | 040272 | 1248 | | LAR | DSTINP | |
| 04743 | 240001 | 1249 | | LLS | 1 | |
| 04744 | 061010 | 1250 | | ADD | K8B17 | |
| 04745 | 715000 | 1251 | | PAX | 0,3 | XR3=2*(DSTINP)+B |
| 04746 | 502752 | 1252 | | BSE* | CTP | CONVERT MAP X, Y TO LAT,LONG |
| 04747 | 301000 | 1253 | | BRU | KYBD9 | |
| 04750 | 041027 | 1254 | KYBD7 | LAR | PMAX | CLEAR |
| 04751 | 101024 | 1255 | | SUB | K1B2 | |
| 04752 | 101023 | 1256 | | SUB | K1B3 | |
| 04753 | 020330 | 1257 | | ANA | DOWD | REMOVE START AND DEST ACKNOW |
| 04754 | 640330 | 1258 | | STO | DOWD | |
| 04755 | 041000 | 1259 | | LAR | KZ | |
| 04756 | 675007 | 1260 | | LXR | K7B17,3 | |
| 04757 | 654340 | 1261 | | STO | SVF,3 | CLEAR FLAGS |
| 04760 | 554757 | 1262 | | BXD | $-1,3 | |
| 04761 | 041031 | 1263 | | LAR | MS | |
| 04762 | 640017 | 1264 | | STO | DRSTF | - TO RESET FLAG |
| 04763 | 200271 | 1265 | | SXR | DSTCMD,0 | CMD=0 |
| 04764 | 301000 | 1266 | | BRU | KYBD9 | |
| 04765 | 044342 | 1267 | KYBD8 | LAR | DEF,1 | DEST ACKOW |
| 04766 | 340775 | 1268 | | BMI | $+7 | - IS VALID |
| 04767 | 040341 | 1269 | | LAR | DVF | |
| 04770 | 340775 | 1270 | | BMI | $+5 | |
| 04771 | 041027 | 1271 | | LAR | PMAX | DEST NOT VALID |
| 04772 | 101023 | 1272 | | SUB | K1B3 | REMOVE ACKNOW |
| 04773 | 020330 | 1273 | | ANA | DOWD | |
| 04774 | 300777 | 1274 | | BRU | $+3 | |
| 04775 | 040330 | 1275 | | LAR | DOWD | DEST VALID |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 04776 | 001023 | 1276 | | ORA | K1B3 | INSERT ACKNOW |
| 04777 | 640330 | 1277 | | STO | DOWD | |
| 05000 | 040327 | 1278 | KYBD9 | LAR | DSCWD2 | OFFSET PROCESSING |
| 05001 | 240430 | 1279 | | LRL | 24 | POSITION BITS |
| 05002 | 561000 | 1280 | | LDR | KZ | |
| 05003 | 665003 | 1281 | | LXR | K3B17,1 | PARITY CK |
| 05004 | 041000 | 1282 | | LAR | KZ | |
| 05005 | 240401 | 1283 | | LRL | 1 | |
| 05006 | 601000 | 1284 | | ADA | | |
| 05007 | 600000 | 1285 | | PAD | | D= SUM OF BITS |
| 05010 | 545004 | 1286 | | BXD | $-4,1 | |
| 05011 | 021001 | 1287 | | ANA | K1B17 | |
| 05012 | 321016 | 1288 | | BNZ | $+4 | NZ IS ODD NO OF ONES. |
| 05013 | 041015 | 1289 | | LAR | K1B9 | OFFSET PARITY CK FAIL |
| 05014 | 502756 | 1290 | | BSE* | FAIL | TO FAIL S.R. |
| 05015 | 301016 | 1291 | | BRU | $+1 | REPLACE WITH HBR $+1 IF FAIL DANGEROUS |
| 05016 | 040327 | 1292 | | LAR | DSCWD2 | PARITY OK |
| 05017 | 241010 | 1293 | | LRS | 8 | |
| 05020 | 021003 | 1294 | | ANA | K3B17 | EXTRACT MAG BITS |
| 05021 | 711000 | 1295 | | PAX | 0,2 | |
| 05022 | 551030 | 1296 | | BXD | KYBD10,2 | |
| 05023 | 200255 | 1297 | | SXR | OFFSET,0 | ZERO OFFSET RQST |
| 05024 | 041027 | 1298 | | LAR | PMAX | |
| 05025 | 101022 | 1299 | | SUB | K1B4 | |
| 05026 | 020330 | 1300 | | ANA | DOWD | REMOVE ACKNOW |
| 05027 | 301041 | 1301 | | BRU | $+10 | |
| 05030 | 040327 | 1302 | KYBD10 | LAR | DSCWD2 | OFFSET RQST |
| 05031 | 021017 | 1303 | | ANA | K1B7 | |
| 05032 | 321035 | 1304 | | BNZ | $+3 | NZ IS - OFFSET |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 05033 | 051130 | 1305 | | LAR | K3MI,2 | |
| 05034 | 301036 | 1306 | | BRU | $+2 | |
| 05035 | 131130 | 1307 | | LTC | K3MI,2 | |
| 05036 | 640255 | 1308 | | STO | OFFSET | |
| 05037 | 040330 | 1309 | | LAR | DOWD | INSERT ACKNOW |
| 05040 | 001022 | 1310 | | ORA | K1B4 | |
| 05041 | 640330 | 1311 | | STO | DOWD | |
| | | 1312 | * | | | |
| | | 1313 | * | | | RSI LOGIC ROUTINE |
| | | 1314 | * | | | |
| 05042 | 041027 | 1315 | RSI | LAR | PMAX | REMOVE |
| 05043 | 101012 | 1316 | | SUB | K1B12 | 5 MIN |
| 05044 | 101011 | 1317 | | SUB | K1B13 | 1 MIN |
| 05045 | 020330 | 1318 | | ANA | DOWD | WARN BITS |
| 05046 | 640330 | 1319 | | STO | DOWD | FR DOWD 2. |
| 05047 | 200275 | 1320 | | SXR | GDSP,0 | |
| 05050 | 040331 | 1321 | | LAR | NABF | |
| 05051 | 341205 | 1322 | | BMI | RSI5 | - IS NOT AIRBORNE |
| 05052 | 040230 | 1323 | | LAR | VN | |
| 05053 | 140231 | 1324 | | LQR | VW | |
| 05054 | 502722 | 1325 | | BSE* | MAG | |
| 05055 | 640275 | 1326 | | STO | GDSP | GROUND SPEED. KNOTS AT B11. |
| 05056 | 040340 | 1327 | | LAR | SVF | |
| 05057 | 341061 | 1328 | | BMI | $+2 | - IS START VALID |
| 05060 | 301205 | 1329 | | BRU | RSI5 | |
| 05061 | 141031 | 1330 | | LQR | MS | - TO Q |
| 05062 | 040347 | 1331 | | LAR | DKMDF | |
| 05063 | 341101 | 1332 | | BMI | RSI2 | - IS DARK MODE |
| 05064 | 040271 | 1333 | RSI1 | LAR | DSTCMD | LITE MODE |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 05065 | 321071 | 1334 | | BNZ | $+4 | IF CMD=0, SET=1 |
| 05066 | 041001 | 1335 | | LAR | K1B17 | |
| 05067 | 640271 | 1336 | | STO | DSTCMD | |
| 05070 | 220017 | 1337 | | SQR | DRSTF | - TO RESET FLAG |
| 05071 | 705000 | 1338 | | PAX | 0,1 | XR1=DSTCMD=I |
| 05072 | 240001 | 1339 | | LLS | 1 | |
| 05073 | 715000 | 1340 | | PAX | 0,3 | XR3=2(I) |
| 05074 | 044342 | 1341 | | LAR | DEF,1 | |
| 05075 | 341111 | 1342 | | BMI | RSI3-4 | - IS CMD DEST VALID |
| 05076 | 200271 | 1343 | | SXR | DSTCMD,0 | CMD=0 |
| 05077 | 220017 | 1344 | | SQR | DRSTF | - TO RESET FLAG |
| 05100 | 301205 | 1345 | | BRU | RSI5 | |
| 05101 | 040341 | 1346 | RSI2 | LAR | DVF | DARK MODE |
| 05102 | 341115 | 1347 | | BMI | RSI3 | - IS DEST VALID |
| 05103 | 040342 | 1348 | | LAR | DEF | |
| 05104 | 341106 | 1349 | | BMI | $+2 | - DEST ENTERED |
| 05105 | 301205 | 1350 | | BRU | RSI5 | |
| 05106 | 640341 | 1351 | | STO | DVF | - TO DEST VALID FLAG |
| 05107 | 200342 | 1352 | | SXR | DEF,0 | + TO DEST ENTERED FLAG |
| 05110 | 675000 | 1353 | | LXR | KZ,3 | |
| 05111 | 054210 | 1354 | | LAR | LATBD,3 | |
| 05112 | 154211 | 1355 | | LQR | LNGBD,3 | |
| 05113 | 640206 | 1356 | | STO | LATD | |
| 05114 | 220207 | 1357 | | SQR | LNGD | |
| 05115 | 040206 | 1358 | RSI3 | LAR | LATD | DET APPROX GND TRACK LENGTH. (RADS/PI) |
| 05116 | 100204 | 1359 | | SUB | LATI | |
| 05117 | 640163 | 1360 | | STO | TS3 | |
| 05120 | 040207 | 1361 | | LAR | LNGD | |
| 05121 | 100205 | 1362 | | SUB | LNGI | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 05122 | 400244 | 1363 | | MPY | CLATS | |
| 05123 | 240001 | 1364 | | LLS | 1 | |
| 05124 | 140163 | 1365 | | LQR | TS3 | |
| 05125 | 502722 | 1366 | | BSE* | MAG | |
| 05126 | 101110 | 1367 | | SUB | KGCLIM | GREAT CIRCLE LIMIT |
| 05127 | 341134 | 1368 | | BMI | $+5 | - IS COMP LAMBERT GND TRACK |
| 05130 | 502730 | 1369 | | BSE* | XMTX | GREAT CIRCLE COMPS. XFM MATRIX AND DID SELECT A/C POS |
| 05131 | 675000 | 1370 | | LXR | KZ,3 | |
| 05132 | 502736 | 1371 | | BSE* | RELOC | RELOCATED COORDS, DIA AND RHO. |
| 05133 | 301135 | 1372 | | BRU | $+2 | |
| 05134 | 502726 | 1373 | | BSE* | LAMGT | LAMBERT GND TRACK S.R. |
| 05135 | 040261 | 1374 | | LAR | DIA | DIST I TO A/C |
| 05136 | 100260 | 1375 | | SUB | DID | DIST I TO D |
| 05137 | 101072 | 1376 | | SUB | KDPAD | DEST PAD |
| 05140 | 341153 | 1377 | | BMI | RSI4-3 | - IS A/C NOT PAST DEST |
| 05141 | 040347 | 1378 | | LAR | DKMDF | PAST DEST |
| 05142 | 341145 | 1379 | | BMI | $+3 | - IS DARK MODE |
| 05143 | 664271 | 1380 | | LXR | DSTCMD,1 | |
| 05144 | 644342 | 1381 | | STO | DEF,1 | + TO DVF(I) |
| 05145 | 200341 | 1382 | | SXR | DVF,0 | + TO DVF |
| 05146 | 040206 | 1383 | | LAR | LATD | DEST TO START PT |
| 05147 | 140207 | 1384 | | LQR | LNGD | |
| 05150 | 640204 | 1385 | | STO | LATI | |
| 05151 | 220205 | 1386 | | SQR | LNGI | |
| 05152 | 301205 | 1387 | | BRU | RSI5 | |
| 05153 | 040261 | 1388 | | LAR | DIA | |
| 05154 | 061073 | 1389 | | ADD | KIPAD | START PAD |
| 05155 | 341205 | 1390 | | BMI | RSI5 | - IS NOT TO START YET |
| 05156 | 040254 | 1391 | RSI4 | LAR | RHO | A/C DIST FR PRIMARY TRACK. B12 |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 05157 | 060255 | 1392 | | ADD | OFFSET | TRACK OFFSET |
| 05160 | 640163 | 1393 | | STO | TS3 | |
| 05161 | 141000 | 1394 | | LQR | KZ | |
| 05162 | 421022 | 1395 | | DIV | K1B4 | |
| 05163 | 640254 | 1396 | | STO | RHO | RHO RESCALED TO B8. |
| 05164 | 040260 | 1397 | | LAR | DID | |
| 05165 | 100261 | 1398 | | SUB | DIA | A=(DID-DIA) |
| 05166 | 140163 | 1399 | | LQR | TS3 | Q=RHO |
| 05167 | 502722 | 1400 | | BSE* | MAG | |
| 05170 | 640276 | 1401 | | STO | DIST | A/C TO DEST DISTANCE. N.MI. AT B12. |
| 05171 | 401075 | 1402 | | MPY | K60B8 | |
| 05172 | 420275 | 1403 | | DIV | GDSP | 12+8-11=9 |
| 05173 | 640177 | 1404 | | STO | TS17 | NEW ETE. MINS AT B9. |
| 05174 | 100277 | 1405 | | SUB | ETE | |
| 05175 | 341200 | 1406 | | BMI | $+3 | - IS ETE DECREASING |
| 05176 | 101134 | 1407 | | SUB | K5MIN | |
| 05177 | 341202 | 1408 | | BMI | $+3 | DELTA(ETE)-5MIN |
| 05200 | 040177 | 1409 | | LAR | TS17 | |
| 05201 | 640277 | 1410 | | STO | ETE | NEW ETE. MINS AT B9. |
| 05202 | 040347 | 1411 | | LAR | DKMDF | |
| 05203 | 341212 | 1412 | | BMI | RSI6 | - IS DARK MODE |
| 05204 | 301243 | 1413 | | BRU | RSI7 | |
| 05205 | 041000 | 1414 | RSI5 | LAR | KZ | NO STEERING BRANCH |
| 05206 | 640276 | 1415 | | STO | DIST | |
| 05207 | 640277 | 1416 | | STO | ETE | |
| 05210 | 200351 | 1417 | | SXR | STRF,0 | + TO STEERING FLAG |
| 05211 | 301326 | 1418 | | BRU | RSI10 | |
| 05212 | 040277 | 1419 | RSI6 | LAR | ETE | DARK MODE WARNING COMPS. |
| 05213 | 101134 | 1420 | | SUB | K5MIN | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 05214 | 341220 | 1421 | | BMI | $+4 | ETE-5MIN |
| 05215 | 040342 | 1422 | | LAR | DEF | |
| 05216 | 341235 | 1423 | | BMI | RSI7-6 | - IS DEST ENTERED |
| 05217 | 301324 | 1424 | | BRU | RSI10-2 | |
| 05220 | 040277 | 1425 | | LAR | ETE | |
| 05221 | 101133 | 1426 | | SUB | K1MIN | |
| 05222 | 341226 | 1427 | | BMI | $+4 | ETE-1MIN |
| 05223 | 040342 | 1428 | | LAR | DEF | |
| 05224 | 341324 | 1429 | | BMI | RSI10-2 | - IS DEST ENTERED |
| 05225 | 301263 | 1430 | | BRU | RSI8 | TO 5MIN WARN |
| 05226 | 040342 | 1431 | | LAR | DEF | |
| 05227 | 341231 | 1432 | | BMI | $+2 | - IS DEST ENTERED |
| 05230 | 301265 | 1433 | | BRU | RSI8+2 | TO 5MIN AND 1MIN WARN |
| 05231 | 040206 | 1434 | | LAR | LATD | DEST TO START PT |
| 05232 | 140207 | 1435 | | LQR | LNGD | |
| 05233 | 640204 | 1436 | | STO | LATI | |
| 05234 | 220205 | 1437 | | SQR | LNGI | |
| 05235 | 040210 | 1438 | | LAR | LATBD | BUFFERED TO TRUE DEST |
| 05236 | 140211 | 1439 | | LQR | LNGBD | |
| 05237 | 640206 | 1440 | | STO | LATD | |
| 05240 | 220207 | 1441 | | SQR | LNGD | |
| 05241 | 200342 | 1442 | | SXR | DEF,0 | + TO DEST ENTERED FLAG |
| 05242 | 301324 | 1443 | | BRU | RSI10-2 | |
| 05243 | 040271 | 1444 | RSI7 | LAR | DSTCMD | LITE MODE. |
| 05244 | 061001 | 1445 | | ADD | K1B17 | FORM NEXT DEST (I+1) |
| 05245 | 711000 | 1446 | | PAX | 0,2 | XR2=(I+1) |
| 05246 | 101005 | 1447 | | SUB | K5B17 | |
| 05247 | 341251 | 1448 | | BMI | $+2 | + IS I=4 |
| 05250 | 671001 | 1449 | | LXR | K1B17,2 | SET NEXT DEST =1 |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 05251 | 210177 | 1450 | | SXR | TS17,2 | SAVE (I+1) |
| 05252 | 050342 | 1451 | | LAR | DEF,2 | |
| 05253 | 341272 | 1452 | | BMI | RSI9 | - IS NEXT DEST VALID |
| 05254 | 040277 | 1453 | | LAR | ETE | WARNING COMPS |
| 05255 | 101134 | 1454 | | SUB | K5MIN | |
| 05256 | 341260 | 1455 | | BMI | $+2 | ETE-5MIN |
| 05257 | 301324 | 1456 | | BRU | RSI10-2 | |
| 05260 | 040277 | 1457 | | LAR | ETE | |
| 05261 | 101133 | 1458 | | SUB | K1MIN | |
| 05262 | 341265 | 1459 | | BMI | $+3 | ETE-1MIN |
| 05263 | 041012 | 1460 | RSI8 | LAR | K1B12 | 5MIN WARNING |
| 05264 | 301267 | 1461 | | BRU | $+3 | |
| 05265 | 041012 | 1462 | | LAR | K1B12 | 5MIN AND |
| 05266 | 061011 | 1463 | | ADD | K1B13 | 1MIN WARNING |
| 05267 | 000330 | 1464 | | ORA | DOWD | |
| 05270 | 640330 | 1465 | | STO | DOWD | |
| 05271 | 301324 | 1466 | | BRU | RSI10-2 | |
| 05272 | 040177 | 1467 | RSI9 | LAR | TS17 | ANGLE BETWEEN TRACKS COMP. (I+1) TO A |
| 05273 | 240001 | 1468 | | LLS | 1 | |
| 05274 | 715000 | 1469 | | PAX | 0,3 | XR3=2*(I+1) |
| 05275 | 054210 | 1470 | | LAR | LATBD,3 | LAT(I+1) |
| 05276 | 100206 | 1471 | | SUB | LATD | |
| 05277 | 640163 | 1472 | | STO | TS3 | |
| 05300 | 040207 | 1473 | | LAR | LNGD | |
| 05301 | 114211 | 1474 | | SUB | LNGBD,3 | LNG(I+1) |
| 05302 | 400244 | 1475 | | MPY | CLATS | |
| 05303 | 240001 | 1476 | | LLS | 1 | |
| 05304 | 140163 | 1477 | | LQR | TS3 | |
| 05305 | 502702 | 1478 | | BSE* | ARCTAN | APPROX BRG OF NEXT TRACK |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 05306 | 100307 | 1479 | | SUB | THETI | PRESENT GND TRACK BRG (AT I) |
| 05307 | 640170 | 1480 | | STO | TS10 | BRG DIFFERENCE |
| 05310 | 160170 | 1481 | | LPM | TS10 | |
| 05311 | 401014 | 1482 | | MPY | K1B10 | |
| 05312 | 421076 | 1483 | | DIV | KTR | NOMINAL TURNING RATE. B1 |
| 05313 | 100277 | 1484 | | SUB | ETE | |
| 05314 | 341324 | 1485 | | BMI | RSI10-2 | - IS NOT TIME TO TURN |
| 05315 | 664271 | 1486 | | LXR | DSTCMD,1 | SWITCH TRACKS |
| 05316 | 644342 | 1487 | | STO | DEF,1 | + TO DVF(I) |
| 05317 | 040206 | 1488 | | LAR | LATD | PRESENT DEST |
| 05320 | 140207 | 1489 | | LQR | LNGD | TO |
| 05321 | 640204 | 1490 | | STO | LATI | START POINT |
| 05322 | 220205 | 1491 | | SQR | LNGI | |
| 05323 | 210271 | 1492 | | SXR | DSTCMD,2 | DEST CMD=(I+1) |
| 05324 | 041031 | 1493 | | LAR | MS | - TO STEERING FLAG |
| 05325 | 640351 | 1494 | | STO | STRF | |
| 05326 | 040327 | 1495 | RSI10 | LAR | DSCWD2 | DATA READOUT |
| 05327 | 241004 | 1496 | | LRS | 4 | |
| 05330 | 021007 | 1497 | | ANA | K7B17 | |
| 05331 | 640177 | 1498 | | STO | TS17 | NEW READOUT RQST |
| 05332 | 100274 | 1499 | | SUB | RDRQST | |
| 05333 | 321341 | 1500 | | BNZ | $+6 | NZ IS CHANGE IN RQST |
| 05334 | 040323 | 1501 | | LAR | RDSC | READOUT TIMER |
| 05335 | 240001 | 1502 | | LLS | 1 | |
| 05336 | 341341 | 1503 | | BMI | $+3 | - IS TIME TO READOUT |
| 05337 | 640323 | 1504 | | STO | RDSC | |
| 05340 | 301106 | 1505 | | BRU* | LINK3 | TO STEERING |
| 05341 | 040177 | 1506 | | LAR | TS17 | |
| 05342 | 640274 | 1507 | | STO | RDRQST | NEW RQST |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 05343 | 321345 | 1508 | | BNZ | $+2 | |
| 05344 | 301363 | 1509 | | BRU | RSI11 | OUTPUT 0 |
| 05345 | 241001 | 1510 | | LRS | 1 | |
| 05346 | 321352 | 1511 | | BNZ | $+4 | |
| 05347 | 040275 | 1512 | | LAR | GDSP | GROUND SPEED |
| 05350 | 241406 | 1513 | | ARS | 6 | |
| 05351 | 301362 | 1514 | | BRU | RSI11-1 | |
| 05352 | 241001 | 1515 | | LRS | 1 | |
| 05353 | 321357 | 1516 | | BNZ | $+4 | |
| 05354 | 040276 | 1517 | | LAR | DIST | DISTANCE |
| 05355 | 241405 | 1518 | | ARS | 5 | |
| 05356 | 301362 | 1519 | | BRU | RSI11-1 | |
| 05357 | 040277 | 1520 | | LAR | ETE | EST TIME ENROUTE |
| 05360 | 061014 | 1521 | | ADD | K1B10 | ROUND |
| 05361 | 241410 | 1522 | | ARS | 8 | |
| 05362 | 502712 | 1523 | | BSE* | BNBCD | CONV TO BCD |
| 05363 | 700002 | 1524 | RSI11 | DOA | 002 | OUTPUT |
| 05364 | 041016 | 1525 | | LAR | K1B8 | RESET READOUT TIMER |
| 05365 | 640323 | 1526 | | STO | RDSC | |
| 05366 | 303151 | 1527 | | BRU* | LINK3 | TO STEERING ROUTINE |
| | | 1528 | * | | | |
| | | 1529 | * | | | DISPLAY CONTROL ROUTINE |
| | | 1530 | * | | | |
| 05367 | 200350 | 1531 | CON | SXR | STCKF,0 | + TO S.T. FLAG |
| 05370 | 041027 | 1532 | | LAR | PMAX | REMOVE |
| 05371 | 101021 | 1533 | | SUB | K1B5 | RSI |
| 05372 | 101014 | 1534 | | SUB | K1B10 | OFF CHART |
| 05373 | 020330 | 1535 | | ANA | DOWD | BITS FR |
| 05374 | 640330 | 1536 | | STO | DOWD | DO WORD. |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 05375 | 040336 | 1537 | | LAR | CCHF | |
| 05376 | 341463 | 1538 | | BMI | CON4 | - IS CHART CHANGE |
| 05377 | 040337 | 1539 | | LAR | SPCHF | |
| 05400 | 341463 | 1540 | | BMI | CON4 | - IS SPECIAL CHART |
| 05401 | 040327 | 1541 | | LAR | DSCWD2 | |
| 05402 | 021004 | 1542 | | ANA | K4B17 | |
| 05403 | 321411 | 1543 | | BNZ | CON1 | NZ IS MANUAL MODE |
| 05404 | 040327 | 1544 | | LAR | DSCWD2 | |
| 05405 | 021021 | 1545 | | ANA | K1B5 | |
| 05406 | 321416 | 1546 | | BNZ | CON2 | NZ IS DEST CONF |
| 05407 | 675000 | 1547 | | LXR | KZ,3 | SELECT A/C POS |
| 05410 | 301431 | 1548 | | BRU | CON3 | |
| 05411 | 665003 | 1549 | CON1 | LXR | K3B17,1 | MAN |
| 05412 | 044430 | 1550 | | LAR | SXF8,1 | |
| 05413 | 644464 | 1551 | | STO | SXC0,1 | |
| 05414 | 545412 | 1552 | | BXD | $-2,1 | |
| 05415 | 301470 | 1553 | | BRU | CON5 | |
| 05416 | 040272 | 1554 | CON2 | LAR | DSTINP | CONFIRM |
| 05417 | 705000 | 1555 | | PAX | 0,1 | XR1=I |
| 05420 | 240001 | 1556 | | LLS | 1 | |
| 05421 | 061010 | 1557 | | ADD | K8B17 | |
| 05422 | 715000 | 1558 | | PAX | 0,3 | XR3=2(I)+8 |
| 05423 | 044342 | 1559 | | LAR | DEF,1 | |
| 05424 | 341431 | 1560 | | BMI | CON3 | - IS DEST VALID |
| 05425 | 040341 | 1561 | | LAR | DVF | |
| 05426 | 341430 | 1562 | | BMI | $+2 | - IS DEST 0 VALID |
| 05427 | 301411 | 1563 | | BRU | CON1 | DEST NOT VALID |
| 05430 | 675006 | 1564 | | LXR | K6B17,3 | |
| 05431 | 502750 | 1565 | CON3 | BSE* | PTC | COMP MAP X,Y |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 05432 | 671002 | 1566 | | LXR | K2B17,2 | |
| 05433 | 675001 | 1567 | | LXR | K1B17,3 | |
| 05434 | 054250 | 1568 | | LAR | XM,3 | CONV TO RADS |
| 05435 | 415115 | 1569 | | MPY | KX,3 | |
| 05436 | 420306 | 1570 | | DIV | S | |
| 05437 | 361474 | 1571 | | BIR | CON6 | O.F. IS OFF CHART |
| 05440 | 654252 | 1572 | | STO | XC,3 | CMD POS (RADS/PI) |
| 05441 | 502700 | 1573 | | BSE* | SINCOS | |
| 05442 | 650172 | 1574 | | STO | TS12,2 | SIN |
| 05443 | 230173 | 1575 | | SQR | TS13,2 | COS |
| 05444 | 174252 | 1576 | | LPM | XC,3 | |
| 05445 | 115120 | 1577 | | SUB | XLIM,3 | |
| 05446 | 341450 | 1578 | | BMI | $+2 | CMD-LIM |
| 05447 | 301474 | 1579 | | BRU | CON6 | OFF CHART |
| 05450 | 671000 | 1580 | | LXR | KZ,2 | |
| 05451 | 555434 | 1581 | | BXD | CON3+3,3 | |
| 05452 | 040430 | 1582 | | LAR | SXFB | |
| 05453 | 140431 | 1583 | | LQR | CXFB | |
| 05454 | 502702 | 1584 | | BSE* | ARCTAN | COMPUTE MAP X POS. (RADS/PI) |
| 05455 | 100252 | 1585 | | SUB | XC | (FB-CMD) POS |
| 05456 | 361463 | 1586 | | BIR | CON4 | O.F. IS GREATER THAN 180DEG |
| 05457 | 640170 | 1587 | | STO | TS10 | EPSX=FB-CMD |
| 05460 | 160170 | 1588 | | LPM | TS10 | |
| 05461 | 101124 | 1589 | | SUB | EPSLIM | |
| 05462 | 341500 | 1590 | | BMI | CON7 | ABS(EPSX)-EPSLIM |
| 05463 | 200464 | 1591 | CON4 | SXR | SXC0,0 | CMD MAP CENTER |
| 05464 | 200466 | 1592 | | SXR | SYC0,0 | |
| 05465 | 041025 | 1593 | | LAR | K1B1 | |
| 05466 | 640465 | 1594 | | STO | CXC0 | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 05467 | 640467 | 1595 | | STO | CYCO | |
| 05470 | 200506 | 1596 | CON5 | SXR | SLDMU,0 | MAP HDG ZERO |
| 05471 | 041025 | 1597 | | LAR | K1B1 | |
| 05472 | 640507 | 1598 | | STO | CLDMU | |
| 05473 | 301513 | 1599 | | BRU | CON8 | |
| 05474 | 040330 | 1600 | CON6 | LAR | DOWD | OFF CHART |
| 05475 | 001014 | 1601 | | ORA | K1B10 | |
| 05476 | 640330 | 1602 | | STO | DOWD | |
| 05477 | 301470 | 1603 | | BRU | CON5 | |
| 05500 | 665003 | 1604 | CON7 | LXR | K3B17,1 | OUTPUT MAP CMD POS |
| 05501 | 044172 | 1605 | | LAR | TS12,1 | B1 |
| 05502 | 644464 | 1606 | | STO | SXCO,1 | B0 |
| 05503 | 545501 | 1607 | | BXD | $-2,1 | |
| 05504 | 041031 | 1608 | | LAR | MS | |
| 05505 | 640350 | 1609 | | STO | STCKF | SET S.T. FLAG |
| 05506 | 040327 | 1610 | | LAR | DSCWD2 | |
| 05507 | 021021 | 1611 | | ANA | K1B5 | |
| 05510 | 321513 | 1612 | | BNZ | CON8 | NZ IS DEST CONF |
| 05511 | 040351 | 1613 | | LAR | STRF | |
| 05512 | 341520 | 1614 | | BMI | CON9 | - IS STEERING VALID |
| 05513 | 040500 | 1615 | CON8 | LAR | SPSI | RSI BLANK |
| 05514 | 140501 | 1616 | | LQR | CPSI | |
| 05515 | 640510 | 1617 | | STO | STHET | |
| 05516 | 220511 | 1618 | | SQR | CTHET | |
| 05517 | 301547 | 1619 | | BRU | CON10-3 | |
| 05520 | 040330 | 1620 | CON9 | LAR | DOWD | RSI ON |
| 05521 | 001021 | 1621 | | ORA | K1B5 | |
| 05522 | 640330 | 1622 | | STO | DOWD | |
| 05523 | 040254 | 1623 | | LAR | RHO | N.MI. |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 05524 | 401117 | 1624 | | MPY | KRHO | |
| 05525 | 420306 | 1625 | | DIV | S | 8+2-10=0 |
| 05526 | 640170 | 1626 | | STO | TS10 | RHO IN RADS/PI |
| 05527 | 160170 | 1627 | | LPM | TS10 | |
| 05530 | 101122 | 1628 | | SUB | RHOLIM | |
| 05531 | 341540 | 1629 | | BMI | $+7 | RHO-LIM |
| 05532 | 040170 | 1630 | | LAR | TS10 | |
| 05533 | 341536 | 1631 | | BMI | $+3 | |
| 05534 | 041122 | 1632 | | LAR | RHOLIM | |
| 05535 | 301544 | 1633 | | BRU | $+7 | |
| 05536 | 121122 | 1634 | | LTC | RHOLIM | |
| 05537 | 301544 | 1635 | | BRU | $+5 | |
| 05540 | 160170 | 1636 | | LPM | TS10 | |
| 05541 | 101123 | 1637 | | SUB | RHOTHR | RHO OUTPUT THRESHOLD |
| 05542 | 341547 | 1638 | | BMI | CON10-3 | ABS(RHO)-THRESHOLD |
| 05543 | 040170 | 1639 | | LAR | TS10 | RHO (RADS/PI) |
| 05544 | 502700 | 1640 | | BSE* | SINCOS | |
| 05545 | 640462 | 1641 | | STO | SRHOO | SIN(RHO OUTPUT) B1 |
| 05546 | 301551 | 1642 | | BRU | $+3 | |
| 05547 | 200462 | 1643 | | SXR | SRHOO,0 | SET RSI DISPLACEMENT=0 |
| 05550 | 141025 | 1644 | | LQR | K1B1 | |
| 05551 | 220463 | 1645 | | SQR | CRHOO | COS(RHO OUTPUT) B1 |
| 05552 | 675160 | 1646 | CON10 | LXR | K3XR,3 | |
| 05553 | 040327 | 1647 | | LAR | DSCWD2 | |
| 05554 | 341561 | 1648 | | BMI | CON11 | - IS HDG UP |
| 05555 | 054500 | 1649 | | LAR | SPSI,3 | NORTH UP |
| 05556 | 654450 | 1650 | | STO | SPSIO,3 | OUTPUT AT B1 |
| 05557 | 555555 | 1651 | | BXD | $-2,3 | |
| 05560 | 301572 | 1652 | | BRU | CON12 | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 05561 | 665157 | 1653 | CON11 | LXR | K2XR,1 | HDG UP |
| 05562 | 671156 | 1654 | | LXR | K1XR,2 | A2=PSI |
| 05563 | 502716 | 1655 | | BSE* | SCDIFF | TRANSFORM OUTPUT VARS. |
| 05564 | 234450 | 1656 | | SQR | SPSIO,3 | COS(OUTPUT-PSI) B1 |
| 05565 | 555566 | 1657 | | BXD | $+1,3 | XR3-1 |
| 05566 | 654450 | 1658 | | STO | SPSIO,3 | SIN(OUTPUT-PSI) B1 |
| 05567 | 545570 | 1659 | | BXD | $+1,1 | XR1-2 |
| 05570 | 545571 | 1660 | | BXD | $+1,1 | |
| 05571 | 555563 | 1661 | | BXD | CON11+2,3 | |
| 05572 | 040330 | 1662 | CON12 | LAR | DOWD2 | OUTPUT DO WORD 2 |
| 05573 | 700001 | 1663 | | DOA | 001 | |
| 05574 | 303150 | 1664 | | BRU* | LINK2 | EXIT TO CONT MONITOR SELF TEST. |
| | | 1665 | * | | | |
| | | 1666 | * | | | |
| | | 1667 | * | | GROUP 3 | |
| | | 1668 | * | | | |
| 06000 | | 1669 | | ORIGIN | 06000 | |
| | | 1670 | * | | | |
| | | 1671 | * | | SINE-COSINE ROUTINE. ANGLE IN A IN RADS AT P1 | |
| | | 1672 | * | | OUTPUT SIN IN A AND TSO, COS IN Q AND TS1 AT B1 | |
| | | 1673 | * | | | |
| 06000 | 640160 | 1674 | SICO1 | STO | TSO | X=ANGLE/PI (400000 TO 377777) |
| 06001 | 160160 | 1675 | | LPM | TSO | |
| 06002 | 640162 | 1676 | | STO | TS2 | |
| 06003 | 041025 | 1677 | | LAR | K1B1 | |
| 06004 | 100162 | 1678 | | SUB | TS2 | |
| 06005 | 640161 | 1679 | | STO | TS1 | 1/2-ABS(X) |
| 06006 | 340010 | 1680 | | BMI | $+2 | - IS 2ND OR 3RD QUAD. |
| 06007 | 300013 | 1681 | | BRU | SICO2 | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 06010 | 041031 | 1682 | | LAR | MS | |
| 06011 | 100160 | 1683 | | SUB | TS0 | |
| 06012 | 640160 | 1684 | | STO | TS0 | 1-X |
| 06013 | 665001 | 1685 | SICO2 | LXR | K1B17,1 | HASTINGS SERIES-SHEET 15 |
| 06014 | 044160 | 1686 | | LAR | TS0,1 | REDUCED X=SERIES X AT B1 |
| 06015 | 404160 | 1687 | | MPY | TS0,1 | |
| 06016 | 640162 | 1688 | | STO | TS2 | SERIES X**2 AT B2 |
| 06017 | 401036 | 1689 | | MPY | KS7 | C7 AT -4. -4+2=-2 |
| 06020 | 061035 | 1690 | | ADD | KS5 | C5 AT -2. |
| 06021 | 400162 | 1691 | | MPY | TS2 | -2+2=0 |
| 06022 | 061034 | 1692 | | ADD | KS3 | C3 AT 0. |
| 06023 | 400162 | 1693 | | MPY | TS2 | 2+0=2 |
| 06024 | 240002 | 1694 | | LLS | 2 | TO 0 |
| 06025 | 061033 | 1695 | | ADD | KS1 | C1-1 AT 0. |
| 06026 | 404160 | 1696 | | MPY | TS0,1 | X AT B1 |
| 06027 | 064160 | 1697 | | ADD | TS0,1 | |
| 06030 | 644160 | 1698 | | STO | TS0,1 | SIN OR COS AT B1. |
| 06031 | 544014 | 1699 | | BXD | SICO2+1,1 | |
| 06032 | 140161 | 1700 | | LQR | TS1 | COS TO Q |
| 06033 | 302700 | 1701 | | BRU* | SINCOS | EXIT. SIN IN A,TS0. COS IN Q,TS1. |
| | | 1702 | * | | | |
| | | 1703 | * | | ARCTANGENT ROUTINE. | SINE IN A, COSINE IN Q. |
| | | 1704 | * | | OUTPUT IN A IN RADS AT PI. | |
| | | 1705 | * | | | |
| 06034 | 220164 | 1706 | ARTAN1 | SQR | TS4 | |
| 06035 | 241401 | 1707 | | ARS | 1 | RE-SCALE TO AVOID O.F. |
| 06036 | 640163 | 1708 | | STO | TS3 | SIN |
| 06037 | 160163 | 1709 | | LPM | TS3 | |
| 06040 | 640161 | 1710 | | STO | TS1 | ABS(SIN) |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 06041 | 040164 | 1711 | | LAR | TS4 | |
| 06042 | 241401 | 1712 | | ARS | 1 | |
| 06043 | 640164 | 1713 | | STO | TS4 | COS |
| 06044 | 340101 | 1714 | | BMI | ARTAN3 | - IS 2ND OR 3RD QUAD. |
| 06045 | 060161 | 1715 | | ADD | TS1 | |
| 06046 | 640162 | 1716 | | STO | TS2 | |
| 06047 | 041024 | 1717 | | LAR | K1B2 | 1/4 |
| 06050 | 640160 | 1718 | | STO | TS0 | |
| 06051 | 040161 | 1719 | | LAR | TS1 | |
| 06052 | 100164 | 1720 | | SUB | TS4 | |
| 06053 | 141000 | 1721 | ARTAN2 | LQR | KZ | |
| 06054 | 420162 | 1722 | | DIV | TS2 | |
| 06055 | 640161 | 1723 | | STO | TS1 | X AT 0 |
| 06056 | 400161 | 1724 | | MPY | TS1 | |
| 06057 | 640162 | 1725 | | STO | TS2 | X**2 AT 0 |
| 06060 | 401043 | 1726 | | MPY | KA9 | C9/PI |
| 06061 | 061042 | 1727 | | ADD | KA7 | C7/PI |
| 06062 | 400162 | 1728 | | MPY | TS2 | |
| 06063 | 061041 | 1729 | | ADD | KA5 | C5/PI |
| 06064 | 400162 | 1730 | | MPY | TS2 | |
| 06065 | 061040 | 1731 | | ADD | KA3 | C3/PI |
| 06066 | 400162 | 1732 | | MPY | TS2 | |
| 06067 | 061037 | 1733 | | ADD | KA1 | C1/PI |
| 06070 | 400161 | 1734 | | MPY | TS1 | |
| 06071 | 060160 | 1735 | | ADD | TS0 | |
| 06072 | 640161 | 1736 | | STO | TS1 | |
| 06073 | 040163 | 1737 | | LAR | TS3 | SIN |
| 06074 | 340077 | 1738 | | BMI | $+3 | - IS 3RD OR 4TH QUAD. |
| 06075 | 040161 | 1739 | | LAR | TS1 | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 06076 | 302702 | 1740 | | BRU* | ARCTAN | EXIT. ANGLE +. RADS AT PI |
| 06077 | 120161 | 1741 | | LTC | TS1 | |
| 06100 | 302702 | 1742 | | BRU* | ARCTAN | EXIT. ANGLE -. RADS AT PI |
| 06101 | 100161 | 1743 | ARTAN3 | SUB | TS1 | COS IS - |
| 06102 | 640162 | 1744 | | STO | TS2 | |
| 06103 | 041026 | 1745 | | LAR | K3B2 | 3/4 |
| 06104 | 640160 | 1746 | | STO | TS0 | |
| 06105 | 040161 | 1747 | | LAR | TS1 | |
| 06106 | 060164 | 1748 | | ADD | TS4 | |
| 06107 | 300053 | 1749 | | BRU | ARTAN2 | |
| | | 1750 | * | | | |
| | | 1751 | * | | | INPUT CONVERSION ROUTINE. COS(X) FR SIN(X),SIN(X+120) |
| | | 1752 | * | | | |
| 06110 | 220164 | 1753 | INPCN1 | SQR | TS4 | SIN(X+120) |
| 06111 | 241401 | 1754 | | ARS | 1 | |
| 06112 | 640163 | 1755 | | STO | TS3 | .5*SIN(X) |
| 06113 | 060164 | 1756 | | ADD | TS4 | |
| 06114 | 141000 | 1757 | | LQR | KZ | |
| 06115 | 421056 | 1758 | | DIV | KS120 | SIN(120) AT B0 |
| 06116 | 640164 | 1759 | | STO | TS4 | COS(X) |
| 06117 | 040704 | 1760 | | LAR | INPCON | |
| 06120 | 640702 | 1761 | | STO | ARCTAN | |
| 06121 | 300037 | 1762 | | BRU | ARTAN1+3 | EXIT TO ARCTAN ROUT. |
| | | 1763 | * | | | |
| | | 1764 | * | | | SQUARE ROOT ROUTINE. X SQ IN A-Q. |
| | | 1765 | * | | | |
| 06122 | 340127 | 1766 | SQRT1 | BMI | $+5 | REJECT NEG INPUT |
| 06123 | 671000 | 1767 | | LXR | KZ,2 | |
| 06124 | 320133 | 1768 | | BNZ | SQRT2 | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 06125 | 240421 | 1769 | | LRL | 17 | A=0. Q TO A. |
| 06126 | 320131 | 1770 | | BNZ | $+3 | |
| 06127 | 041000 | 1771 | | LAR | KZ | ROOT=0 |
| 06130 | 302706 | 1772 | | BRU* | SQRT | EXIT. |
| 06131 | 141000 | 1773 | | LQR | KZ | |
| 06132 | 671010 | 1774 | | LXR | K8B17,2 | |
| 06133 | 640161 | 1775 | SQRT2 | STO | TS1 | SAVE INPUT |
| 06134 | 220162 | 1776 | | SQR | TS2 | |
| 06135 | 665010 | 1777 | | LXR | K8B17,1 | DET NO. OF LEADING 0 PAIRS. |
| 06136 | 241002 | 1778 | | LRS | 2 | |
| 06137 | 320141 | 1779 | | BNZ | $+2 | |
| 06140 | 300142 | 1780 | | BRU | $+2 | |
| 06141 | 544136 | 1781 | | BXD | $-3,1 | |
| 06142 | 041027 | 1782 | | LAR | PMAX | FORM 1ST GUESS,X0. |
| 06143 | 245400 | 1783 | | ARS | 0,1 | |
| 06144 | 665002 | 1784 | | LXR | K2B17,1 | 3 ITERATIONS |
| 06145 | 640160 | 1785 | SQRT3 | STO | TS0 | X(N-1) |
| 06146 | 040161 | 1786 | | LAR | TS1 | X SQ TO A-Q |
| 06147 | 140162 | 1787 | | LQR | TS2 | |
| 06150 | 420160 | 1788 | | DIV | TS0 | |
| 06151 | 060160 | 1789 | | ADD | TS0 | |
| 06152 | 241001 | 1790 | | LRS | 1 | X(N)=.5*(X(N-1)+ (X**2/X(N-1))) |
| 06153 | 544145 | 1791 | BXD | SQRT3,1 | | |
| 06154 | 251400 | 1792 | | ARS | 0,2 | XR2=0 OR 8 |
| 06155 | 302706 | 1793 | | BRU* | SQRT | EXIT. ROOT IN A. |
| | | 1794 | * | | | |
| | | 1795 | * | | | BCD TO BINARY ROUTINE. BCD IN A17-A6. |
| | | 1796 | * | | | |
| 06156 | 141000 | 1797 | BCDBN1 | LQR | KZ | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 06157 | 240427 | 1798 | | LRL | 23 | H TO A4-A1 |
| 06160 | 665001 | 1799 | | LXR | K1B17,1 | |
| 06161 | 240001 | 1800 | | LLS | 1 | |
| 06162 | 600000 | 1801 | | PAD | | |
| 06163 | 240002 | 1802 | | LLS | 2 | |
| 06164 | 601000 | 1803 | | ADA | | |
| 06165 | 600000 | 1804 | | PAD | | 10A IN D. |
| 06166 | 041000 | 1805 | | LAR | KZ | |
| 06167 | 240404 | 1806 | | LRL | 4 | T OR U TO A4-A1 |
| 06170 | 601000 | 1807 | | ADA | | |
| 06171 | 544161 | 1808 | | BXD | $-8,1 | |
| 06172 | 302710 | 1809 | | BRU* | BCDBN | EXIT. BINARY IN A AT 17. |
| | | 1810 | * | | | |
| | | 1811 | * | | | BINARY TO BCD ROUTINE. BINARY INT IN A AT 17. |
| | | 1812 | * | | | |
| 06173 | 141000 | 1813 | BNBCD1 | LQR | KZ | |
| 06174 | 421060 | 1814 | | DIV | K1KB17 | N/1000 IN A |
| 06175 | 061011 | 1815 | | ADD | K1B13 | ROUND |
| 06176 | 360212 | 1816 | | BIR | BNBCD2 | |
| 06177 | 200160 | 1817 | | SXR | TS0,0 | |
| 06200 | 665002 | 1818 | | LXR | K2B17,1 | |
| 06201 | 300205 | 1819 | | BRU | $+4 | |
| 06202 | 240004 | 1820 | | LLS | 4 | |
| 06203 | 640160 | 1821 | | STO | TS0 | |
| 06204 | 240422 | 1822 | | LRL | 18 | REMAINDER TO A |
| 06205 | 401057 | 1823 | | MPY | K10B17 | |
| 06206 | 060160 | 1824 | | ADD | TS0 | |
| 06207 | 544202 | 1825 | | BXD | $-5,1 | |
| 06210 | 240005 | 1826 | | LLS | 5 | POSITION BITS |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 06211 | 302712 | 1827 | | BRU* | BNBCD | EXIT. BCD IN A17-A6 |
| 06212 | 041027 | 1828 | BNBCD2 | LAR | PMAX | |
| 06213 | 300177 | 1829 | | BRU | BNBCD1+4 | |
| | | 1830 | * | | | |
| | | 1831 | * | | | SC SUM ROUTINE. SIN AND COS OF (A1+A2). |
| | | 1832 | * | | | |
| 06214 | 050000 | 1833 | SCSUM1 | LAR | 00,2 | SIN(A2). SUM ENTRANCE. |
| 06215 | 300221 | 1834 | | BRU | $+4 | |
| 06216 | 040716 | 1835 | SCSUM2 | LAR | SCDIFF | DIFF ENTRANCE. |
| 06217 | 640714 | 1836 | | STO | SCSUM | |
| 06220 | 130000 | 1837 | | LTC | 00,2 | -SIN(A2) |
| 06221 | 640162 | 1838 | | STO | TS2 | |
| 06222 | 404000 | 1839 | | MPY | 00,1 | |
| 06223 | 640163 | 1840 | | STO | TS3 | SA2XSA1 |
| 06224 | 040162 | 1841 | | LAR | TS2 | |
| 06225 | 404001 | 1842 | | MPY | 01,1 | |
| 06226 | 640162 | 1843 | | STO | TS2 | SA2XCA1 |
| 06227 | 044001 | 1844 | | LAR | 01,1 | |
| 06230 | 410001 | 1845 | | MPY | 01,2 | CA1XCA2 |
| 06231 | 100163 | 1846 | | SUB | TS3 | |
| 06232 | 240001 | 1847 | | LLS | 1 | TO B1 |
| 06233 | 640163 | 1848 | | STO | TS3 | C(A1+A2) |
| 06234 | 044000 | 1849 | | LAR | 00,1 | |
| 06235 | 410001 | 1850 | | MPY | 01,2 | SA1XCA2 |
| 06236 | 060162 | 1851 | | ADD | TS2 | S(A1+A2) |
| 06237 | 240001 | 1852 | | LLS | 1 | TO B1 |
| 06240 | 140163 | 1853 | | LQR | TS3 | C(A1+A2) |
| 06241 | 302714 | 1854 | | BRU* | SCSUM | EXIT. |
| | | 1855 | * | | | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| | | 1856 | * | | RANGE ROUTINE. | (DME FROM SYNCHRO INPUTS) |
| | | 1857 | * | | | |
| 06242 | 050404 | 1858 | RNG1 | LAR | S1RT1,2 | |
| 06243 | 150405 | 1859 | | LQR | S2RT1,2 | |
| 06244 | 502704 | 1860 | | BSE* | INPCON | |
| 06245 | 241001 | 1861 | | LRS | 1 | RESCALE TO 2PI |
| 06246 | 401066 | 1862 | | MPY | K10B4 | |
| 06247 | 640170 | 1863 | | STO | TS10 | K+F(T) AT B4 |
| 06250 | 021167 | 1864 | | ANA | MASK1 | |
| 06251 | 640171 | 1865 | | STO | TS11 | K |
| 06252 | 050402 | 1866 | | LAR | S1RU1,2 | |
| 06253 | 150403 | 1867 | | LQR | S2RU1,2 | |
| 06254 | 502704 | 1868 | | BSE* | INPCON | |
| 06255 | 241001 | 1869 | | LRS | 1 | RESCALE TO 2PI |
| 06256 | 401022 | 1870 | | MPY | K1B4 | |
| 06257 | 060171 | 1871 | | ADD | TS11 | |
| 06260 | 640172 | 1872 | | STO | TS12 | K+F(U). UNIT SYNCHRO REVS AT B4 |
| 06261 | 040170 | 1873 | | LAR | TS10 | |
| 06262 | 100172 | 1874 | | SUB | TS12 | F(T)-F(U) |
| 06263 | 061021 | 1875 | | ADD | K1B5 | ROUND |
| 06264 | 021167 | 1876 | | ANA | MASK1 | |
| 06265 | 060172 | 1877 | | ADD | TS12 | K+F(U) CORRECTED |
| 06266 | 401067 | 1878 | | MPY | KRSF | 4+8=12 |
| 06267 | 644262 | 1879 | | STO | RS1,1 | PARTIAL RNG |
| 06270 | 050406 | 1880 | RNG2 | LAR | S1RH1,2 | |
| 06271 | 101024 | 1881 | | SUB | K1B2 | |
| 06272 | 340301 | 1882 | | BMI | RNG3 | - IS LESS THAN 100 N.MI. |
| 06273 | 044262 | 1883 | | LAR | RS1,1 | |
| 06274 | 061070 | 1884 | | ADD | KHUND | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 06275 | 644262 | 1885 | | STO | RS1,1 | |
| 06276 | 101071 | 1886 | | SUB | KRUL | |
| 06277 | 342720 | 1887 | | BMI* | RNG | RS-RUL. - IS NORMAL EXIT. |
| 06300 | 303146 | 1888 | | BRU* | RNGAMB | RS TOO LARGE. SPECIAL EXIT. |
| 06301 | 041013 | 1889 | RNG3 | LAR | K1B11 | 2 N.MI. |
| 06302 | 104262 | 1890 | | SUB | RS1,1 | |
| 06303 | 342720 | 1891 | | BMI* | RNG | RLL-RS. - IS NORMAL EXIT. |
| 06304 | 303146 | 1892 | | BRU* | RNGAMB | RS TOO SMALL. SPECIAL EXIT. |
| | | 1893 | * | | | |
| | | 1894 | * | | | MAGNITUDE ROUTINE. TAKE MAG OF VECTOR (A,Q) |
| | | 1895 | * | | | |
| 06305 | 640162 | 1896 | MAG1 | STO | TS2 | A |
| 06306 | 220163 | 1897 | | SQR | TS3 | Q |
| 06307 | 400162 | 1898 | | MPY | TS2 | |
| 06310 | 640160 | 1899 | | STO | TS0 | A**2 MS |
| 06311 | 220161 | 1900 | | SQR | TS1 | LS |
| 06312 | 040163 | 1901 | | LAR | TS3 | |
| 06313 | 400163 | 1902 | | MPY | TS3 | Q**2 |
| 06314 | 060160 | 1903 | | ADD | TS0 | |
| 06315 | 360331 | 1904 | | BIR | MAG3 | CHECK O.F. |
| 06316 | 240422 | 1905 | | LRL | 18 | |
| 06317 | 060161 | 1906 | | ADD | TS1 | |
| 06320 | 340323 | 1907 | | BMI | $+3 | |
| 06321 | 240422 | 1908 | | LRL | 18 | |
| 06322 | 300327 | 1909 | | BRU | MAG2 | |
| 06323 | 101031 | 1910 | | SUB | MS | |
| 06324 | 240422 | 1911 | | LRL | 18 | |
| 06325 | 061001 | 1912 | | ADD | K1B17 | |
| 06326 | 360331 | 1913 | | BIR | MAG3 | CHECK O.F. |

| COMP. OCTAL ADDRESS | OCTAL CELL CONTENTS | SEQ. NO. | LABEL FIELD MNEMONIC | OPERATIONS FIELD MNEMONIC | VARIABLE FIELD | COMMENT FIELD |
|---|---|---|---|---|---|---|
| 06327 | 502706 | 1914 | MAG2 | BSE* | SQRT | |
| 06330 | 302722 | 1915 | | BRU* | MAG | EXIT |
| 06331 | 041027 | 1916 | MAG3 | LAR | PMAX | O.F. |
| 06332 | 302722 | 1917 | | BRU* | MAG | EXIT |
| 06333 | 640162 | 1918 | MAG4 | STO | TS2 | HORZ RNG ENTR. (H-HST), RS IN A,Q |
| 06334 | 040724 | 1919 | | LAR | HORZ | |
| 06335 | 640722 | 1920 | | STO | MAG | |
| 06336 | 120162 | 1921 | | LTC | TS2 | |
| 06337 | 300306 | 1922 | | BRU | MAG1+1 | |
| | | 1923 | * | | | |
| | | 1924 | * | | | LAMBERT GROUND TRACK ROUTINE. |
| | | 1925 | * | | | |
| 06340 | 675004 | 1926 | LAMGT1 | LXR | K4B17,3 | I |
| 06341 | 502746 | 1927 | | BSE* | RVSLT | |
| 06342 | 640174 | 1928 | | STO | RI | LAMBERT R AT I. B13 |
| 06343 | 675006 | 1929 | | LXR | K6B17,3 | D |
| 06344 | 502744 | 1930 | | BSE* | GTPTC | |
| 06345 | 040170 | 1931 | | LAR | TS10 | XD1  B12 |
| 06346 | 140171 | 1932 | | LQR | TS11 | YD1  B12 |
| 06347 | 502702 | 1933 | | BSE* | ARCTAN | |
| 06350 | 640307 | 1934 | | STO | THETI | GND TRACK BRG AT I. |
| 06351 | 502700 | 1935 | | BSE* | SINCOS | |
| 06352 | 640245 | 1936 | | STO | STHETI | SIN  B1 |
| 06353 | 220246 | 1937 | | SQR | CTHETI | COS  B1 |
| 06354 | 040170 | 1938 | | LAR | TS10 | XD1 |
| 06355 | 140171 | 1939 | | LQR | TS11 | YD1 |
| 06356 | 502722 | 1940 | | BSE* | MAG | |
| 06357 | 640260 | 1941 | | STO | DID | LENGTH OF GND TRACK. N.MI. B12. |
| 06360 | 675000 | 1942 | LAMGT2 | LXR | KZ,3 | A/C |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 06361 | 502744 | 1943 | | BSE* | GTPTC | COMP XA1,YA1  B12 |
| 06362 | 665163 | 1944 | | LXR | K6XR,1 | SELECTS SIN,COS (THETI) |
| 06363 | 671165 | 1945 | | LXR | K8XR,2 | SELECTS XA1,YA1 |
| 06364 | 502716 | 1946 | | BSE* | SCDIFF | XFORM TO 2 SYST |
| 06365 | 640254 | 1947 | | STO | RHO | RHO=-XA2  B12 |
| 06366 | 220261 | 1948 | | SQR | DIA | DIA=+YA2  B12 |
| 06367 | 120261 | 1949 | LAMGT3 | LTC | DIA | =YA2=YP2. XP2=0 P=BRG COMP PT |
| 06370 | 400246 | 1950 | | MPY | CTHETI | YP1=COS(THETI)*YA2. |
| 06371 | 060174 | 1951 | | ADD | RI | |
| 06372 | 640177 | 1952 | | STO | TS17 | RI-YP1  B13 |
| 06373 | 040261 | 1953 | | LAR | DIA | |
| 06374 | 400245 | 1954 | | MPY | STHETI | XP1=SIN(THETI)*YA2. B13 |
| 06375 | 140177 | 1955 | | LQR | TS17 | |
| 06376 | 502702 | 1956 | | BSE* | ARCTAN | COMP L(MUI-MUP) |
| 06377 | 060307 | 1957 | | ADD | THETI | THETA=THETI+LDMU(P) |
| 06400 | 502700 | 1958 | | BSE* | SINCOS | |
| 06401 | 640510 | 1959 | | STO | STHET | SIN(GND TRACK BRG AT P) B1 |
| 06402 | 220511 | 1960 | | SQR | CTHET | COS |
| 06403 | 302726 | 1961 | | BRU* | LAMGT | EXIT |
| | | 1962 | * | | | |
| | | 1963 | * | | | RELOCATED COORDINATE SYSTEM TRANSFORMATION MATRIX ROUTINE |
| | | 1964 | * | | | |
| 06404 | 040205 | 1965 | XMTX1 | LAR | LNGI | COMPUTE PARTIAL C MATRIX. 0 TO 2 XFRM. |
| 06405 | 502700 | 1966 | | BSE* | SINCOS | |
| 06406 | 220314 | 1967 | | SQR | C22 | COS(LNGI) |
| 06407 | 120160 | 1968 | | LTC | TSSIN | |
| 06410 | 640315 | 1969 | | STO | C23 | -SIN(LNGI) |
| 06411 | 200313 | 1970 | | SXR | C21,0 | |
| 06412 | 040204 | 1971 | | LAR | LATI | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 06413 | 502732 | 1972 | | BSE* | GCSC | GEOCENTRIC SIN-COS |
| 06414 | 640316 | 1973 | | STO | C31 | SIN(LATI) |
| 06415 | 220310 | 1974 | | SQR | C11 | COS(LATI) |
| 06416 | 220247 | 1975 | | SQR | CLATI | |
| 06417 | 240001 | 1976 | | LLS | 1 | |
| 06420 | 400315 | 1977 | | MPY | C23 | |
| 06421 | 640311 | 1978 | | STO | C12 | |
| 06422 | 120316 | 1979 | | LTC | C31 | |
| 06423 | 240001 | 1980 | | LLS | 1 | |
| 06424 | 400314 | 1981 | | MPY | C22 | |
| 06425 | 640312 | 1982 | | STO | C13 | |
| 06426 | 120310 | 1983 | | LTC | C11 | |
| 06427 | 240001 | 1984 | | LLS | 1 | |
| 06430 | 400315 | 1985 | | MPY | C23 | |
| 06431 | 640317 | 1986 | | STO | C32 | |
| 06432 | 040310 | 1987 | | LAR | C11 | |
| 06433 | 240001 | 1988 | | LLS | 1 | |
| 06434 | 400314 | 1989 | | MPY | C22 | |
| 06435 | 640320 | 1990 | | STO | C33 | |
| 06436 | 675006 | 1991 | XMTX2 | LXR | K6B17,3 | DESTINATION |
| 06437 | 502734 | 1992 | | BSE* | VXFRM | COMP D UNIT VECTOR IN 2 SYST. |
| 06440 | 120173 | 1993 | | LTC | TS13 | -YD2 |
| 06441 | 140172 | 1994 | | LQR | TS12 | XD2 |
| 06442 | 502702 | 1995 | | BSE* | ARCTAN | |
| 06443 | 640307 | 1996 | | STO | THETI | GND TRACK BRG AT I. |
| 06444 | 502700 | 1997 | | BSE* | SINCOS | |
| 06445 | 640245 | 1998 | | STO | STHETI | SIN B1 |
| 06446 | 220246 | 1999 | | SQR | CTHETI | COS B1 |
| 06447 | 040172 | 2000 | | LAR | TS12 | XD2 |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 06450 | 140173 | 2001 | | LQR | TS13 | YD2 |
| 06451 | 502722 | 2002 | | BSE* | MAG | ROOT((XD2)2+(YD2)2) |
| 06452 | 140174 | 2003 | | LQR | TS14 | ZD2 |
| 06453 | 502702 | 2004 | | BSE* | ARCTAN | COMP DEST RELOC LONG |
| 06454 | 400240 | 2005 | | MPY | RE | |
| 06455 | 421032 | 2006 | | DIV | K1DPI | |
| 06456 | 640260 | 2007 | | STO | DID | DIST I TO D. N.MI AT B12 |
| 06457 | 665163 | 2008 | XMTX3 | LXR | K6XR,1 | COMPUTE FINAL C MATRIX. 0 TO 3 XFRM. |
| 06460 | 671164 | 2009 | | LXR | K7XR,2 | |
| 06461 | 675002 | 2010 | | LXR | K2B17,3 | |
| 06462 | 054313 | 2011 | | LAR | C21,3 | |
| 06463 | 154310 | 2012 | | LQR | C11,3 | |
| 06464 | 640160 | 2013 | | STO | TSSIN | |
| 06465 | 220161 | 2014 | | SQR | TSCOS | |
| 06466 | 502714 | 2015 | | BSE* | SCSUM | |
| 06467 | 654313 | 2016 | | STO | C21,3 | |
| 06470 | 234310 | 2017 | | SQR | C11,3 | |
| 06471 | 554462 | 2018 | | BXD | $-7,3 | |
| 06472 | 302730 | 2019 | | BRU* | XMTX | EXIT |
| | | 2020 | * | | | |
| | | 2021 | * | | | GEOCENTRIC SINE-COSINE ROUTINE. GEOGRAPHIC LATITUDE IN A. |
| | | 2022 | * | | | |
| 06473 | 502700 | 2023 | GCSC1 | BSE* | SINCOS | |
| 06474 | 400161 | 2024 | | MPY | TSCOS | |
| 06475 | 401104 | 2025 | | MPY | EPS | |
| 06476 | 421023 | 2026 | | DIV | K1B3 | |
| 06477 | 640162 | 2027 | | STO | TS2 | 2*EPS*SIN(LATG)*COS(LATG) AT B0 |
| 06500 | 400160 | 2028 | | MPY | TSSIN | |
| 06501 | 060161 | 2029 | | ADD | TSCOS | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 06502 | 640161 | 2030 | | STO | TSCOS | |
| 06503 | 120162 | 2031 | | LTC | TS2 | |
| 06504 | 400161 | 2032 | | MPY | TSCOS | |
| 06505 | 060160 | 2033 | | ADD | TSSIN | |
| 06506 | 640160 | 2034 | | STO | TSSIN | GEOCENTRIC SIN IN A, TS0. B1 |
| 06507 | 140161 | 2035 | | LQR | TSCOS | GEOCENTRIC COS IN Q, TS1. B1 |
| 06510 | 302732 | 2036 | | BRU* | GCSC | EXIT |
| | | 2037 | * | | | |
| | | 2038 | * | | | VECTOR TRANSFORMATION ROUTINE. COMPUTE UNIT VECTOR IN 0 SYSTEM AND MULTIPLY BY C MATRIX. |
| | | 2039 | * | | | |
| | | 2040 | * | | | |
| 06511 | 054201 | 2041 | VXFRM1 | LAR | LNGDR,3 | LONGITUDE OF POINT |
| 06512 | 502700 | 2042 | | BSE* | SINCOS | |
| 06513 | 640170 | 2043 | | STO | TS10 | SIN(LNG) |
| 06514 | 220171 | 2044 | | SQR | TS11 | COS(LNG) |
| 06515 | 054200 | 2045 | | LAR | LATDR,3 | LATITUDE OF POINT |
| 06516 | 502732 | 2046 | | BSE* | GCSC | GEOCENTRIC SIN-COS |
| 06517 | 240001 | 2047 | | LLS | 1 | |
| 06520 | 640175 | 2048 | | STO | TS15 | X0=SIN(LATC) B0 |
| 06521 | 665001 | 2049 | | LXR | K1B17,1 | |
| 06522 | 040161 | 2050 | | LAR | TSCOS | COS(LATC) B1 |
| 06523 | 404170 | 2051 | | MPY | TS10,1 | COS(LNG), SIN(LNG) B1 |
| 06524 | 421024 | 2052 | | DIV | K1B2 | |
| 06525 | 644176 | 2053 | | STO | TS16,1 | Z0,Y0 B0 |
| 06526 | 544522 | 2054 | | BXD | $-4,1 | |
| 06527 | 671006 | 2055 | | LXR | K6B17,2 | |
| 06530 | 665002 | 2056 | | LXR | K2B17,1 | MUL BY C MATRIX |
| 06531 | 050312 | 2057 | VXFRM2 | LAR | C13,2 | C33,C23,C13 |
| 06532 | 400177 | 2058 | | MPY | TS17 | Z0 |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 06533 | 644172 | 2059 | | STO | TS12,1 | |
| 06534 | 050311 | 2060 | | LAR | C12,2 | C32,C22,C12 |
| 06535 | 400176 | 2061 | | MPY | TS16 | Y0 |
| 06536 | 064172 | 2062 | | ADD | TS12,1 | |
| 06537 | 644172 | 2063 | | STO | TS12,1 | |
| 06540 | 050310 | 2064 | | LAR | C11,2 | C31,C21,C11 |
| 06541 | 400175 | 2065 | | MPY | TS15 | X0 |
| 06542 | 064172 | 2066 | | ADD | TS12,1 | |
| 06543 | 644172 | 2067 | | STO | TS12,1 | Z,Y,X OUTPUT AT B1 |
| 06544 | 550545 | 2068 | | BXD | $+1,2 | XR2-3 |
| 06545 | 550546 | 2069 | | BXD | $+1,2 | |
| 06546 | 550547 | 2070 | | BXD | $+1,2 | |
| 06547 | 544531 | 2071 | | BXD | VXFRM2,1 | |
| 06550 | 302734 | 2072 | | BRU* | VXFRM | EXIT. |
| | | 2073 | * | | | |
| | | 2074 | * | | | RELOCATED COORDINATES ROUTINE |
| | | 2075 | * | | | |
| 06551 | 502734 | 2076 | RELOC1 | BSE* | VXFRM | COMP A/C UNIT VECTOR IN 3 SYST. |
| 06552 | 040173 | 2077 | | LAR | TS13 | YA3 |
| 06553 | 240001 | 2078 | | LLS | 1 | TO B0 |
| 06554 | 400240 | 2079 | | MPY | RE | |
| 06555 | 640254 | 2080 | | STO | RHO | DIST FR PRIMARY TRACK. N.MI. B12. |
| 06556 | 040172 | 2081 | | LAR | TS12 | XA3 |
| 06557 | 140174 | 2082 | | LQR | TS14 | ZA3 |
| 06560 | 502702 | 2083 | | BSE* | ARCTAN | |
| 06561 | 640166 | 2084 | | STO | TS6 | A/C RELOCATED LNG |
| 06562 | 400240 | 2085 | | MPY | RE | |
| 06563 | 421032 | 2086 | | DIV | K1DPI | |
| 06564 | 640261 | 2087 | | STO | DIA | DIST I TO A/C. N.MI. AT B12. |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 06565 | 040166 | 2088 | RELOC2 | LAR | TS6 | BRG COMP |
| 06566 | 502700 | 2089 | | BSE* | SINCOS | |
| 06567 | 640175 | 2090 | | STO | TS15 | XP3  P=BRG COMP PT. |
| 06570 | 200176 | 2091 | | SXR | TS16,0 | YP3=0 |
| 06571 | 220177 | 2092 | | SQR | TS17 | ZP3 |
| 06572 | 502740 | 2093 | | BSE* | MINMP | COMP P IN 0 SYST |
| 06573 | 040172 | 2094 | | LAR | TS12 | XPO=SIN(LATP) |
| 06574 | 141025 | 2095 | | LQR | K1B1 | |
| 06575 | 502724 | 2096 | | BSE* | HORZ | ROOT(1-XPO**2) |
| 06576 | 640167 | 2097 | | STO | TS7 | XNO=COS(LATP) |
| 06577 | 665001 | 2098 | | LXR | K1B17,1 | N=NORTH VECTOR AT P. |
| 06600 | 120172 | 2099 | | LTC | TS12 | -XPO |
| 06601 | 404173 | 2100 | | MPY | TS13,1 | ZPO,YPO |
| 06602 | 420167 | 2101 | | DIV | TS7 | |
| 06603 | 644170 | 2102 | | STO | TS10,1 | ZNO,YNO |
| 06604 | 544600 | 2103 | | BXD | $-4,1 | |
| 06605 | 140177 | 2104 | | LQR | TS17 | |
| 06606 | 120175 | 2105 | | LTC | TS15 | |
| 06607 | 640177 | 2106 | | STO | TS17 | ZT3=XP3 T=TANGENT VECTOR AT P. |
| 06610 | 220175 | 2107 | | SQR | TS15 | XT3=ZP3 |
| 06611 | 502740 | 2108 | | BSE* | MINMP | COMP T IN 0 SYST |
| 06612 | 040247 | 2109 | | LAR | CLATI | |
| 06613 | 400245 | 2110 | | MPY | STHETI | |
| 06614 | 420167 | 2111 | | DIV | TS7 | S(THETA)=C(LATI)* S(THETAI)/C(LATP) |
| 06615 | 640510 | 2112 | | STO | STHET | SIN(GND TRACK BRG AT P) B1 |
| 06616 | 200511 | 2113 | | SXR | CTHET,0 | |
| 06617 | 665002 | 2114 | | LXR | K2B17,1 | |
| 06620 | 044167 | 2115 | | LAR | TS7,1 | N VECTOR |
| 06621 | 404172 | 2116 | | MPY | TS12,1 | T VECTOR |

| COMP. OCTAL ADDRESS | OCTAL CELL CONTENTS | SEQ. NO. | LABEL FIELD MNEMONIC | OPERATIONS FIELD MNEMONIC | VARIABLE FIELD | COMMENT FIELD |
|---|---|---|---|---|---|---|
| 06622 | 240001 | 2117 | | LLS | 1 | |
| 06623 | 060511 | 2118 | | ADD | CTHET | |
| 06624 | 640511 | 2119 | | STO | CTHET | COS(THETA)=N,T DOT PROD |
| 06625 | 544620 | 2120 | | BXD | $-5,1 | |
| 06626 | 302736 | 2121 | | BRU* | RELOC | EXIT |
| | | 2122 | * | | | |
| | | 2123 | * | | | MATRIX INVERSE MULTIPLY. INVERSE C MATRIX * INPUT VECTOR. |
| | | 2124 | * | | | |
| 06627 | 665002 | 2125 | MINMP1 | LXR | K2B17,1 | |
| 06630 | 044310 | 2126 | | LAR | C11,1 | C13,C12,C11 |
| 06631 | 400175 | 2127 | | MPY | TS15 | X |
| 06632 | 644172 | 2128 | | STO | TS12,1 | |
| 06633 | 044313 | 2129 | | LAR | C21,1 | C23,C22,C21 |
| 06634 | 400176 | 2130 | | MPY | TS16 | Y |
| 06635 | 064172 | 2131 | | ADD | TS12,1 | |
| 06636 | 644172 | 2132 | | STO | TS12,1 | |
| 06637 | 044316 | 2133 | | LAR | C31,1 | C33,C32,C31 |
| 06640 | 400177 | 2134 | | MPY | TS17 | Z |
| 06641 | 064172 | 2135 | | ADD | TS12,1 | |
| 06642 | 240001 | 2136 | | LLS | 1 | TO B1 |
| 06643 | 644172 | 2137 | | STO | TS12,1 | Z,Y,X OUTPUT AT B1 |
| 06644 | 544630 | 2138 | | BXD | MINMP1+1,1 | |
| 06645 | 302740 | 2139 | | BRU* | MINMP | EXIT |
| | | 2140 | * | | | |
| | | 2141 | * | | | CHART ROUTINE |
| | | 2142 | * | | | |
| 06646 | 720406 | 2143 | MAP1 | DIA | 006 | DISCRETE WORD 2. |
| 06647 | 640327 | 2144 | | STO | DSCWD2 | |
| 06650 | 021010 | 2145 | | ANA | K8B17 | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 06651 | 320653 | 2146 | | BNZ | $+2 | NZ IS CHART SELECT |
| 06652 | 300715 | 2147 | | BRU | MAP2 | |
| 06653 | 720403 | 2148 | | DIA | 003 | MAP CODE |
| 06654 | 640177 | 2149 | | STO | TS17 | |
| 06655 | 140177 | 2150 | | LQR | TS17 | PARITY CHECK |
| 06656 | 561000 | 2151 | | LDR | KZ | |
| 06657 | 665161 | 2152 | | LXR | K4XR,1 | |
| 06660 | 041000 | 2153 | | LAR | KZ | |
| 06661 | 240401 | 2154 | | LRL | 1 | |
| 06662 | 601000 | 2155 | | ADA | | |
| 06663 | 600000 | 2156 | | PAD | | D=SUM OF BITS |
| 06664 | 544660 | 2157 | | BXD | $-4,1 | |
| 06665 | 021001 | 2158 | | ANA | K1B17 | |
| 06666 | 320672 | 2159 | | BNZ | $+4 | NZ IS ODD NO OF ONES. |
| 06667 | 041014 | 2160 | | LAR | K1B10 | MAP PARITY CK FAIL |
| 06670 | 502756 | 2161 | | BSE* | FAIL | TO FAIL S.R. |
| 06671 | 300715 | 2162 | | BRU | MAP2 | INHIBIT CHART CHANGE. |
| 06672 | 040177 | 2163 | | LAR | TS17 | MAP CODE |
| 06673 | 021027 | 2164 | | ANA | PMAX | REMOVE PARITY BIT |
| 06674 | 502710 | 2165 | | BSE* | BCDBN | CONV TO BINARY |
| 06675 | 101015 | 2166 | | SUB | K1B9 | |
| 06676 | 340700 | 2167 | | BMI | $+2 | N-256 |
| 06677 | 300715 | 2168 | | BRU | MAP2 | MAP NO. TOO LARGE. |
| 06700 | 061015 | 2169 | | ADD | K1B9 | |
| 06701 | 061017 | 2170 | | ADD | K1B7 | 02000 |
| 06702 | 715000 | 2171 | | PAX | 0,3 | |
| 06703 | 057011 | 2172 | | LAR* | LNGC0,3 | DET MAP S.F. FR SIGN BITS OF MAP DATA. |
| 06704 | 021031 | 2173 | | ANA | MS | |
| 06705 | 241001 | 2174 | | LRS | 1 | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 06706 | 640161 | 2175 | | STO | TS1 | |
| 06707 | 056411 | 2176 | | LAR* | RC0,3 | |
| 06710 | 021031 | 2177 | | ANA | MS | |
| 06711 | 060161 | 2178 | | ADD | TS1 | |
| 06712 | 241020 | 2179 | | LRS | 16 | |
| 06713 | 711000 | 2180 | | PAX | 0,2 | MAP S.F. CODE TO XR2. |
| 06714 | 550723 | 2181 | | BXD | MAP3,2 | |
| 06715 | 041027 | 2182 | MAP2 | LAR | PMAX | ILLEGAL MAP NO. OR NO CHART CHANGE. |
| 06716 | 101016 | 2183 | | SUB | K1B8 | REMOVE VALID CHART BIT |
| 06717 | 020330 | 2184 | | ANA | DOWD | FR DOWD2. |
| 06720 | 640330 | 2185 | | STO | DOWD | |
| 06721 | 200336 | 2186 | | SXR | CCHF,0 | + TO CHART CHANGE FLAG. |
| 06722 | 302742 | 2187 | | BRU* | MAP | EXIT |
| 06723 | 214303 | 2188 | MAP3 | SXR | MAPXR,3 | SAVE MAP INDEX |
| 06724 | 056411 | 2189 | | LAR* | RC0,3 | MAP CENTER RADIUS. |
| 06725 | 021027 | 2190 | | ANA | PMAX | REMOVE S.F. CODE. |
| 06726 | 640304 | 2191 | | STO | RC | SAVE |
| 06727 | 057011 | 2192 | | LAR* | LNGC0,3 | MAP CENTER LONG. |
| 06730 | 021027 | 2193 | | ANA | PMAX | REMOVE S.F. CODE. |
| 06731 | 640305 | 2194 | | STO | LNGC | SAVE |
| 06732 | 051125 | 2195 | | LAR | SL0,2 | |
| 06733 | 640306 | 2196 | | STO | S | MAP S.F. |
| 06734 | 040330 | 2197 | | LAR | DOWD | INSERT |
| 06735 | 001016 | 2198 | | ORA | K1B8 | VALID CHART BIT |
| 06736 | 640330 | 2199 | | STO | DOWD | |
| 06737 | 200464 | 2200 | | SXR | SXC0,0 | SET MAP X CMD TO 0 DEG. |
| 06740 | 041025 | 2201 | | LAR | K1B1 | |
| 06741 | 640465 | 2202 | | STO | CXC0 | |
| 06742 | 041031 | 2203 | | LAR | MS | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 06743 | 640336 | 2204 | | STO | CCHF | - TO CHART CHANGE FLAG. |
| 06744 | 302742 | 2205 | | BRU* | MAP | EXIT |
| | | 2206 | * | | | |
| | | 2207 | * | | | GROUND TRACK POLAR TO CARTESIAN ROUTINE. CENTER AT I. |
| | | 2208 | * | | | |
| 06745 | 040205 | 2209 | GTPTC1 | LAR | LNGI | |
| 06746 | 114201 | 2210 | | SUB | LNG,3 | |
| 06747 | 401050 | 2211 | | MPY | L | |
| 06750 | 502700 | 2212 | | BSE* | SINCOS | SIN,COS (LDMU) |
| 06751 | 502746 | 2213 | | BSE* | RVSLT | COMP R  B13 |
| 06752 | 400160 | 2214 | | MPY | TSSIN | |
| 06753 | 421024 | 2215 | | DIV | K1B2 | 13+1-2=12 |
| 06754 | 640170 | 2216 | | STO | TS10 | X=R*SIN(LDMU)  N.MI. AT B12. |
| 06755 | 120175 | 2217 | | LTC | TS15 | -R |
| 06756 | 400161 | 2218 | | MPY | TSCOS | |
| 06757 | 420174 | 2219 | | DIV | RI | |
| 06760 | 061025 | 2220 | | ADD | K1B1 | |
| 06761 | 400174 | 2221 | | MPY | RI | |
| 06762 | 421024 | 2222 | | DIV | K1B2 | 13+1-2=12 |
| 06763 | 640171 | 2223 | | STO | TS11 | Y=RI-R*COS(LDMU) N.MI. AT B12. |
| 06764 | 302744 | 2224 | | BRU* | GTPTC | EXIT |
| | | 2225 | * | | | |
| | | 2226 | * | | | LAMBERT RADIUS VS LATITUDE ROUTINE. |
| | | 2227 | * | | | |
| 06765 | 054200 | 2228 | RVSLT1 | LAR | LAT,3 | LATITUDE AT PI |
| 06766 | 240001 | 2229 | | LLS | 1 | |
| 06767 | 640177 | 2230 | | STO | TS17 | LAT/PI AT B-1 |
| 06770 | 401047 | 2231 | | MPY | KDR | -1+15=14 |
| 06771 | 061046 | 2232 | | ADD | KCR | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 06772 | 414200 | 2233 | | MPY | LAT,3 | |
| 06773 | 061045 | 2234 | | ADD | KBR | AT B14 |
| 06774 | 400177 | 2235 | | MPY | TS17 | 14-1=13 |
| 06775 | 061044 | 2236 | | ADD | KAR | |
| 06776 | 640175 | 2237 | | STO | TS15 | R AT B13 |
| 06777 | 302746 | 2238 | | BRU* | RVSLT | EXIT. R IN A,TS15 |
| | | 2239 | * | | | |
| | | 2240 | * | | | MAP POLAR TO CARTESIAN ROUTINE |
| | | 2241 | * | | | |
| 07000 | 040305 | 2242 | PTC1 | LAR | LNGC | MAP CENTER LONG, MUC. |
| 07001 | 114201 | 2243 | | SUB | LNGDR,3 | |
| 07002 | 401050 | 2244 | | MPY | L | |
| 07003 | 502700 | 2245 | | BSE* | SINCOS | |
| 07004 | 640506 | 2246 | | STO | SLDMU | SIN(LDMU) AT B1 |
| 07005 | 220507 | 2247 | | SQR | CLDMU | COS(LDMU) |
| 07006 | 502746 | 2248 | | BSE* | RVSLT | COMP R B13 |
| 07007 | 400506 | 2249 | | MPY | SLDMU | |
| 07010 | 421021 | 2250 | | DIV | K1B5 | 13+1-5=9 |
| 07011 | 640250 | 2251 | | STO | XM | MAP X IN N.MI. AT B9. R*SIN(LDMU) |
| 07012 | 120175 | 2252 | | LTC | TS15 | -R |
| 07013 | 400507 | 2253 | | MPY | CLDMU | |
| 07014 | 420304 | 2254 | | DIV | RC | -R*COS(LDMU)/RC AT B1 |
| 07015 | 061025 | 2255 | | ADD | K1B1 | |
| 07016 | 400304 | 2256 | | MPY | RC | |
| 07017 | 421021 | 2257 | | DIV | K1B5 | 1+13-5=9 |
| 07020 | 640251 | 2258 | | STO | YM | MAP Y IN N.MI. AT B9. RC-R*COS(LDMU) |
| 07021 | 302750 | 2259 | | BRU* | PTC | EXIT |
| | | 2260 | * | | | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| | | 2261 | * | | | MAP CARTESIAN TO POLAR ROUTINE. |
| | | 2262 | * | | | |
| 07022 | 671002 | 2263 | CTP1 | LXR | K2B17,2 | COMP MAP POS |
| 07023 | 665001 | 2264 | | LXR | K1B17,1 | |
| 07024 | 050430 | 2265 | | LAR | SXFB,2 | |
| 07025 | 150431 | 2266 | | LQR | CXFB,2 | |
| 07026 | 502702 | 2267 | | BSE* | ARCTAN | MAP POS RADS/PI |
| 07027 | 400306 | 2268 | | MPY | S | MAP S.F. N.MI./IN B10 |
| 07030 | 425115 | 2269 | | DIV | KX,1 | SERVO S.F. RADS/IN/PI B1 |
| 07031 | 644250 | 2270 | | STO | XM,1 | MAP X,Y N.MI. B9 |
| 07032 | 671000 | 2271 | | LXR | KZ,2 | |
| 07033 | 545024 | 2272 | | BXD | $-7,1 | |
| 07034 | 120251 | 2273 | CTP2 | LTC | YM | |
| 07035 | 241404 | 2274 | | ARS | 4 | TO B13 |
| 07036 | 060304 | 2275 | | ADD | RC | MAP CENTER RADIUS AT B13 |
| 07037 | 640177 | 2276 | | STO | TS17 | RC-YM AT 13 |
| 07040 | 040250 | 2277 | | LAR | XM | |
| 07041 | 241404 | 2278 | | ARS | 4 | TO B13 |
| 07042 | 140177 | 2279 | | LQR | TS17 | |
| 07043 | 502702 | 2280 | | BSE* | ARCTAN | |
| 07044 | 640176 | 2281 | | STO | TS16 | LDMU AT PI |
| 07045 | 502700 | 2282 | | BSE* | SINCOS | |
| 07046 | 040177 | 2283 | | LAR | TS17 | |
| 07047 | 401025 | 2284 | | MPY | K1B1 | |
| 07050 | 420161 | 2285 | | DIV | TSCOS | |
| 07051 | 640175 | 2286 | | STO | TS15 | R=(RC-YM)/COS(LDMU) AT B13 |
| 07052 | 401054 | 2287 | | MPY | KDL | DL/PI AT -38. -38+13=-25 |
| 07053 | 061053 | 2288 | | ADD | KCL | CL/PI AT -25. |
| 07054 | 240001 | 2289 | | LLS | 1 | TO -26 |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 07055 | 400175 | 2290 | | MPY | TS15 | -26+13=-13 |
| 07056 | 061052 | 2291 | | ADD | KBL | BL/PI AT -13. |
| 07057 | 400175 | 2292 | | MPY | TS15 | -13+13=0 |
| 07060 | 061051 | 2293 | | ADD | KAL | AL/PI AT 0. |
| 07061 | 654200 | 2294 | | STO | LATDR,3 | MAP LAT AT PI |
| 07062 | 120176 | 2295 | | LTC | TS16 | -LDMU |
| 07063 | 141000 | 2296 | | LQR | KZ | |
| 07064 | 421050 | 2297 | | DIV | L | |
| 07065 | 060305 | 2298 | | ADD | LNGC | MAP CENTER LONG,MUC |
| 07066 | 654201 | 2299 | | STO | LNGDR,3 | MAP LNG AT PI |
| 07067 | 302752 | 2300 | | BRU* | CTP | EXIT |
| | | 2301 | * | | | |
| | | 2302 | * | | | DELAY SUBROUTINE. |
| | | 2303 | * | | | |
| 07070 | 640161 | 2304 | ZELAY1 | STO | TS1 | A=MILLISECSX10 AT B17 |
| 07071 | 240034 | 2305 | | LLS | 28 | |
| 07072 | 240034 | 2306 | | LLS | 28 | |
| 07073 | 240020 | 2307 | | LLS | 16 | |
| 07074 | 040161 | 2308 | | LAR | TS1 | |
| 07075 | 101001 | 2309 | | SUB | K1B17 | |
| 07076 | 321070 | 2310 | | BNZ | ZELAY1 | .1MS TO HERE |
| 07077 | 302754 | 2311 | | BRU* | ZELAY | EXIT. A=0 |
| | | 2312 | * | | | |
| | | 2313 | * | | | FAIL SUB-ROUTINE. |
| | | 2314 | * | | | |
| 07100 | 000014 | 2315 | FAIL1 | ORA | XFAIL | INSERT FAIL BIT IN |
| 07101 | 640014 | 2316 | | STO | XFAIL | FAIL WORD. |
| 07102 | 041031 | 2317 | | LAR | MS | |
| 07103 | 640015 | 2318 | | STO | TD00 | |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 07104 | 700000 | 2319 | | DOA | 000 | ISSUE SYSTEM FAIL DO. |
| 07105 | 302756 | 2320 | | BRU* | FAIL | EXIT |
| | | 2321 | * | | | |
| | | 2322 | * | | | STEERING ROUTINE. |
| | | 2323 | * | | | |
| 07106 | 040351 | 2324 | STR | LAR | STRF | STEER FLAG |
| 07107 | 341117 | 2325 | | BMI | STR1-3 | - IS STEER |
| 07110 | 120500 | 2326 | | LTC | SPSI | NO STEERING |
| 07111 | 640502 | 2327 | | STO | SPSIC | SET PSI CMD=PSI+180 |
| 07112 | 120501 | 2328 | | LTC | CPSI | |
| 07113 | 640503 | 2329 | | STO | CPSIC | |
| 07114 | 200516 | 2330 | | SXR | PHIC,0 | ROLL CMD=0 |
| 07115 | 200257 | 2331 | | SXR | INTD,0 | |
| 07116 | 301256 | 2332 | | BRU | STR7 | TO RATE LIMITER |
| 07117 | 040326 | 2333 | | LAR | DSCWD1 | |
| 07120 | 341122 | 2334 | | BMI | $+2 | - IS HDG VALID |
| 07121 | 301110 | 2335 | | BRU | STR+2 | |
| 07122 | 665156 | 2336 | STR1 | LXR | K1XR,1 | A1=PSI |
| 07123 | 671157 | 2337 | | LXR | K2XR,2 | A2=THETA |
| 07124 | 502716 | 2338 | | BSE* | SCDIFF | |
| 07125 | 640176 | 2339 | | STO | TS16 | SIN(PSI-THETA) B1 |
| 07126 | 220177 | 2340 | | SQR | TS17 | COS(PSI-THETA) B1 |
| 07127 | 040254 | 2341 | | LAR | RHO | |
| 07130 | 141000 | 2342 | | LQR | KZ | |
| 07131 | 421023 | 2343 | | DIV | K1B3 | RHO AT B5 |
| 07132 | 401135 | 2344 | | MPY | KH | |
| 07133 | 420235 | 2345 | | DIV | VA | 5+6-10=1 |
| 07134 | 640170 | 2346 | | STO | TS10 | SIN(ALPHA)=KH*RHO/VA B1 |
| 07135 | 160170 | 2347 | | LPM | TS10 | LIMIT SIN(ALPHA) |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 07136 | 101136 | 2348 | | SUB | KLM1 | |
| 07137 | 341146 | 2349 | | BMI | STR2 | SIN(ALPHA)-SIN (INTERCEPT) |
| 07140 | 040254 | 2350 | | LAR | RHO | |
| 07141 | 341144 | 2351 | | BMI | $+3 | |
| 07142 | 041136 | 2352 | | LAR | KLM1 | |
| 07143 | 301145 | 2353 | | BRU | $+2 | |
| 07144 | 121136 | 2354 | | LTC | KLM1 | |
| 07145 | 640170 | 2355 | | STO | TS10 | |
| 07146 | 040177 | 2356 | STR2 | LAR | TS17 | COS(PSI-THETA) |
| 07147 | 341161 | 2357 | | BMI | STR3 | - IS A/C IN WRONG DIRECTION |
| 07150 | 160170 | 2358 | | LPM | TS10 | |
| 07151 | 101137 | 2359 | | SUB | KLM2 | |
| 07152 | 640172 | 2360 | | STO | TS12 | ABS(SIN(ALPHA))-THRESHOLD |
| 07153 | 341173 | 2361 | | BMI | STR4 | - IS ON COURSE MODE |
| 07154 | 040254 | 2362 | | LAR | RHO | OFF COURSE MODE |
| 07155 | 640256 | 2363 | | STO | D | SET D=RHO |
| 07156 | 200257 | 2364 | | SXR | INTD,0 | INTEGRAL(D)=0 |
| 07157 | 675000 | 2365 | | LXR | KZ,3 | |
| 07160 | 301227 | 2366 | | BRU | STR5 | TO PHIC S.R. |
| 07161 | 040176 | 2367 | STR3 | LAR | TS16 | A/C POINTED WRONG |
| 07162 | 341165 | 2368 | | BMI | $+3 | SIN(PSI-THETA) |
| 07163 | 121140 | 2369 | | LTC | KPCLM1 | - MAX ROLL CMD |
| 07164 | 301166 | 2370 | | BRU | $+2 | |
| 07165 | 041140 | 2371 | | LAR | KPCLM1 | + MAX ROLL CMD |
| 07166 | 640516 | 2372 | | STO | PHIC | |
| 07167 | 040254 | 2373 | | LAR | RHO | |
| 07170 | 640256 | 2374 | | STO | D | D=RHO |
| 07171 | 200257 | 2375 | | SXR | INTD,0 | |
| 07172 | 301245 | 2376 | | BRU | STR6 | TO CMD HDG S.R. |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 07173 | 120235 | 2377 | STR4 | LTC | VA | ON COURSE MODE |
| 07174 | 400176 | 2378 | | MPY | TS16 | SIN(PSI-THETA) |
| 07175 | 401102 | 2379 | | MPY | DELT | |
| 07176 | 421032 | 2380 | | DIV | K1DPI | 10+1+(-13)=-2 |
| 07177 | 241412 | 2381 | | ARS | 10 | (RHO DOT)*DELT TO B8 |
| 07200 | 060256 | 2382 | | ADD | D | D(N-1) |
| 07201 | 640167 | 2383 | | STO | TS7 | D PREDICTED |
| 07202 | 040254 | 2384 | | LAR | RHO | |
| 07203 | 100167 | 2385 | | SUB | TS7 | |
| 07204 | 401145 | 2386 | | MPY | KQD | D FILTER WT |
| 07205 | 060167 | 2387 | | ADD | TS7 | |
| 07206 | 640256 | 2388 | | STO | D | D=SMOOTHED RHO. N.MI. AT B8 |
| 07207 | 241401 | 2389 | | ARS | 1 | .50 APPROX=D*(DELT) |
| 07210 | 060257 | 2390 | | ADD | INTD | |
| 07211 | 361213 | 2391 | | BIR | $+2 | |
| 07212 | 640257 | 2392 | | STO | INTD | INTEGRAL(D). N.MI.-SECS AT B8 |
| 07213 | 040256 | 2393 | | LAR | D | |
| 07214 | 240004 | 2394 | | LLS | 4 | TO B4 |
| 07215 | 401135 | 2395 | | MPY | KH | |
| 07216 | 640166 | 2396 | | STO | TS6 | KH*D AT B10 |
| 07217 | 040257 | 2397 | | LAR | INTD | |
| 07220 | 241402 | 2398 | | ARS | 2 | TO B10 |
| 07221 | 060166 | 2399 | | ADD | TS6 | KH*D + INTEGRAL(D) B10 |
| 07222 | 141000 | 2400 | | LQR | KZ | |
| 07223 | 420235 | 2401 | | DIV | VA | 10-10=0 |
| 07224 | 241401 | 2402 | | ARS | 1 | |
| 07225 | 640170 | 2403 | | STO | TS10 | NEW SIN(ALPHA)  B1 |
| 07226 | 675001 | 2404 | | LXR | K1B17,3 | |
| 07227 | 040170 | 2405 | STR5 | LAR | TS10 | PHI CMD S.R. |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 07230 | 100176 | 2406 | | SUB | TS16 | SIN(ALPHA)-SIN(PSI-THETA) B1 |
| 07231 | 415142 | 2407 | | MPY | KG1,3 | INNER LOOP GAIN. DEGS/KNOT B0 |
| 07232 | 400235 | 2408 | | MPY | VA | AIR SPEED B10 |
| 07233 | 640516 | 2409 | | STO | PHIC | ROLL CMD. DEGS AT B11 |
| 07234 | 160516 | 2410 | | LPM | PHIC | |
| 07235 | 115140 | 2411 | | SUB | KPCLM1,3 | |
| 07236 | 341245 | 2412 | | BMI | STR6 | ROLL CMD-LIMIT |
| 07237 | 040516 | 2413 | | LAR | PHIC | |
| 07240 | 341243 | 2414 | | BMI | $+3 | |
| 07241 | 055140 | 2415 | | LAR | KPCLM1,3 | + LIMIT |
| 07242 | 301244 | 2416 | | BRU | $+2 | |
| 07243 | 135140 | 2417 | | LTC | KPCLM1,3 | - LIMIT |
| 07244 | 640516 | 2418 | | STO | PHIC | |
| 07245 | 040170 | 2419 | STR6 | LAR | TS10 | CMD HDG S.R. |
| 07246 | 141025 | 2420 | | LQR | K1B1 | |
| 07247 | 502724 | 2421 | | BSE* | HORZ | ROOT(Q2-A2) |
| 07250 | 640171 | 2422 | | STO | TS11 | COS(ALPHA) B1 |
| 07251 | 665157 | 2423 | | LXR | K2XR,1 | A1=THETA |
| 07252 | 671165 | 2424 | | LXR | K8XR,2 | A2=ALPHA |
| 07253 | 502714 | 2425 | | BSE* | SCSUM | |
| 07254 | 640502 | 2426 | | STO | SPSIC | SIN(PSI CMD)=SIN (THETA+ALPHA) B1 |
| 07255 | 220503 | 2427 | | SQR | CPSIC | COS(PSI CMD)=COS (THETA+ALPHA) B1 |
| 07256 | 040516 | 2428 | STR7 | LAR | PHIC | RATE LIMIT ROLL CMD |
| 07257 | 100517 | 2429 | | SUB | PHICO | |
| 07260 | 640173 | 2430 | | STO | TS13 | NEW CMD-LAST OUTPUT. DEGS AT B11 |
| 07261 | 160173 | 2431 | | LPM | TS13 | |
| 07262 | 101144 | 2432 | | SUB | KDPCLM | |
| 07263 | 341273 | 2433 | | BMI | STR8 | CHANGE-LIMIT |

| COMP. OCTAL ADDRESS | OCTAL CELL CONTENTS | SEQ.NO. | LABEL FIELD MNEMONIC | OPERATIONS FIELD MNEMONIC | VARIABLE FIELD | COMMENT FIELD |
|---|---|---|---|---|---|---|
| 07264 | 040173 | 2434 | | LAR | TS13 | |
| 07265 | 341270 | 2435 | | BMI | $+3 | |
| 07266 | 041144 | 2436 | | LAR | KDPCLM | |
| 07267 | 301271 | 2437 | | BRU | $+2 | |
| 07270 | 121144 | 2438 | | LTC | KDPCLM | |
| 07271 | 060517 | 2439 | | ADD | PHICO | |
| 07272 | 301274 | 2440 | | BRU | $+2 | |
| 07273 | 040516 | 2441 | STR8 | LAR | PHIC | |
| 07274 | 640517 | 2442 | | STO | PHICO | NEW ROLL CMD OUTPUT. DEGS B11 |
| 07275 | 141000 | 2443 | | LQR | KZ | |
| 07276 | 421140 | 2444 | | DIV | KPCLM1 | RE-SCALE FOR OUTPUT. |
| 07277 | 640476 | 2445 | | STO | APO | AUTO PILOT AO. |
| 07300 | 303152 | 2446 | | BRU* | LINK4 | TO DISPLAY CONTROL ROUT. |
| | | 2447 | | END | | TRM |

What is claimed is:

1. A navigation system for controlling the navigation of a craft along a selected route over an area comprising:

display means having a display surface for displaying navigation information;

first means coupled to said display means for storing and projecting at least one navigation chart representative of at least a portion of a predetermined area;

means coupled to said display means for displaying a craft-position symbol on said surface;

second means coupled to said first means to which craft-position signals are supplied for displaying a portion of said navigation chart on said display surface so that the displayed craft-position symbol is superposed on a point on said displayed chart;

chart-positioning control means coupled to said second means for controlling the positioning of the displayed chart so that said point on the displayed chart substantially represents the actual craft-position over the area;

third means coupled to said chart-positioning control means for controlling the selection of a start point and at least a first destination point on at least one displayed chart portion and for providing position representative signals;

computing means responsive to said position representative signals and to chart coordinate data for determining a navigation route between said start point and said first destination point and for providing said craft position signals; and fourth means responsive to said position representative signals from said computing means for displaying on said display surface a navigation route indication at a distance from said craft-position symbol corresponding to the off course distance of said craft from said determined navigation route.

2. The navigation system as recited in claim 1 further including fifth means coupled to said chart-positioning control means for responding to a selected condition to control the display of said chart in a north up or heading up orientation.

3. The navigation system as recited in claim 1 further including means coupled between said computing means and said display means for displaying a command heading symbol at an angle with respect to a predetermined mark which represents the desired craft navigation correction to direct said craft toward said navigation route.

4. The navigation system as recited in claim 1 further including means coupled to said fourth means for controlling the display of said navigation route indication when said craft is less than a first preselected travel time from said first destination point, and said computing means generates signals which determine a navigation route from said first destination point to said second destination point when the craft is less than a second preselected travel time from said first destination point.

5. The navigation system as recited in claim 1 wherein said means for displaying a craft position symbol on said surface displays the symbol at the center of said display surface and said chart-positioning control means automatically moves the display chart, so that the point on the chart representing the craft's position is displayed at the display surface center.

6. The navigation system as recited in claim 5 further including means coupled to said display means and to said computing means for providing an indication when the displayed chart does not contain a point corresponding to the craft's actual position.

7. A system for facilitating navigation of a craft along a selected route over an area, comprising:

display means including a display surface for displaying navigation information thereon;

first means coupled to said display means for supplying said display means with a map of at least a portion of said area for display on the display surface thereof;

second means coupled to said display means for defining route start and destination points;

third means for determining the locations of said start and destination points and for computing a selected route therebetween and developing signals representative thereof;

fourth means included in said third means for determining the craft's position in said area and for developing signals representative thereof;

fifth means coupled to said display means and responsive to signals from said fourth means related to the craft's position, for controlling the displayed map so that a point thereof corresponding to the craft's position is displayed at a predetermined point on said display surface; and sixth means responsive to signals representative of the computed selected route for controlling said display means to display a route indication on said surface at an orientation with respect to the displayed map which corresponds to the selected route orientation with respect to the area included in said map, and at a distance from said predetermined point corresponding to the craft's off-route error.

8. The system as recited in claim 7 further including seventh means coupled to said display means for displaying a symbol whose relative position on said display surface represents a desired correction in the craft's direction to direct the craft toward said selected route.

9. The system as recited in claim 8 further including eighth means included in said sixth means for displaying on said surface a magnified error indication at a distance from said preselected point which is a selected multiple of the distance between said preselected point and said route indication.

10. A navigation system for displaying data useful in the navigation of a craft along a defineable selected route over an area comprising:

map storing means for storing a plurality of navigation maps, each being a map of a selected area;

display means including map selecting means and route selecting means, said display means displaying at least a portion of one of said maps, and cooperating with said map storing means for selecting on said maps a start point and generating output signals corresponding to a selected map and at least a first destination point;

computing means responsive to said display means output signals, said computing means storing coordinate data related to each of said maps, responsive to said output signals from said display means and the coordinate data of the maps containing said points for generating route signals between the selected points, said computing means further including means for determining the position of the navigated craft to provide craft position signals related thereto;

means responsive to said route signals for displaying an indication on said display means responsive to said route signals; and means responsive to the craft position signals to display a point on the displayed map corresponding to the craft's position at a predetermined point on said display means.

11. The navigation system as recited in claim 10 wherein said display means further include first means for displaying a craft symbol at said predetermined point and second means included in said computer for generating an orientation symbol for controlling said first means to display said craft symbol at an orientation with respect to a reference direction which corresponds to the actual orientation of the craft with such reference direction.

12. The navigation system as recited in claim 11 wherein said first means displays said craft symbol with respect to either a HEADING UP or a NORTH UP orientation, and wherein said display means further include third means for displaying a command heading symbol for indicating the desired craft navigation correction to direct said craft toward said defined route.

13. The navigation system as recited in claim 12 wherein said predetermined point is the center point of a display surface of said display means, and said display means further include means for controlling the display of the route indication on said display means so as to provide an indication that the craft is less than a preselected flight time from said destination point.

14. The navigation system as recited in claim 10 wherein said means responsive to the craft position signals displays said displayed map so that said predetermined point is the center of a display surface of said display means.

15. The navigation system as recited in claim 14 further including means coupled to said computing means for indicating that the selected map does not contain a displayable point corresponding to the craft's actual position.

16. The navigation system as recited in claim 15 including means coupled to said computing means for extinguishing at least said indication provided by said means responsive to the route signals when the selected map does not contain a displayable point corresponding to the craft's actual position.

17. The navigation system as recited in claim 16 further including first means for displaying a craft symbol at said predetermined point and means for controlling said first means to display said craft symbol at an orientation with respect to a reference direction which corresponds to the actual orientation of the craft with such reference direction.

18. The navigation system as recited in claim 17 wherein said generating means generates an indication signal and including means responsive to said indication signal for providing an indication when said craft is less than a preselected flight time from said destination point.

19. The navigation system as recited in claim 10 wherein said computing means generates an off route error indication signal and said display means include means responsive to said off route error indication signal for displaying an off route magnified error indication movable laterally from said indication provided by the means responsive to the route signals, a distance that is a selected function of the craft's off-route error.

20. The navigation system as recited in claim 10 wherein said route-selecting means include:
first means for controlling the selection of any desired map out of said plurality of maps for display by said display means;
second means for controlling the display of a point in the displayed map to be at a preselected point on a display surface of said display means;
third means for defining a point on a map displayed at said preselected point as a start point and for communicating said display means output signals to said computing means to determine therein coordinate data of said start point; and
fourth means for defining a point on a map displayed at said preselected point as a destination point and for communicating said display means output signals to said computing means to determine therein coordinate data of said destination point.

21. The navigation system as recited in claim 20 wherein said means responsive to the craft position signals displays said displayed map so that said predetermined point is the center of a display surface of said display means.

22. The navigation system as recited in claim 21 including means coupled to said computing means for indicating that the selected map does not contain a displayable point corresponding to the craft's actual position.

23. The navigation system as recited in claim 22 including means coupled to said computing means and to said means responsive to said route signals for extinguishing at least said indication when the selected map does not contain a displayable point corresponding to the craft's actual position.

24. The navigation system as recited in claim 23 including fifth means for displaying a craft symbol at said predetermined point and means for controlling said fifth means for display said craft symbol at an orientation with respect to a reference direction which corresponds to the actual orientation of the craft with such reference direction.

25. The navigation system as recited in claim 24 including means for providing an indication when said craft is less than a preselected flight time from said destination point.

26. The navigation system as recited in claim 24 including means responsive to said route signals for displaying an off route magnified error indication movable laterally from said indication provided by said means responsive to the route signals, a distance that is a selected function of the craft's off route error.

27. A navigation control system aboard a craft for navigating the craft over an area along a navigator-selected route, said system providing a first plurality of signals representative of an aircraft position and a second plurality of signals representative of a selected route, comprising:
a display unit with a display surface for displaying navigation information;
map storing means coupled to said display unit for storing at least one map of said area;
map positioning means including manually actuable means for controlling the display of said map on said display surface and generating map position signals;
route display means for controllably displaying a route indication on said surface;
computing means responsive to a first plurality of signals and to said map position signals for providing aircraft position signals as a function of the craft's position and to a second plurality of signals for providing route indication control signals; and
coupling means for supplying said aircraft position signals to said map positioning means to control the display of said map so that a point thereon which corresponds to the craft's position is displayed at a selected point on said display surface, said coupling means further including means for supplying said route indication control signals to said route display means to control the display of said route indication with respect to said selected point as a function of the position of said craft with respect to said route.

28. A navigation control system as recited in claim 27 wherein said selected point is the center of said display surface, said computing means generates an off route error indication signal and said display means further includes means responsive to said off route error indication signals for displaying an off route magnified error indication movable laterally from said route indication a distance that is a selected function of the craft's off route error.

29. A navigation control system as recited in claim 28 wherein said computing means generates an off-map signal and further including means responsive to said off-map signal for indicating that the selected map does not contain a displayable point corresponding to the craft's actual position.

30. A navigation system for use aboard a craft to be navigated with respect to a selected route over an area comprising:
a display unit having a display surface for displaying navigation information and generating map position signals;
storing means coupled to said display unit for storing a plurality of area charts including charts of areas along the route with respect to which the craft is to be navigated;
first means coupled to said display unit for responding to craft position signals and for displaying on said surface a portion of a chart of an area containing the craft's position, with said craft position being displayed at a first point on said surface;
second means coupled to said display unit and responsive to command signals for displaying on said surface an elongated indication of the selected route at a relative location with respect to said first point representative of the positional error of said craft with respect to said route;
display control means coupled to said second means for controlling the display of the elongated indication of said route in accordance with preselected display criteria;
chart select means coupled to said storing means for selecting for display any one of the charts in said storing means;

chart positioning means coupled to said first means for controlling the display of the chart so that a selected point thereon is displayed at a second point of said surface;

a first element manually operable and coupled to said chart positioning means to define the point on a chart displayed at said selected point as a route start point, said chart positioning means responding to provide a start point signal;

a second element manually operable and coupled to said chart positioning means to define the point on a chart displayed at said selected point as a route destination point, said chart positioning means responding to provide a destination point signal; and computing means responsive to said map position signals for providing said craft position signals and responsive to said start point and destination point signals for computing the route orientation, and for providing said command signals to control the display of the elongated route indication on said display surface.

31. The navigation system as recited in claim 30 wherein said first and second points are the same, and said first means controls said display unit to provide said first point at the center point of said surface.

32. The navigation system as recited in claim 31 further including a craft symbol displayable at said center point; said computing means providing an orientation signal as a function of the craft's actual heading; and means responsive to said orientation symbol for controlling the rotational orientation of the displayed craft symbol.

33. The navigation system as recited in claim 32 further including means for displaying a compass rose about the periphery of said display surface, said first means including means for controlling the display of said chart, said display control means including means to display said elongated route indication, and said means for displaying a compass rose including means to display said compass rose so that said chart, route indication and compass rose are in either a "north up" or a "heading up" mode.

34. The navigation system as recited in claim 33 further including in said display unit means for displaying a command heading symbol indicating a heading to overcome craft positional error, said computing means generating command heading signals, and means responsive to said command heading signals for controlling the display of said command heading symbol.

35. The navigation system as recited in claim 30 wherein each chart stored in said storing means is definable by a unique chart number, said chart select means including chart number select means manually actuable to define a chart number and chart change indicating means which are manually actuable to initiate the selection for display of a chart whose number corresponds to the chart number defined by said chart number select means.

36. The navigation system as recited in claim 35 further including a manually actuable multidestination control element coupled to said computing means and providing a plurality of destination point signals for defining in succession a plurality of points successively displayed at said second point of said surface as destination points.

37. A system for use in navigating a craft along a selected route comprising:

a source of navigation position signals;

a display unit including a display surface, display control means for controlling the display on said surface of at least a route indication, map display means for displaying at said preselected point on said display surface a point on an area map, said point on said map representing the craft's actual position and craft display means responsive to signals representing the craft heading for displaying at said preselected point on said display surface a craft symbol at an orientation related to the craft's heading, and command heading display means responsive to signals representative of the command heading for displaying a command heading symbol at an orientation corresponding to a desired craft heading for navigation along said route, said display unit providing display unit position signals;

computing means responsive to said display unit position signals and the navigation position signals for deriving control signals which are a function of the selected route and the relative position of said craft with respect thereto, and for deriving said signals representing the craft heading and the command heading; and means responsive to said control signals for controlling said display means to display said route indication on said surface so as to indicate the relative position of said craft with respect to said selected route and so that the distance therefrom to a preselected point on said surface is related to the craft's off-route distance.

38. A system for use in navigating a craft along a selected route comprising:

a source of navigation position signals;

a display unit including a display surface, display control means for controlling the display on said surface of at least a route indication and map display means for displaying at said preselected point on said display surface a point on an area map, said point on said map representing the craft's actual position, said display unit providing display unit position signals;

first manually controllable means for defining a route start point and provide route start signals;

second manually controllable means for defining a route destination point and providing route destination signals;

computing means responsive to said route start point signals and said route destination signals and to the navigation position signals for deriving control signals which are a function of the selected route and the relative position of said craft with respect thereto; and means responsive to said control signals for controlling said display means to display said route indication on said surface so as to indicate the relative position of said craft with respect to said selected route and so that the distance therefrom to a preselected point on said surface is related to the craft's off-route distance.

39. A navigation system for a craft comprising:

a source of craft position signals;

display means for displaying navigation information and a route indication;

first means for providing signals representing a start point and a destination point of a route to be navigated by a craft;

second means utilizing said start and destination point signals and signals representative of craft position for deriving a great circle route on the basis of said start and destination point signals and the distance of said craft therefrom, said second means providing route signals;

means coupled to said display means and responsive to said route signals for displaying a route indication from a preselected point by a distance which represents the distance of said craft from the route to be navigated, representative of the craft position; and means selectably controllable and coupled to said second means for providing a route offset signal, said second means providing route signals as a function of said offset signal, to said means coupled to said display means for displaying the route indication from said preselected point at a distance which is a function of the distance of said craft from said route to be navigated and said selectably controlled route offset signal.

40. A navigation system comprising:

first means for defining start and destination points of a route to be navigated by a craft and for generating start and destination point signals;

second means responsive to route signals for displaying during the navigation of said craft a route indication at a distance from a selected point representative of the craft's off course error;

third means responsive to said start and destination point signals, for providing said route signals to control the display of said route indication as a function of preselected values of estimated navigation time to reach said destination point; and means coupled to said third means, including manually controlled means for inserting a selected offset value signal to provide an offset route so that said route indication is displayed from said selected display point at a distance related to the craft's off-route error from said offset route.

41. A navigation system comprising:

means for storing a plurality of navigation maps;

display means coupled to said means for storing and including a display surface for displaying navigation information;

map select and control means coupled to said display means, including manually actuable means for selecting a map of the stored maps for display on said surface and for controlling the display of the selected map thereon;

first manually actuable means coupled to said map select and control means for defining a point on a selected map which is displayed at a selected point on said surface as a route start point, and for generating start point signals;

second manually actuable means coupled to said map select and control means for defining a point on a selected map which is displayed at said selected point on said surface as a destination point and for generating destination point signals;

computing means responsive to said start point and destination point signals for utilizing the defined start and destination points to derive a route therebetween and for determining in response to craft position signals the position of said craft from said route, said computing means generating route command signals and craft symbol signals; and means coupling said route command signals and said craft symbol signals from said computing means to said display means for displaying on the surface thereof a route indication and a craft symbol.

42. The system as defined in claim 41 wherein said computing means generates map positioning signals and said map select and control means include means responsive to said map positioning signals from said computing means for automatically slewing a displayed map containing a point which represents the craft position so that the point which represents the craft position is displayed under said craft symbol.

43. The system as defined in claim 42 further including means in said second manually actuable means for defining a succession of selected points as destination points and generating a plurality of destination point signals, said computing means responding to said plurality of destination point signals to derive a sequence of routes, the first route being from said start point to a first chosen destination point and a succeeding route being from the first chosen destination point to a second chosen destination point.

44. A navigation system comprising:

a source of navigation position signals;

display means including a display surface and means for providing a plurality of maps successively displayed on the surface;

first means for defining selected points on said displayed maps successively displayed on said surface as start and destination points and for generating defined point signals;

computing means responsive to said defined point signals to derive a route therebetween, and for responding to the navigation position signals to generate map position signals and to determine the craft's off-route error and generate error signals; and means for supplying said error signals and said map position signals from said computing means to said display means to display on its surface in response to said error signals a route indication at a distance from a selected point thereon which corresponds to the craft's off-route error and for automatically moving in response to said map position signals a displayed map containing a craft position point to coincide with said selected point on the display surface.

45. The navigation system as defined in claim 44 further including means in said first means for defining several selected points on displayed maps as destination points and generating corresponding defined point signals, and multidestination manually actuable means for selecting the first destination to which a route from said start point is derived and for selecting a succeeding destination point to which a route is to be derived from the last selected destination point.

46. The navigation system as defined in claim 45 wherein said computing means include means for estimating a time enroute value, and for computing a succeeding route to a next selected destination point when said time enroute value is less than a preselected number of units of time and generating said error signals on said succeeding route for being supplied to said display means.

47. The navigation system as defined in claim 44 further including means displaying a craft symbol at said selected point on said display surface, said computing means responding to mode control signals for providing symbol position signals, and means including manually actuable mode control means for applying said mode control signals to said computing means for generating said symbol position signals to control said craft symbol, either in a "heading up" or "north up" orientation mode.

48. The navigation system as defined in claim 44 where said computing means generates an off-map signal and further including means responsive to said off-map signal for indicating the absence of a point on the displayed map which corresponds to the craft's actual position.

49. A navigation system comprising:

display means for displaying maps of a navigation route on a display surface, computing means for controlling the display generating route signals, craft position signals, map indication signals and heading signals, and means responsive to said route signals for displaying on a display surface of said display means at a distance from a selected point thereon, a route indication representing a route to be navigated by a craft from a start point to a destination point, distance between said route indication and said selected point being related to the craft's off route error;

means responsive to said craft position signals for automatically displaying at said selected point a point on a map corresponding to the craft's actual position;

means responsive to said map indication signals for providing an indication when the map does not contain a point corresponding to the craft's position; and displayable means in said display means and responsive to said heading signals for indicating a required correction in the craft's heading to be navigated along said route to said destination point.

50. In a navigation system comprising:

first means for defining start and destination points of a route to be navigated by a craft and for generating signals;

second means including computer means and display means and responsive to said signals generated by said first means for displaying during the navigation of said craft a route indication of said route to be navigated, said computing means calculating a great circle route between said start and destination point signals; and means coupled to said computer means for inserting selected offset signals for calculating a route to be navigated offset from said great circle route and displaying said route indication along the offset route.

51. A navigation system for a craft having a source of craft position signals comprising:

first means for entering and storing the craft position signals, second means for generating signals representing a start point and a destination point of a route to be navigated by a craft and coupled to said first means for entering and storing the start point and destination point signals therein, computing means coupled to said first and second means and utilizing said start and destination point signals and said craft position signals for deriving signals representative of a great circle route on the basis of said start and destination point signals and the distance of said craft therefrom and for generating route indication signals and command signals, and display means responsive to said route indication signals for providing an indication of the calculated route and the positional error of the craft therefrom and responsive to said command signals to provide a command heading indication of a heading to overcome the craft positional error.

52. A navigation system comprising:

first means for providing aircraft position signals, second means for providing coordinate data signals of an area to be navigated, position selection means for selecting start and destination positions over an area to be navigated, storage means coupled to said first and second means for entering and storing said aircraft position signals and said coordinate data signals, third means coupled to said position selection means and to said storage means for generating and entering signals to be stored representing a start point and destination point of a route to be navigated, and fourth means coupled to said storage means for responding to said start and destination point signals, said aircraft position signals and said coordinate data signals for deriving signals representative of a great circle route between said start and destination points and signals representative of variation from said great circle route.

53. A navigation system comprising:

display means for displaying an area over which the craft is to be navigated and for displaying a navigation route, first means coupled to said display means for defining start and destination points and providing start and destination point signals, second means coupled to said display means and to said first means and responsive to said start and destination point signals for developing first signals representative of a great circle route between said start and destination points and for developing second signals representative of a parallel route offset from said great circle route a selected distance, and third means coupled to said second means for providing a selected offset value signal for development of said second signals.

54. A system for navigating a craft over an area comprising:

map display means having a display surface, first means coupled to said map display means for defining a selected point on a displayed map which is a route start point and for defining a selected point on which is a route destination point and for providing route start and route destination signals, computing means coupled to said first means for responding to said start and destination point signals to derive a first great circle route therebetween and for determining the position of the craft from said route, said computing means responding to offset signals to derive an offset route parallel to and in a selected direction from said first route, and second controllable means coupled to said computing means for providing offset signals representative of a selected offset distance in a selected direction from said first great circle route.

55. An aircraft system for route navigation over an area comprising:

map display means for displaying the area to be navigated and for displaying a route to be navigated in response to route signals, first means coupled to said display means for providing signals representing a start point of a route to be navigated, second means coupled to said display means for sequentially defining signals representative of a succession of destination points over the route to be navigated, and computing means coupled to said first and second means and responsive to said signals representative of said start point signals and to said signals representative of a succession of said destination points to derive said route signals representative of a sequence of routes, the first route being from said start point to a first destination point and a succeeding route being from the first destination point to a second destination point, said computing means coupled to said map display means to apply said route signals thereto.

* * * * *